United States Patent [19]
Bradley et al.

[11] Patent Number: 5,826,076
[45] Date of Patent: Oct. 20, 1998

[54] COMPUTER-BASED INFORMATION ACCESS METHOD AND APPARATUS TO PERMIT SQL-BASED MANIPULATION OF PROGRAMMING LANGUAGE-SPECIFIC DATA FILES

[75] Inventors: John Bradley; Frederick A. Hewett, both of Austin; Bruce D. Sinclair, Round Rock, all of Tex.

[73] Assignee: Liant Software Corporation, Framingham, Mass.

[21] Appl. No.: 242,167

[22] Filed: May 13, 1994

[51] Int. Cl.⁶ ........................................ G06F 17/30
[52] U.S. Cl. .......................... 395/604; 395/703; 395/708
[58] Field of Search ............................ 395/54, 575, 600, 395/650, 700, 602–604, 703, 708

[56] References Cited

U.S. PATENT DOCUMENTS

| | | | |
|---|---|---|---|
| 4,918,588 | 4/1990 | Barrett et al. | 364/DIG. 1 |
| 4,918,593 | 4/1990 | Huber | 364/DIG. 7 |
| 4,930,071 | 5/1990 | Tou et al. | 395/600 |
| 4,931,928 | 6/1990 | Greenfeld | 395/600 |
| 5,091,852 | 2/1992 | Tsuchida et al. | 395/600 |
| 5,230,049 | 7/1993 | Chang et al. | 395/700 |
| 5,295,222 | 3/1994 | Wadhwa et al. | 395/1 |
| 5,307,484 | 4/1994 | Baker et al. | 395/600 |
| 5,379,419 | 1/1995 | Heffernan et al. | 395/600 |
| 5,423,930 | 6/1995 | Song | 395/600 |
| 5,432,930 | 7/1995 | Song | 395/602 |

FOREIGN PATENT DOCUMENTS

| | | |
|---|---|---|
| 0 490 465 A2 | 6/1992 | European Pat. Off. . |
| 0 534 466 A2 | 3/1993 | European Pat. Off. . |
| 2 231 420 | 4/1989 | United Kingdom . |

OTHER PUBLICATIONS

"DATAPLEX: An access to heterogenous distributed databases", Chin–Wan Chung, Communications of the ACM, v33, n1, p. 70(11) Jan. 1990.

International Search Report, PCT/US95/05851; Sep. 26, 1995.

International Application Published Under the Patent Cooperation Treaty, No. WO 93/07564 (Apr. 15, 1993).

*Primary Examiner*—Thomas G. Black
*Assistant Examiner*—Hosain T. Alam
*Attorney, Agent, or Firm*—Arnold, White & Durkee

[57] ABSTRACT

A method and apparatus that permits creation, reading and modification of 3GL application programs by SQL requests. A catalog is created by selecting source programs from 3GL application data for which file definitions are to be extracted, identifying specific files within the selected source programs to be processed, extracting appropriate schema from the selected files, and recording the appropriate schema in a catalog. Once the 3GL-specific data schema contained in the application source has been extracted and stored in the catalog, the relational database which is to be based upon the data represented by the 3GL schema is defined and stored in the system catalog so that tables in the relational database may be accessed by a runtime SQL database engine. Further, both 3GL data and relational database data may be modified and maintained with a single tool set. After the catalog is created, the invention uses the catalog to process SQL requests in order to access the relational database representation of the 3GL data by parsing the SQL query request, generating a set of possible execution plans for manipulating the relational form of the data, selecting an optimal plan based upon information provided from the system catalog, and executing the plan by servicing the SQL request for relational data from the underlying 3GL data files described in the system catalog.

23 Claims, 148 Drawing Sheets

Microfiche Appendix Included
(3 Microfiche, 191 Pages)

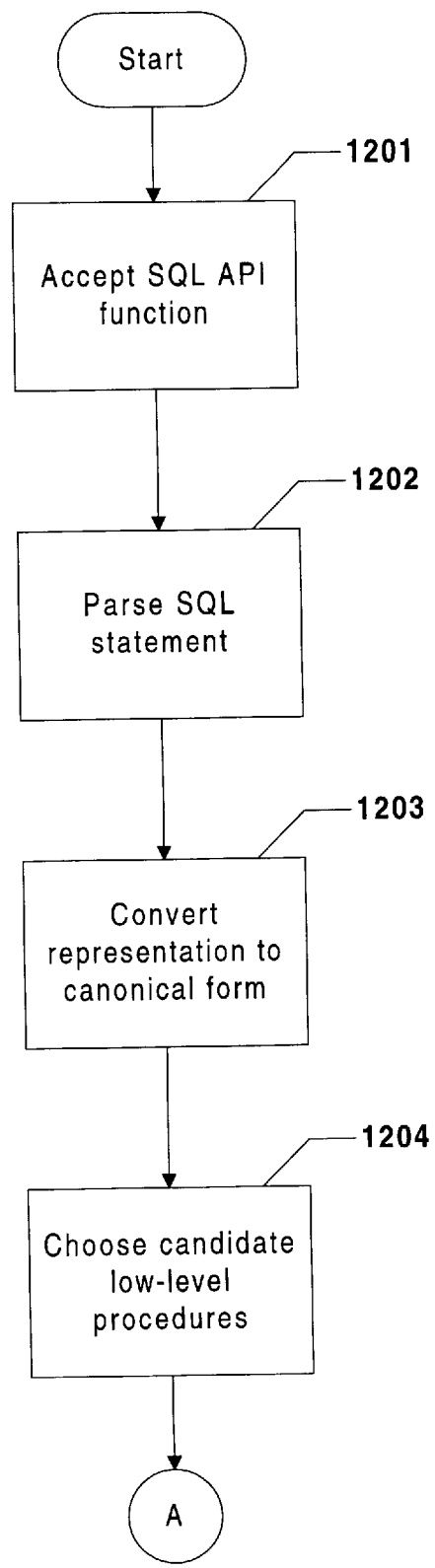
Figure 12A1

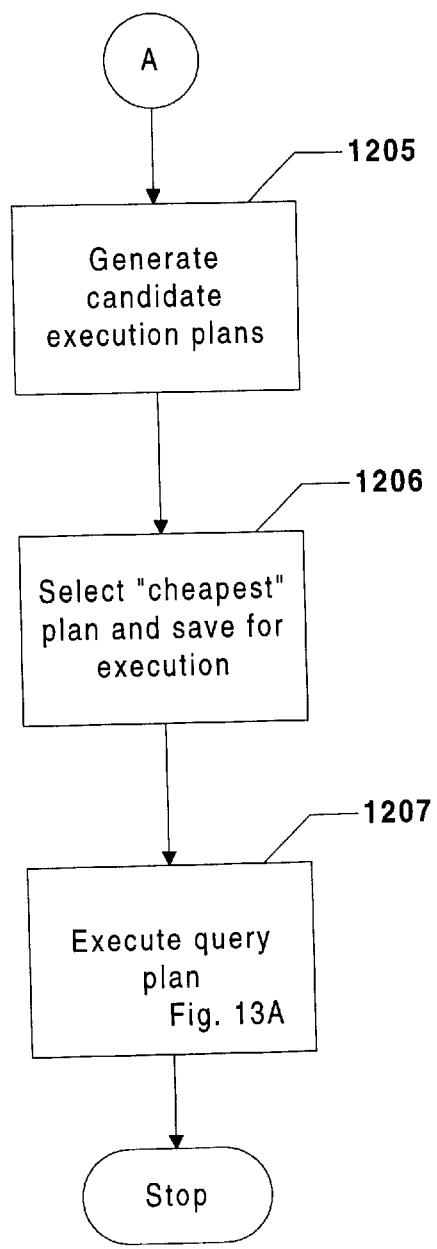
Figure 12A2

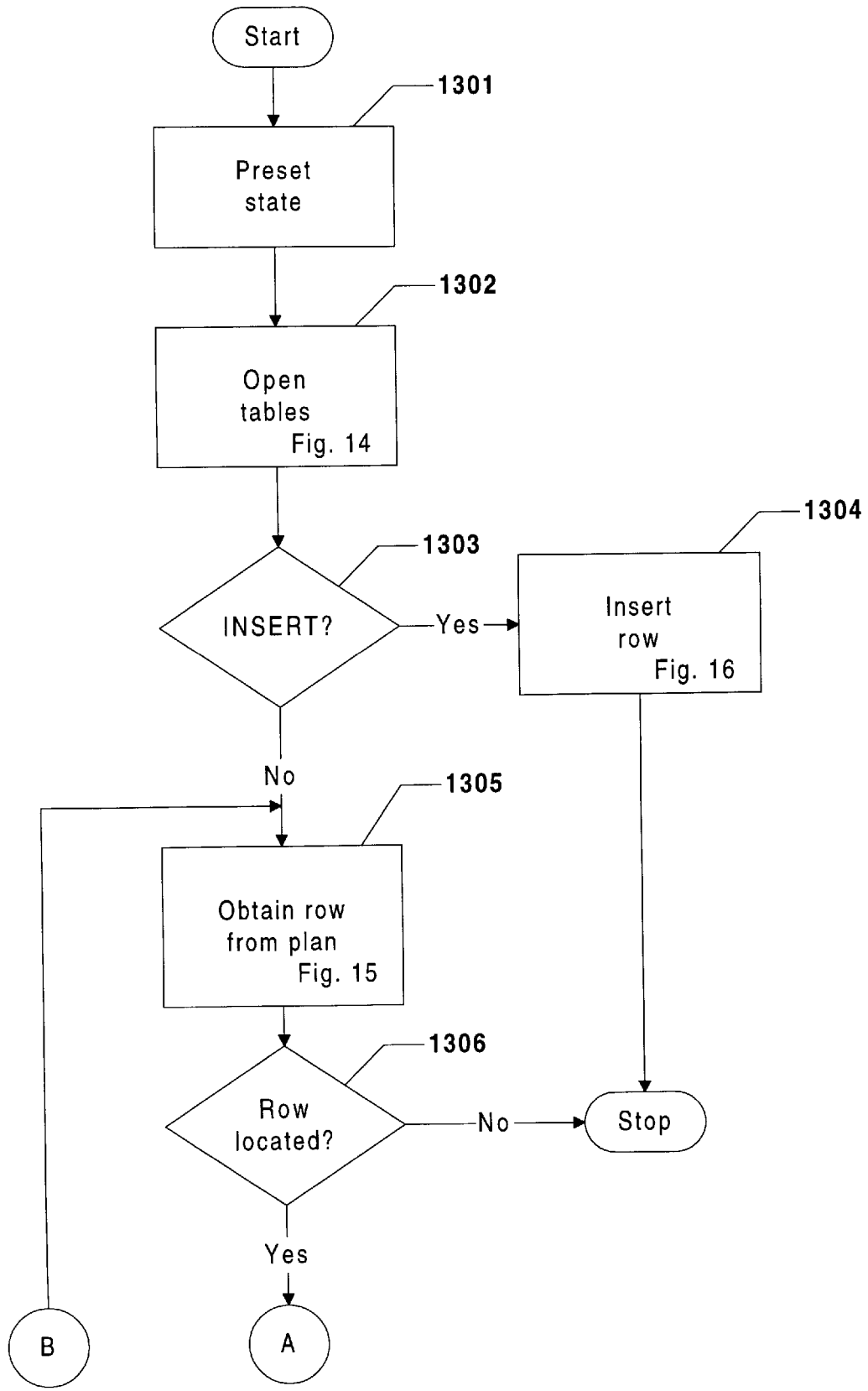
Figure 13A1

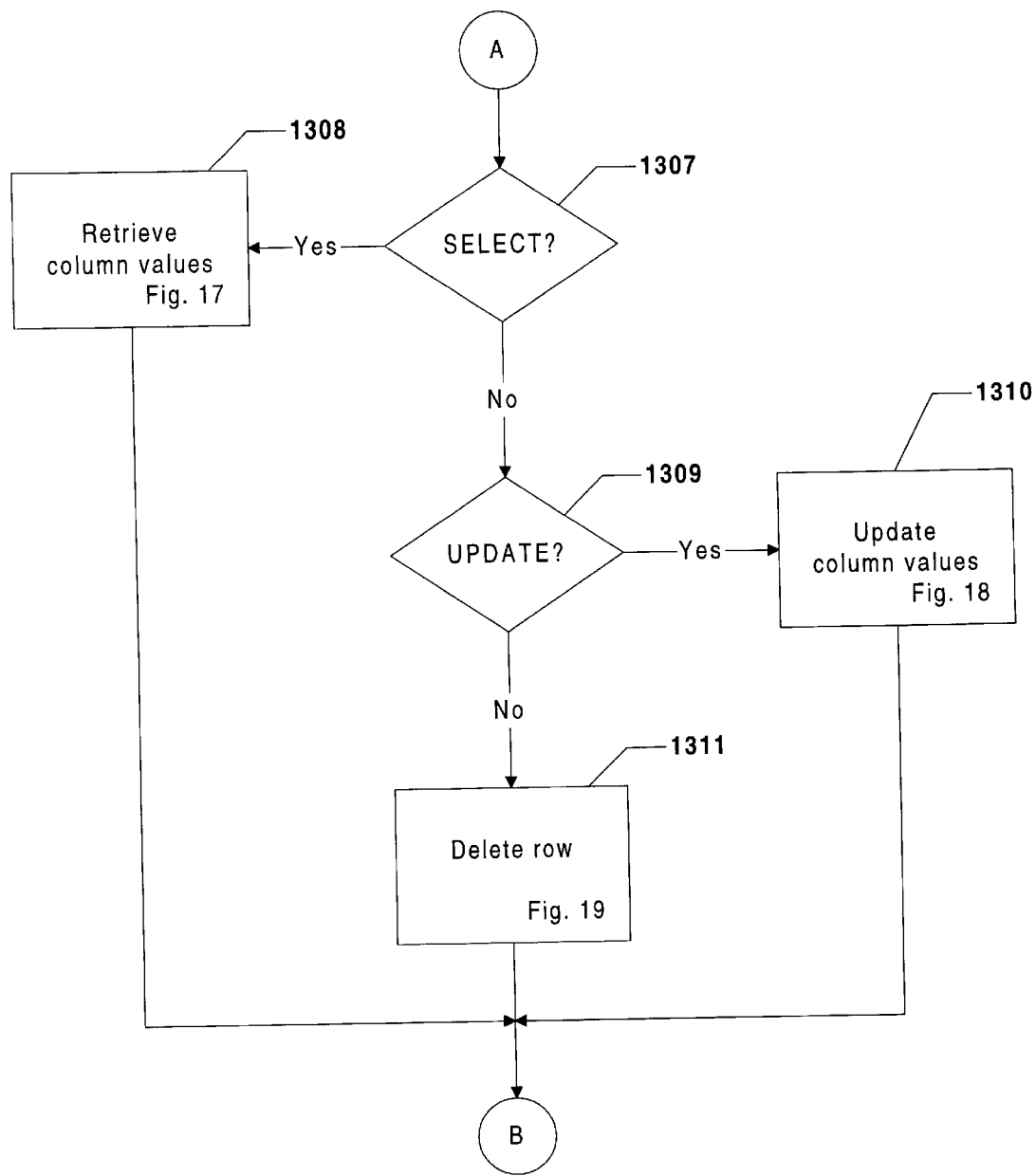
Figure 13A2

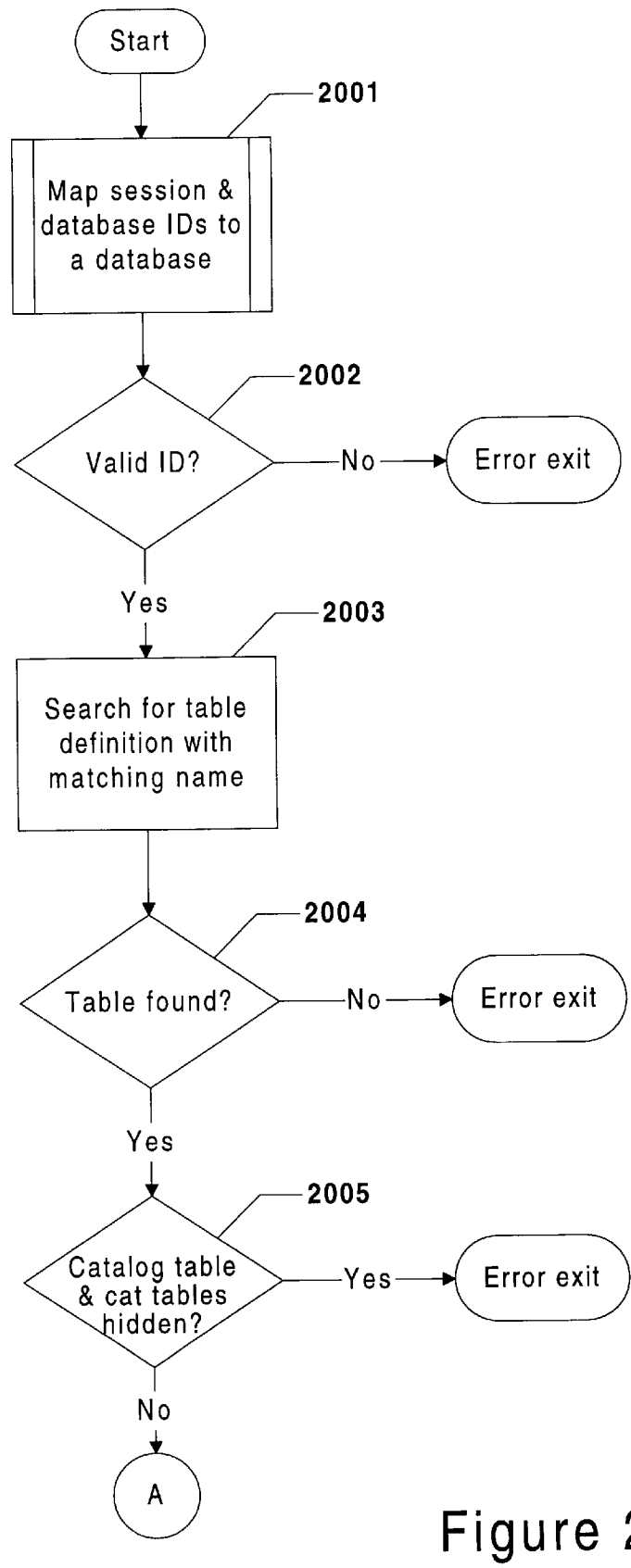
Figure 20A1

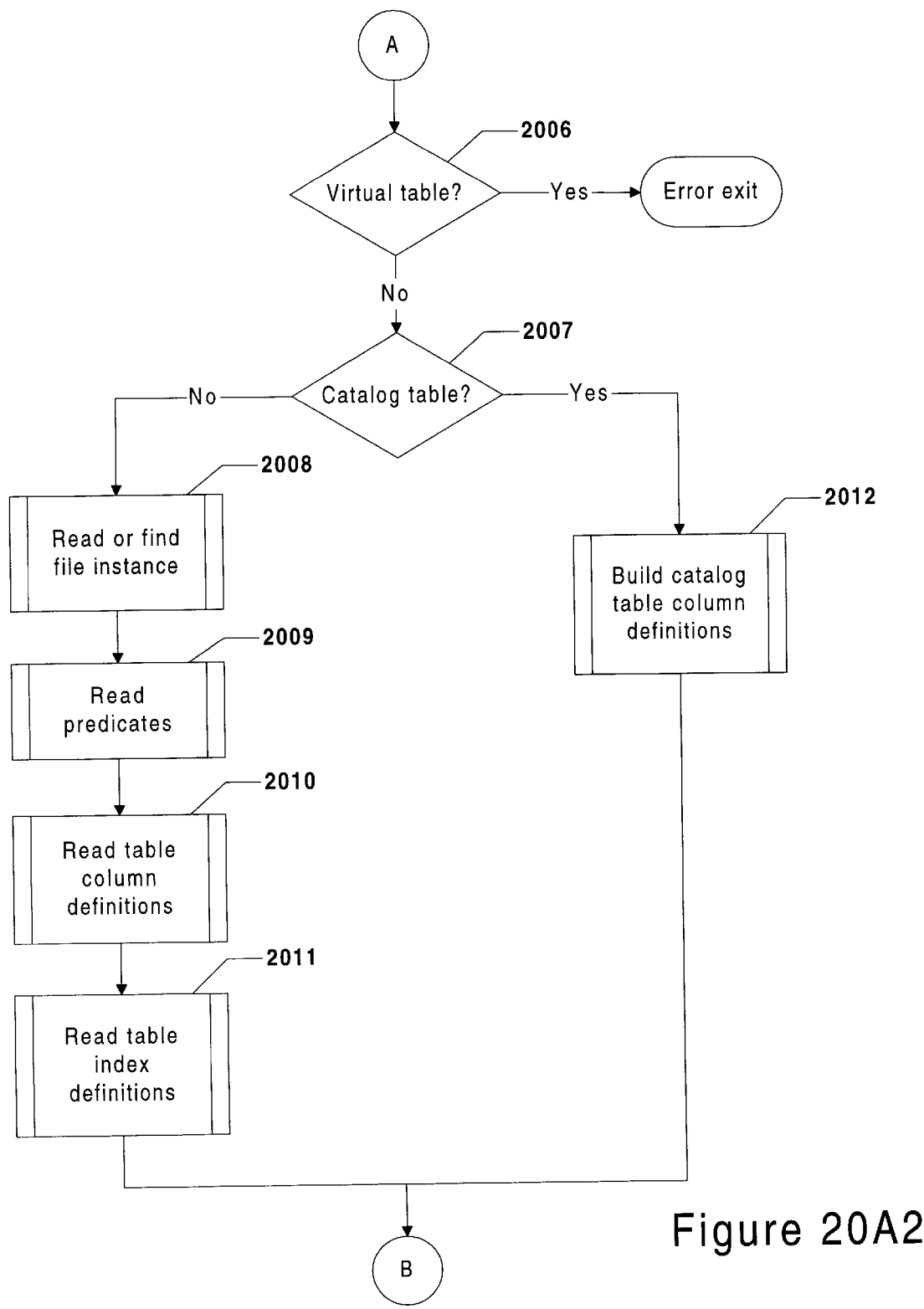
Figure 20A2

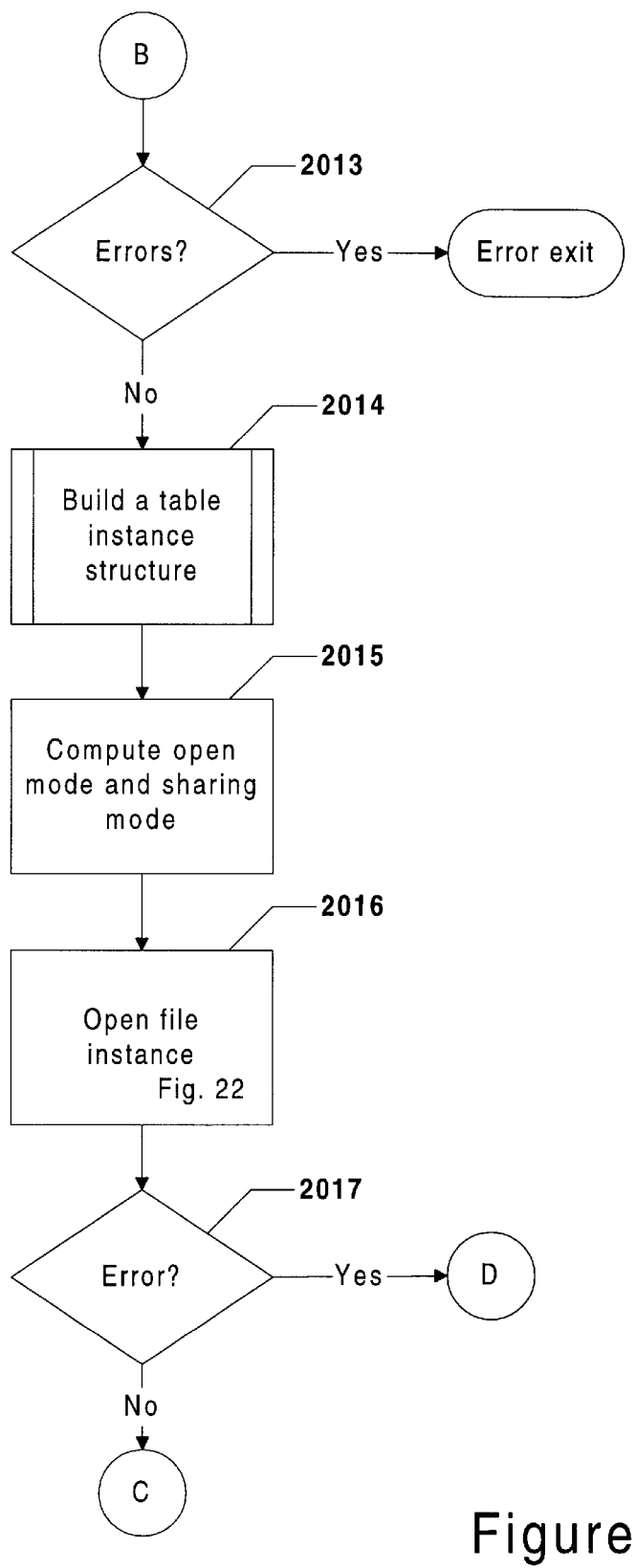
Figure 20A3

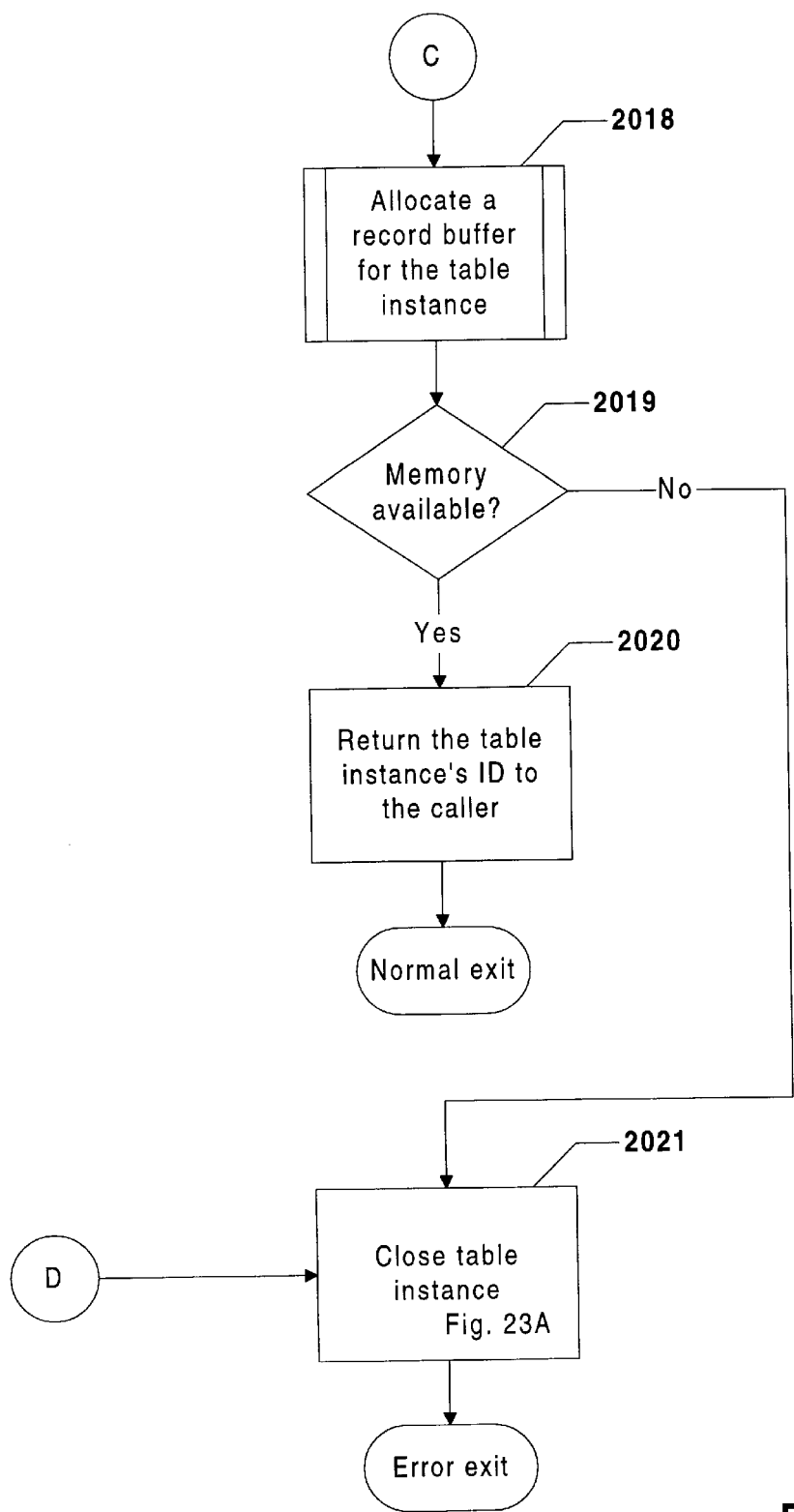
Figure 20A4

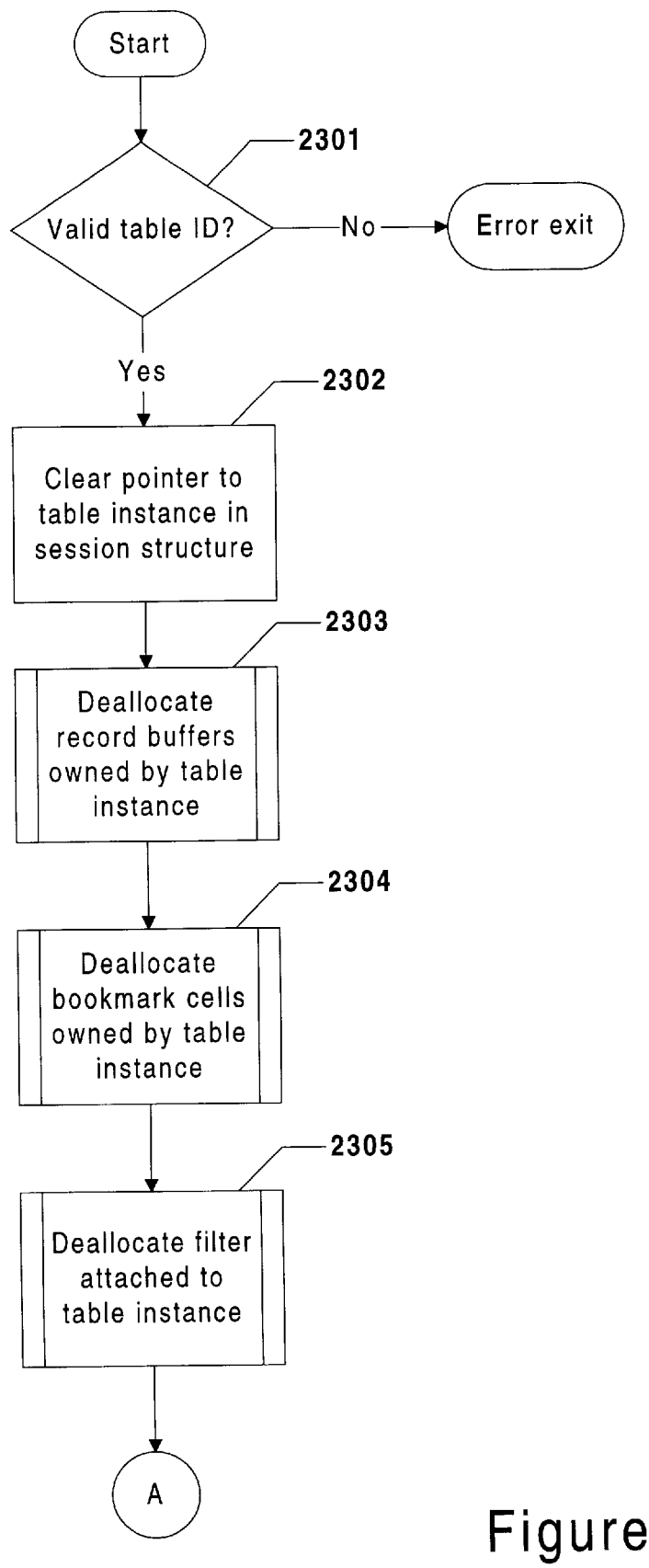
Figure 23A1

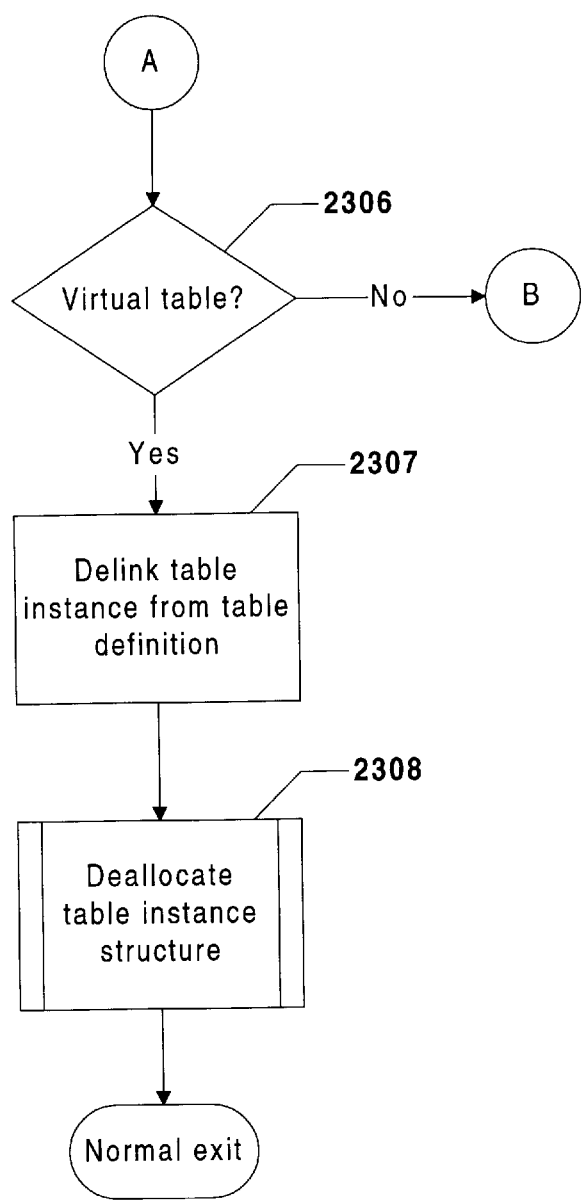
Figure 23A2

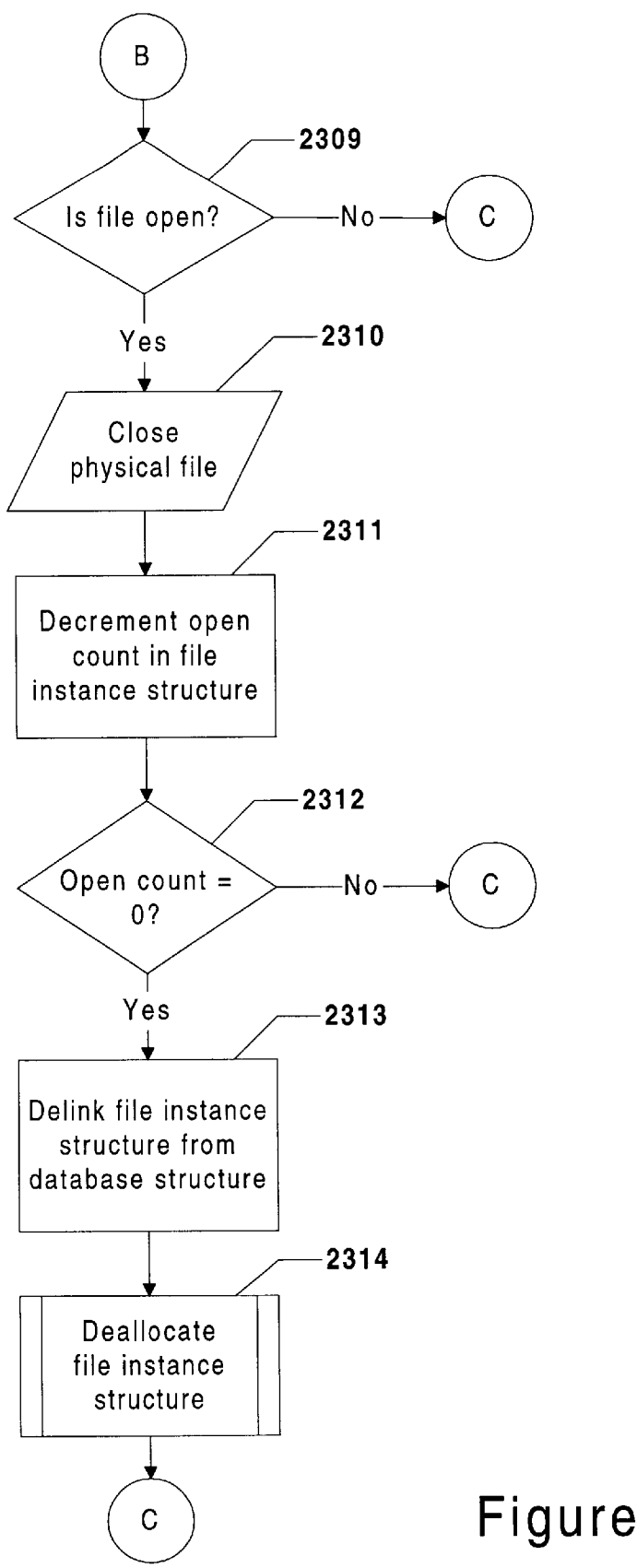
Figure 23A3

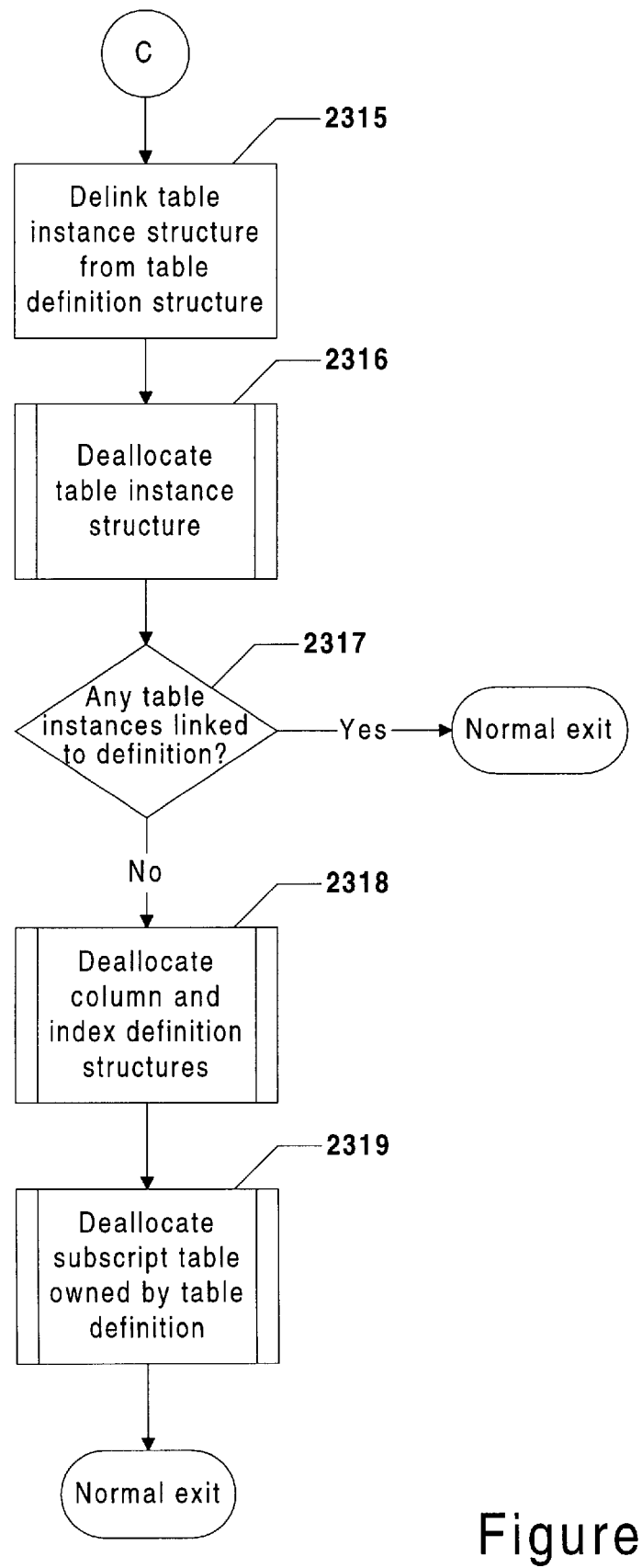
Figure 23A4

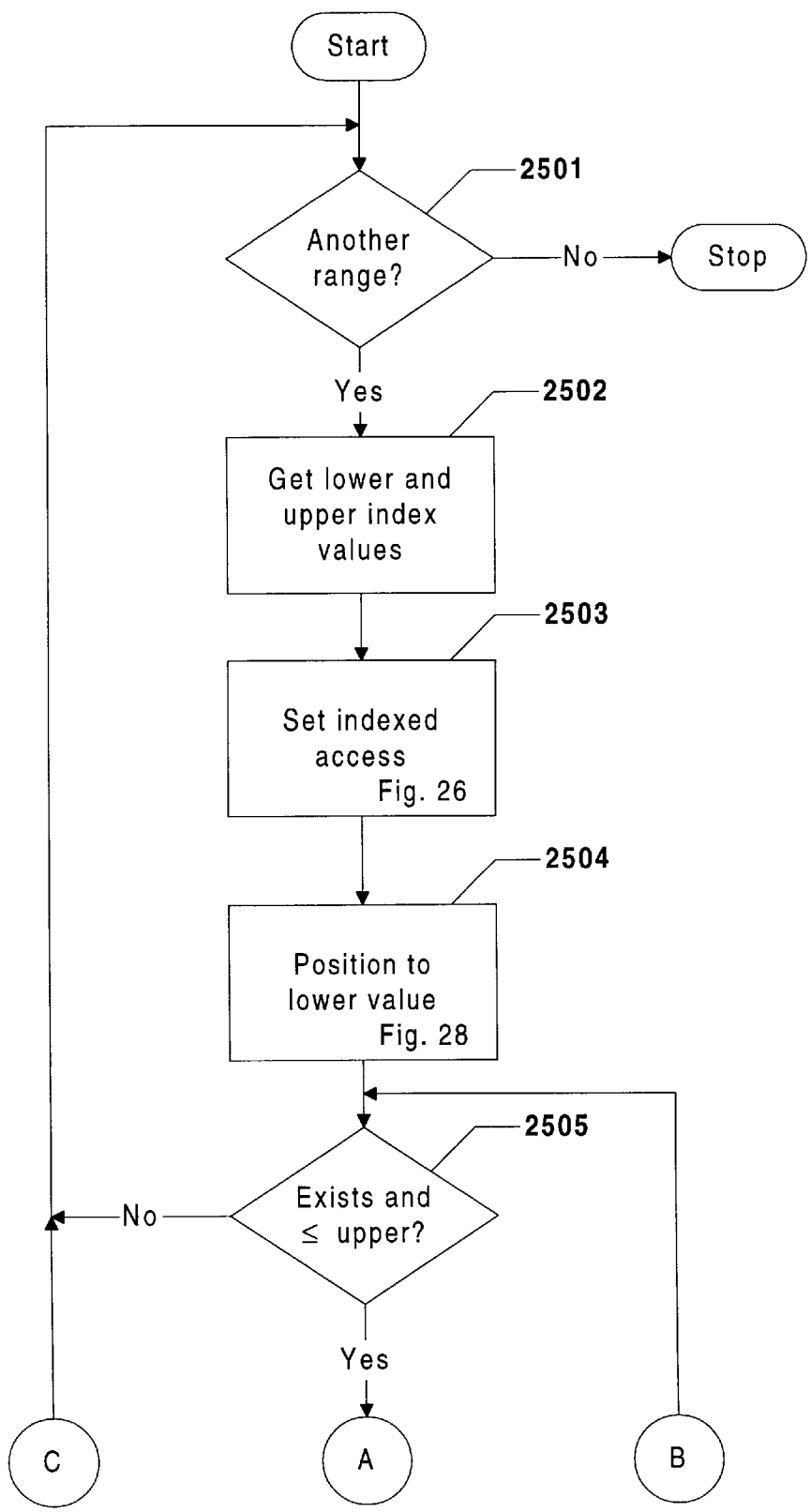
Figure 25A1

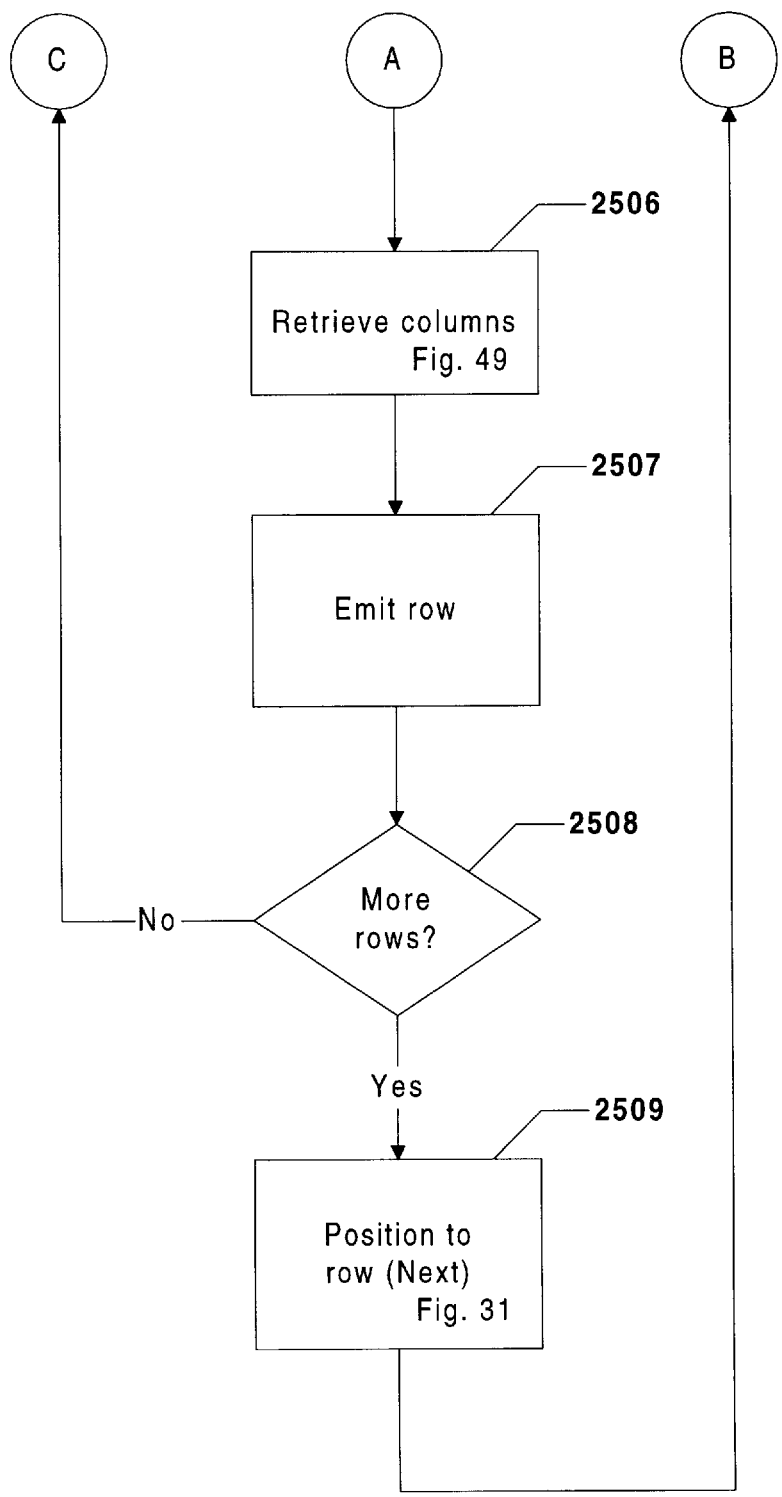
Figure 25A2

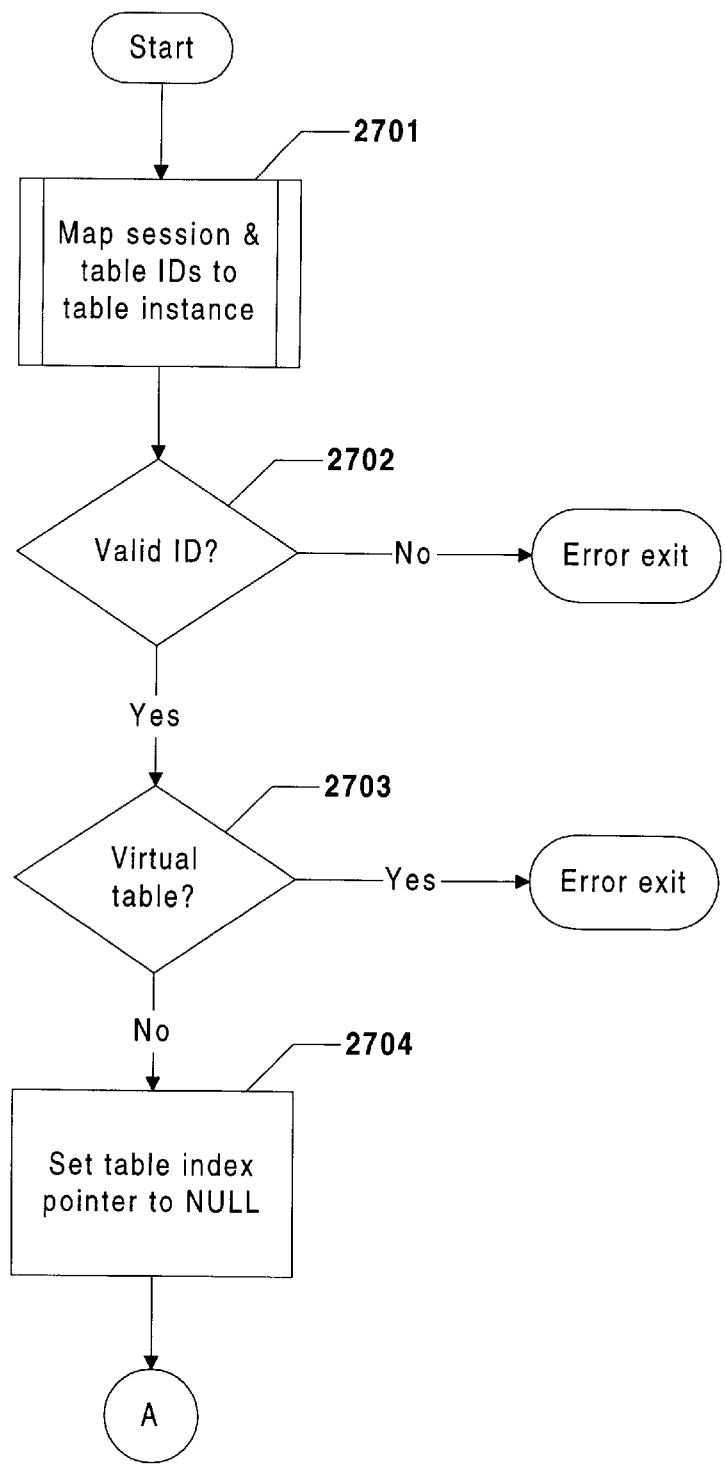
Figure 27A1

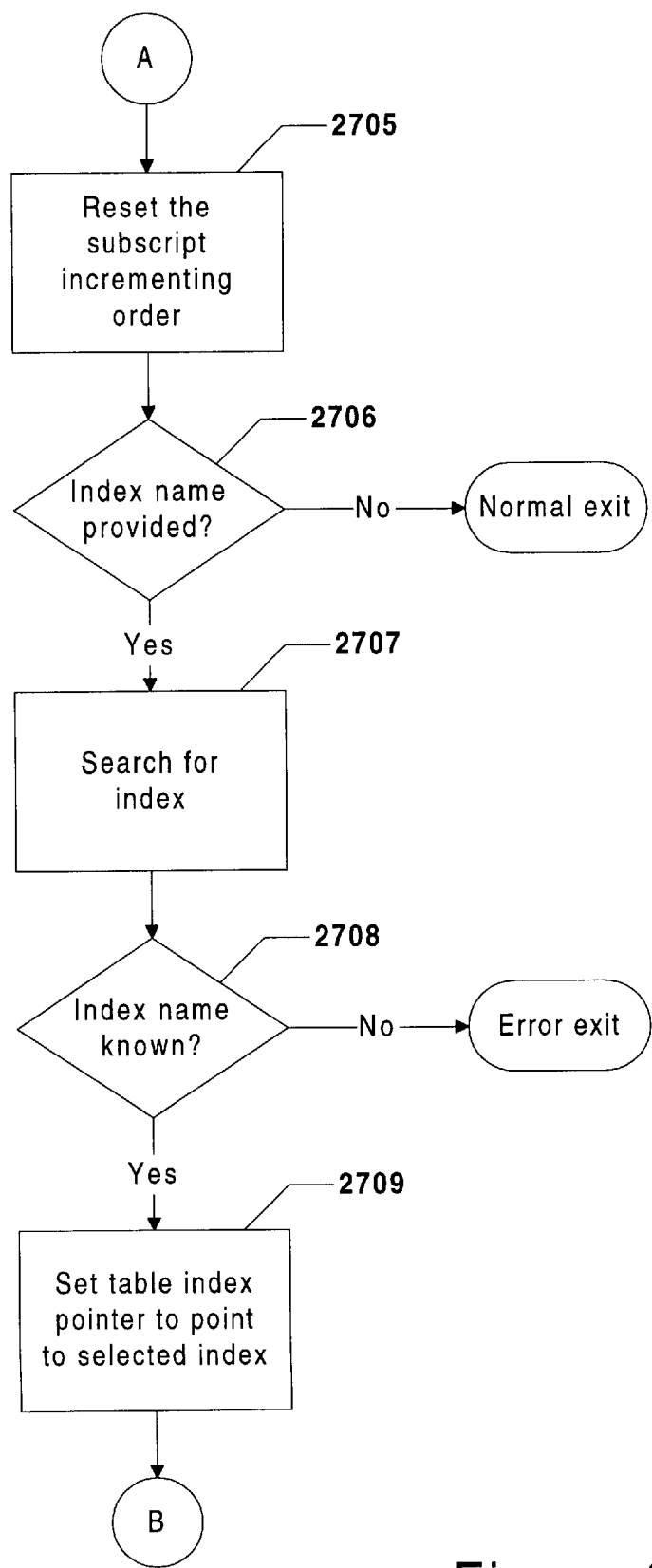
Figure 27A2

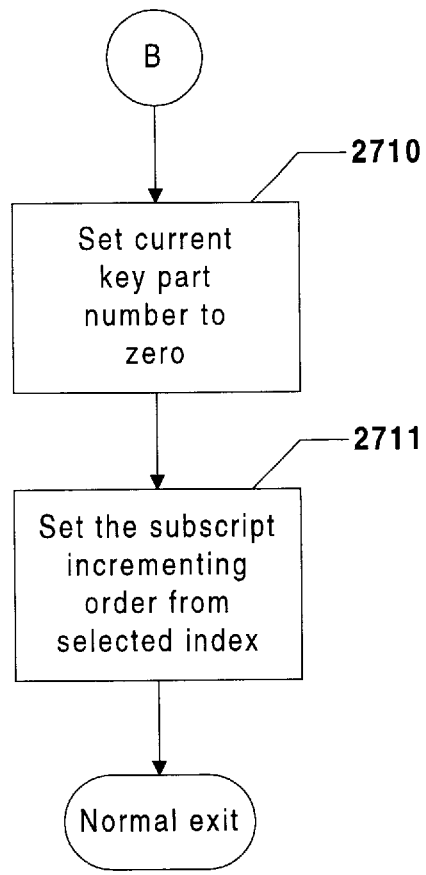
Figure 27A3

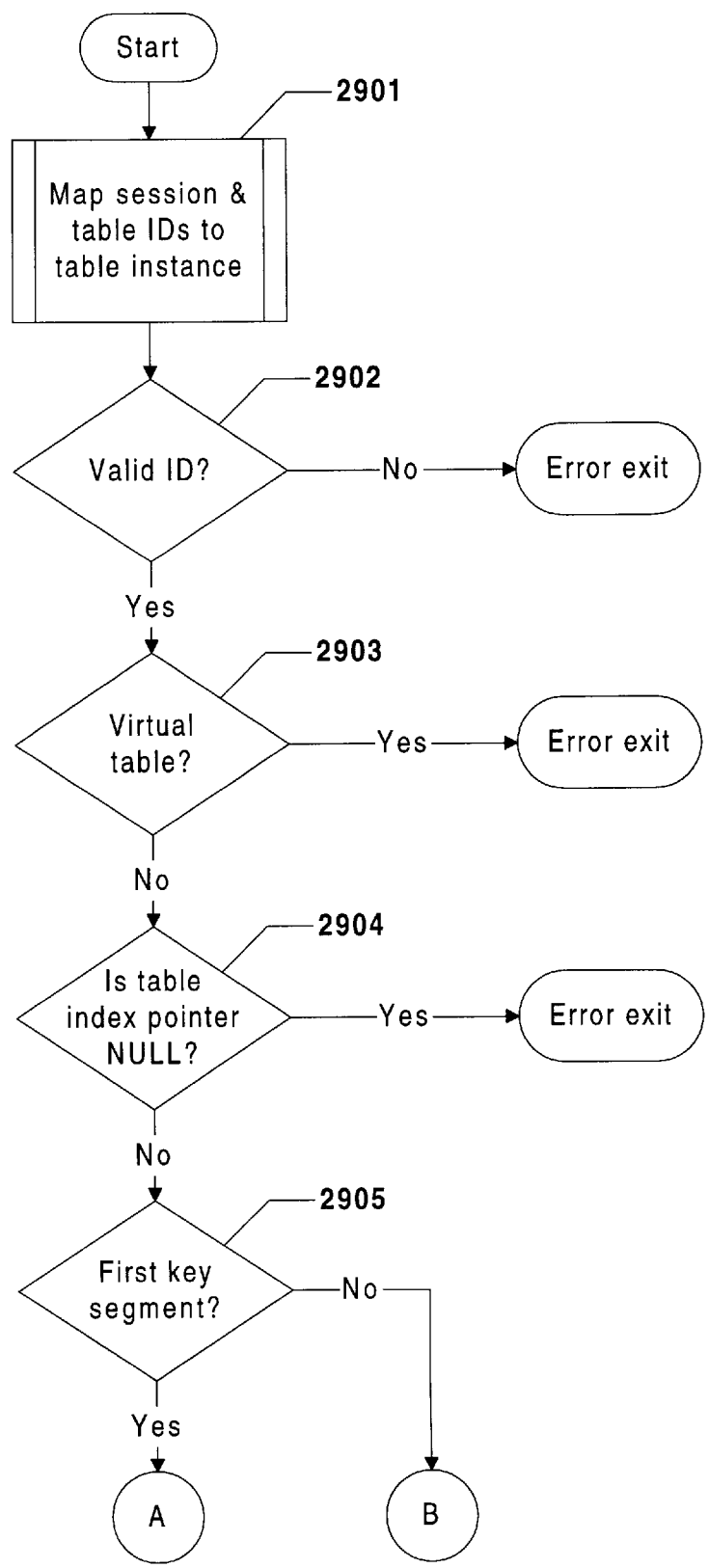
Figure 29A1

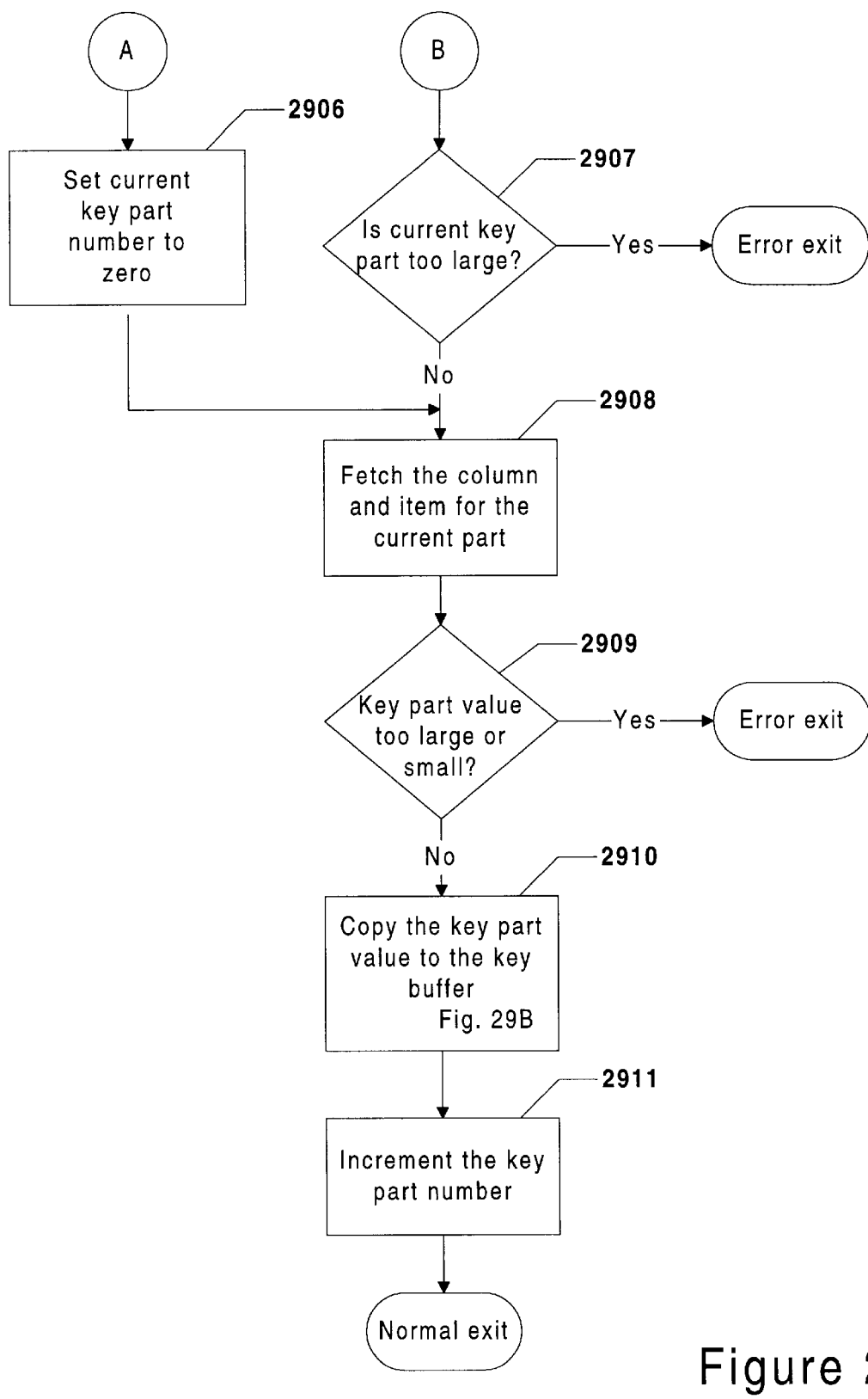
Figure 29A2

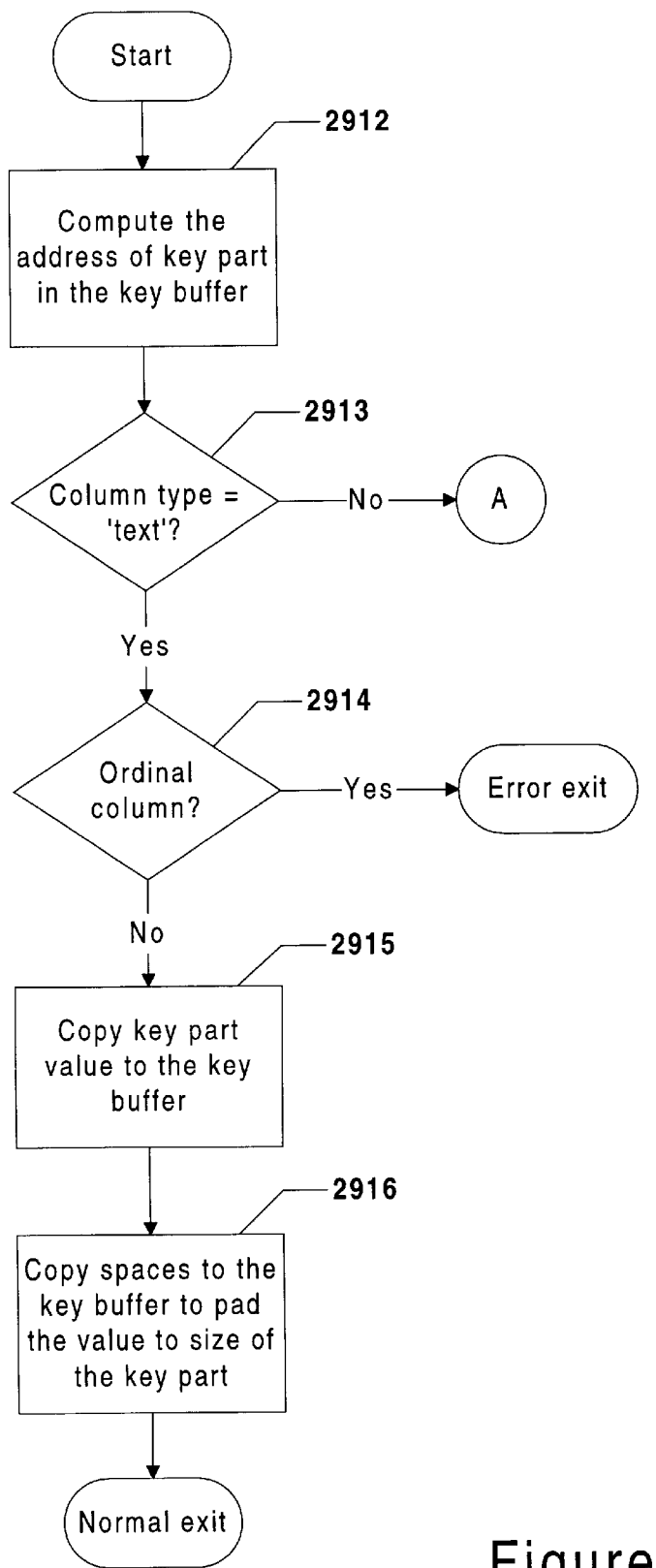
Figure 29B1

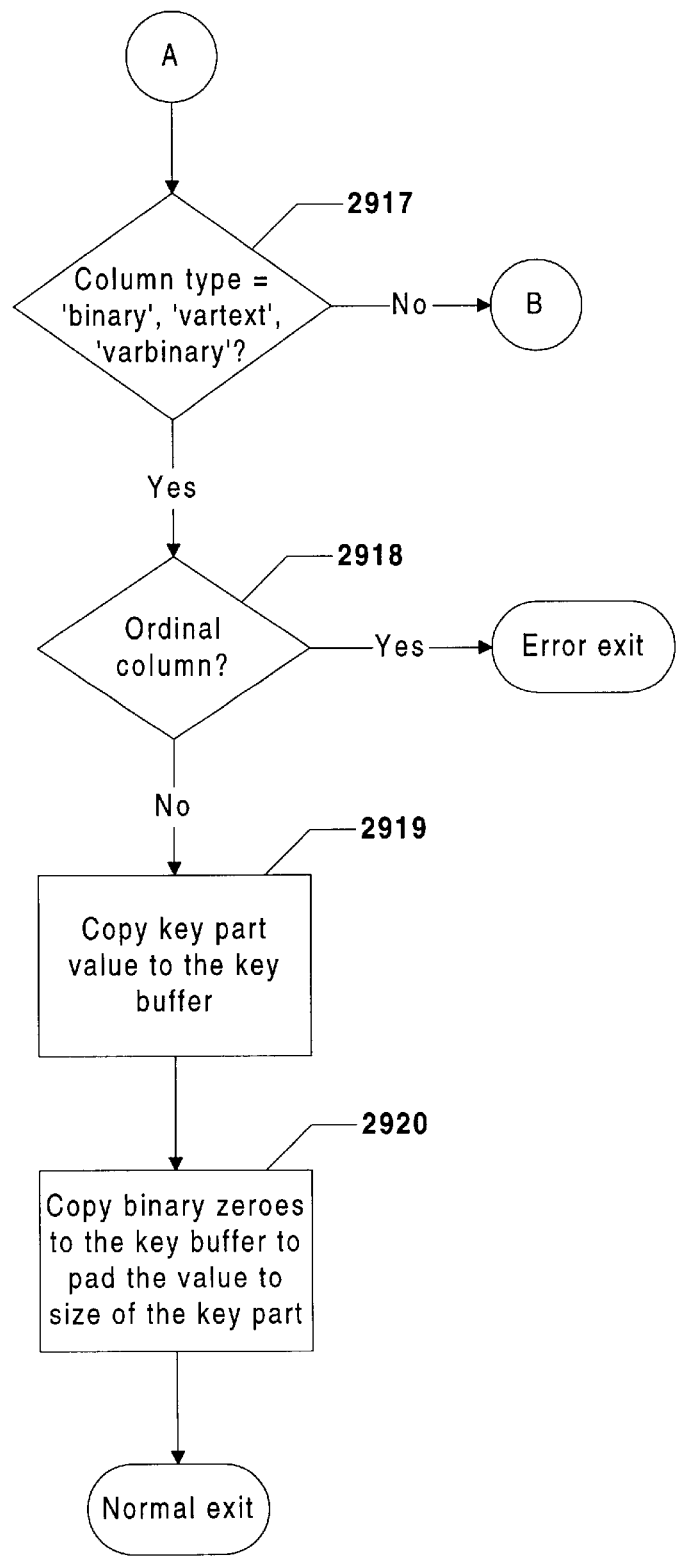
Figure 29B2

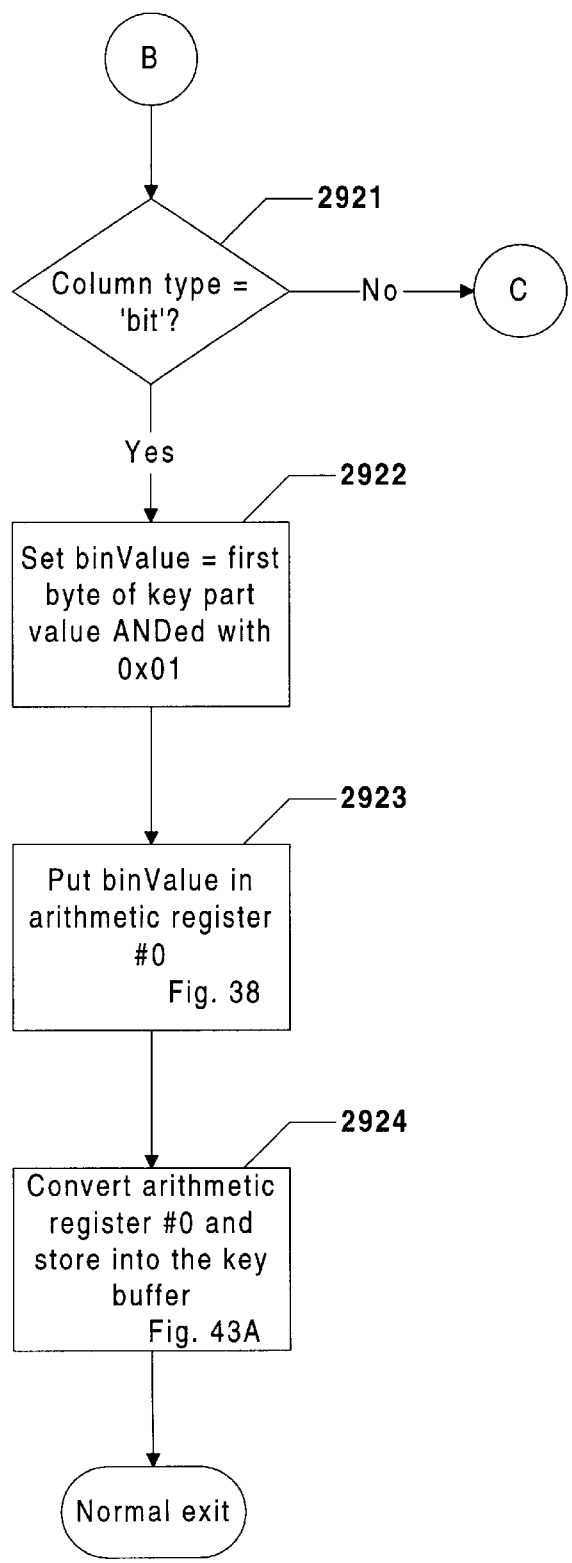
Figure 29B3

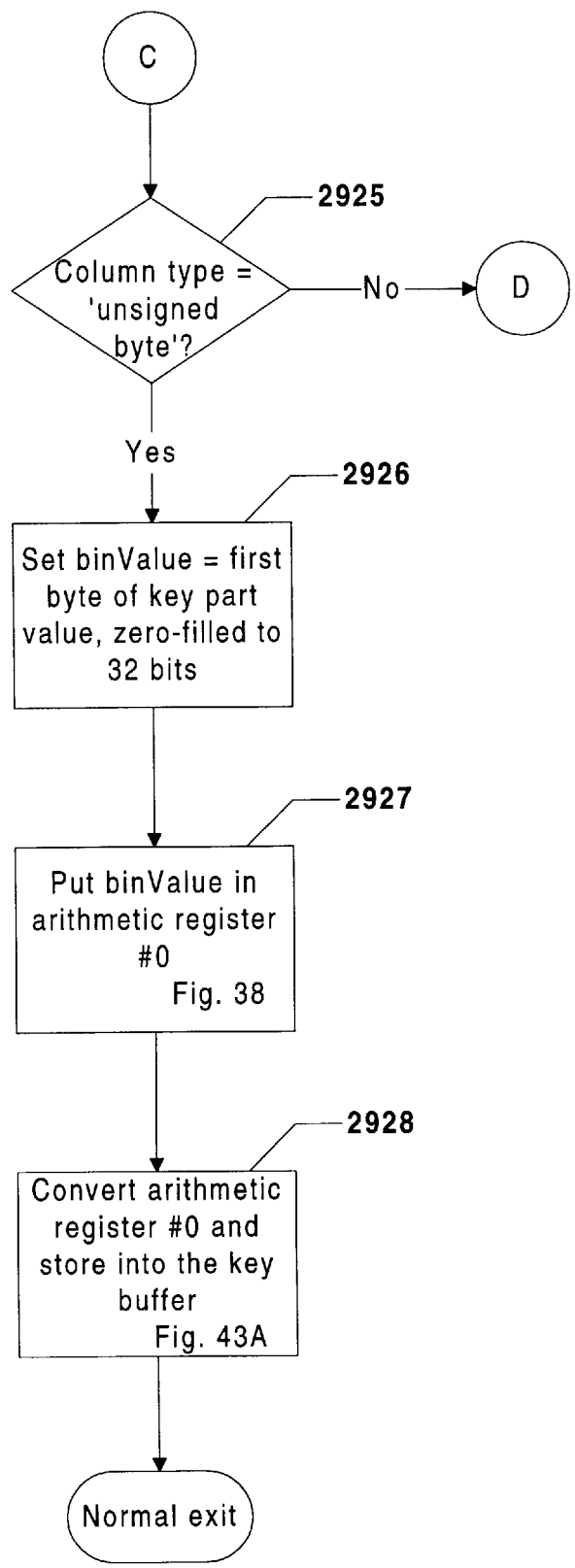
Figure 29B4

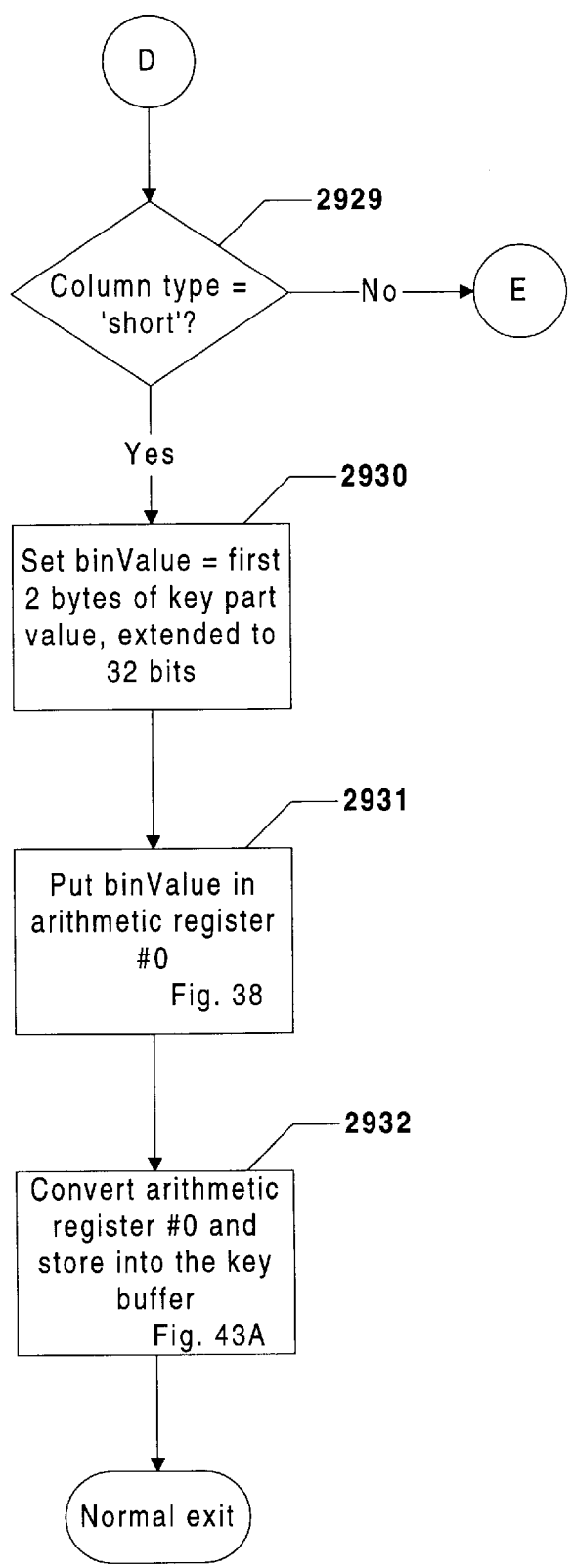
Figure 29B5

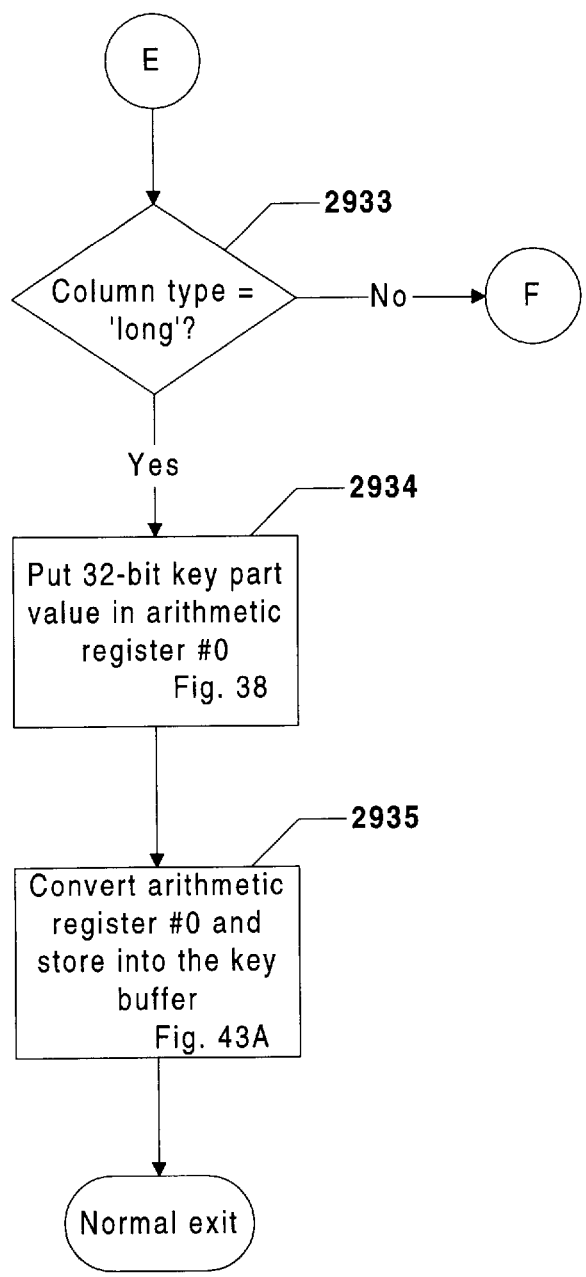
Figure 29B6

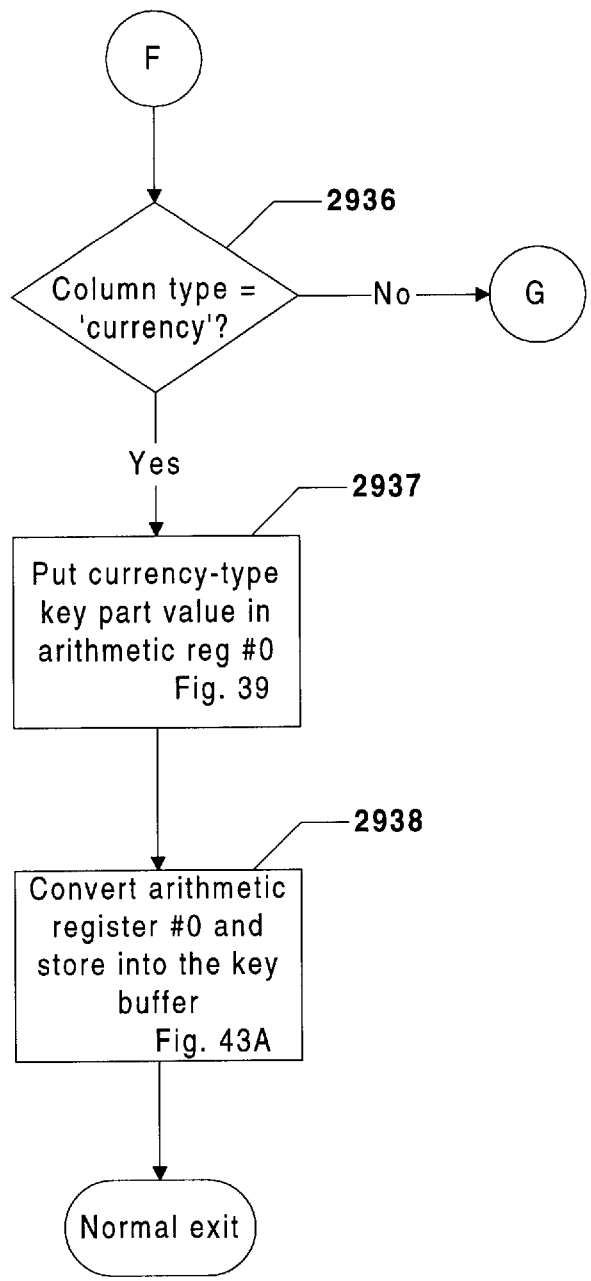
Figure 29B7

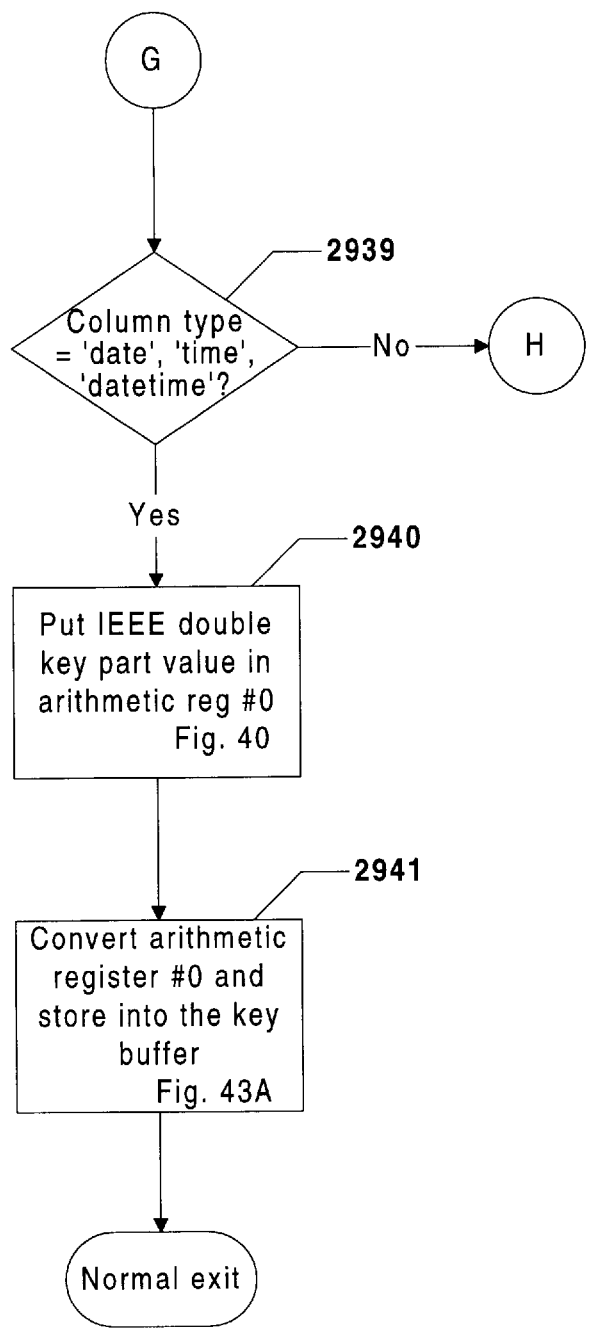
Figure 29B8

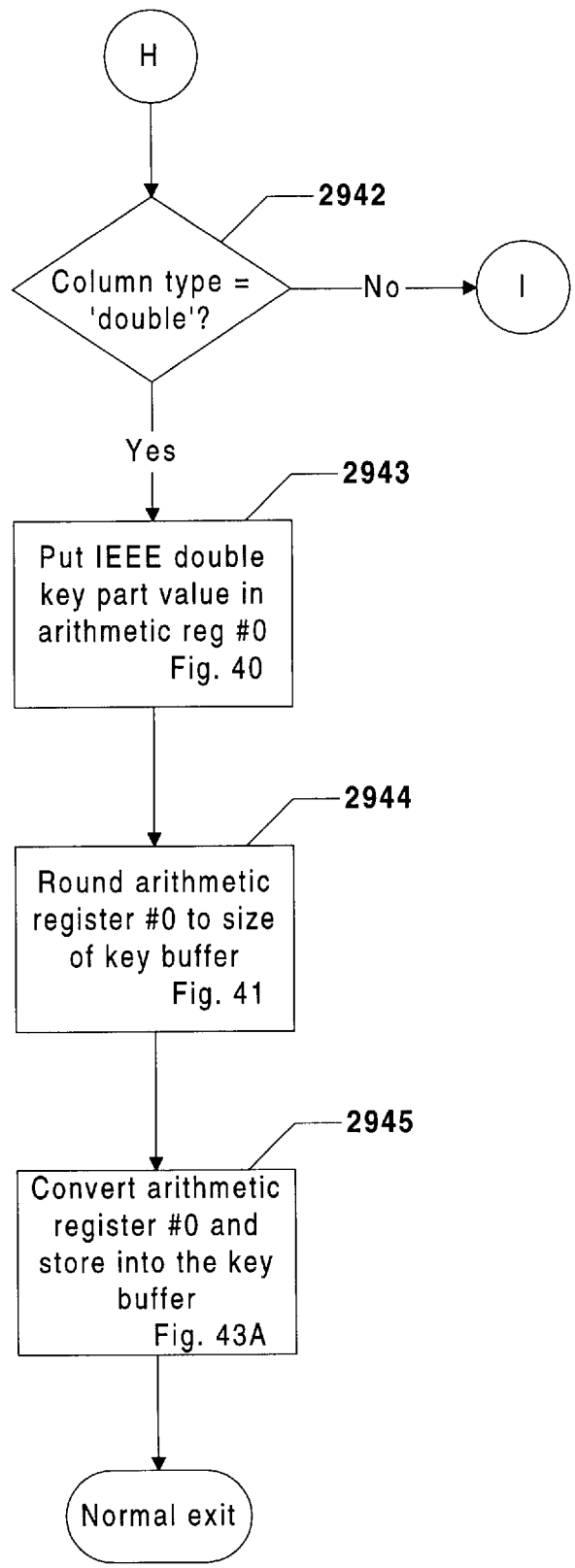
Figure 29B9

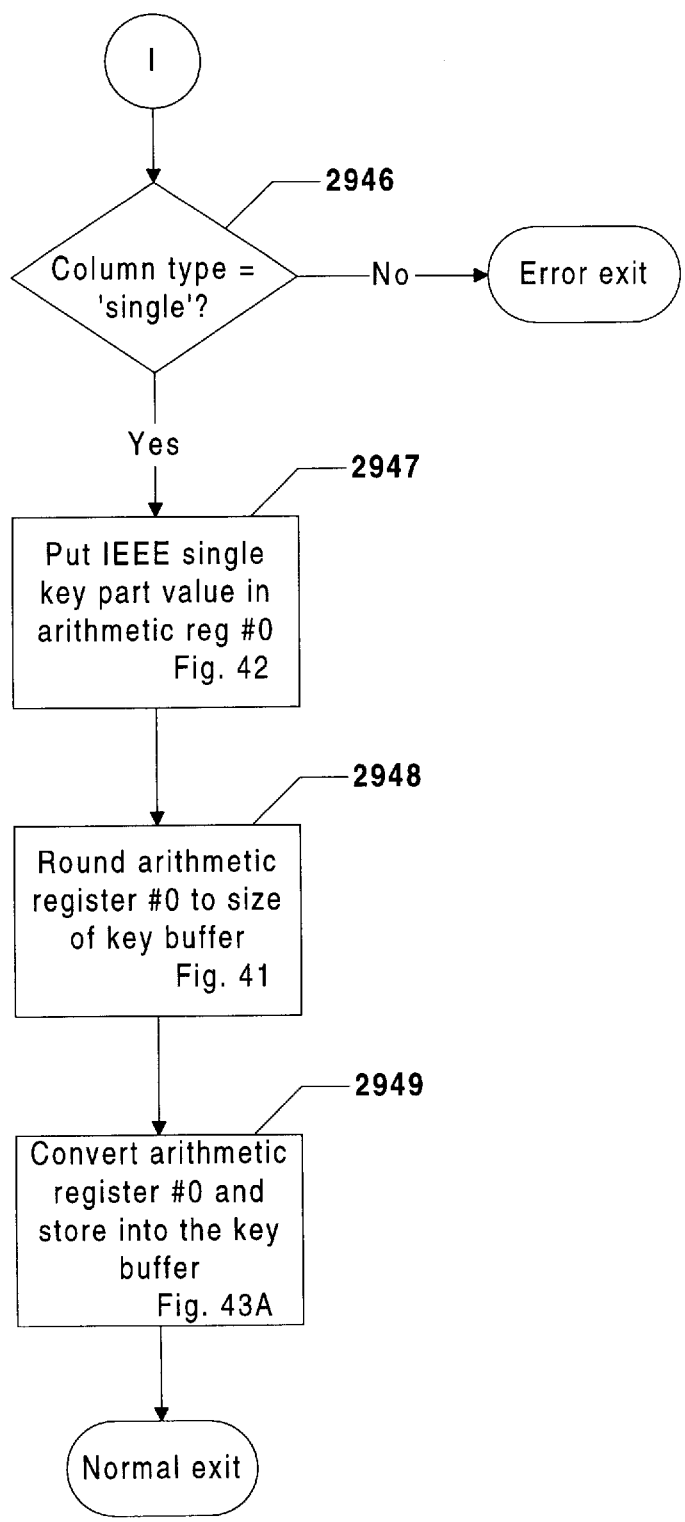
Figure 29B10

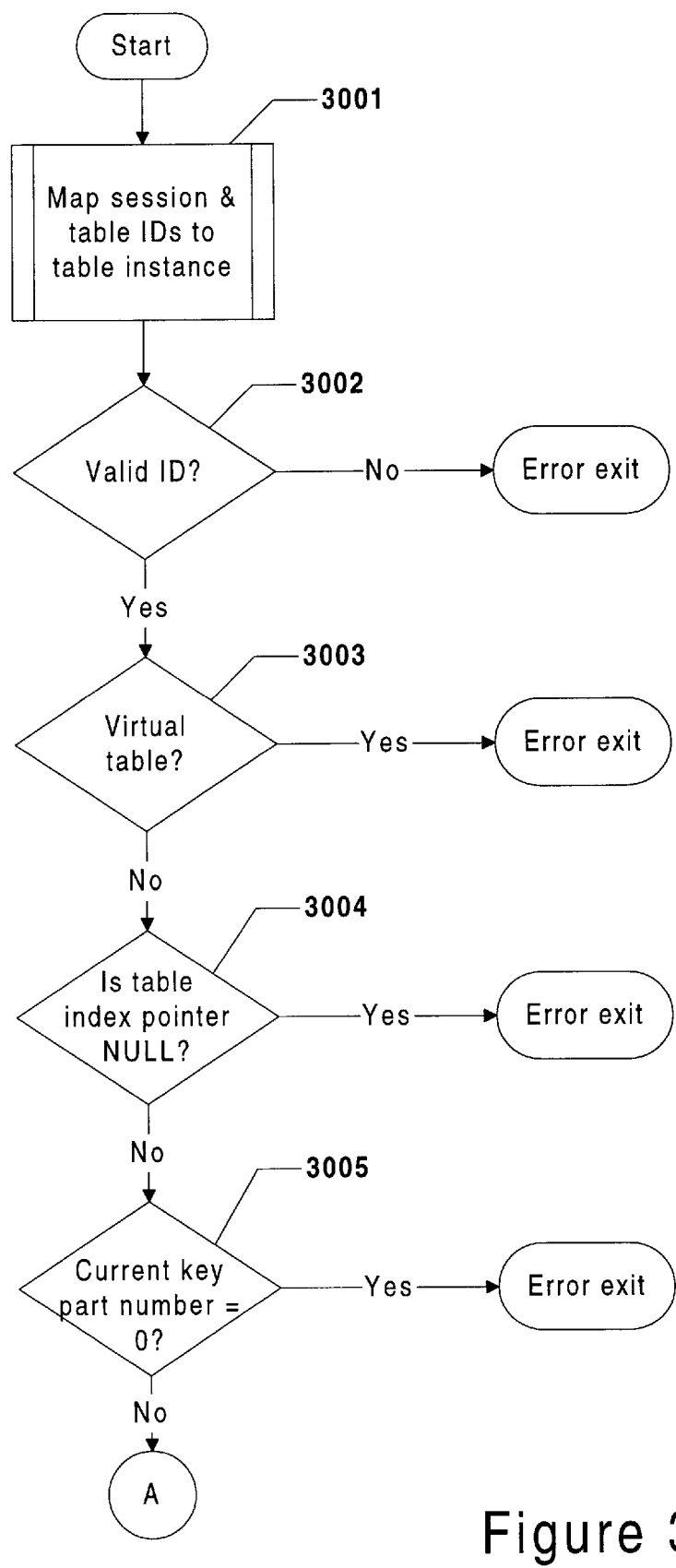
Figure 30A1

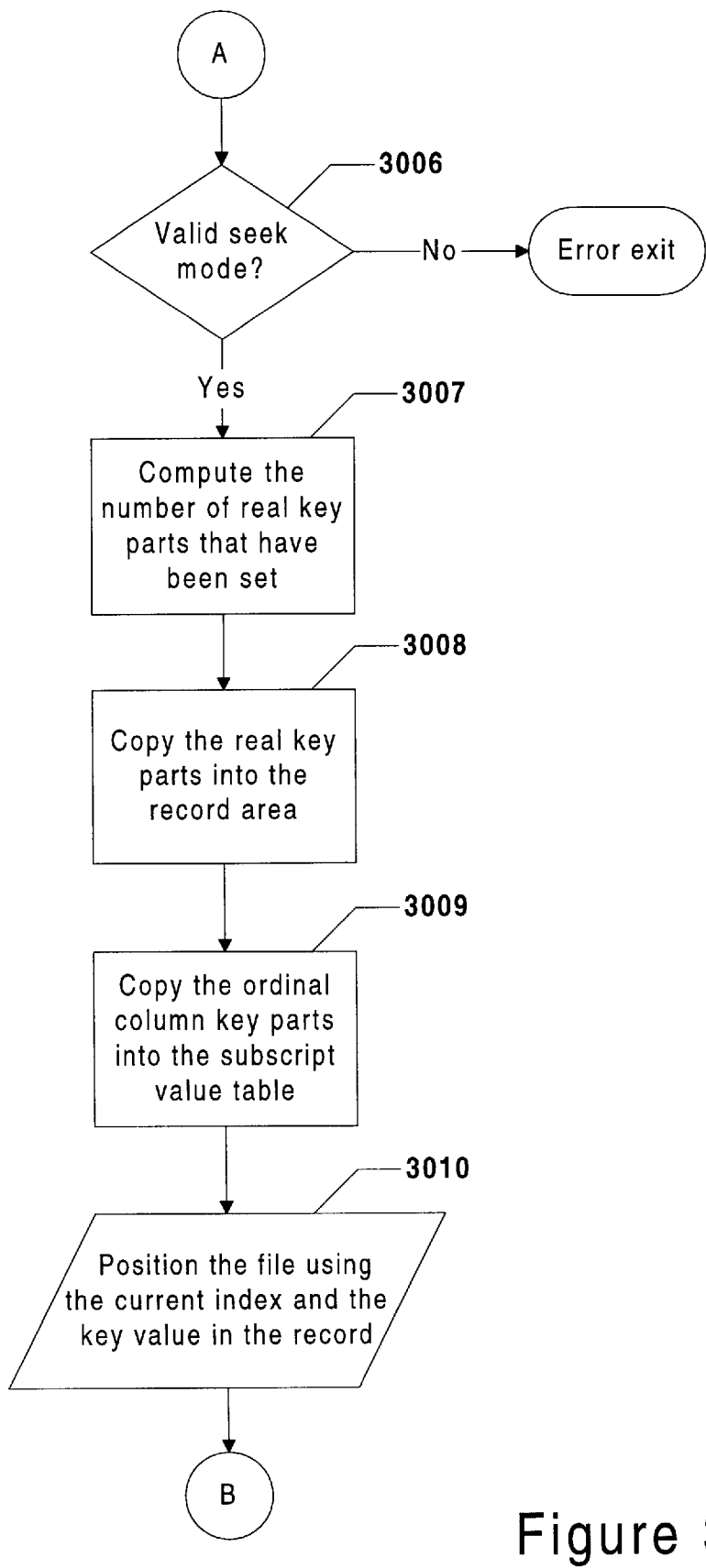
Figure 30A2

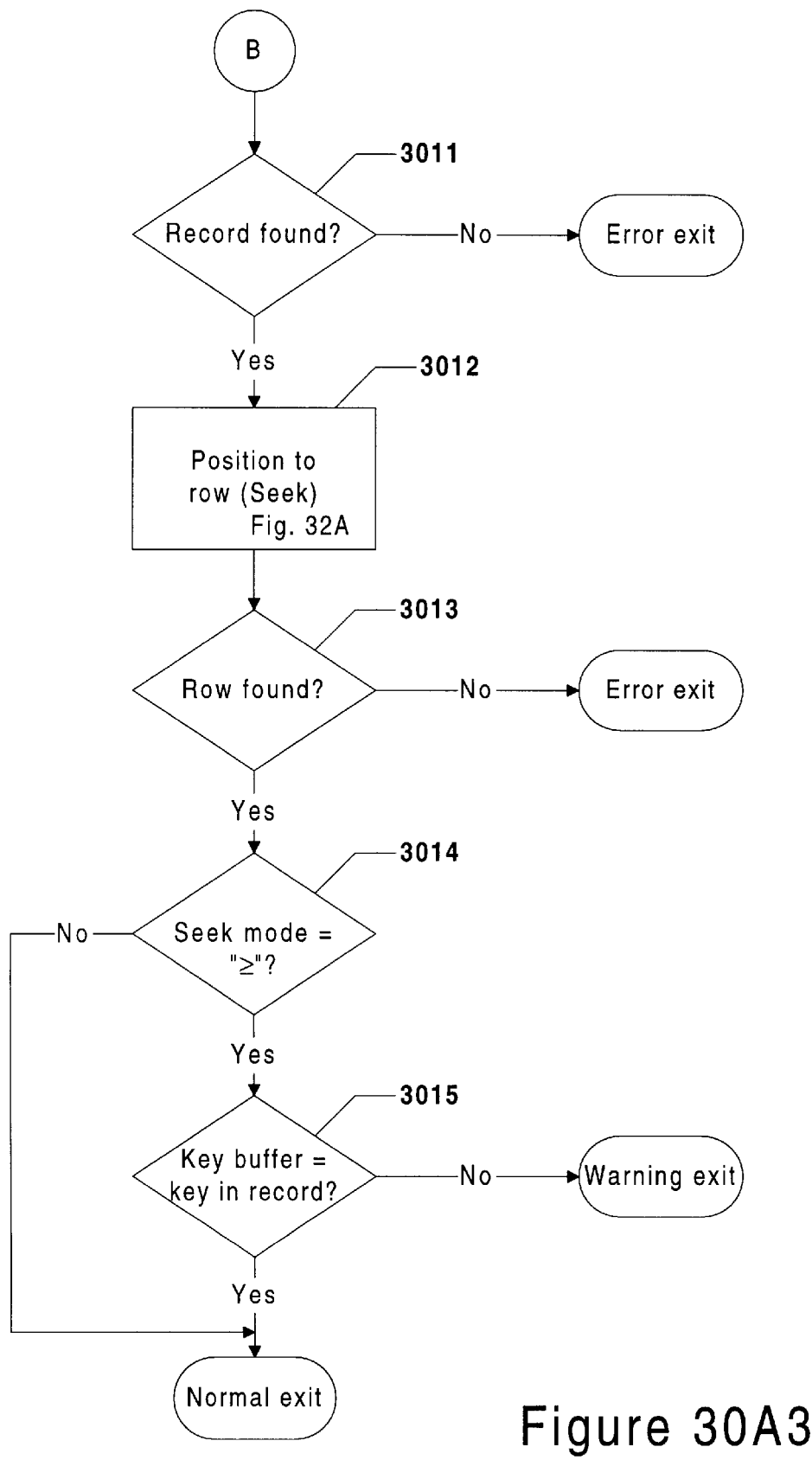
Figure 30A3

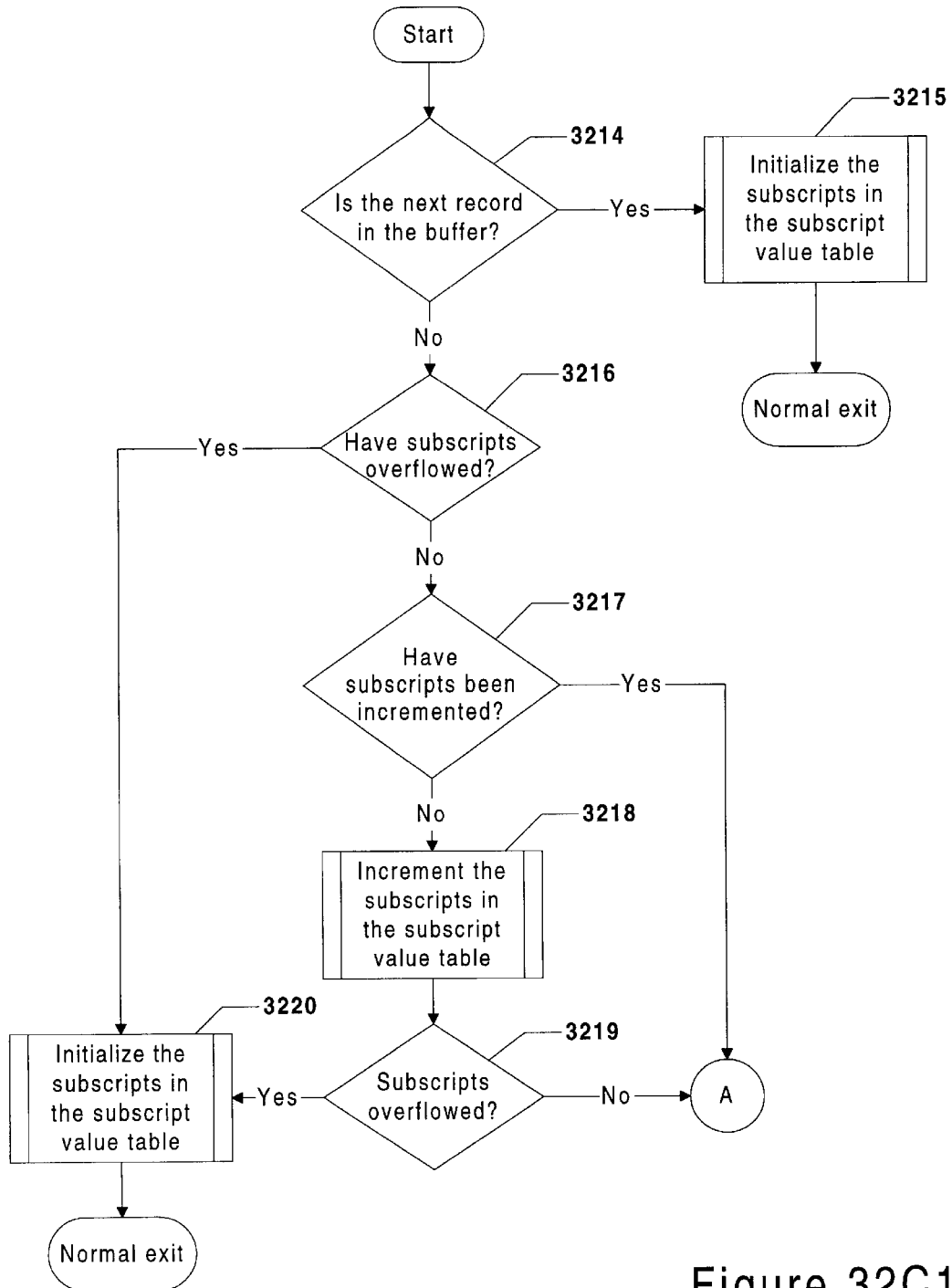
Figure 32C1

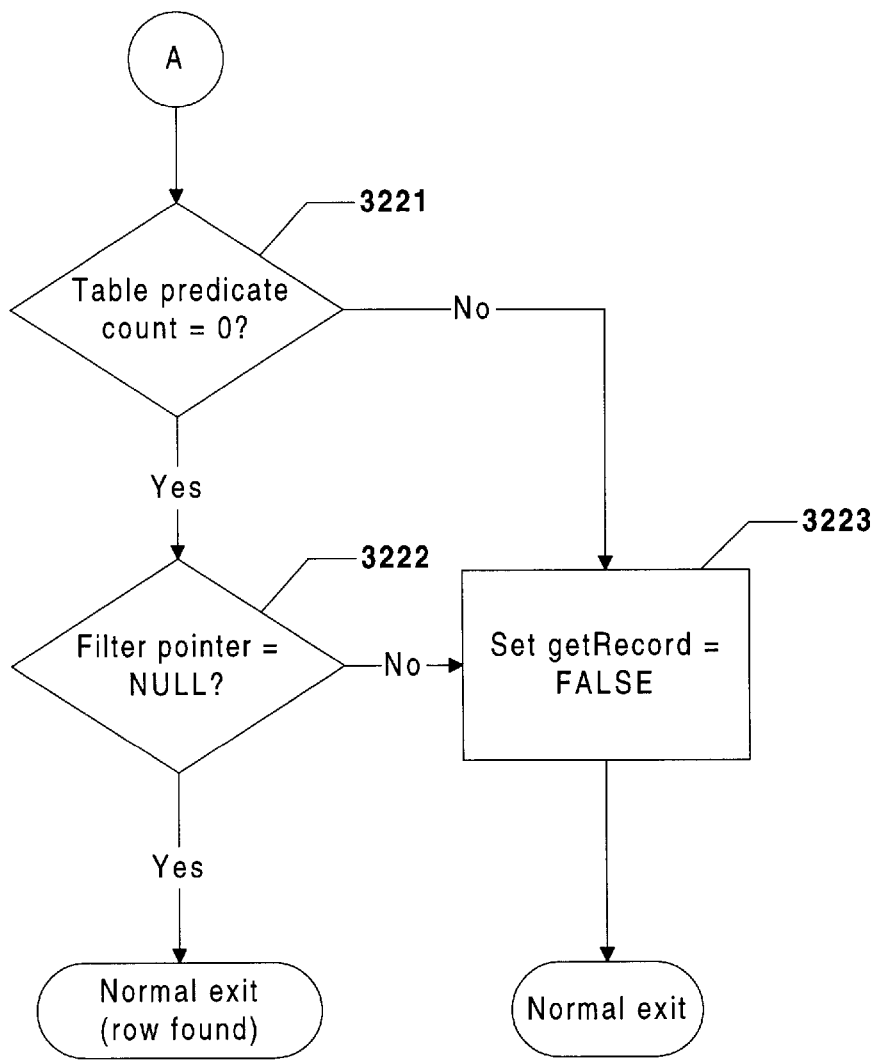
Figure 32C2

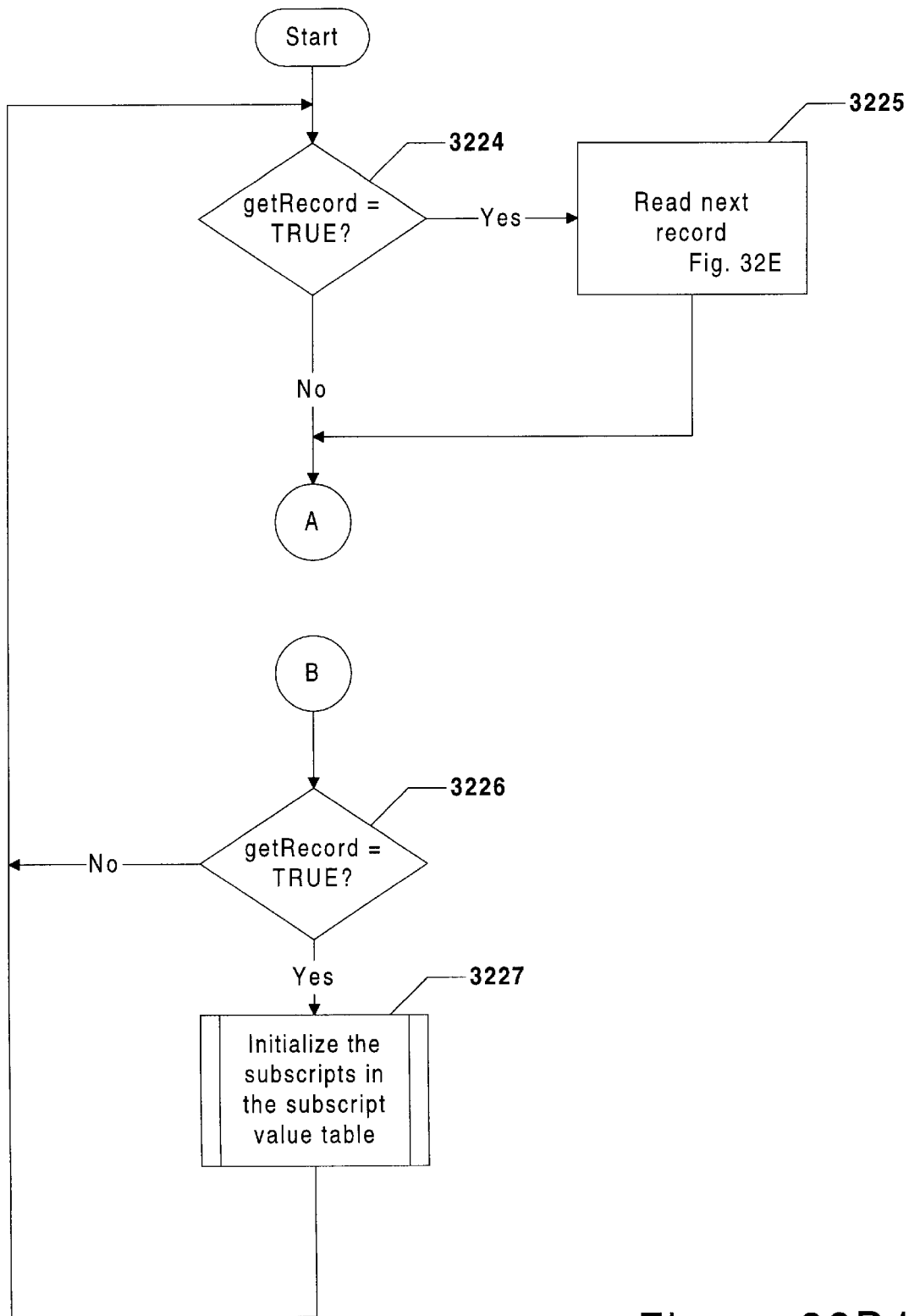
Figure 32D1

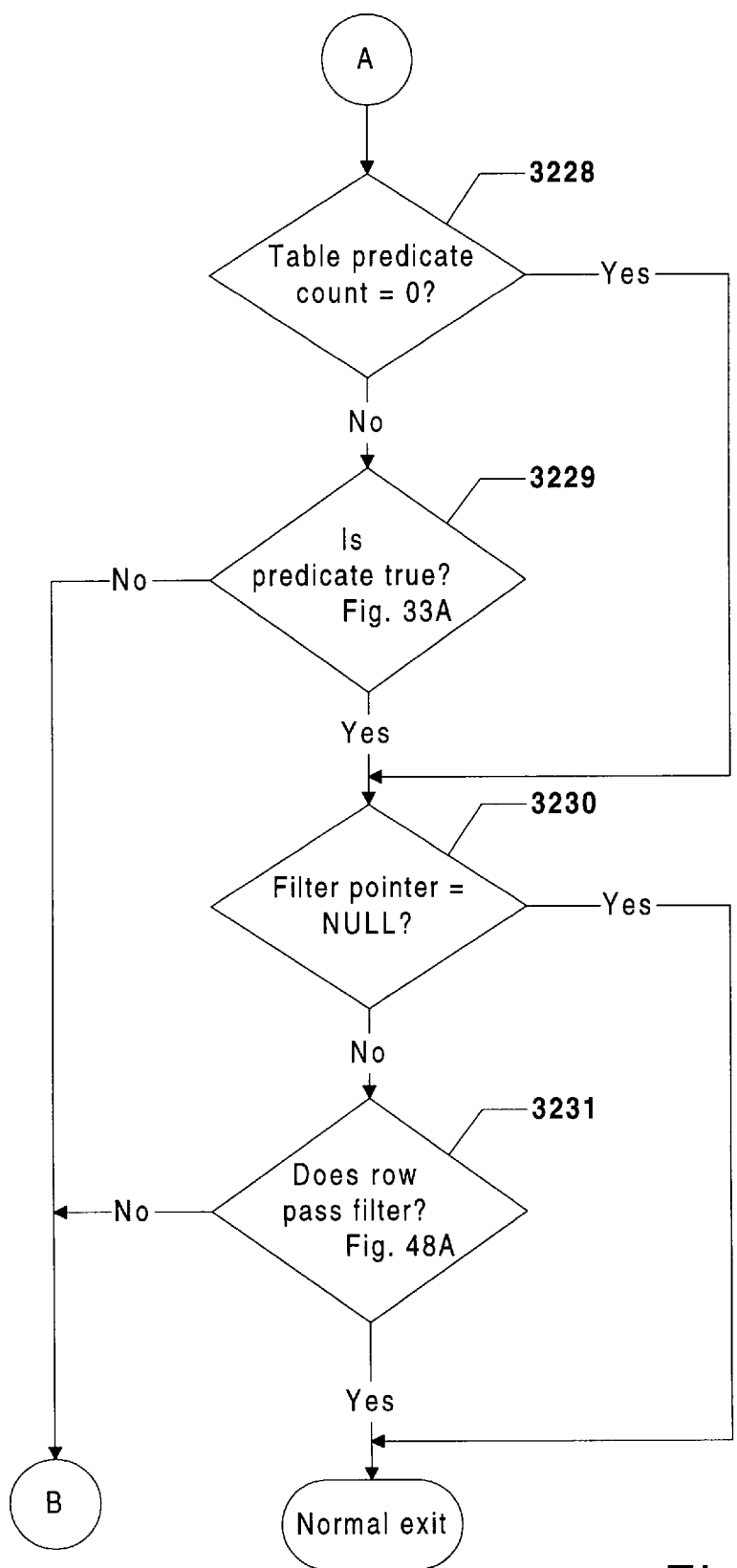
Figure 32D2

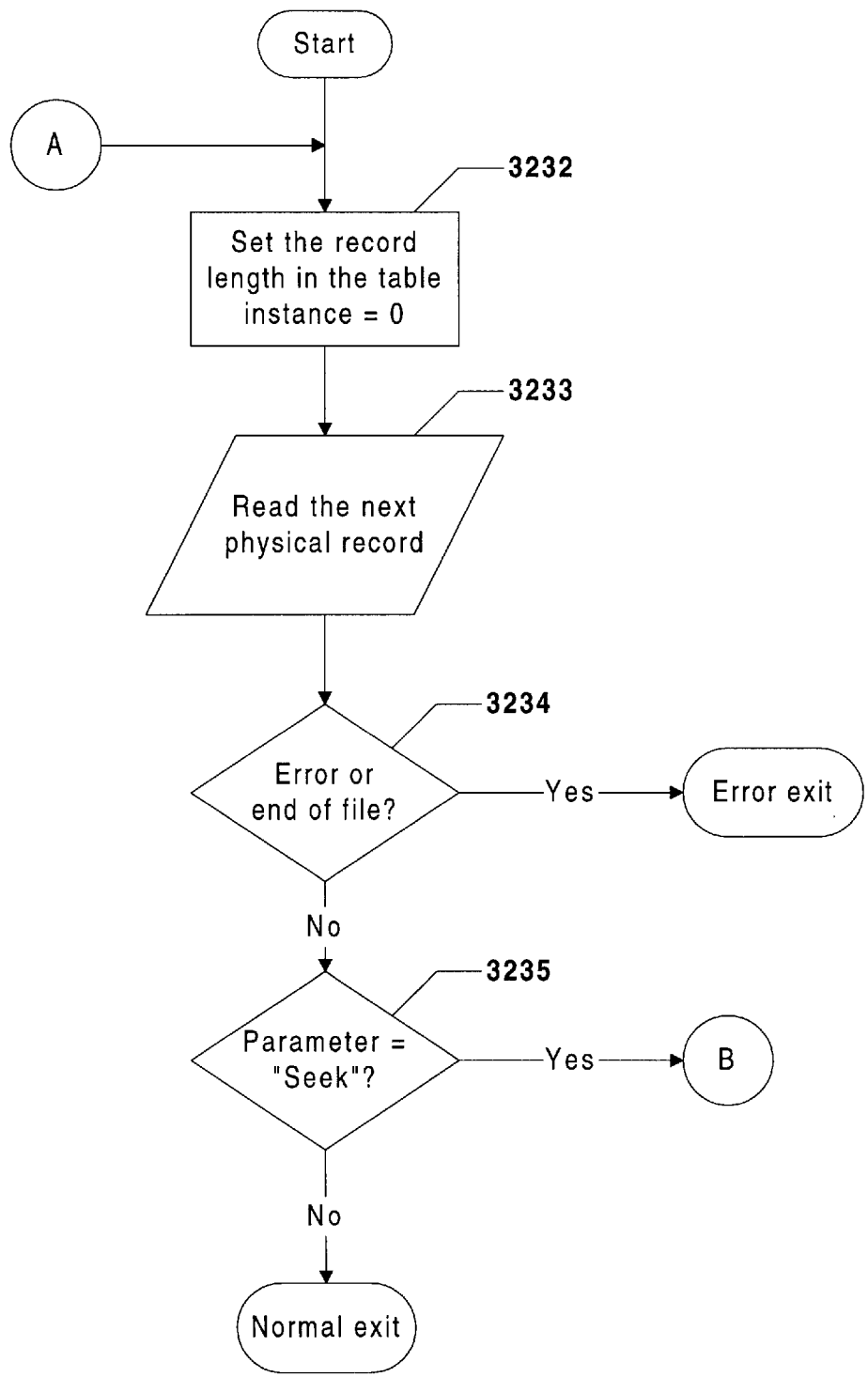
Figure 32E1

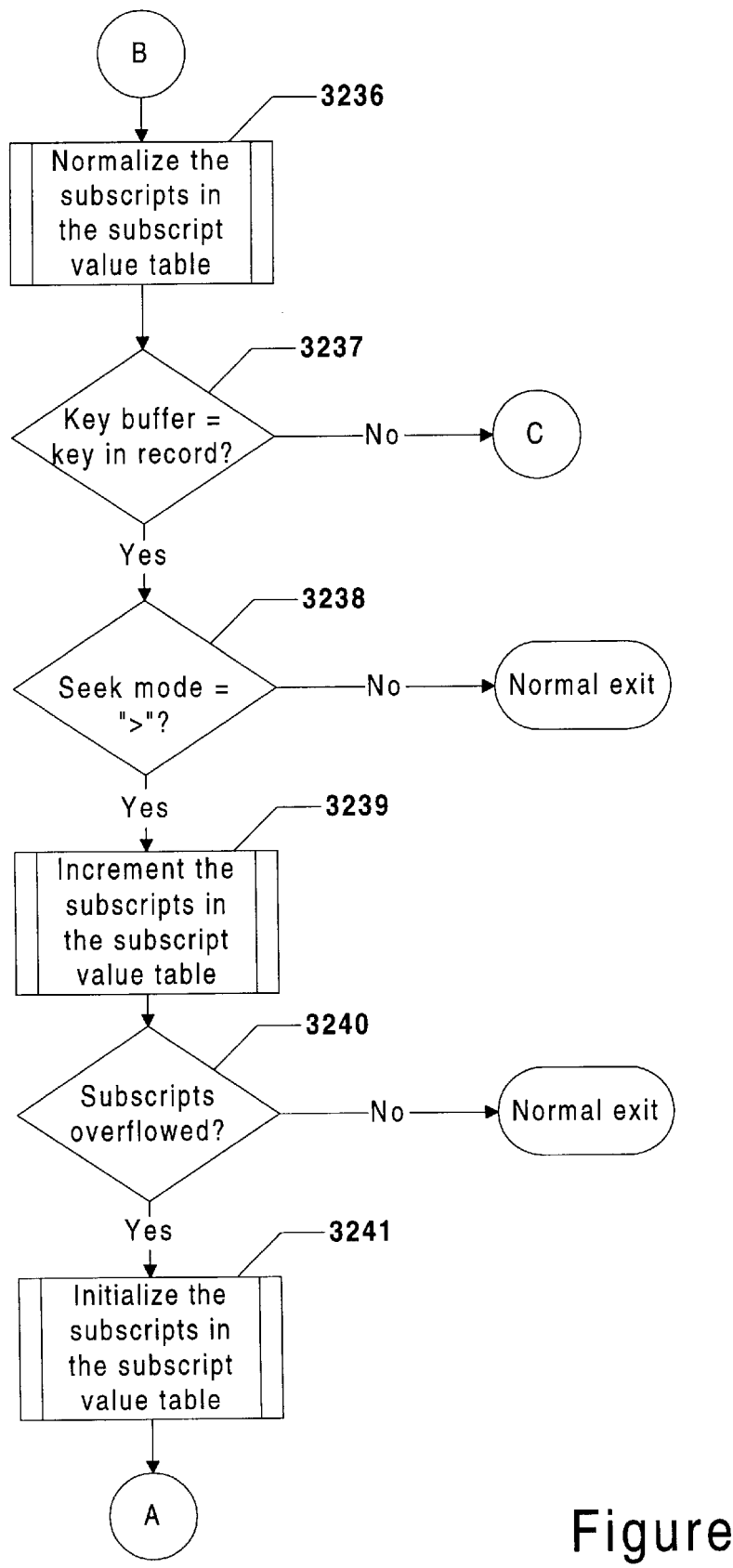
Figure 32E2

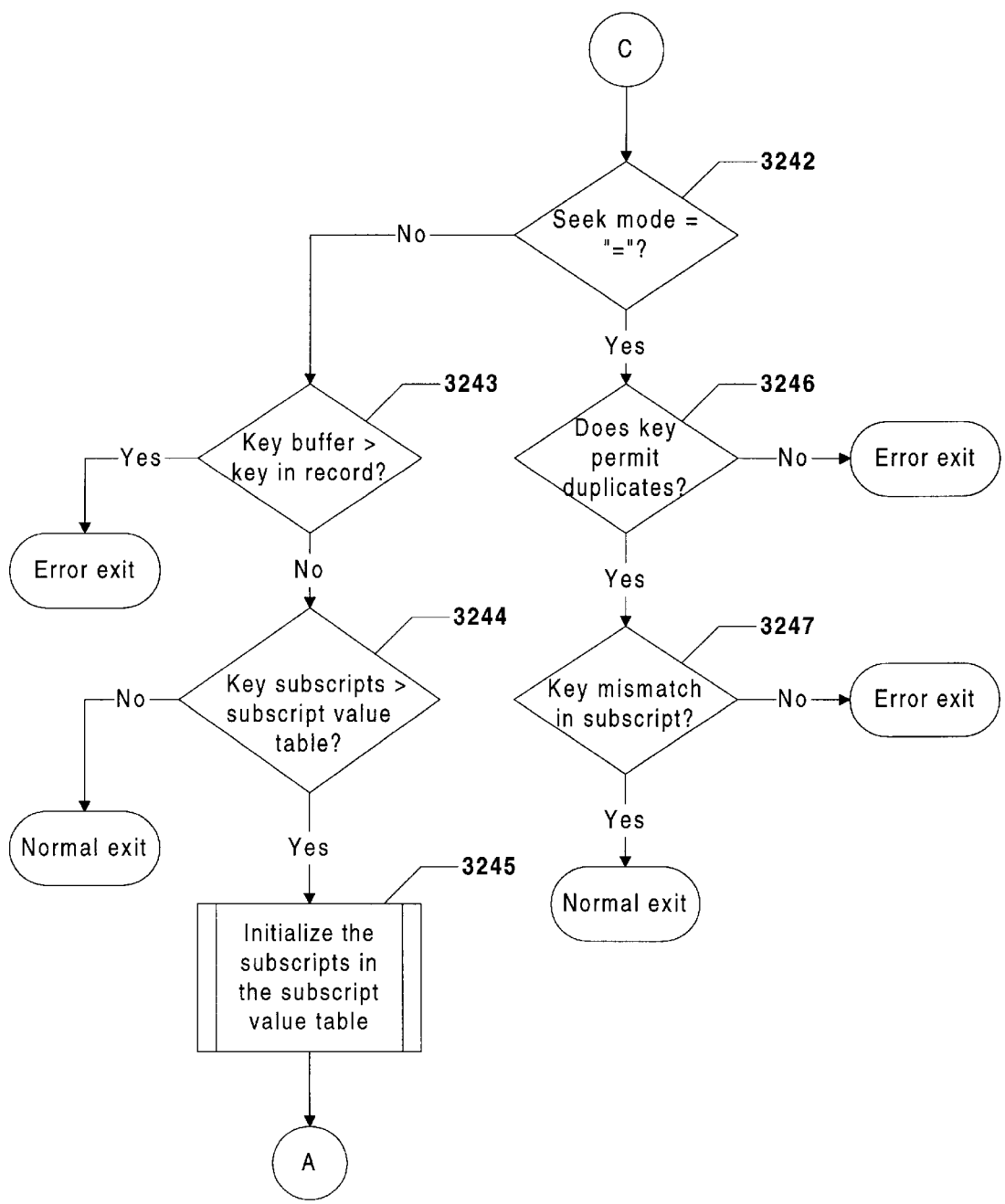
Figure 32E3

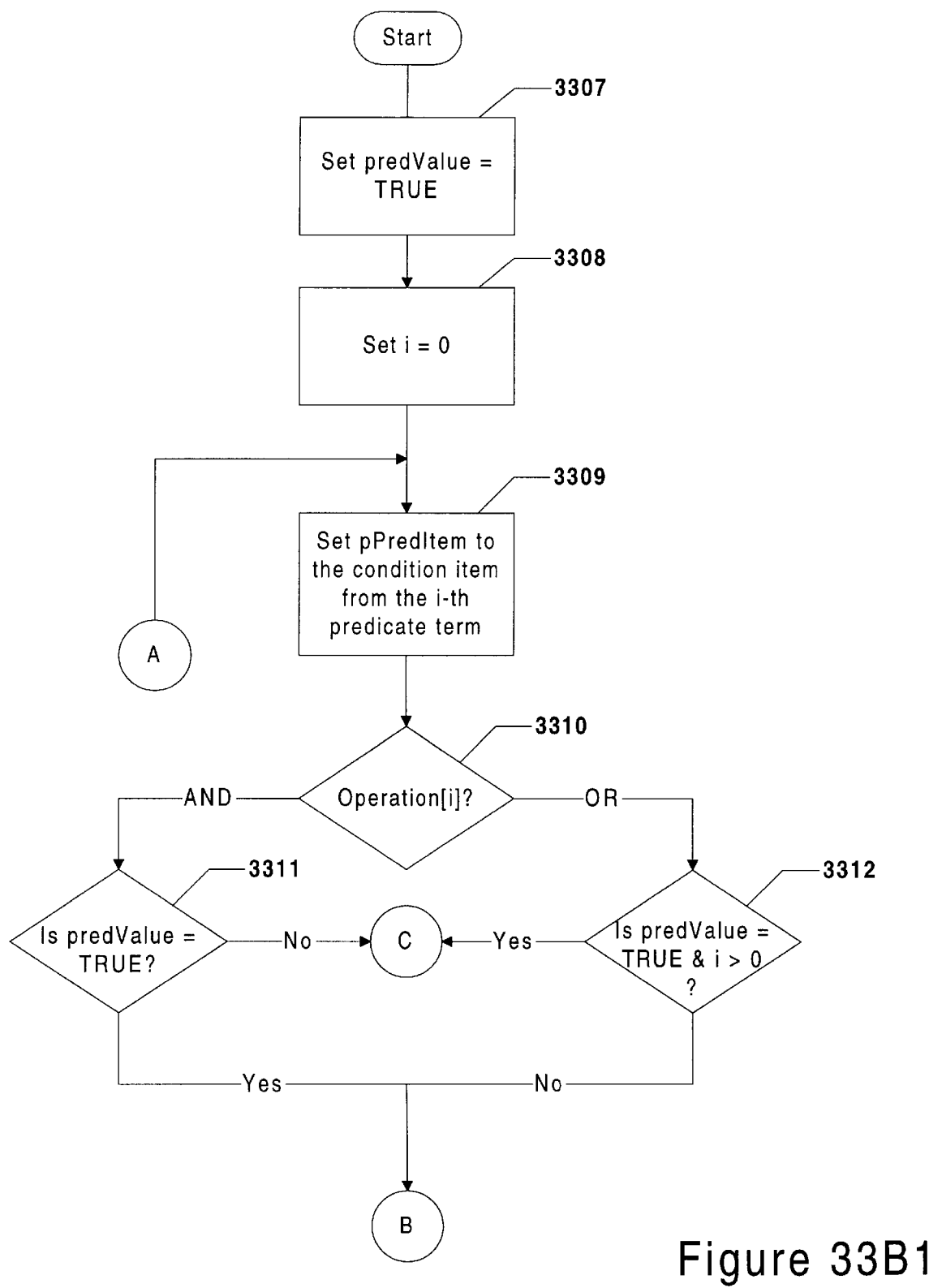
Figure 33B1

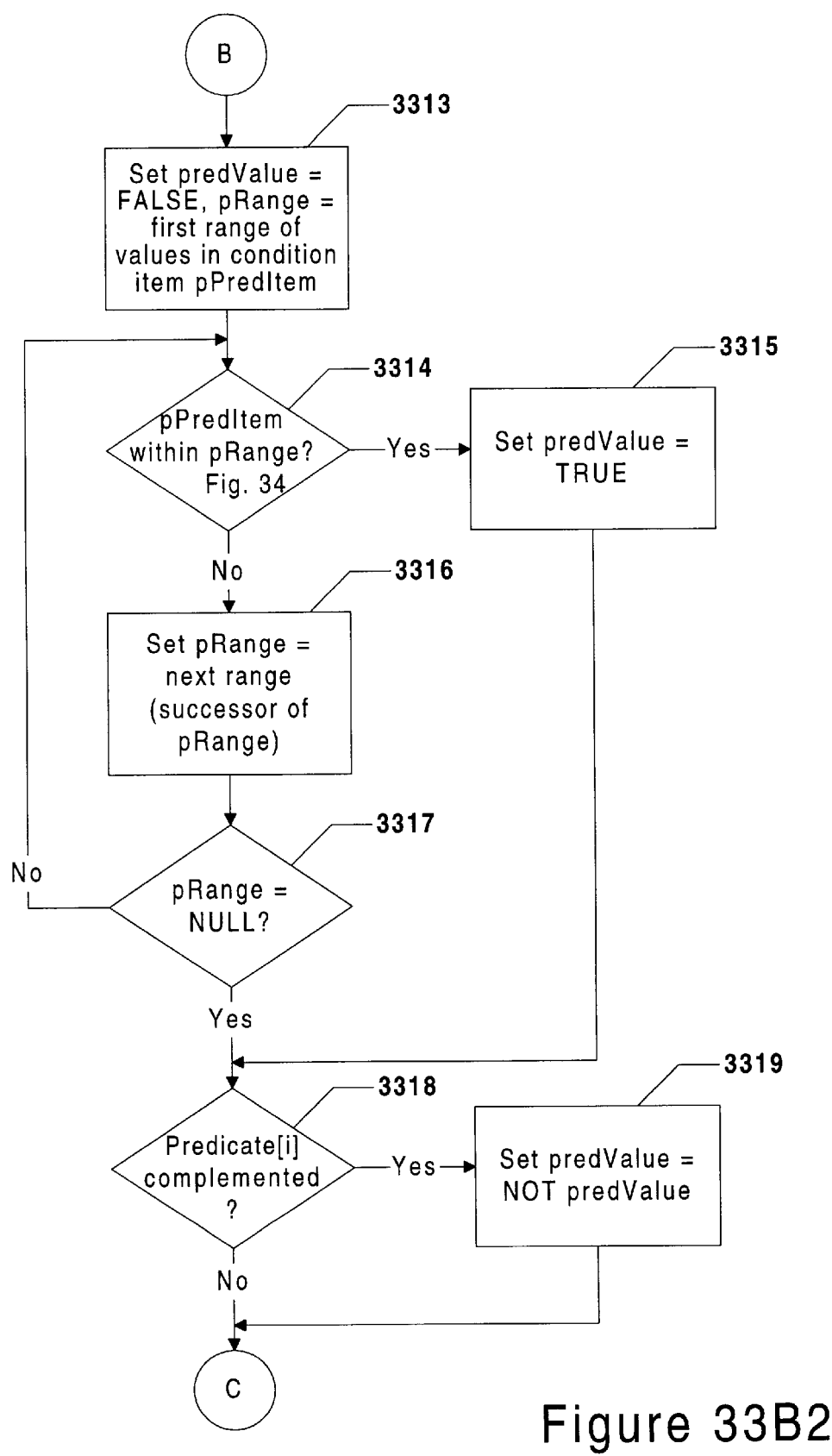
Figure 33B2

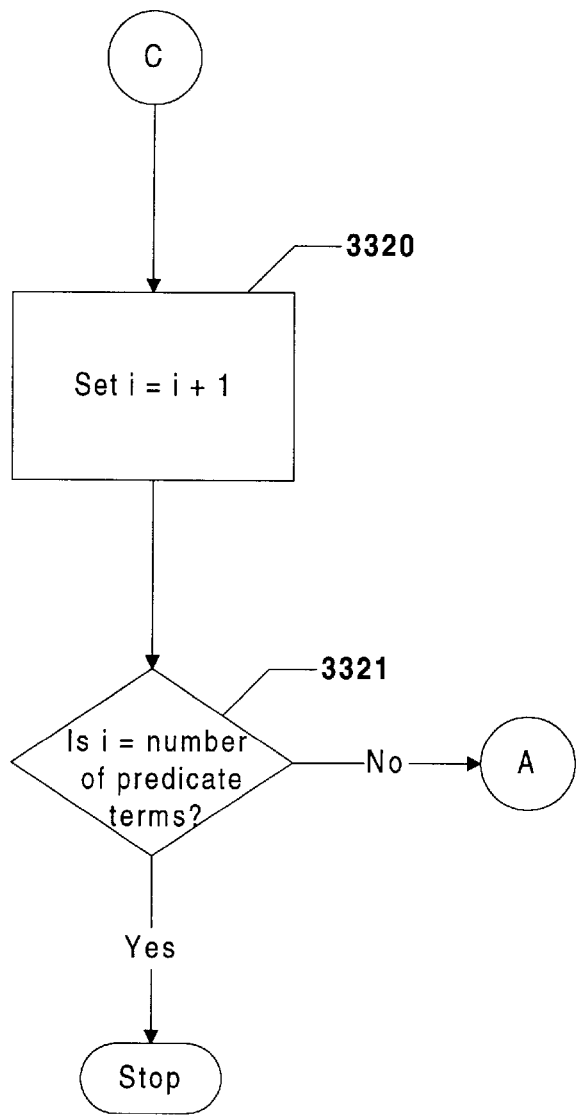
Figure 33B3

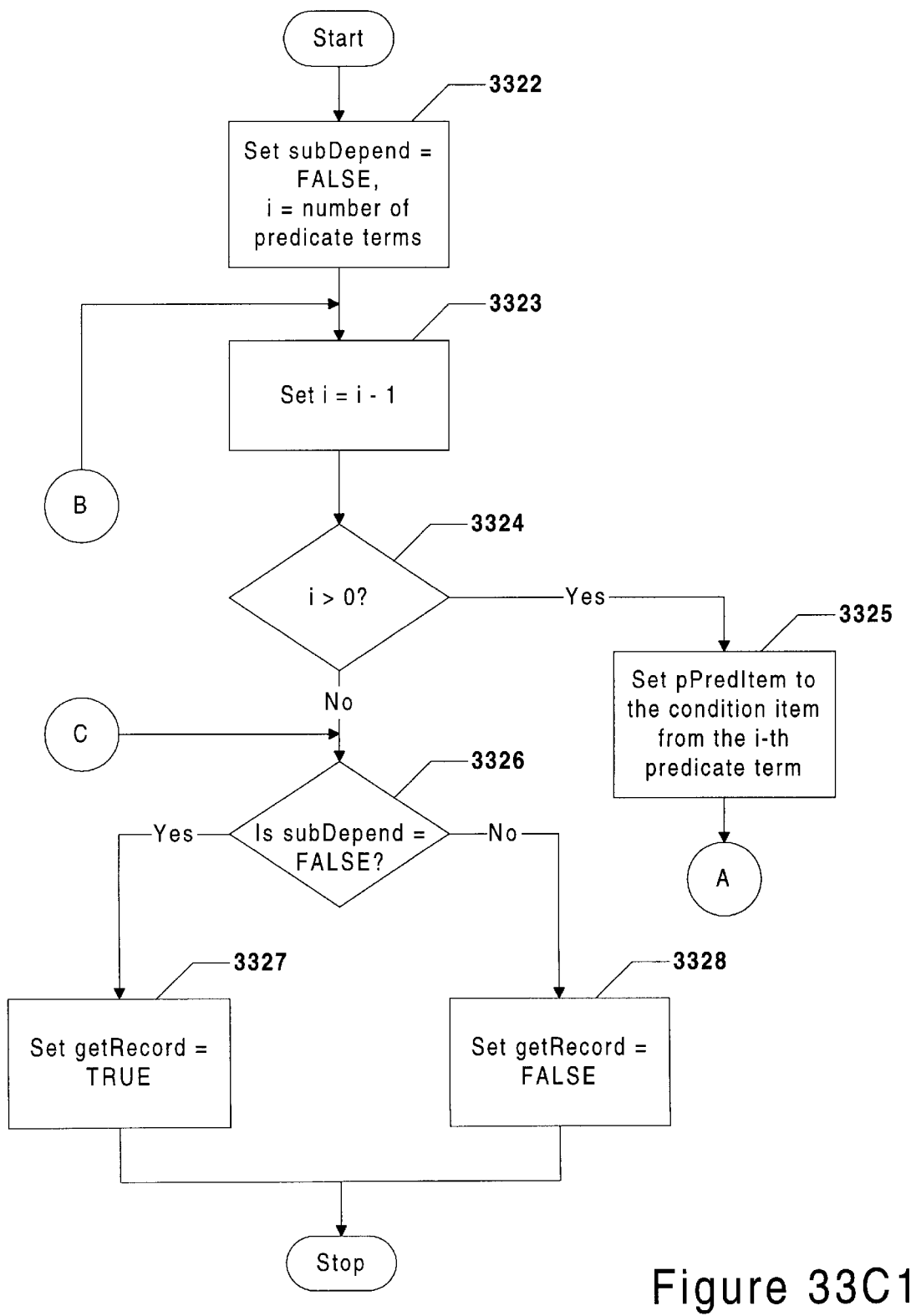
Figure 33C1

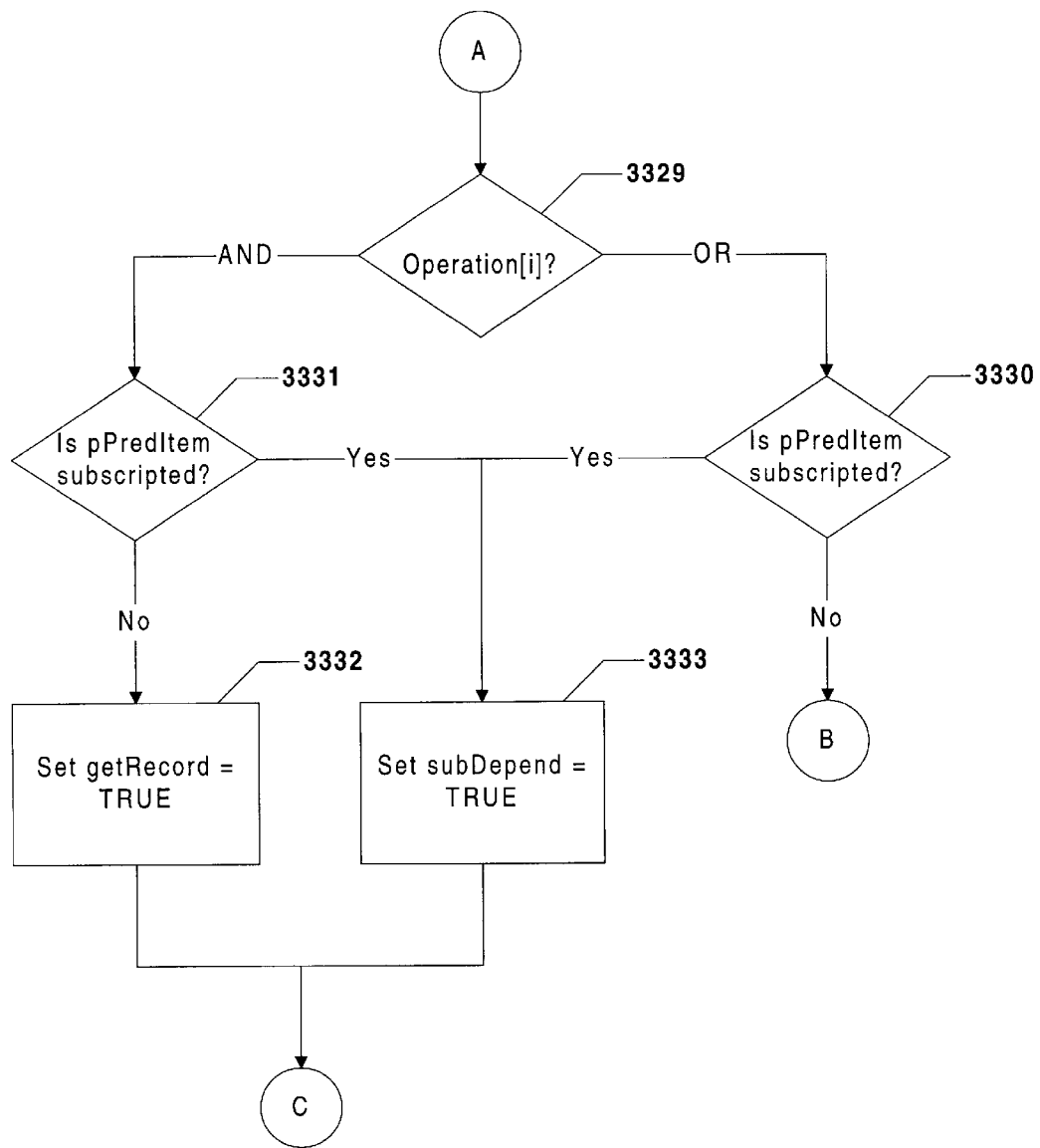
Figure 33C2

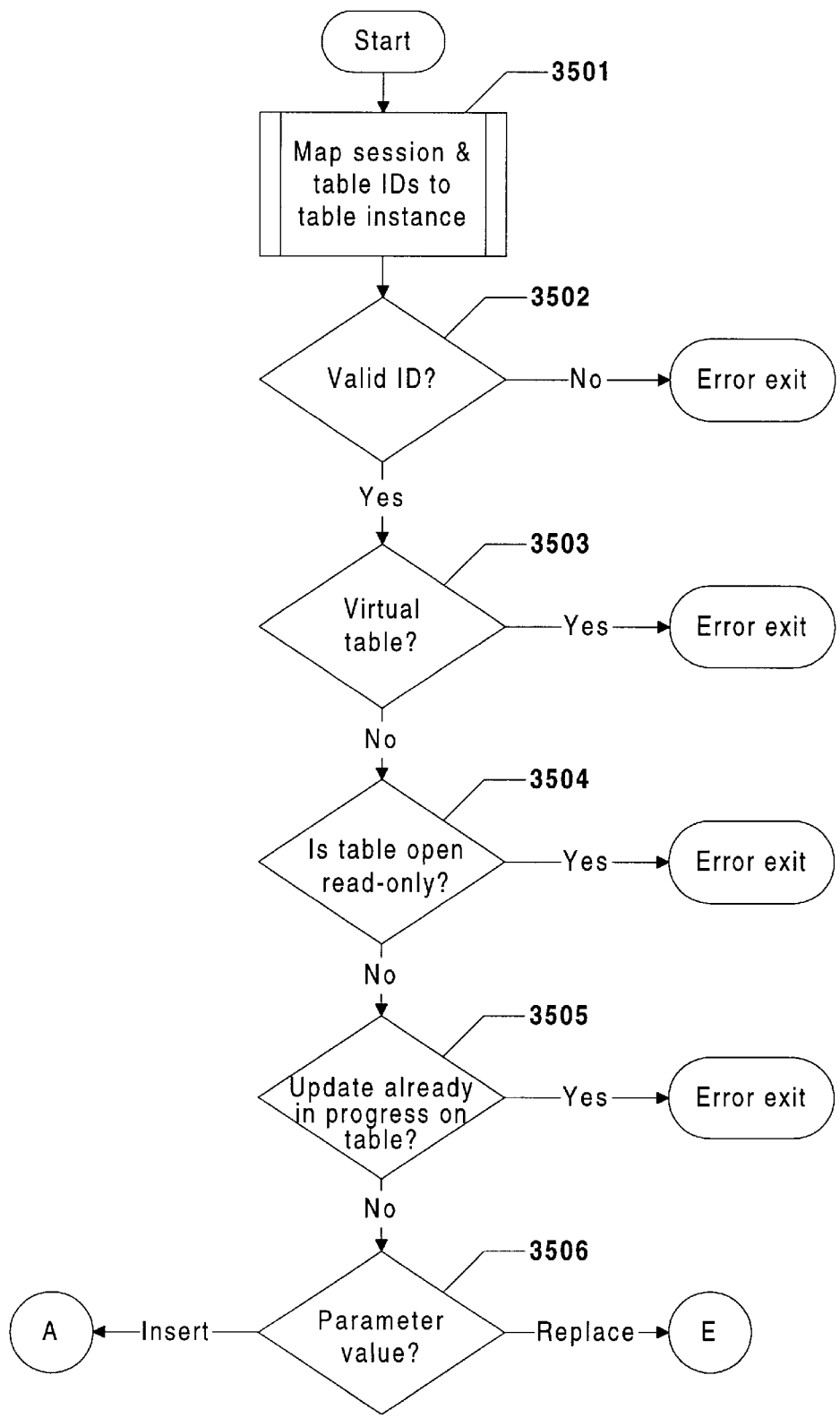
Figure 35A1

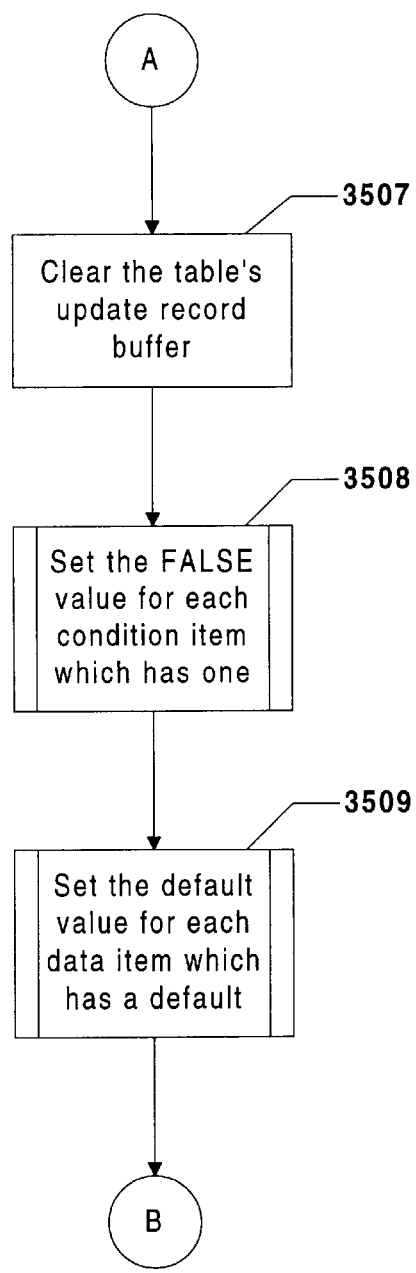
Figure 35A2

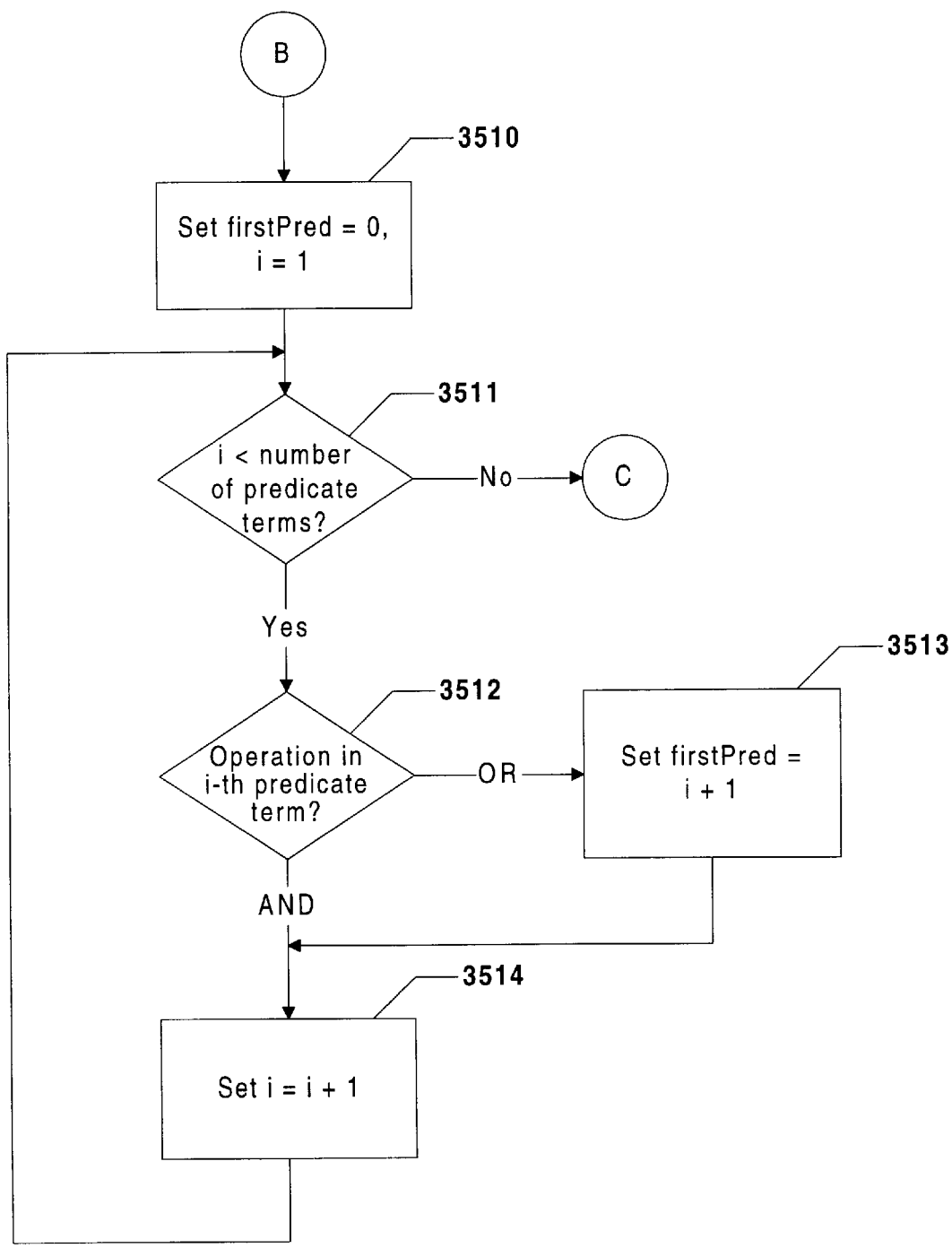
Figure 35A3

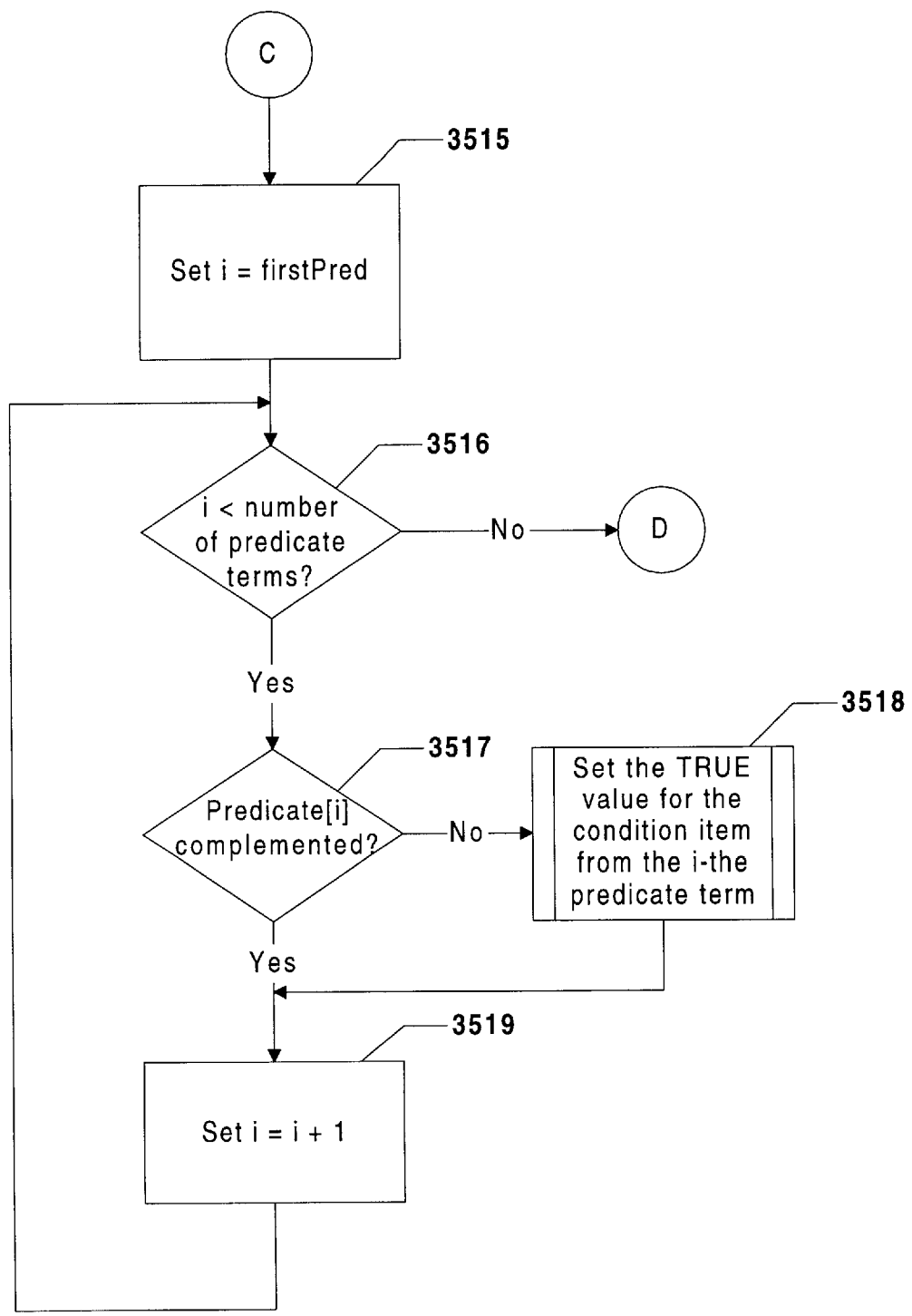
Figure 35A4

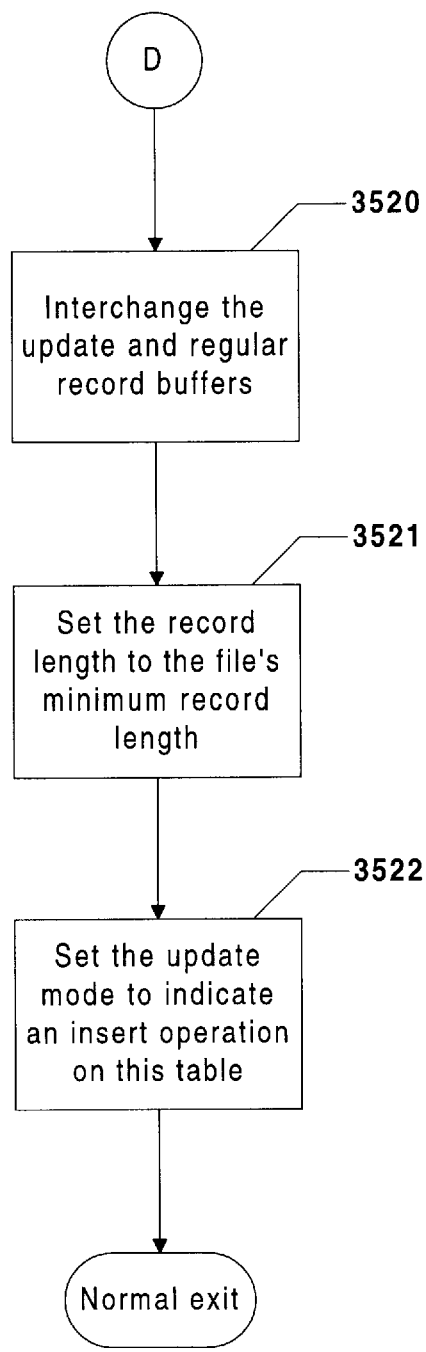
Figure 35A5

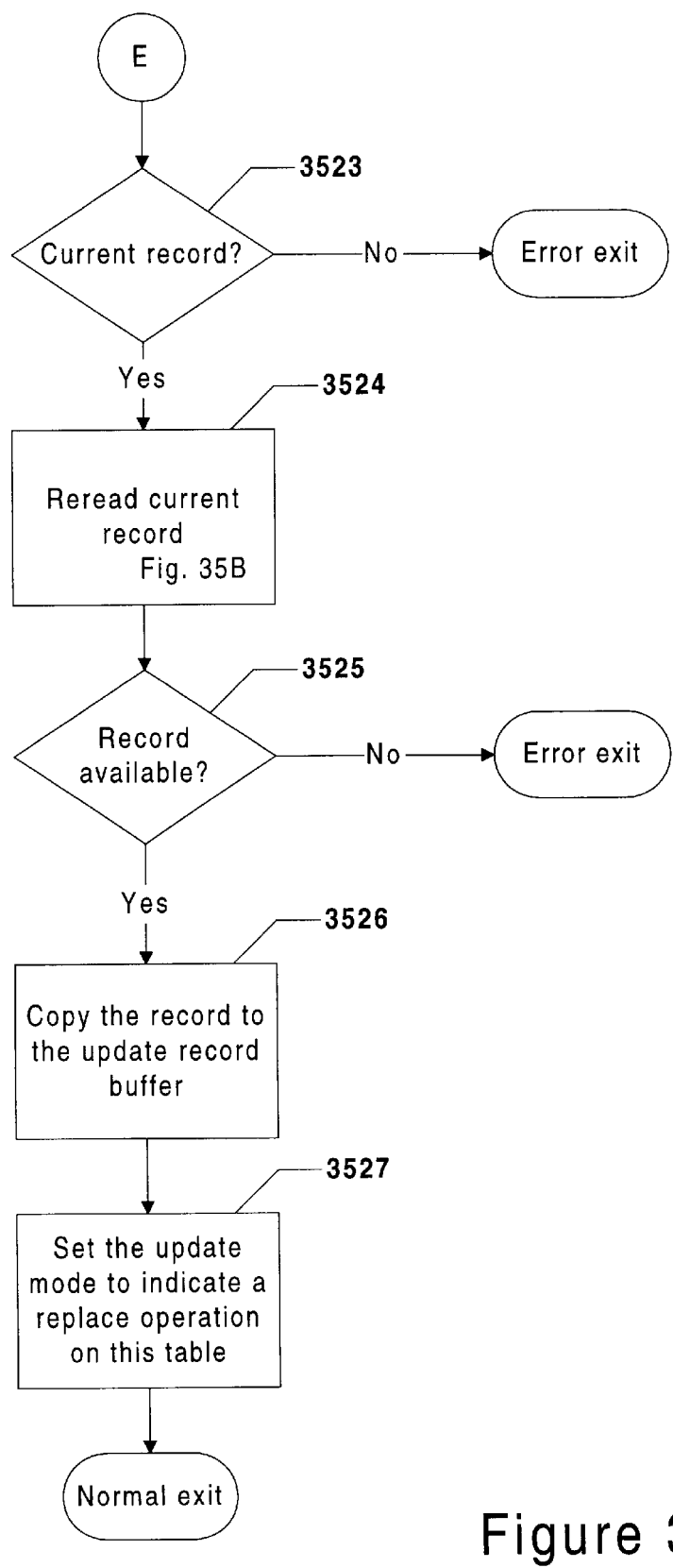
Figure 35A6

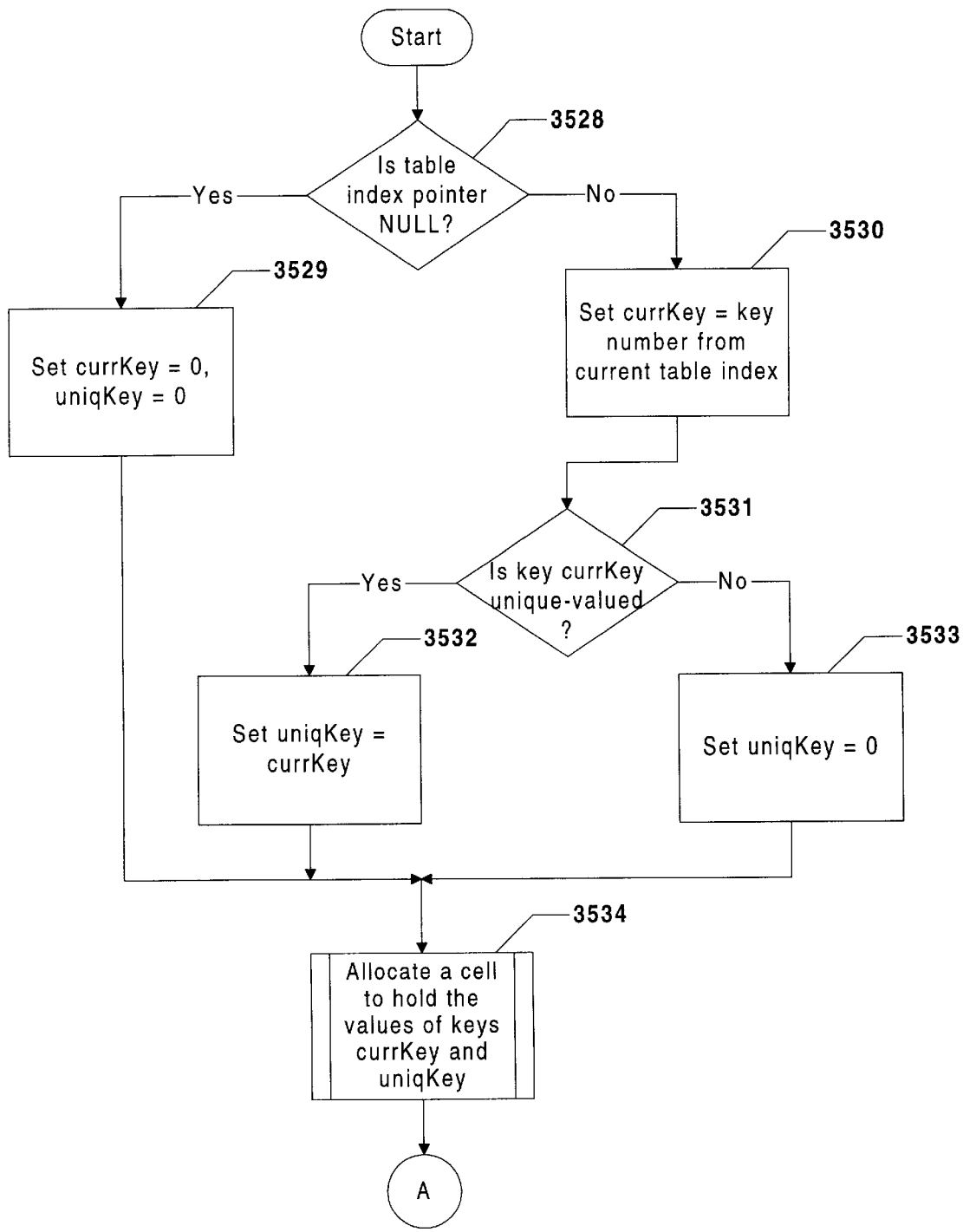
Figure 35B1

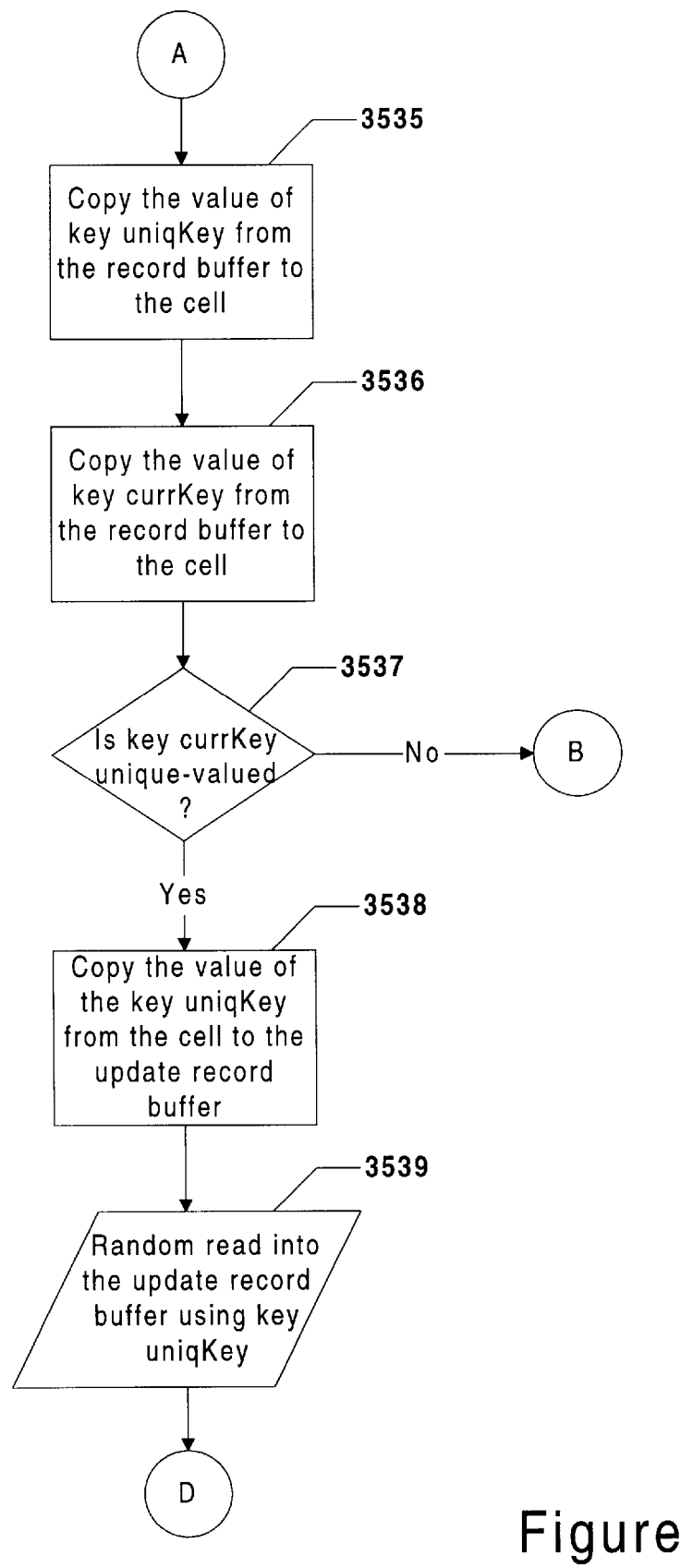
Figure 35B2

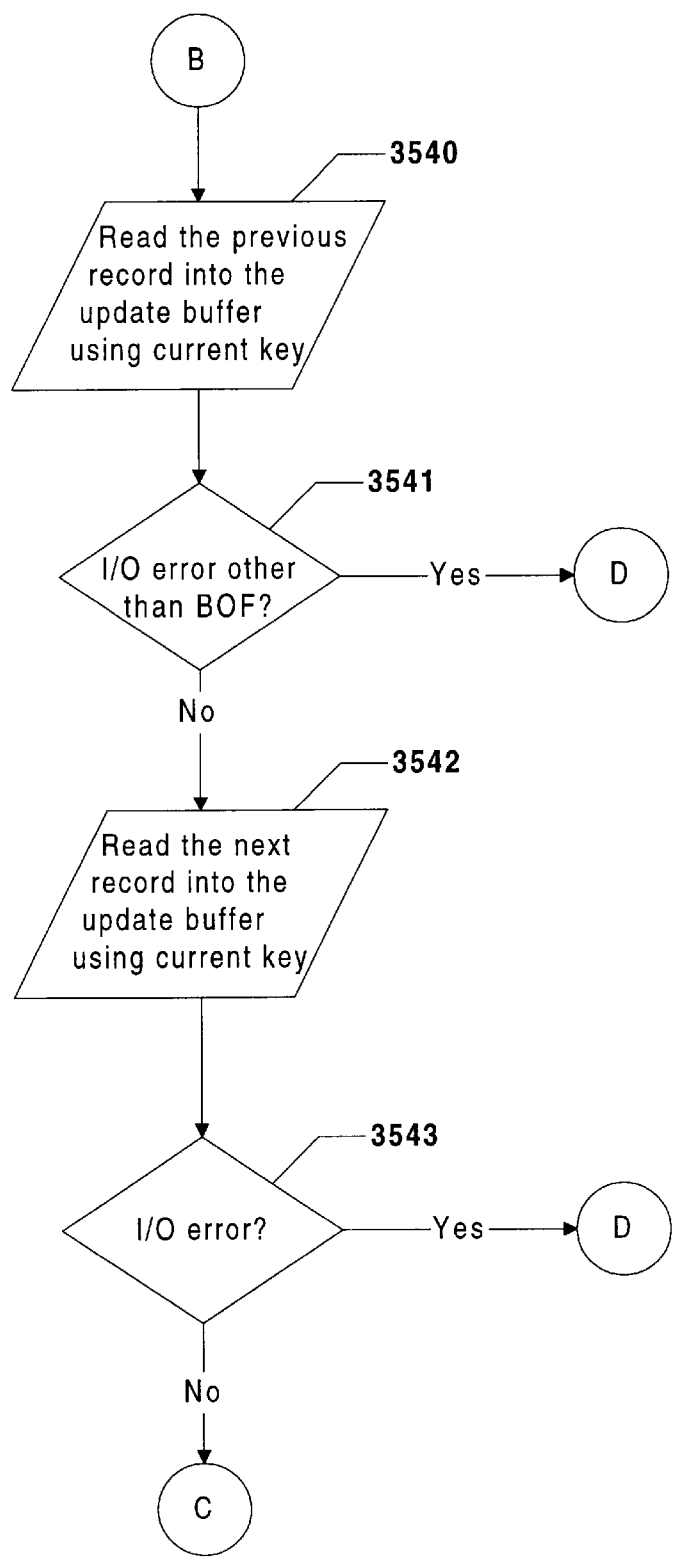
Figure 35B3

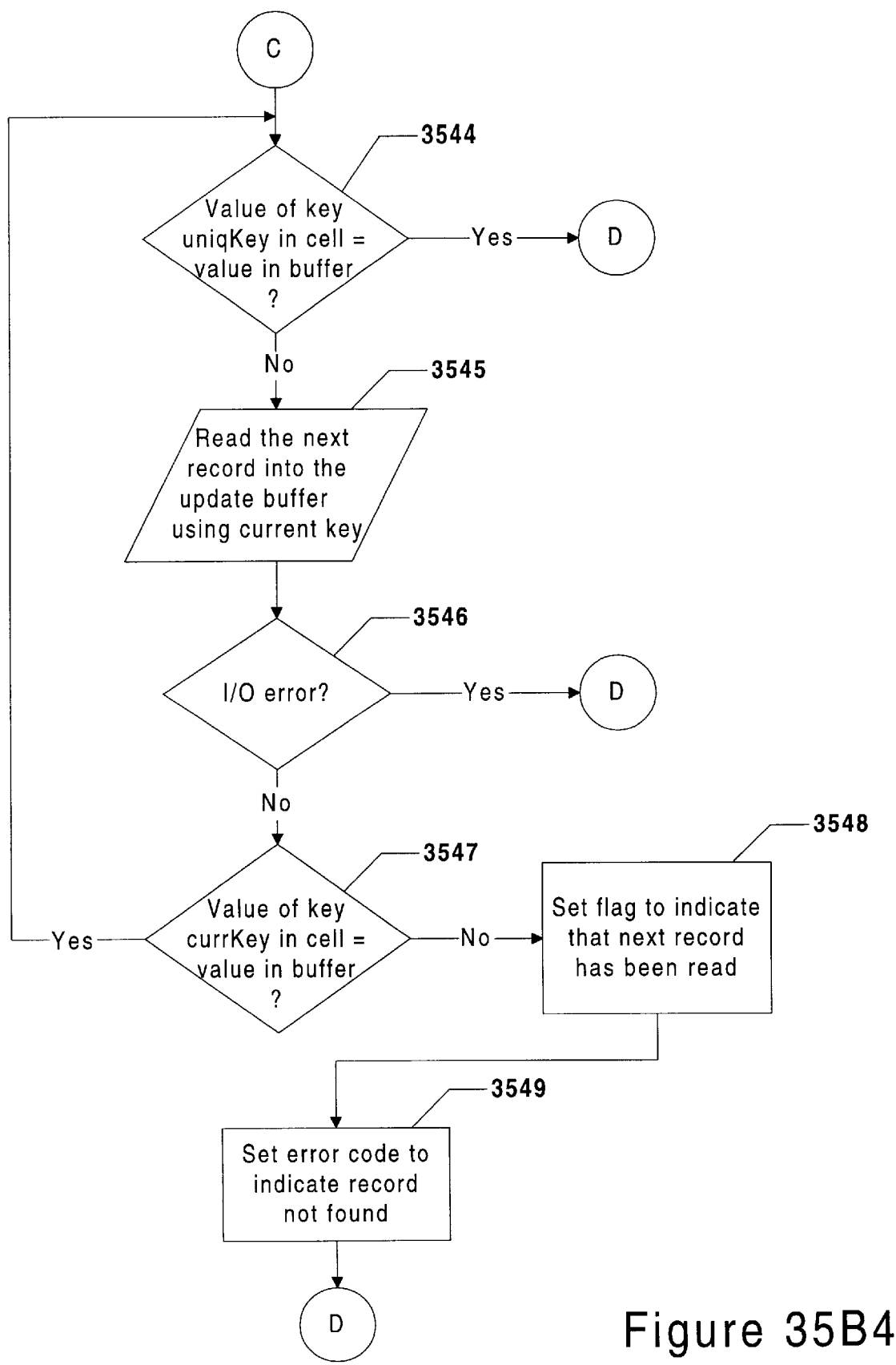
Figure 35B4

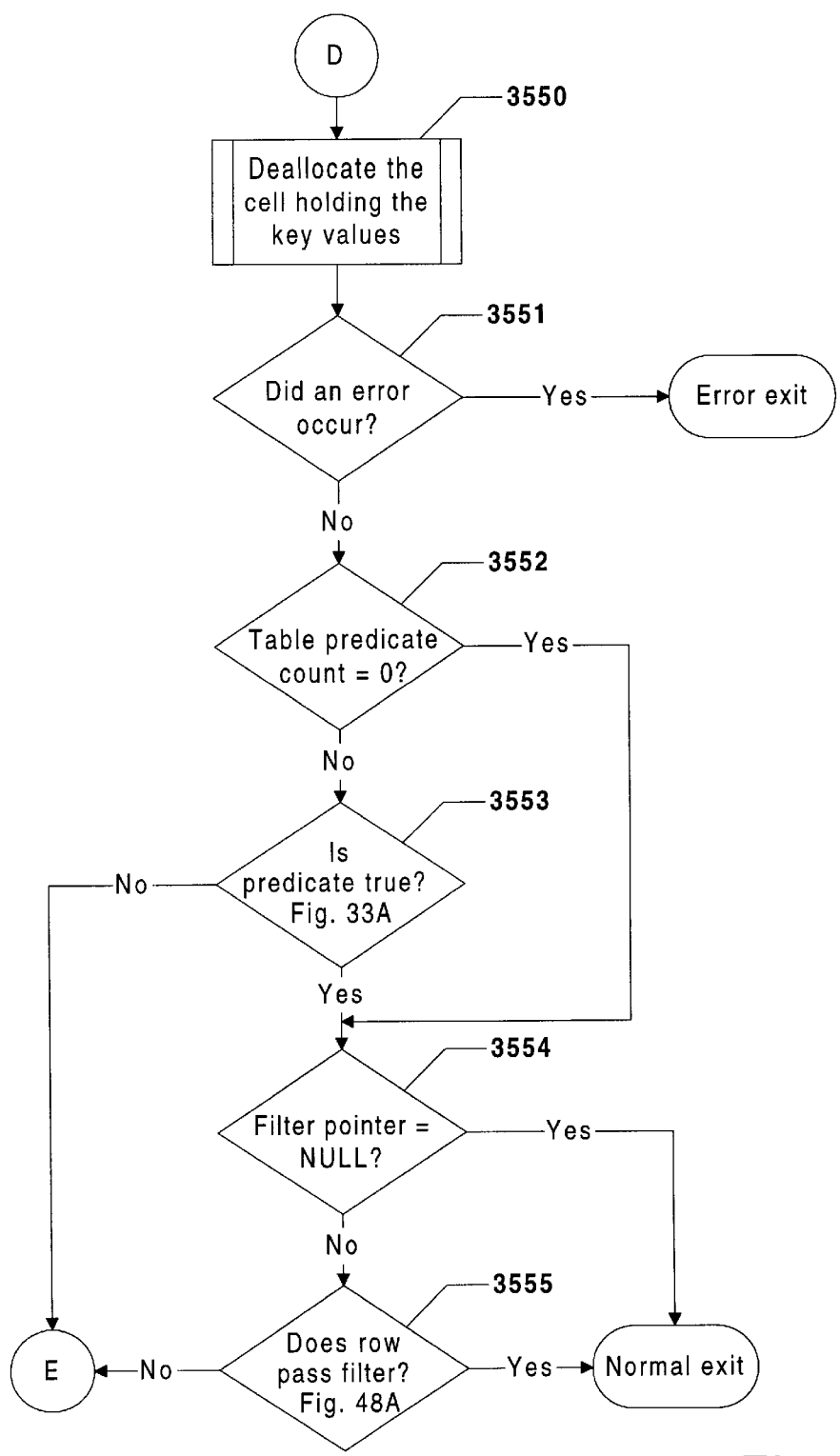
Figure 35B5

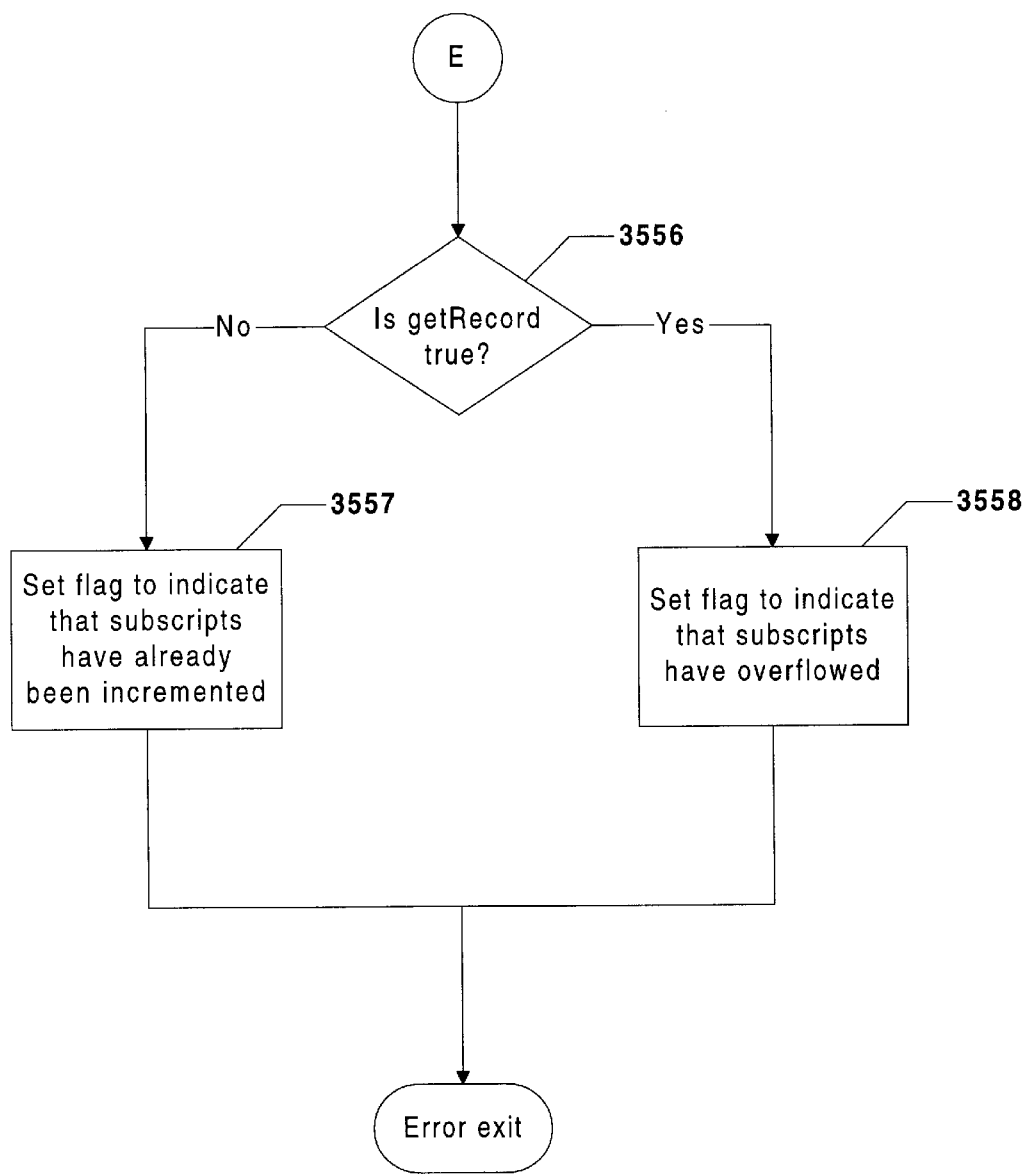
Figure 35B6

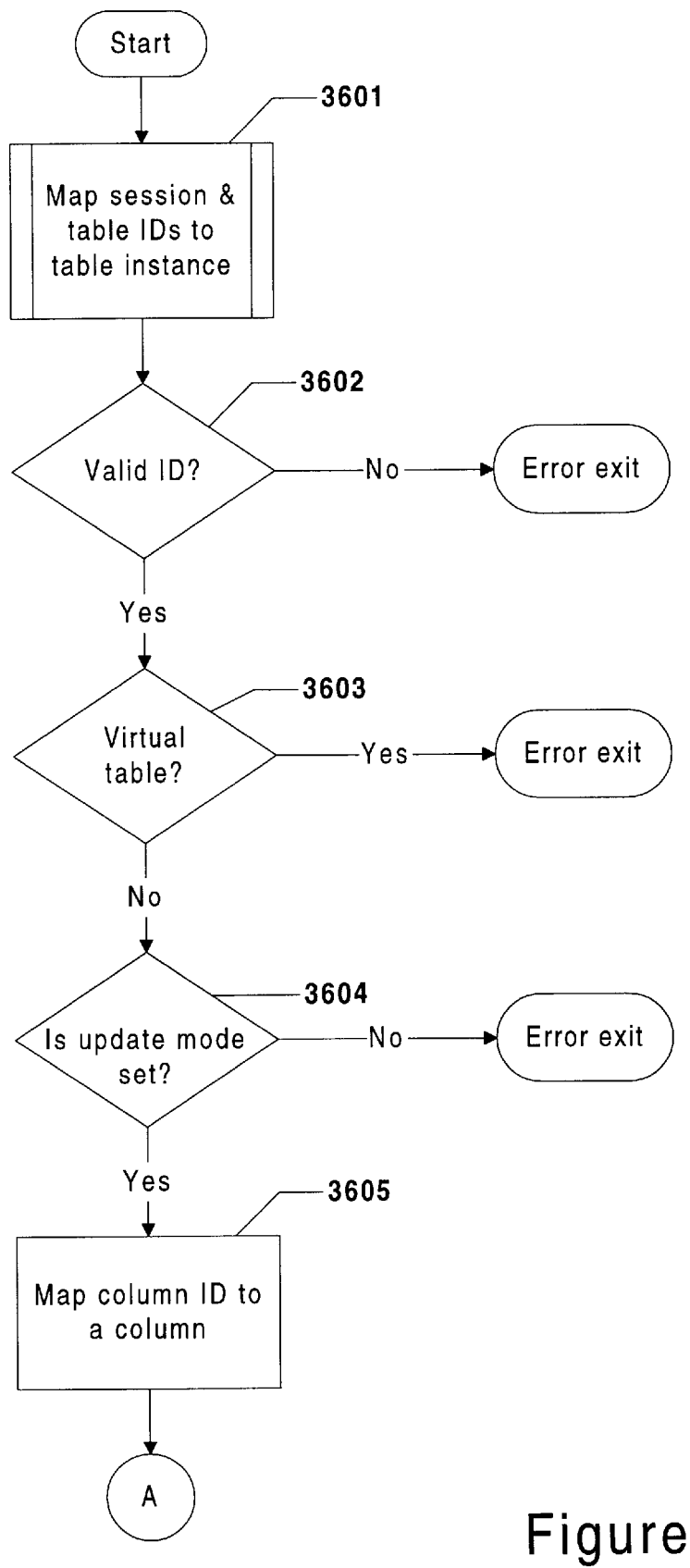
Figure 36A1

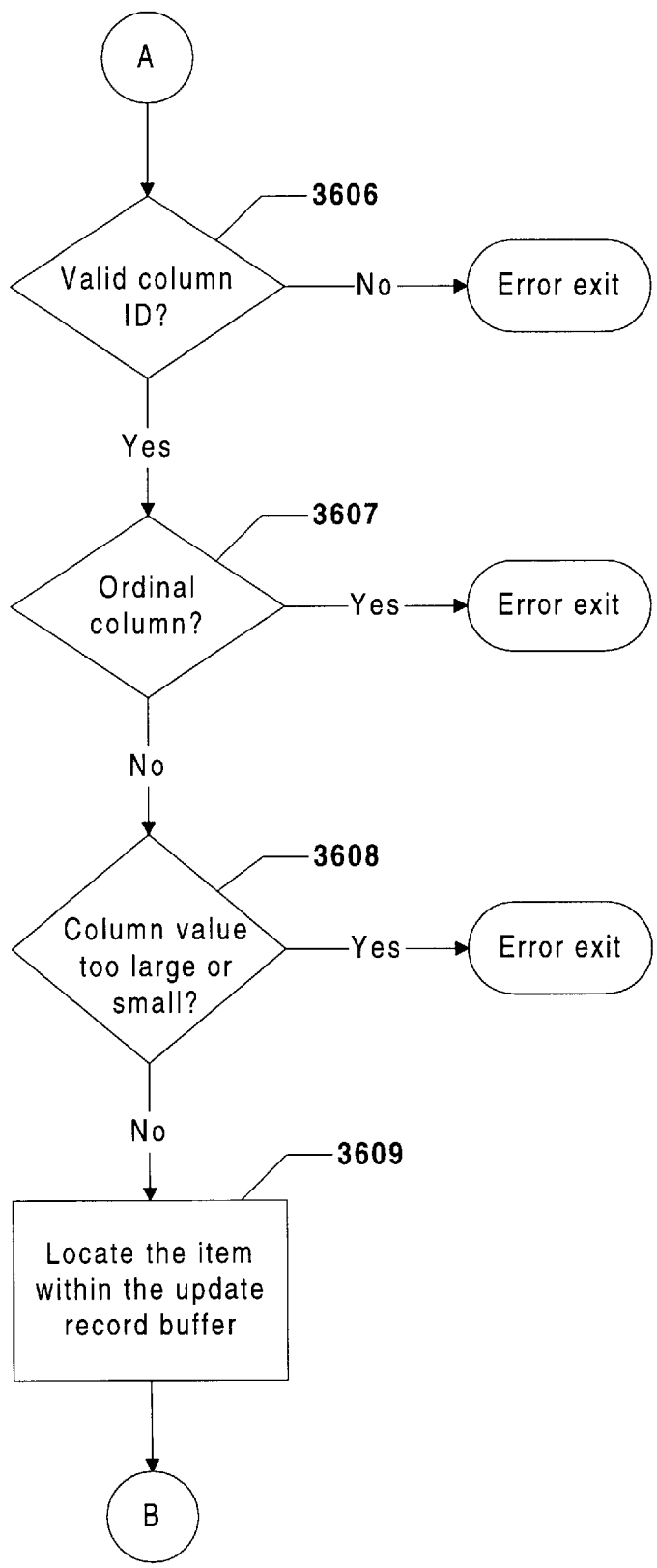
Figure 36A2

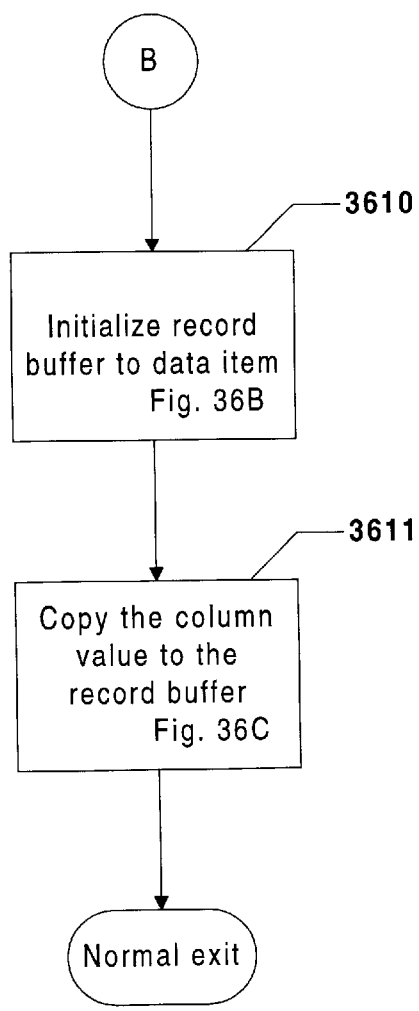
Figure 36A3

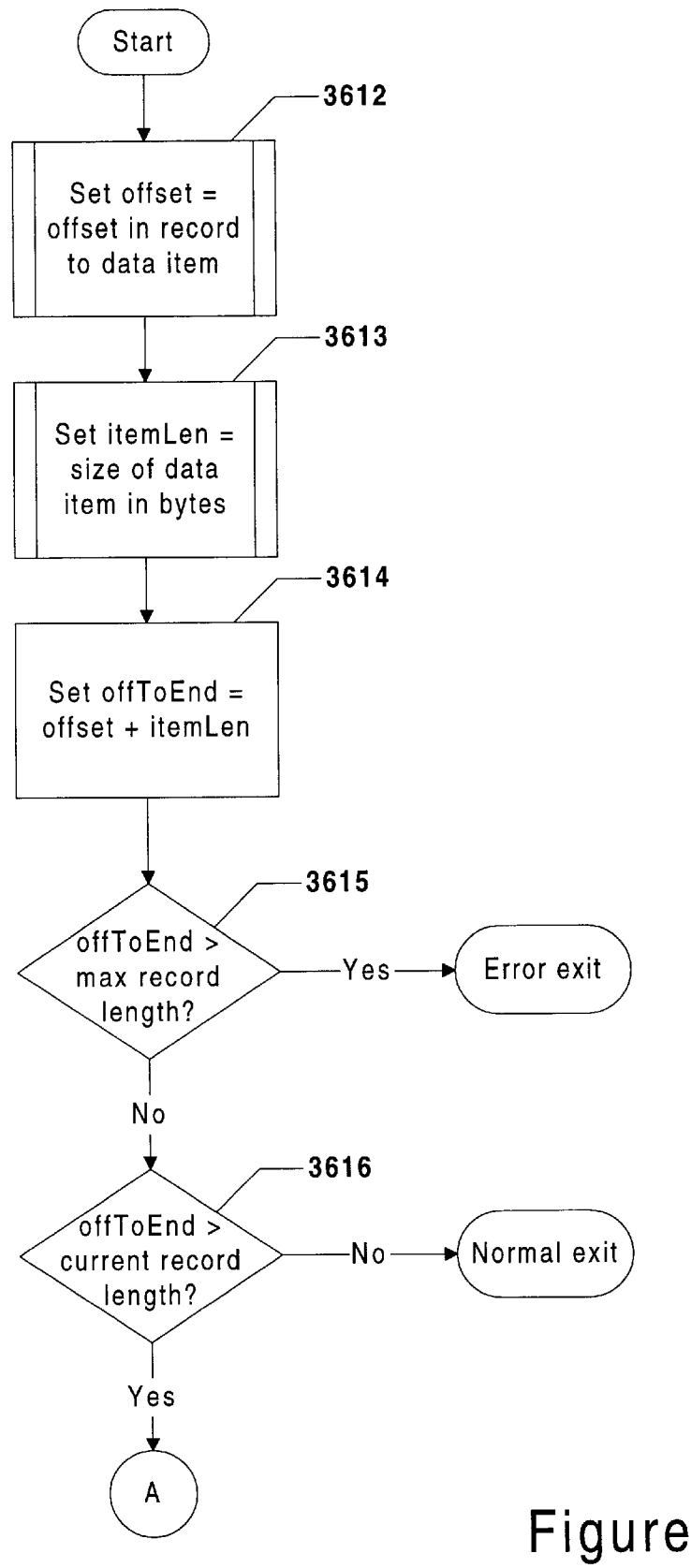
Figure 36B1

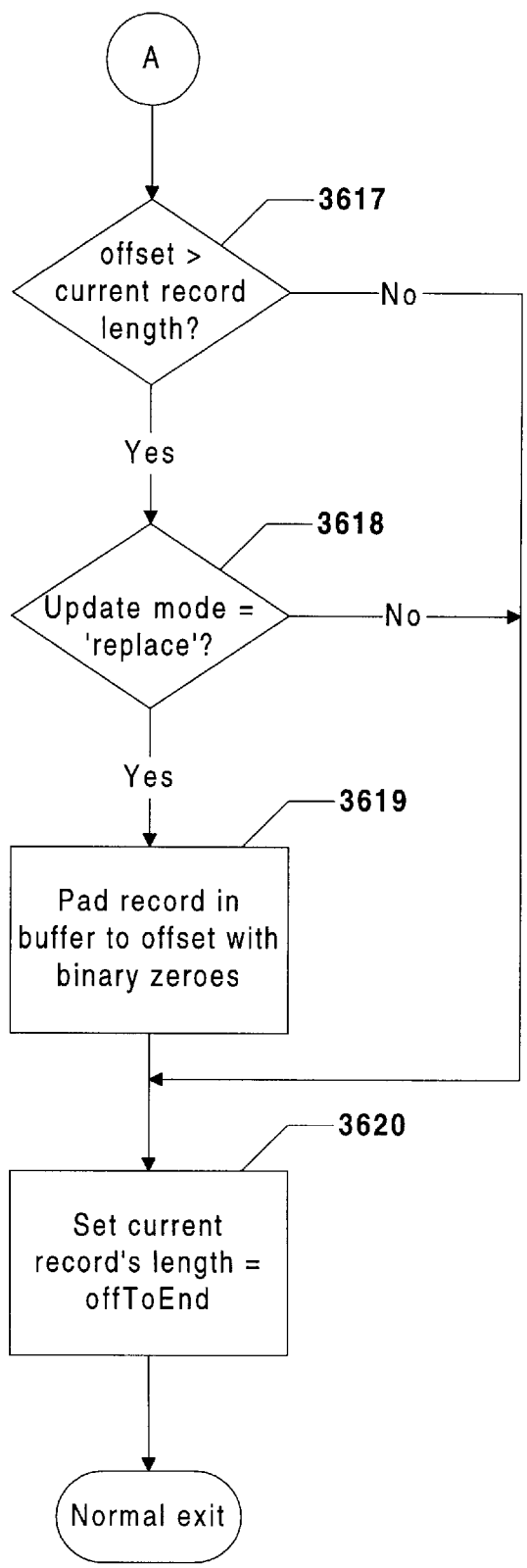
Figure 36B2

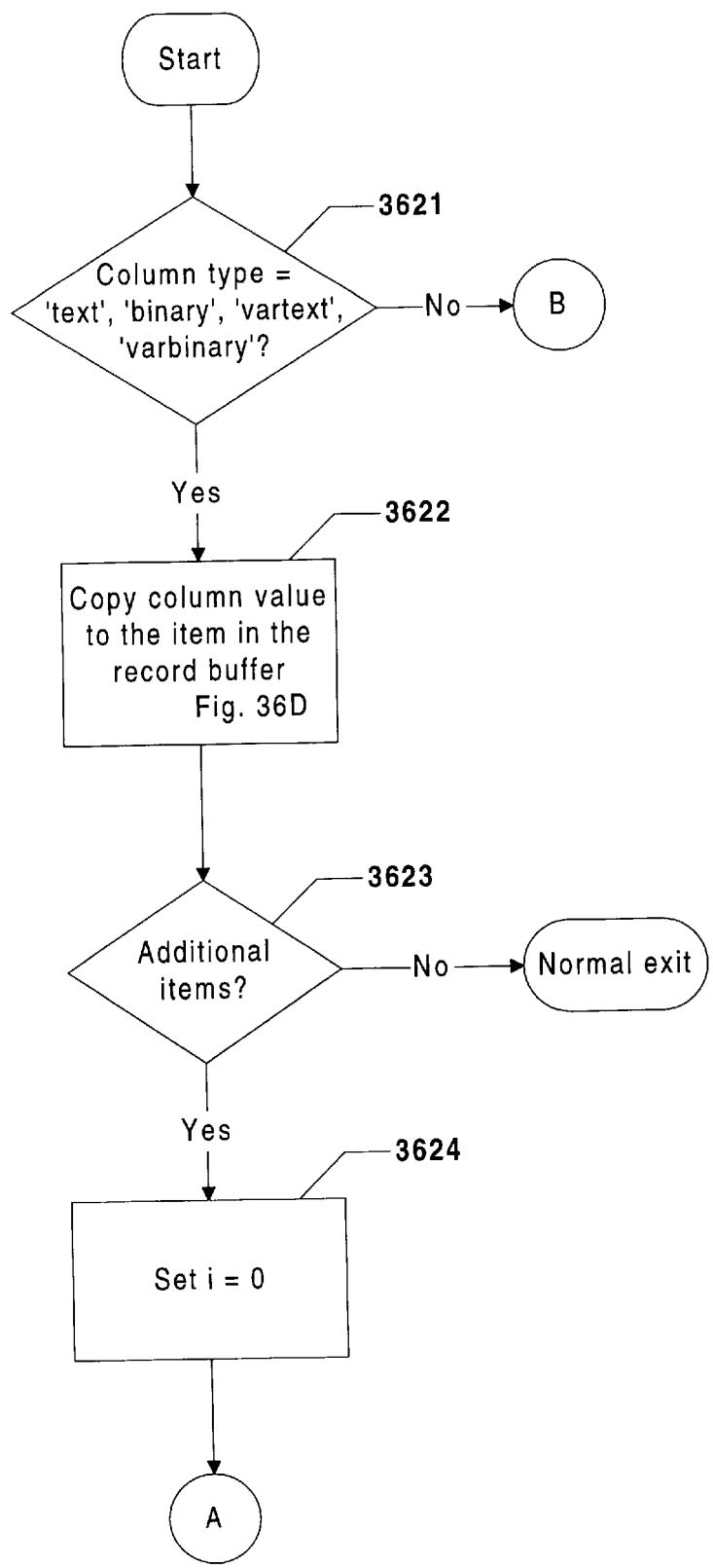
Figure 36C1

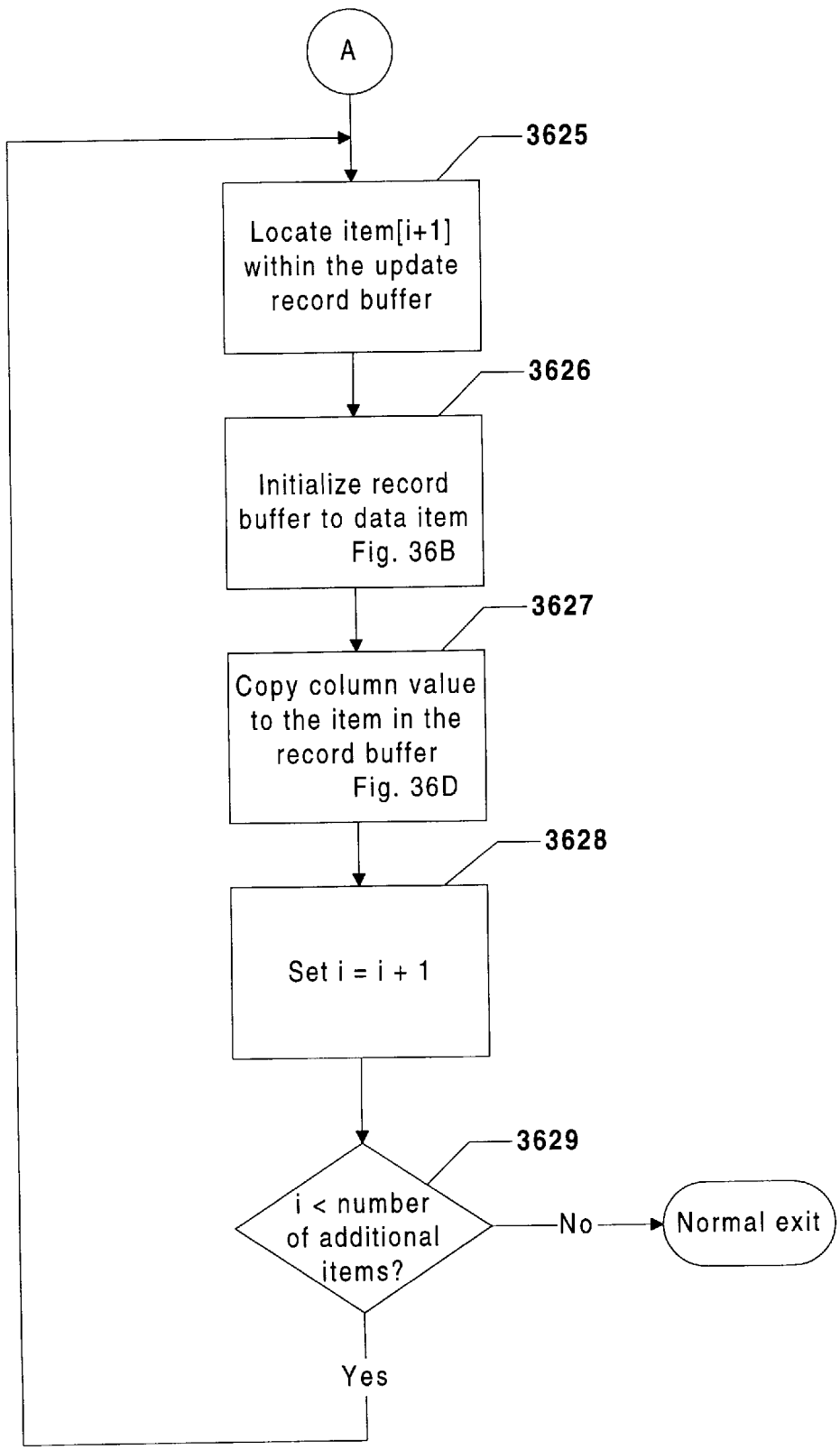
Figure 36C2

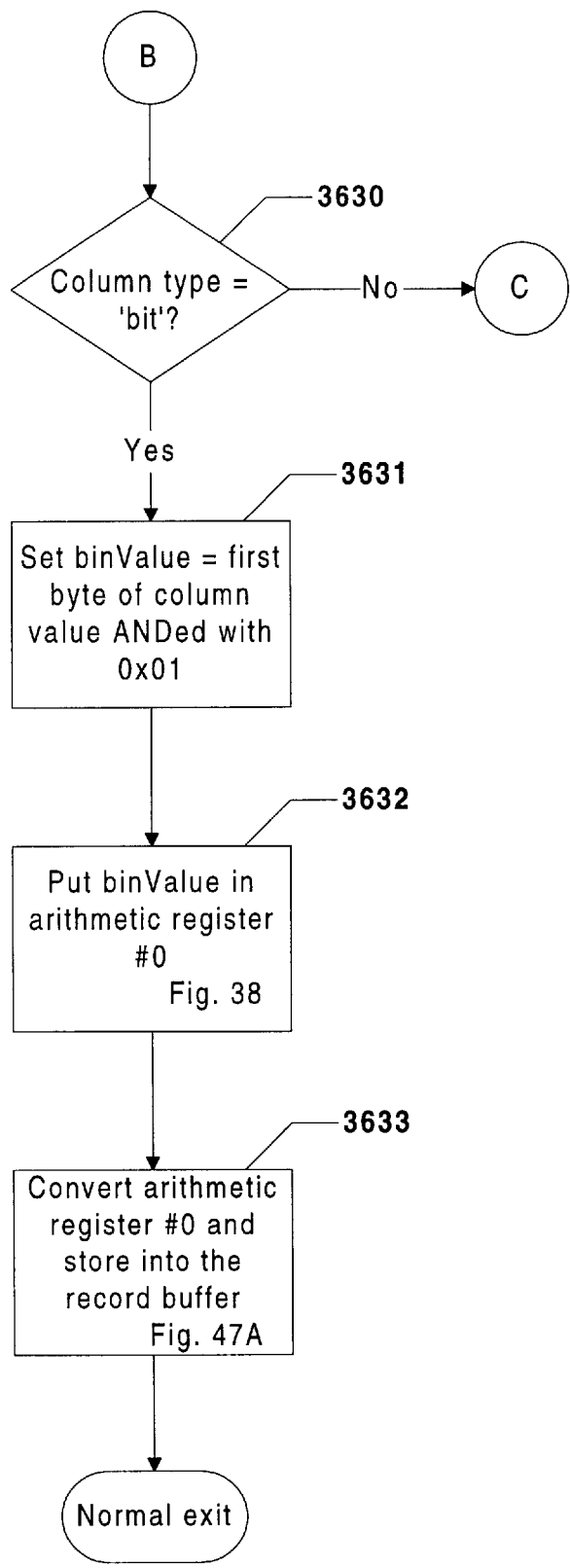
Figure 36C3

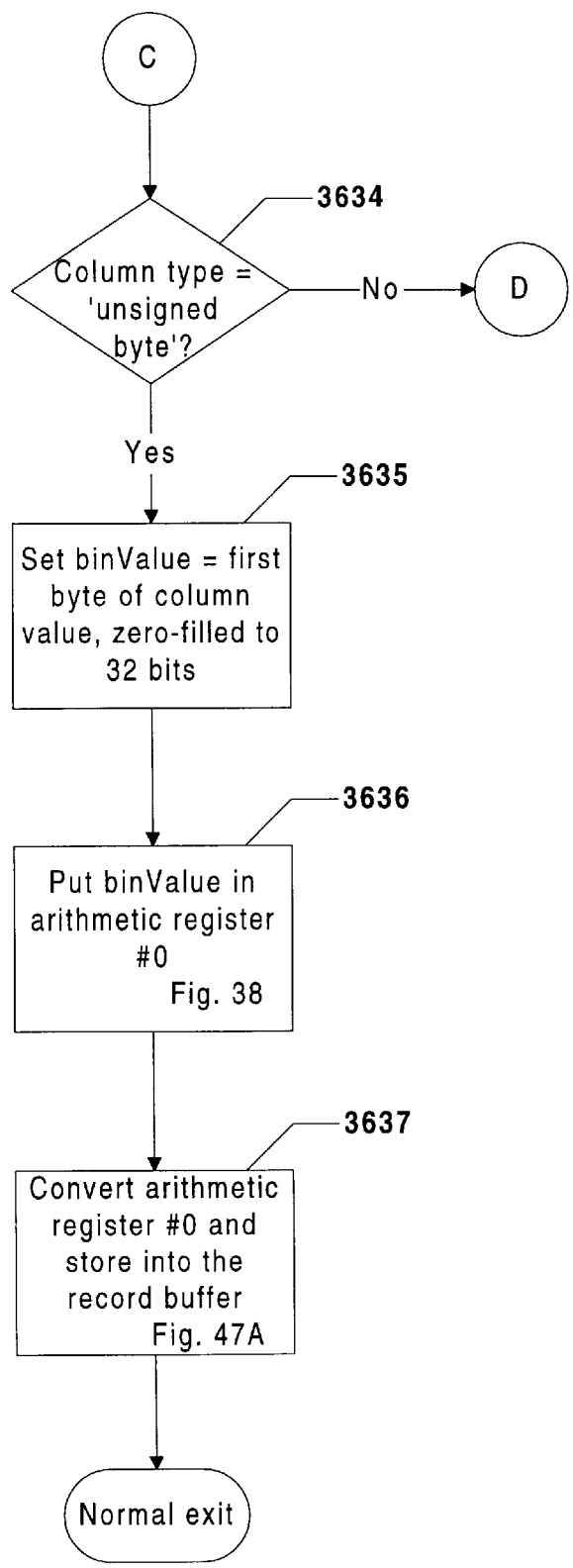
Figure 36C4

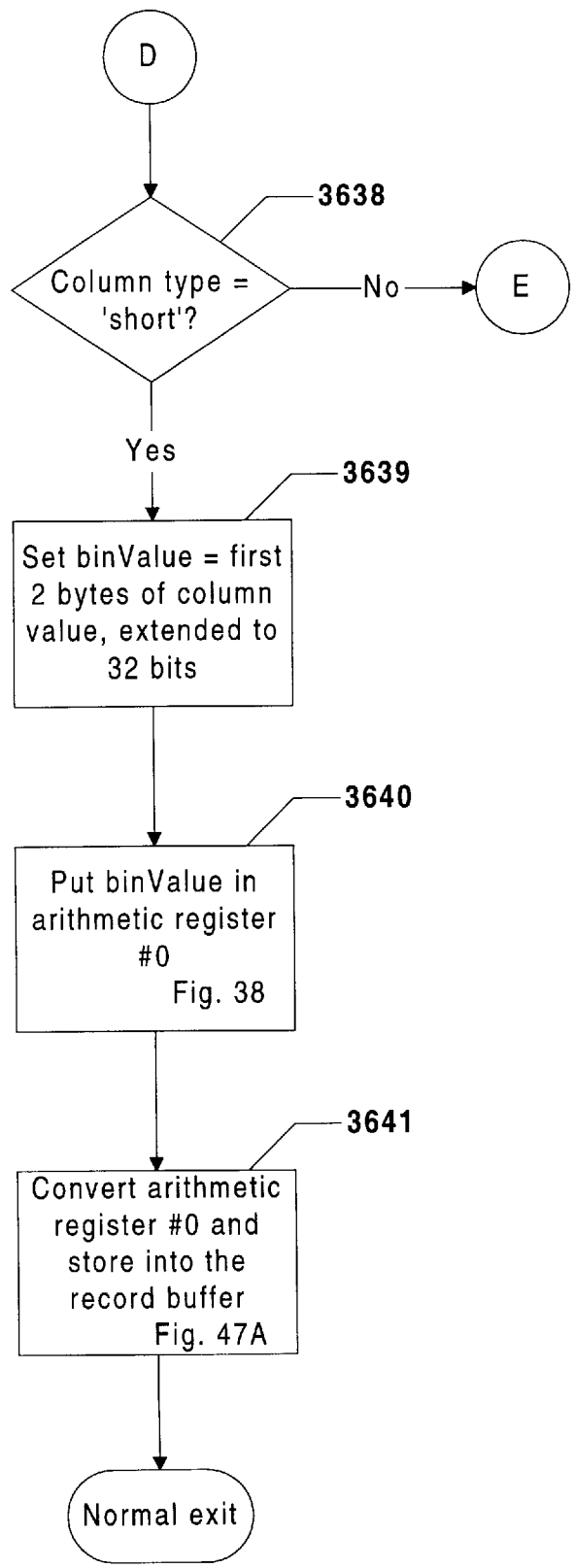
Figure 36C5

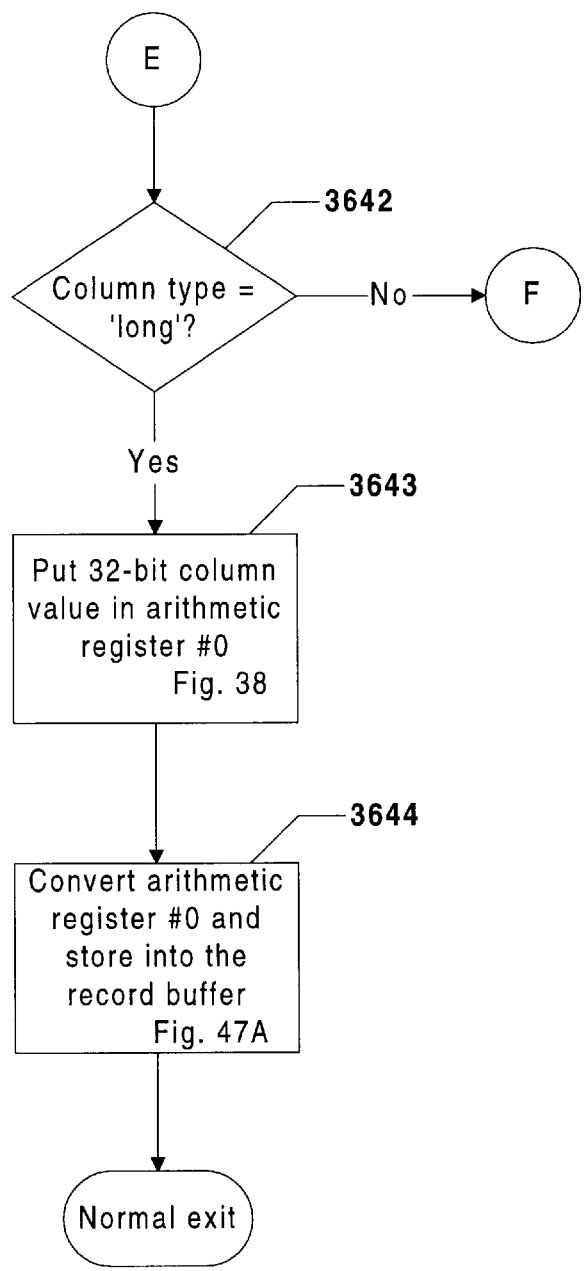
Figure 36C6

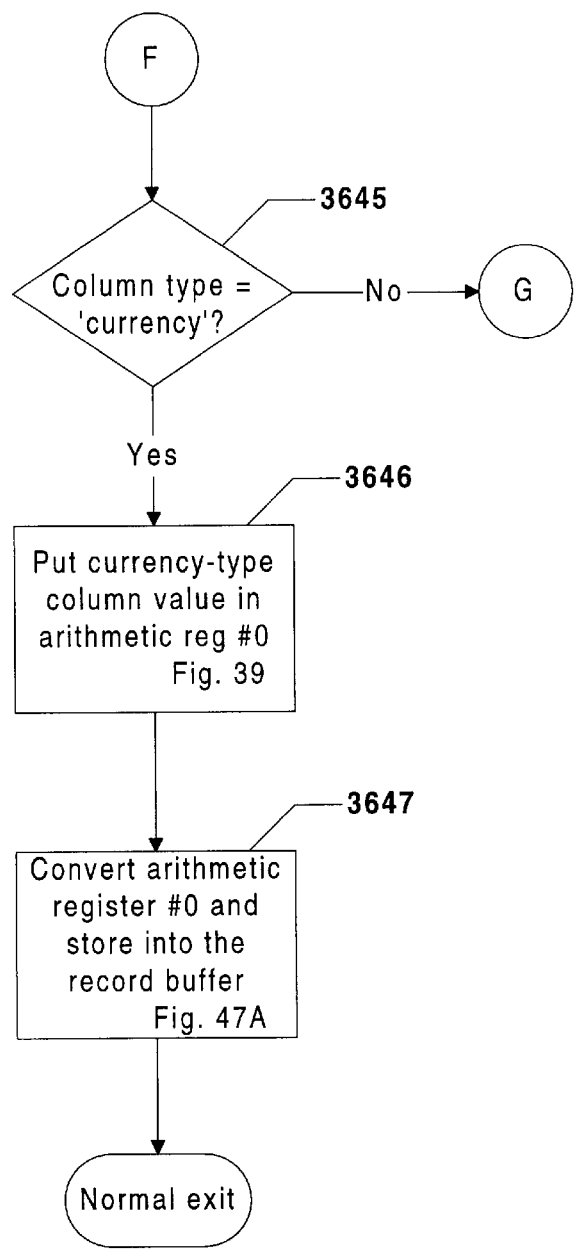
Figure 36C7

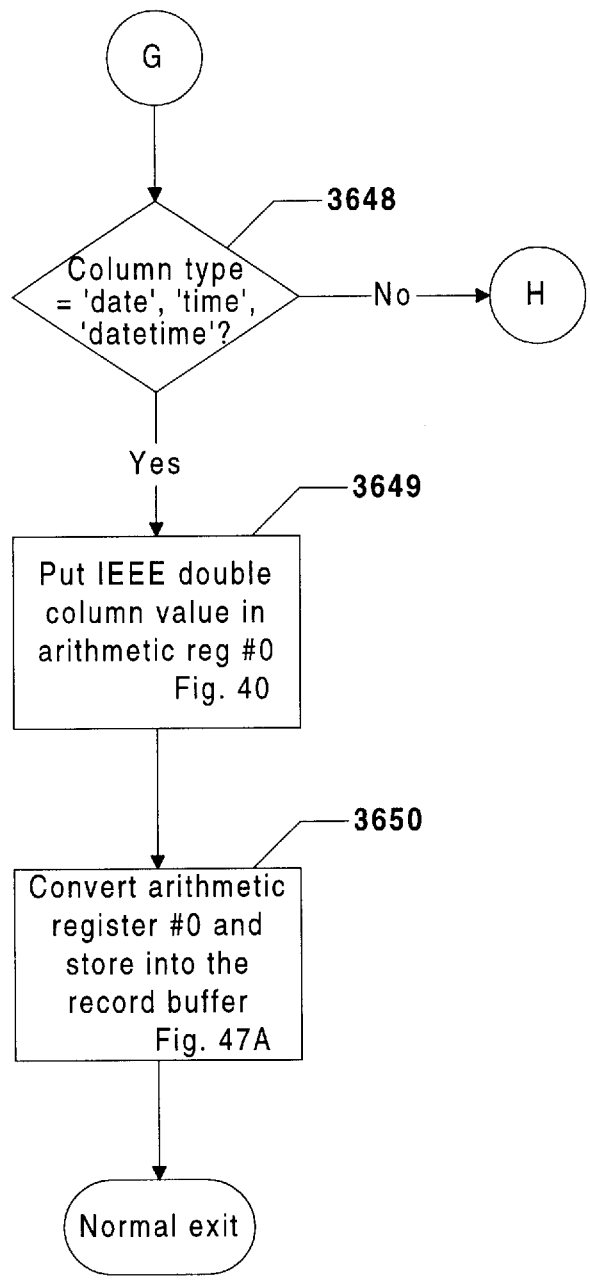
Figure 36C8

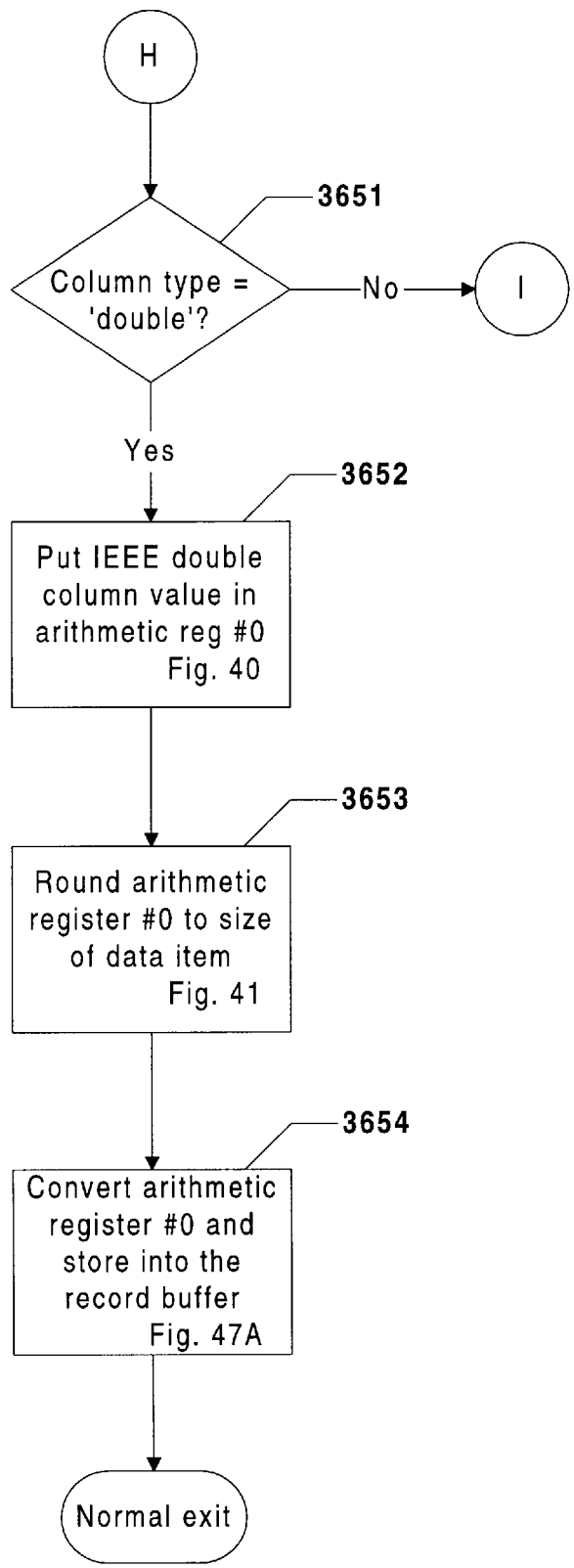
Figure 36C9

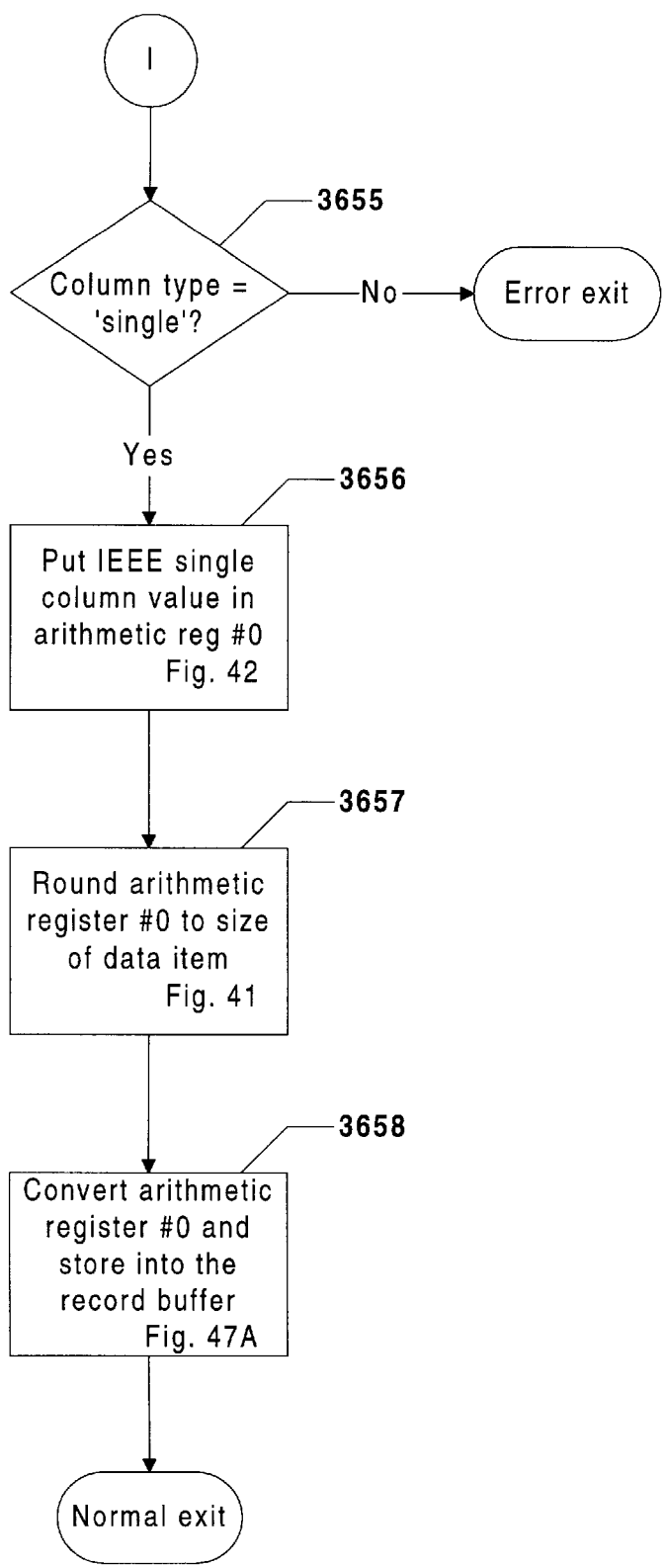
Figure 36C10

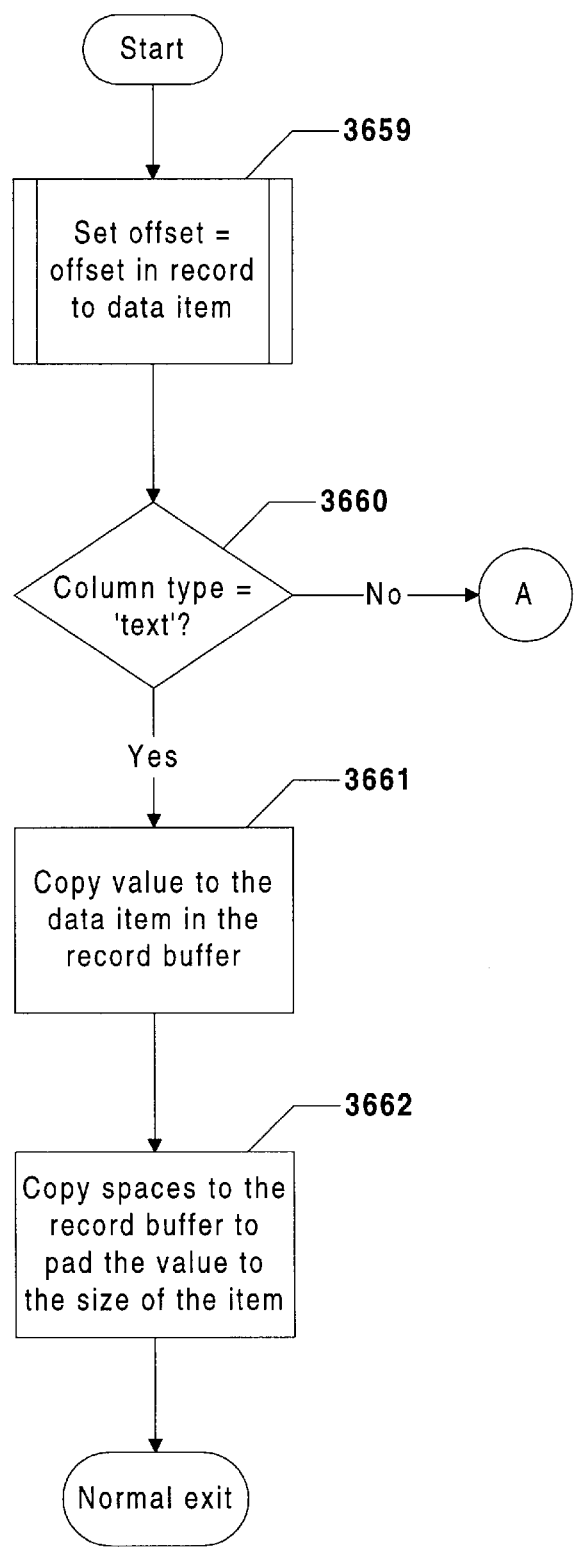
Figure 36D1

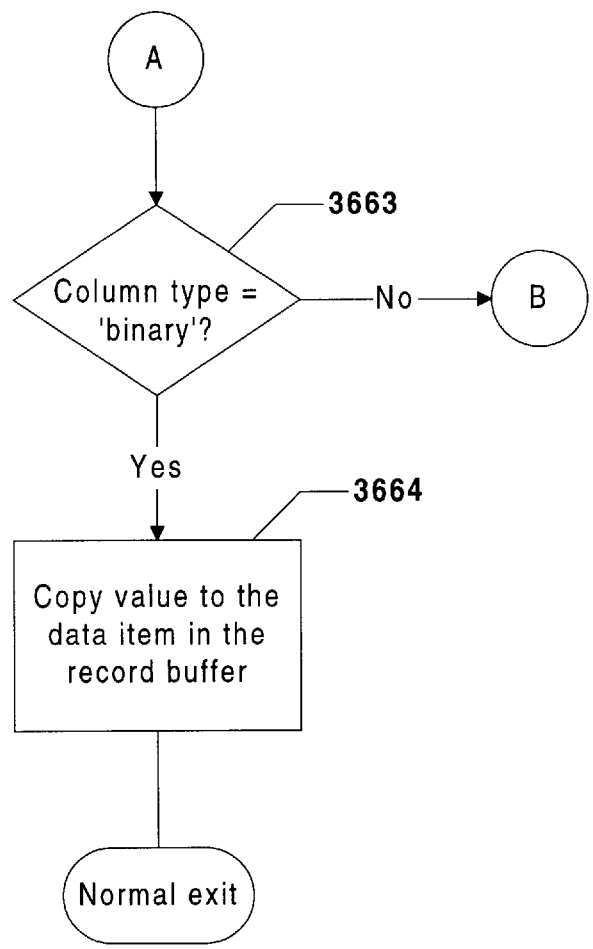
Figure 36D2

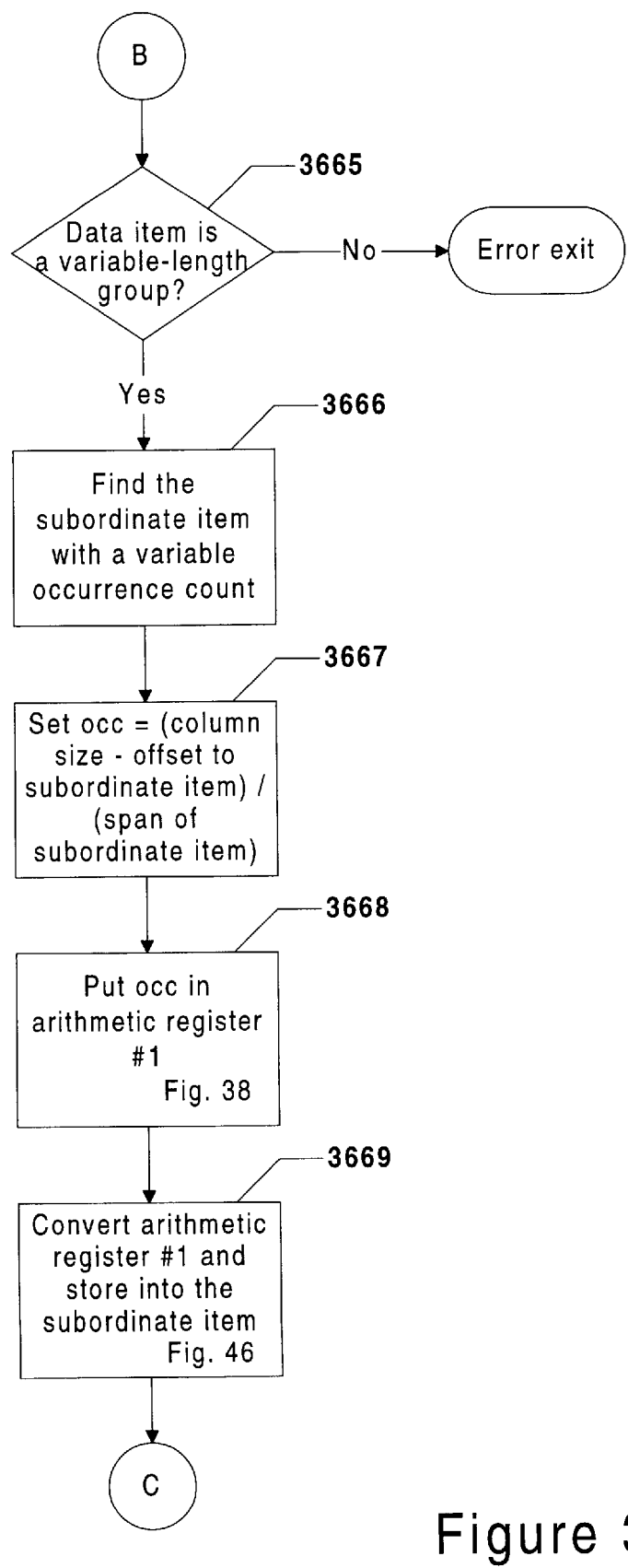
Figure 36D3

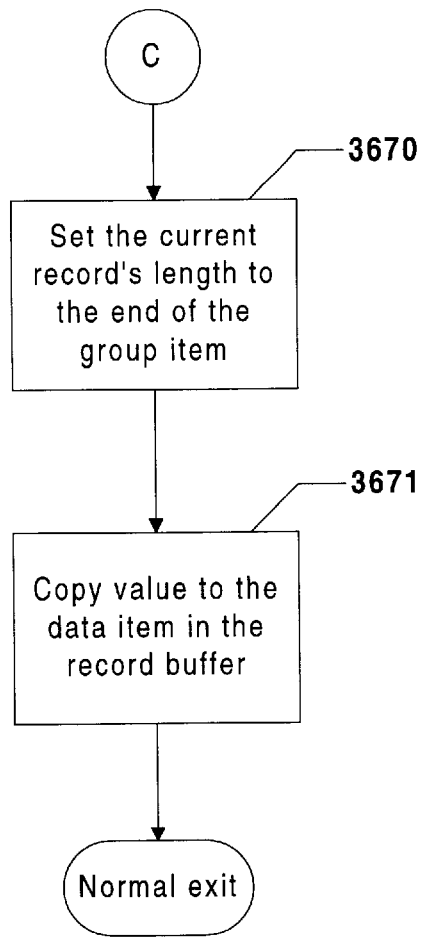
Figure 36D4

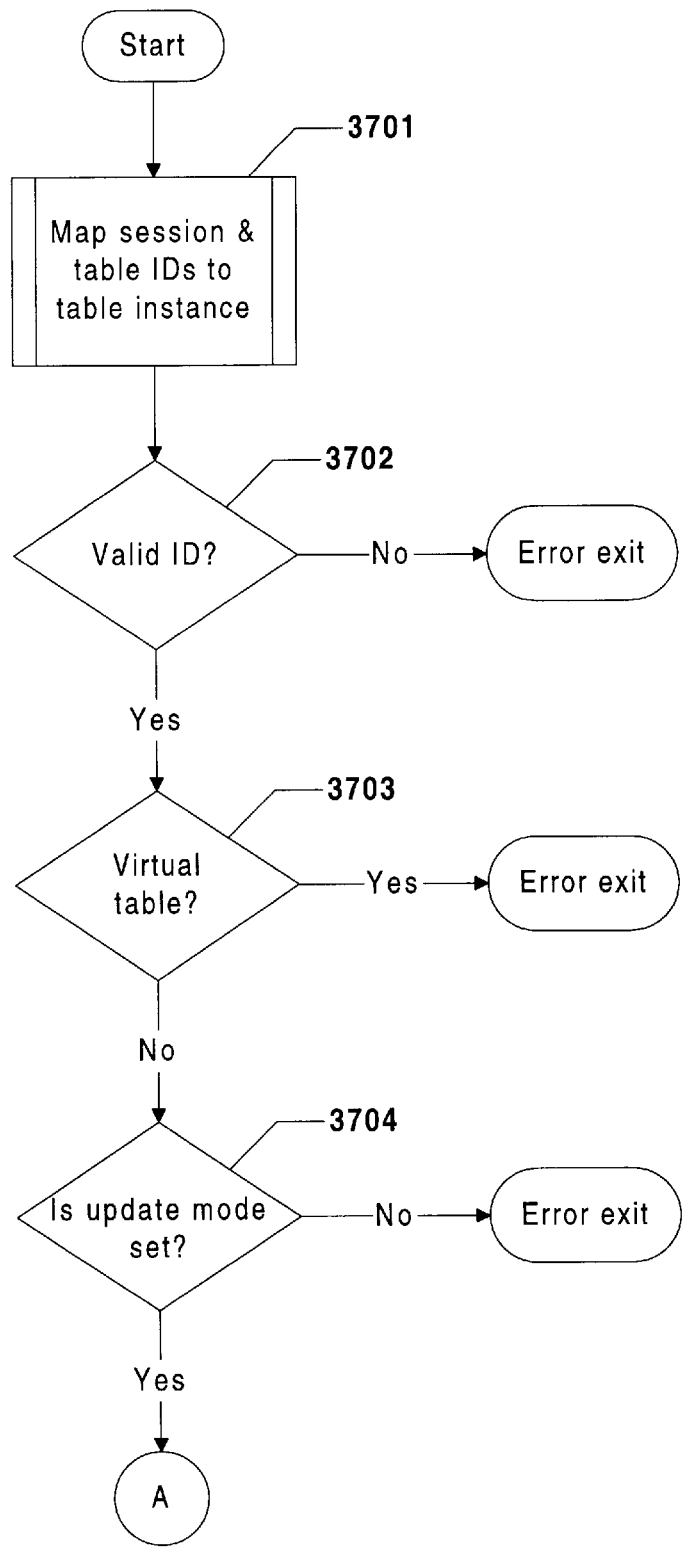
Figure 37A1

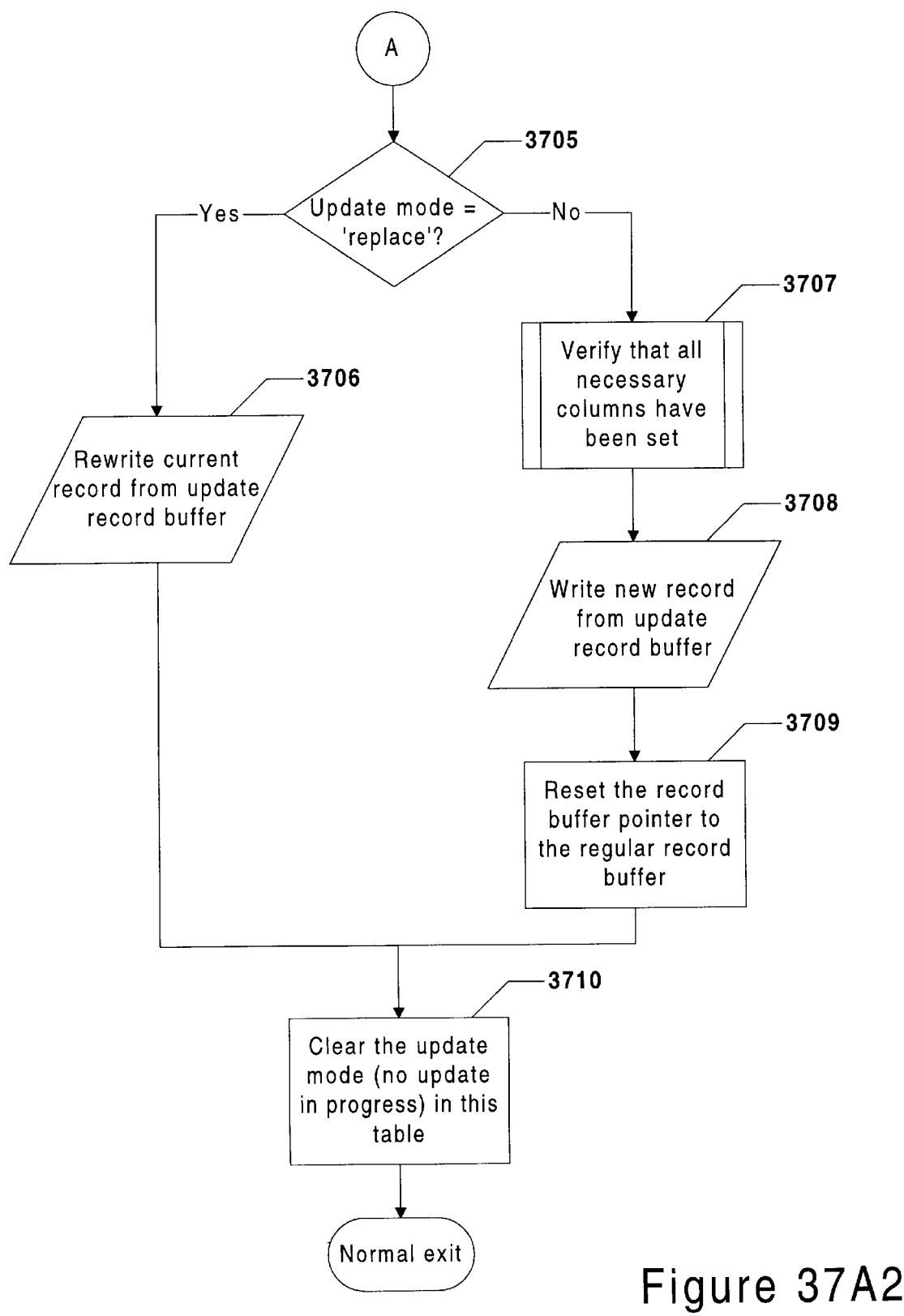
Figure 37A2

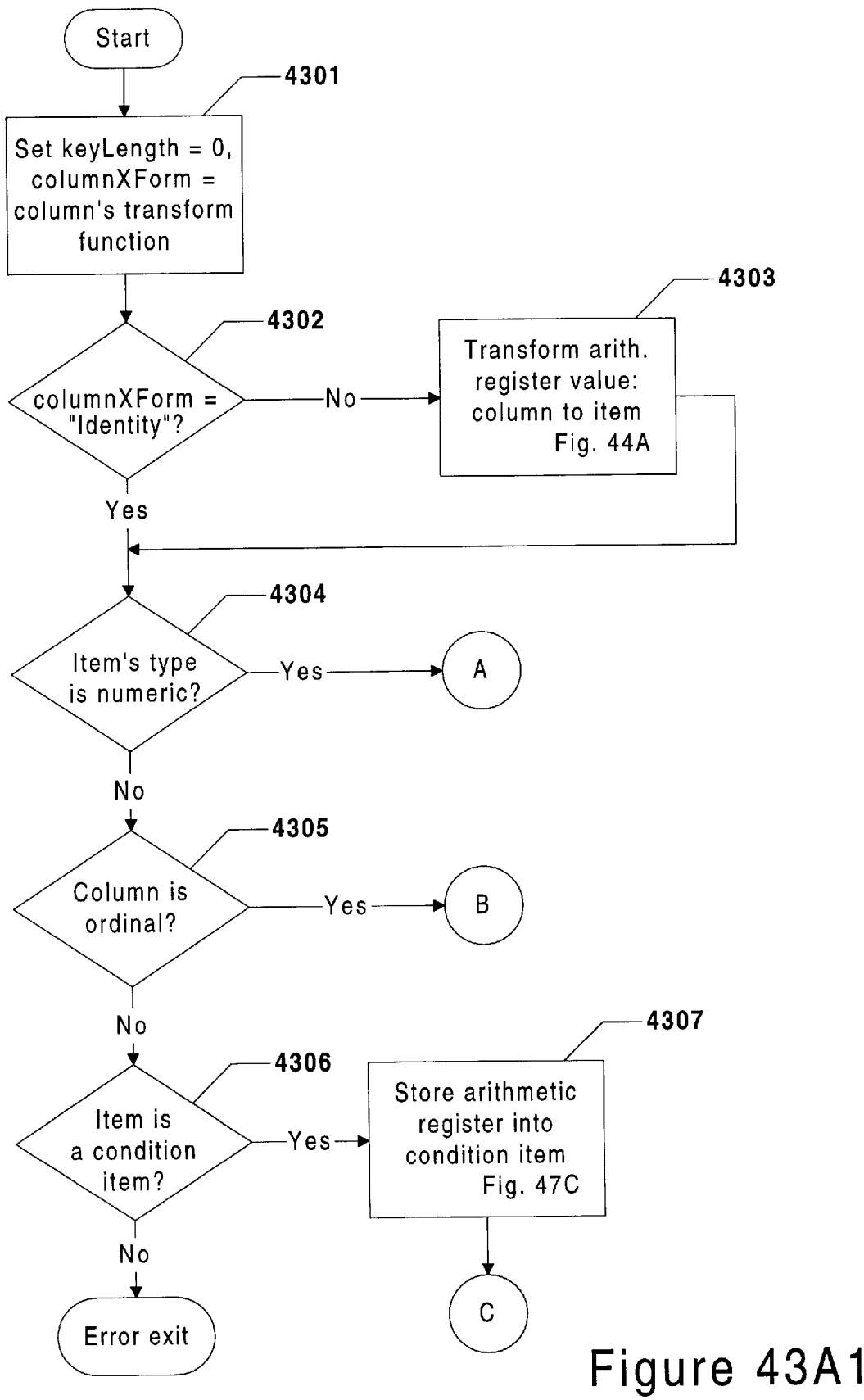
Figure 43A1

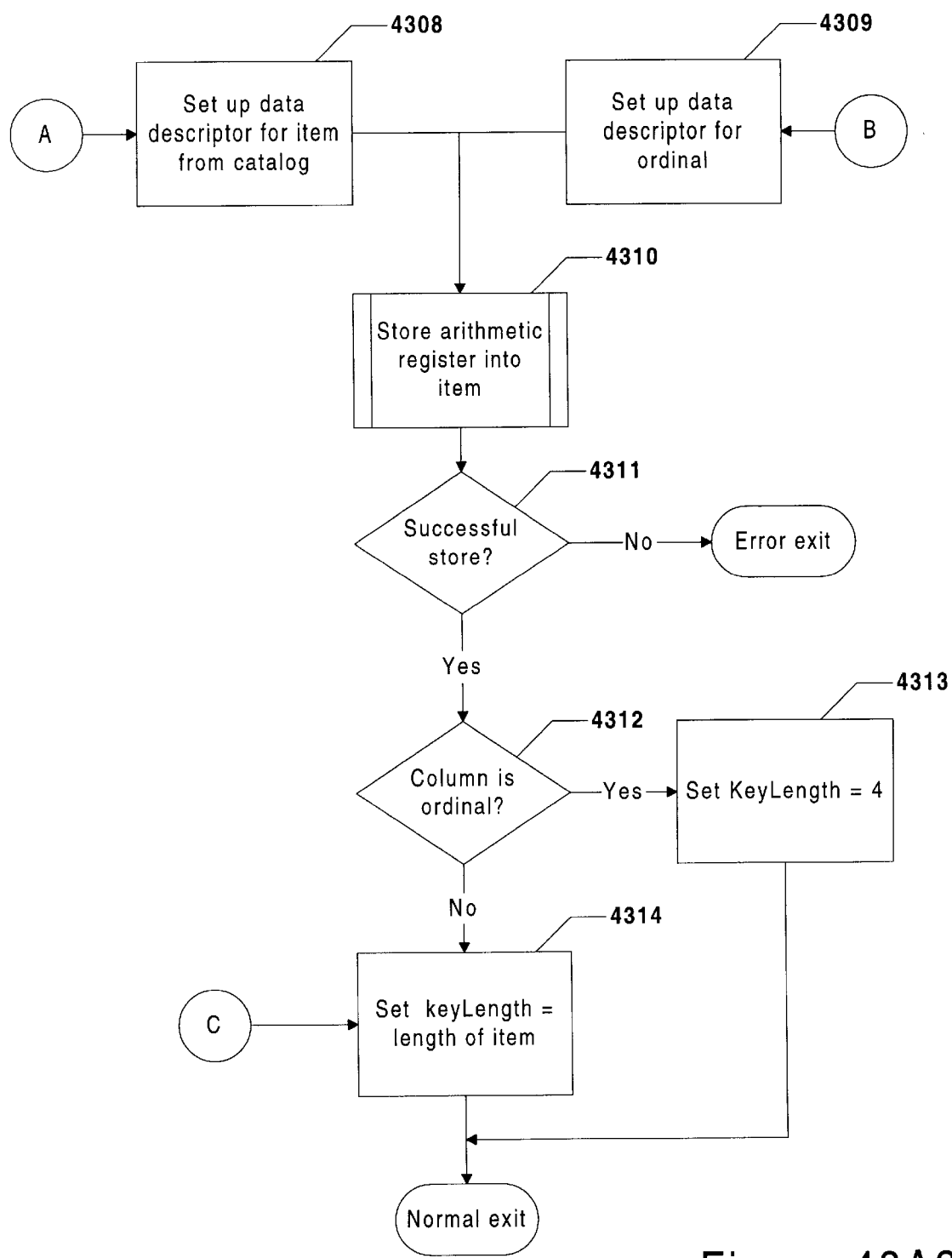
Figure 43A2

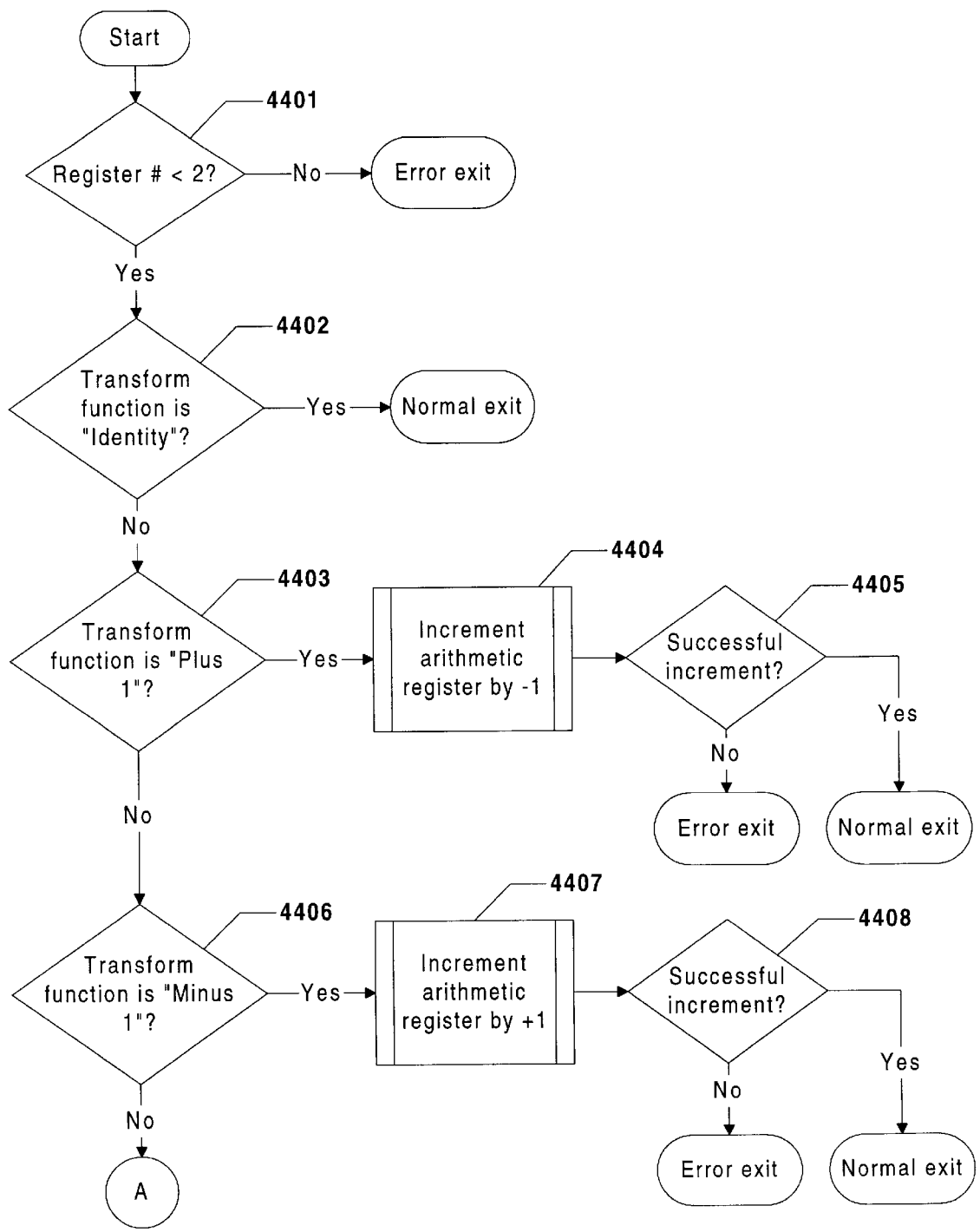
Figure 44A1

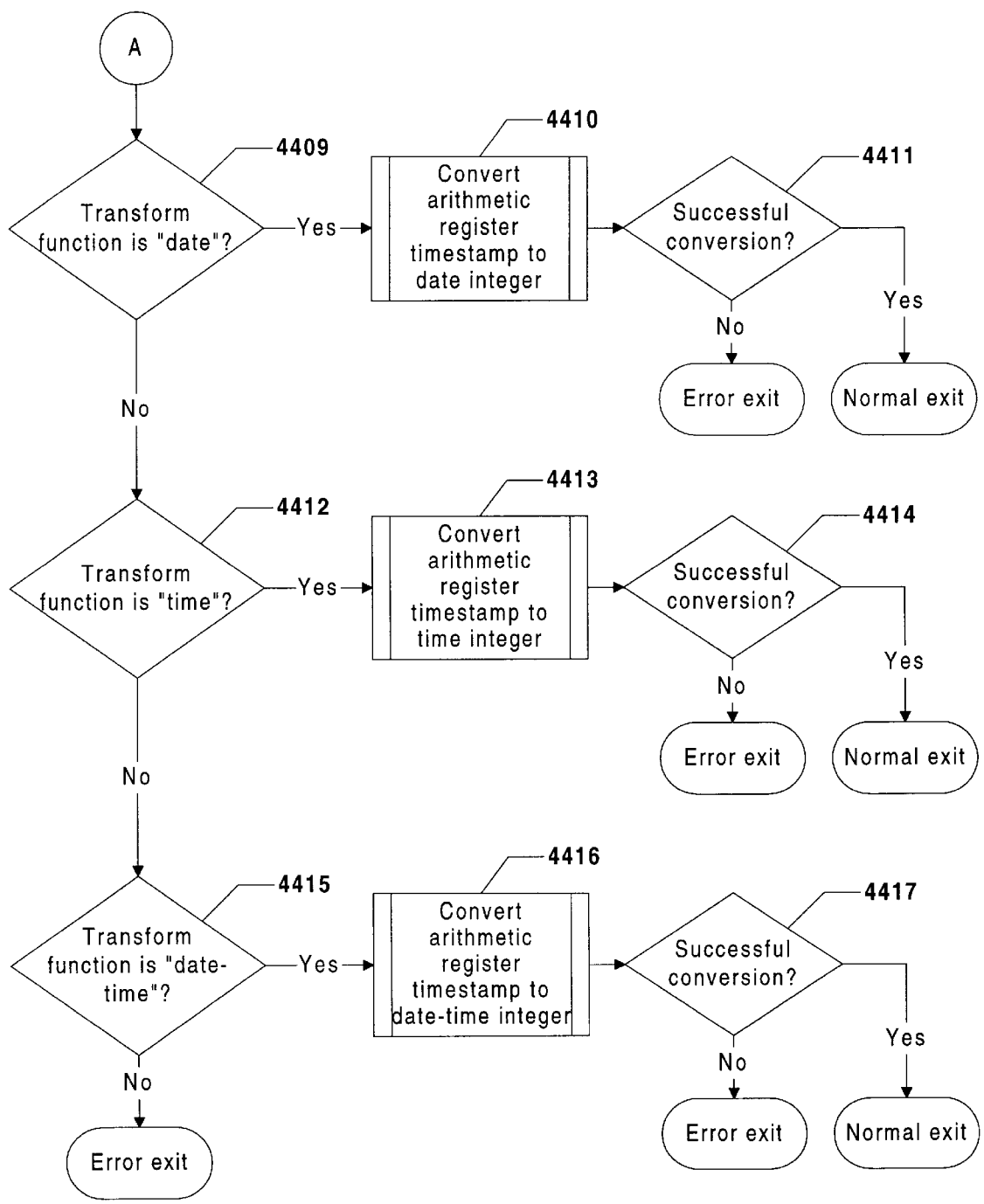
Figure 44A2

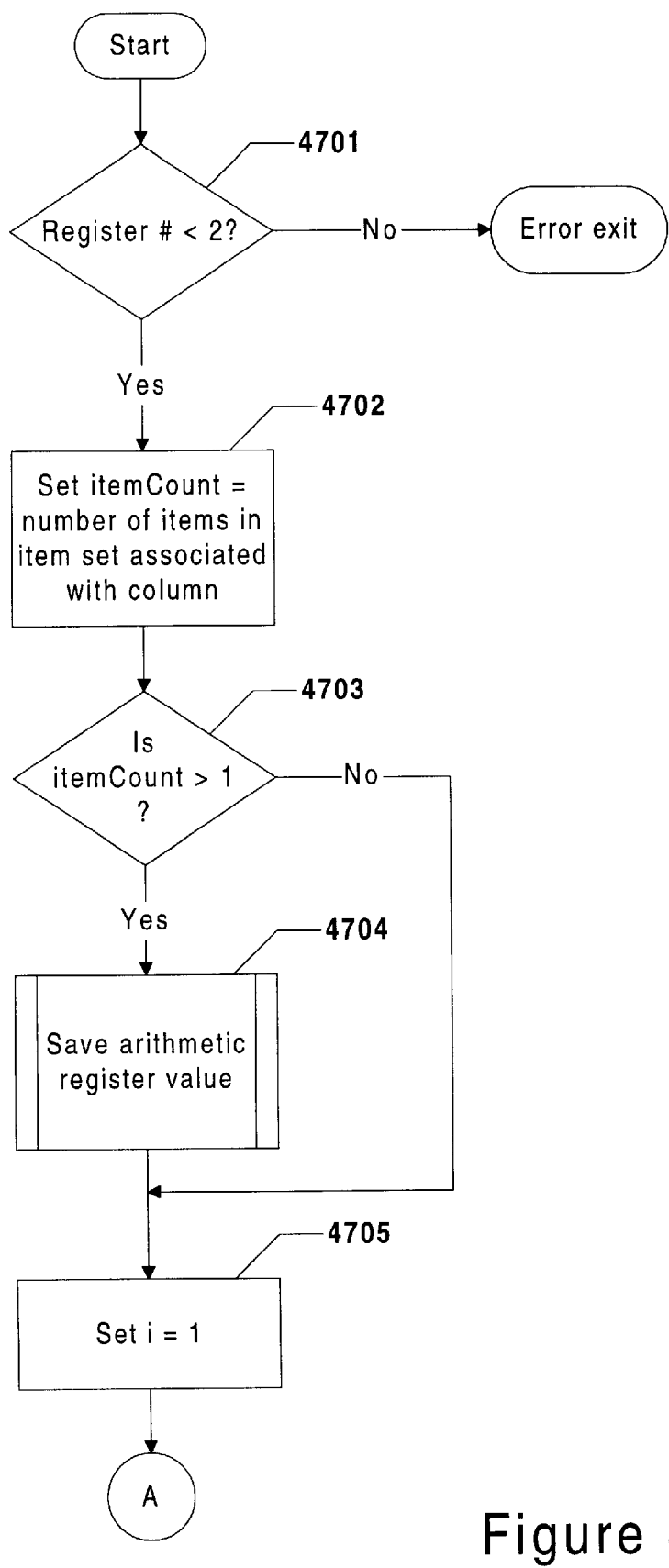
Figure 47A1

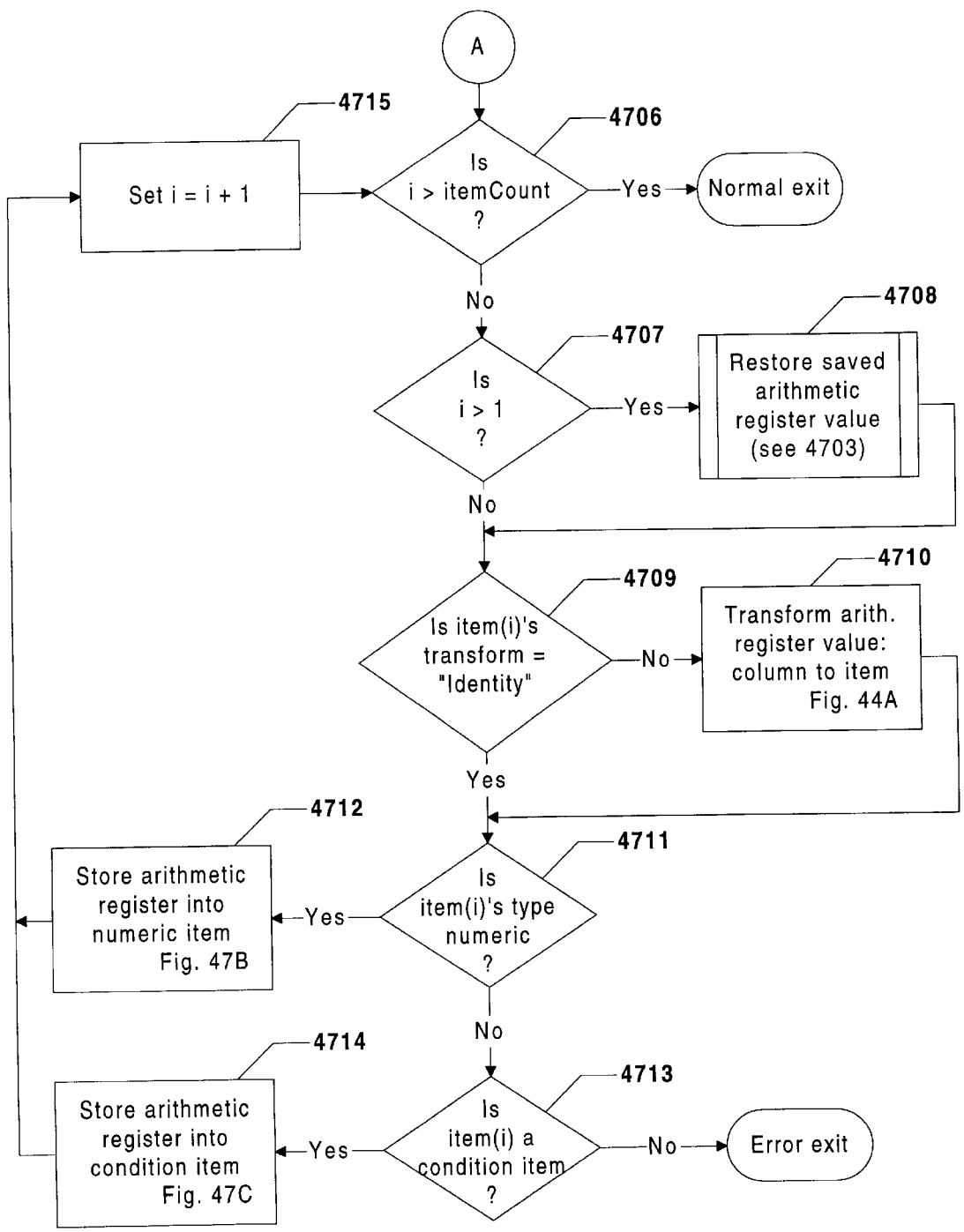
Figure 47A2

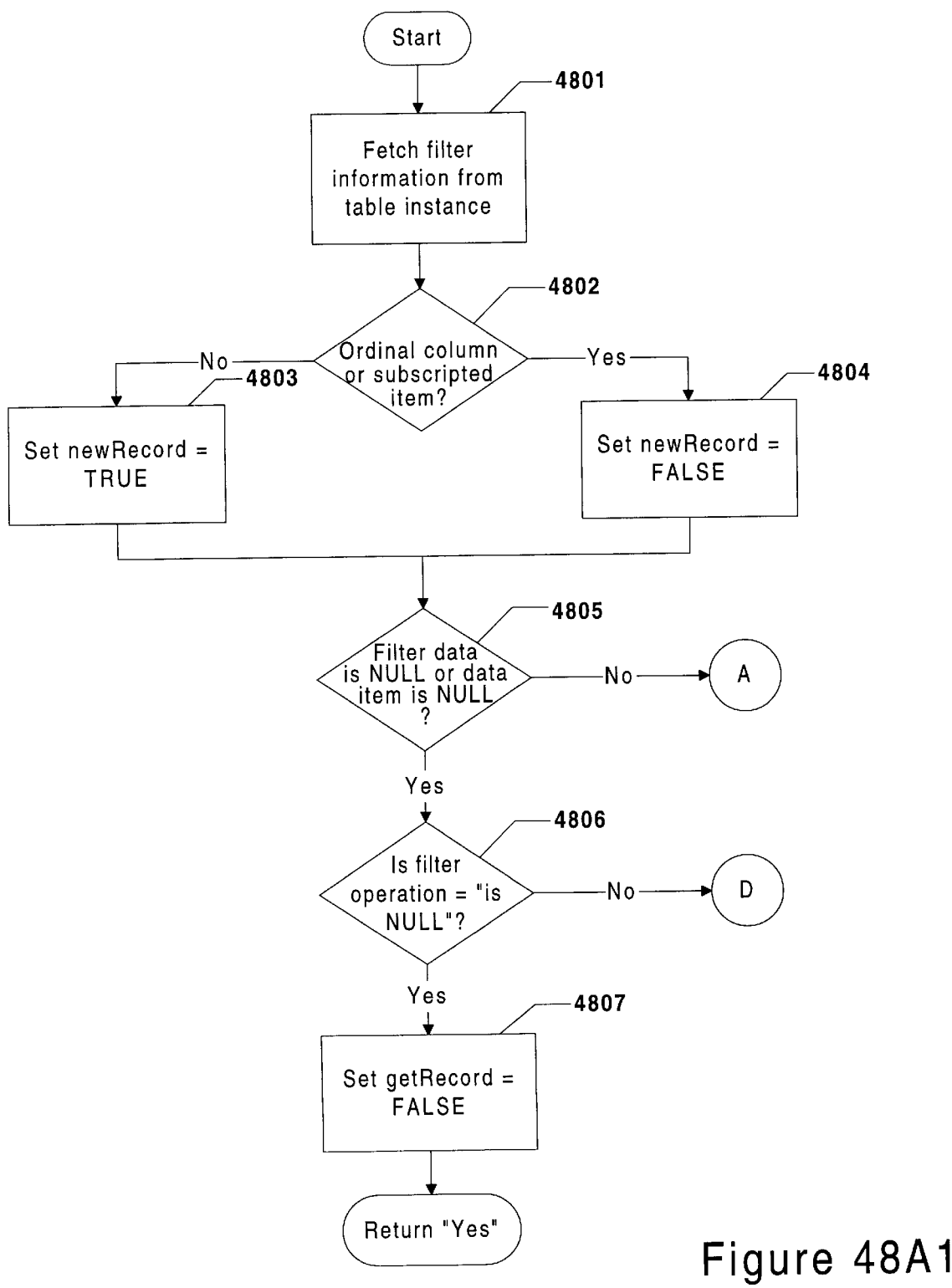
Figure 48A1

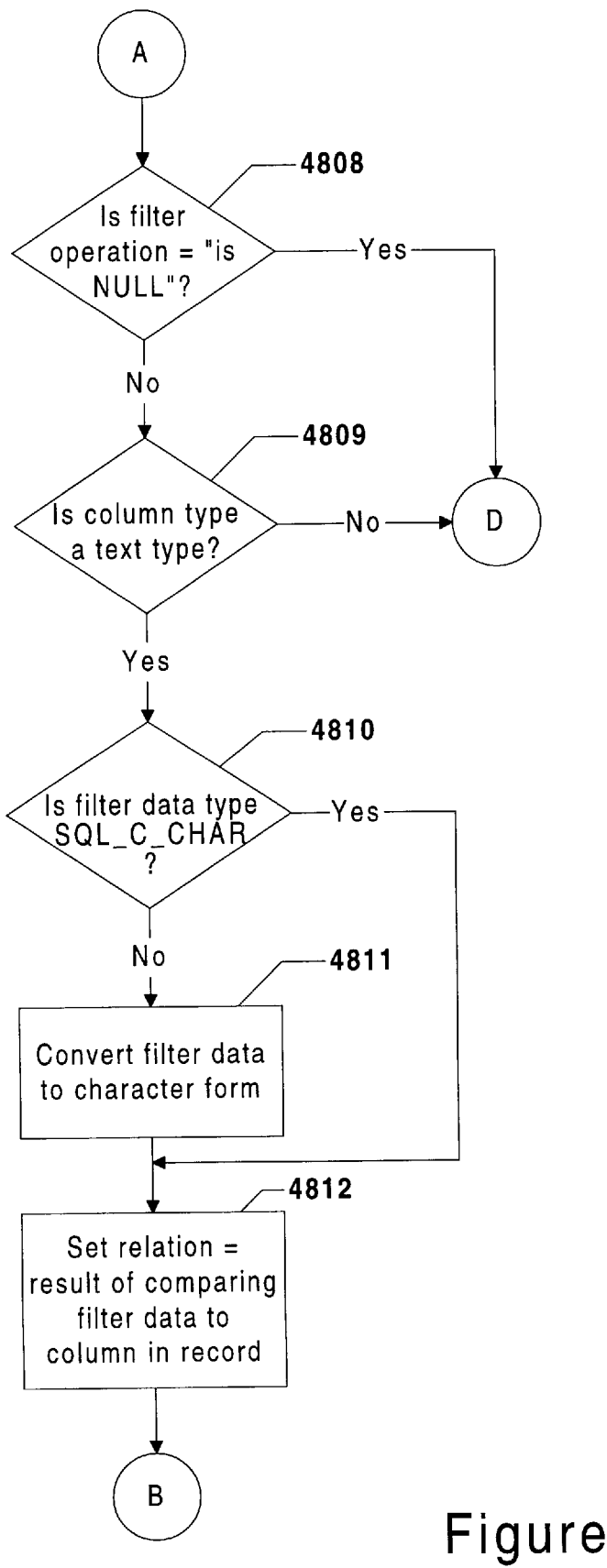
Figure 48A2

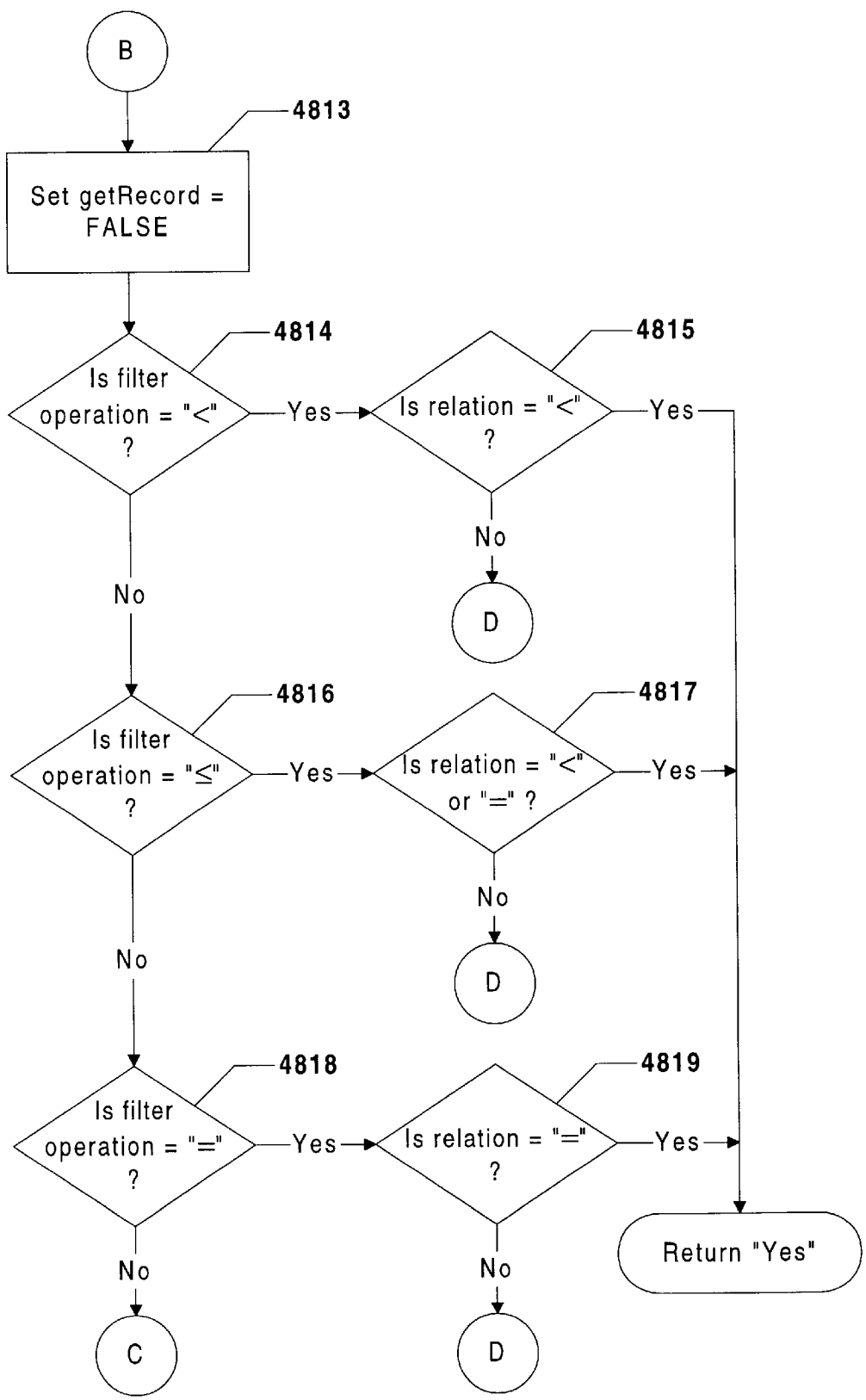
Figure 48A3

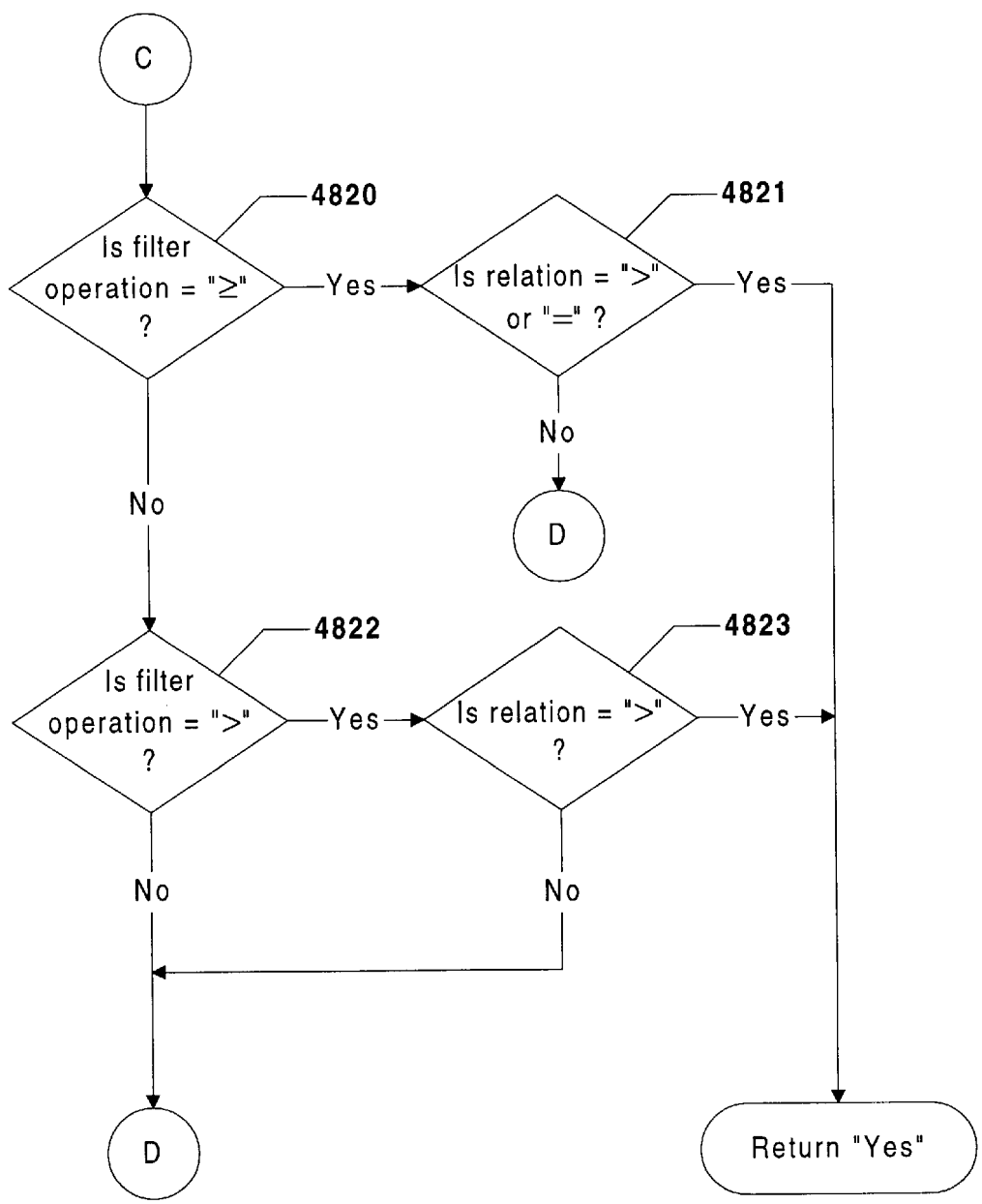
Figure 48A4

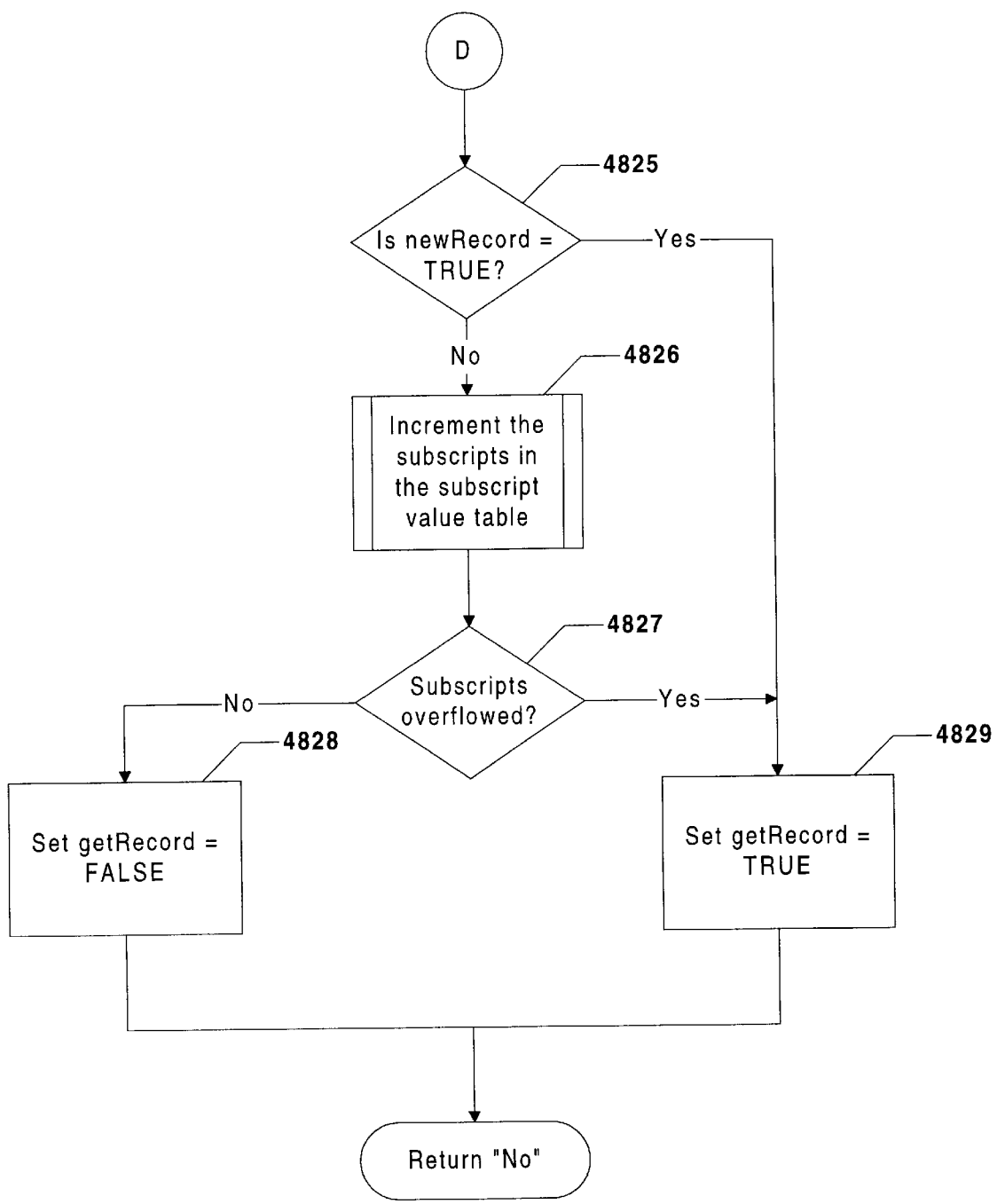
Figure 48A5

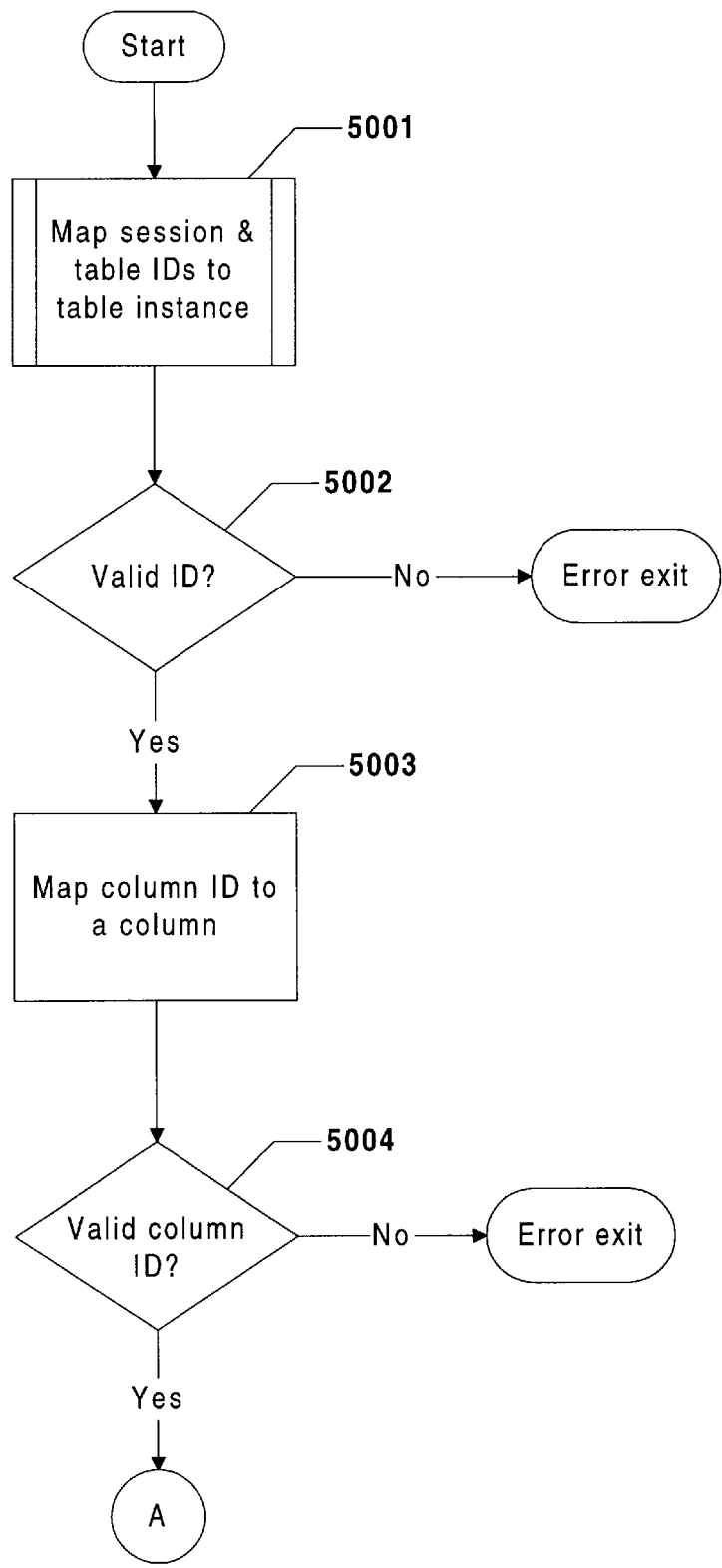
Figure 50A1

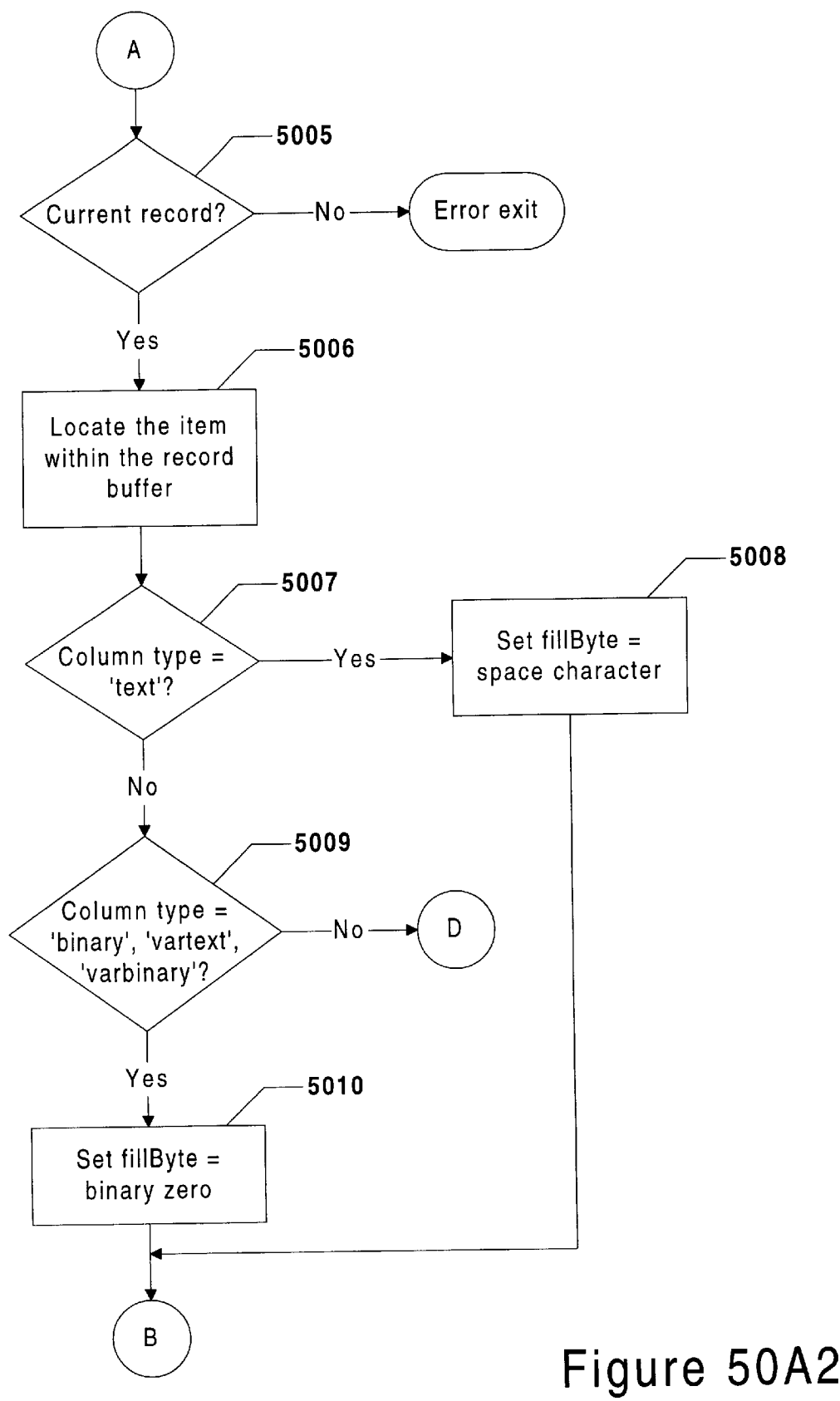
Figure 50A2

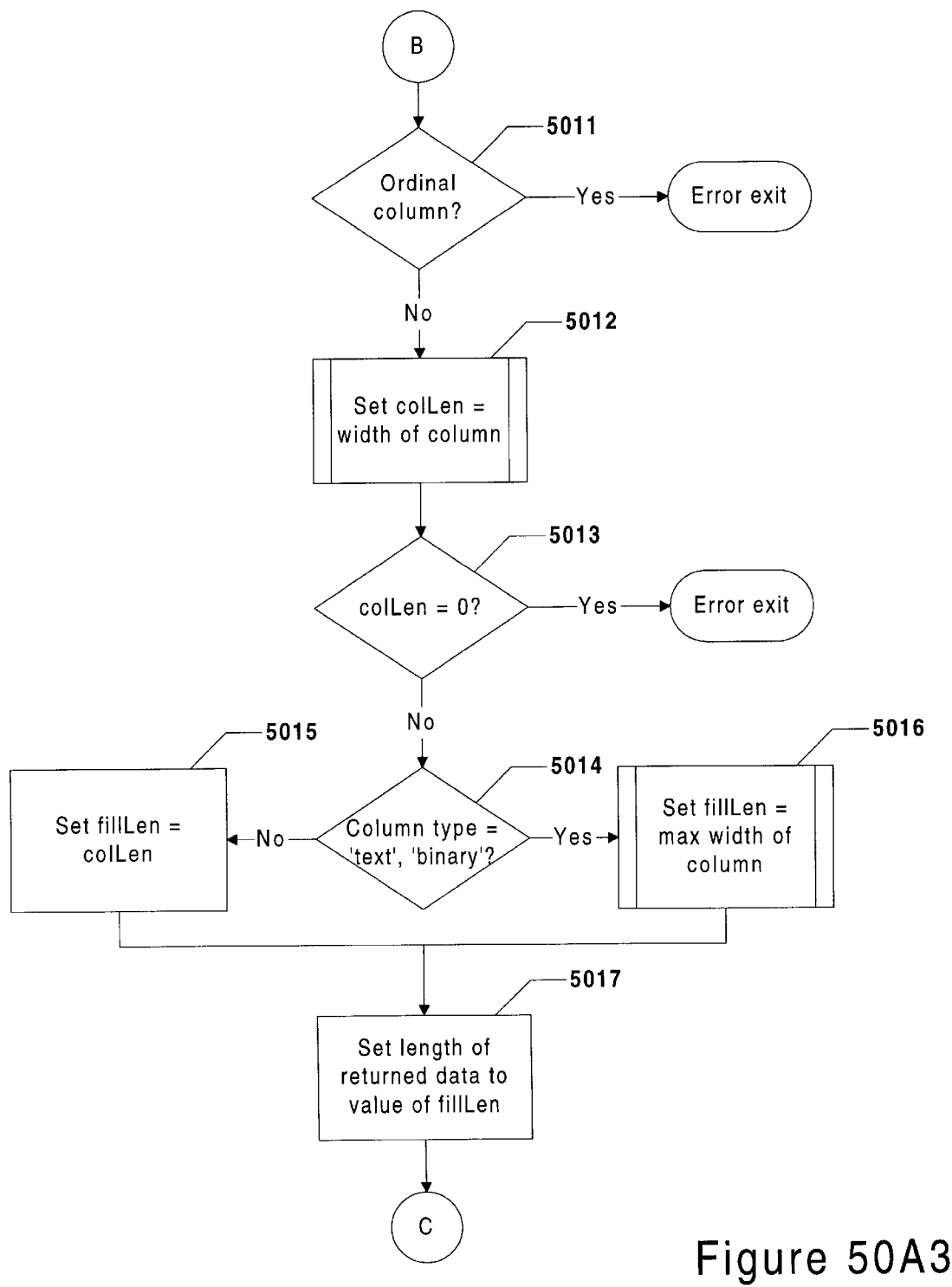
Figure 50A3

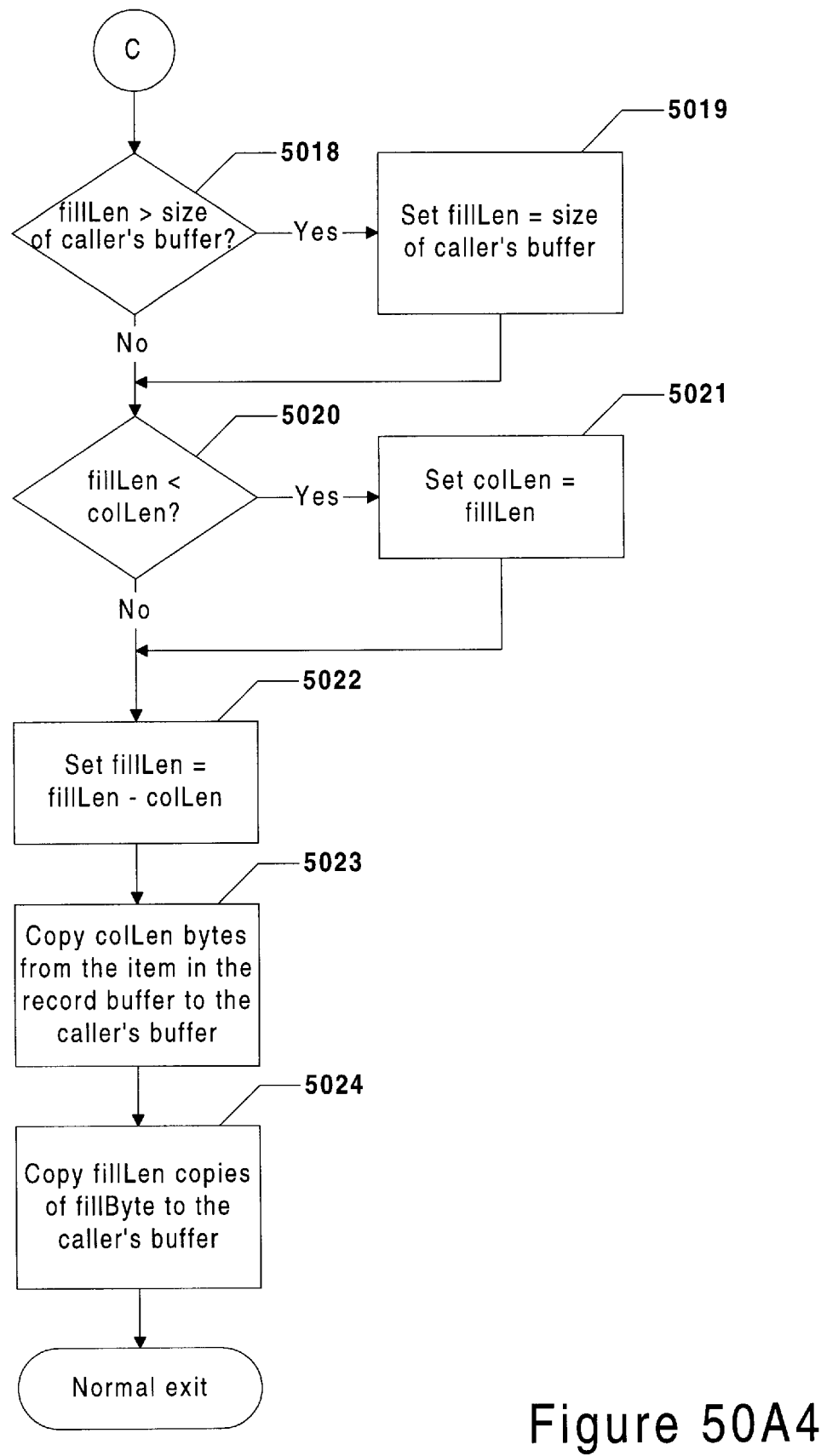
Figure 50A4

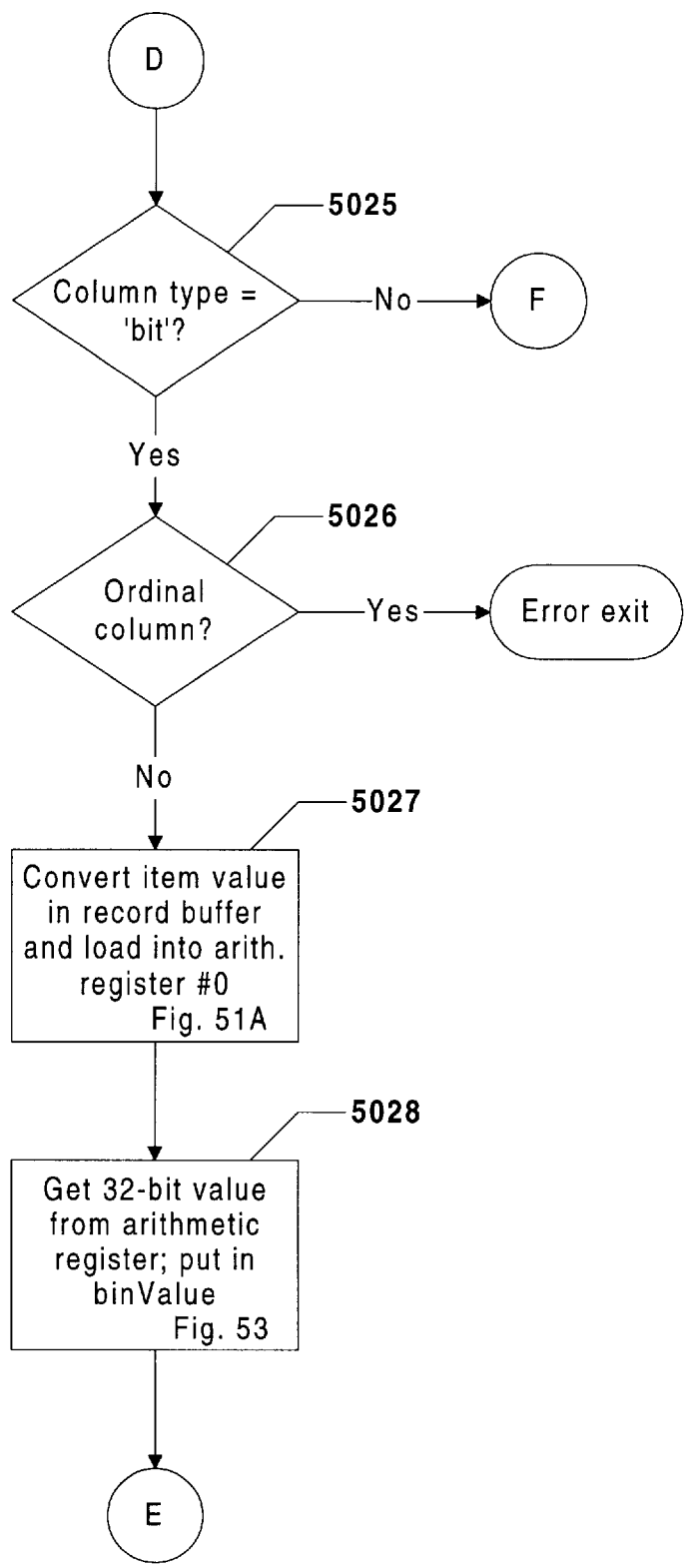
Figure 50A5

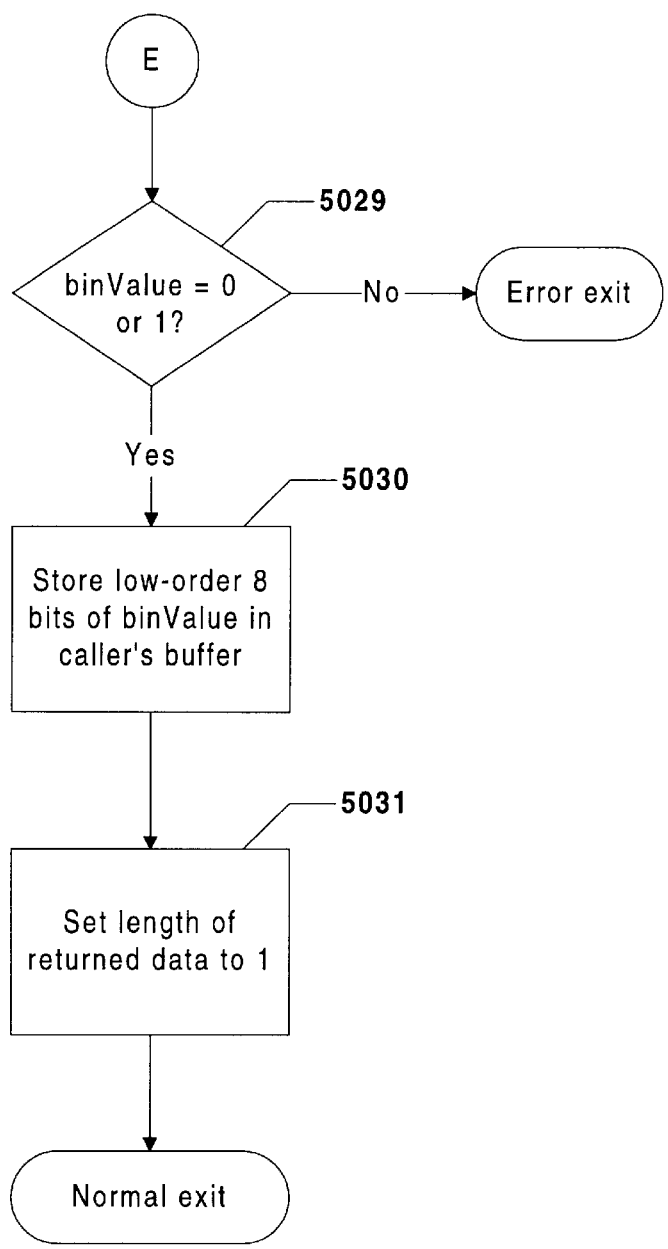
Figure 50A6

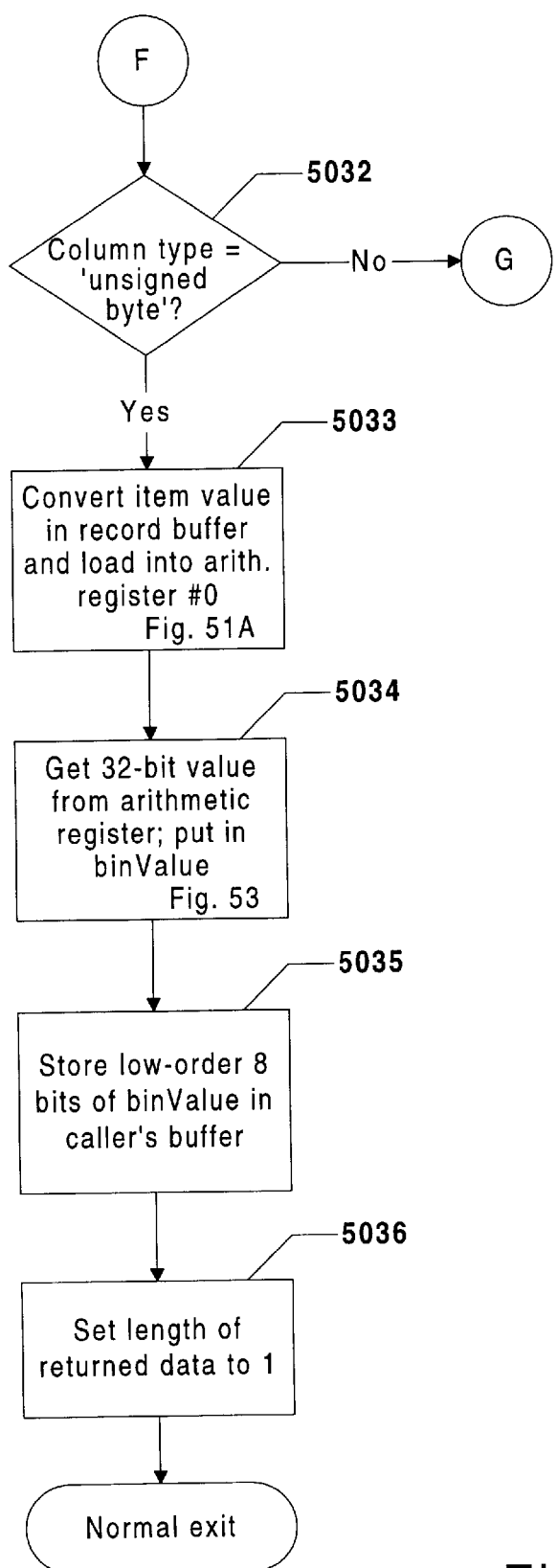
Figure 50A7

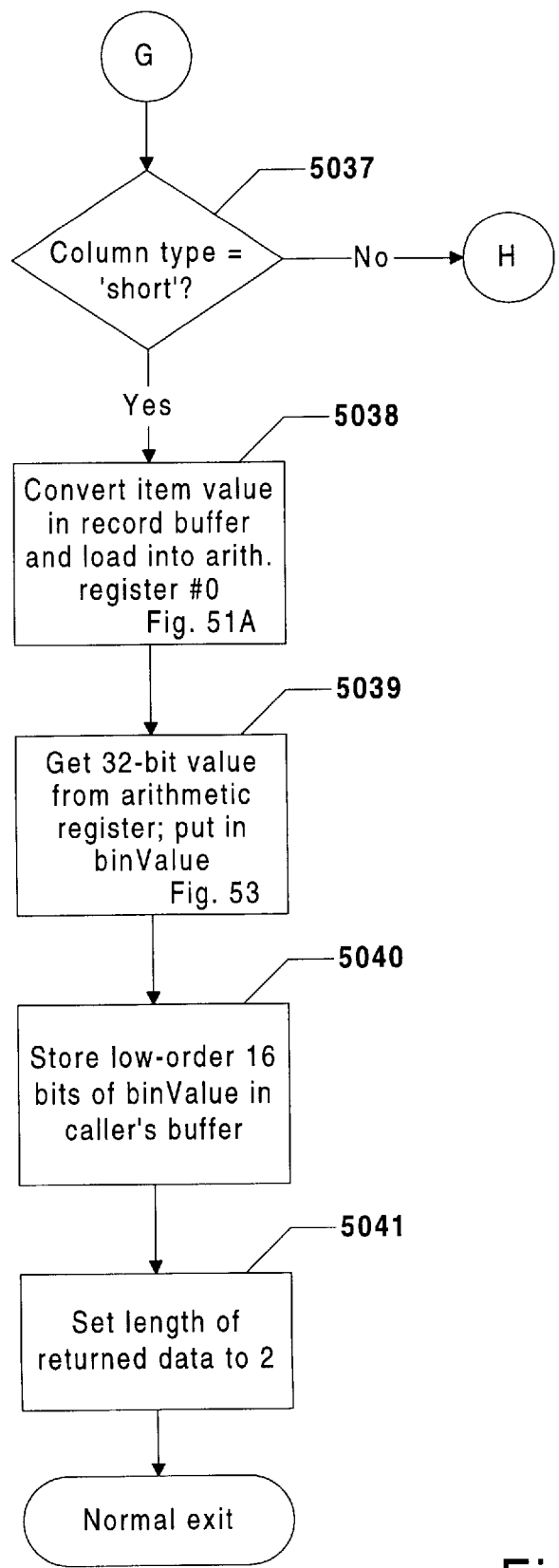
Figure 50A8

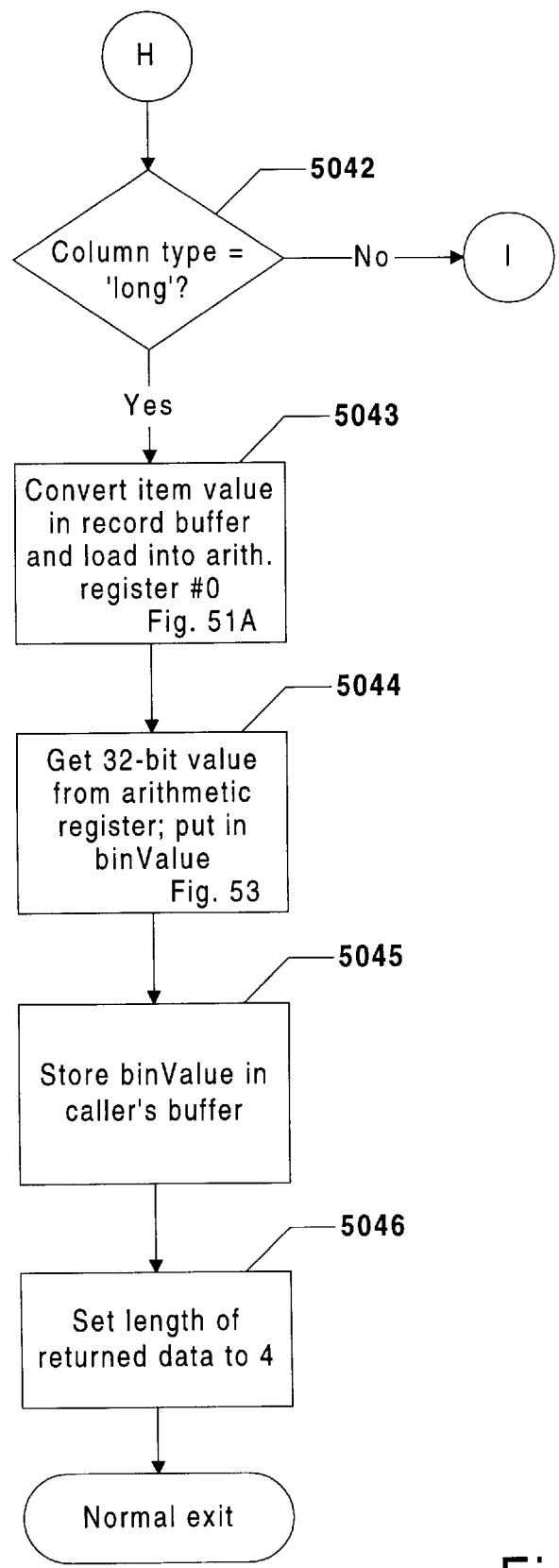
Figure 50A9

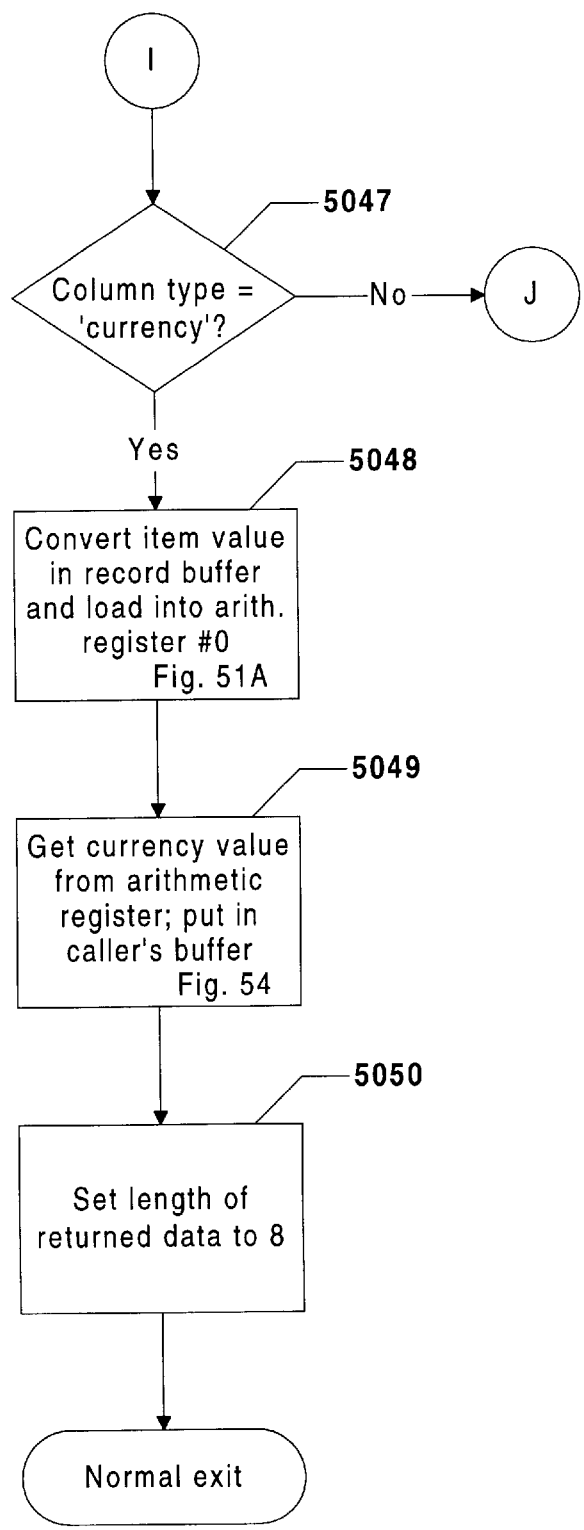
Figure 50A10

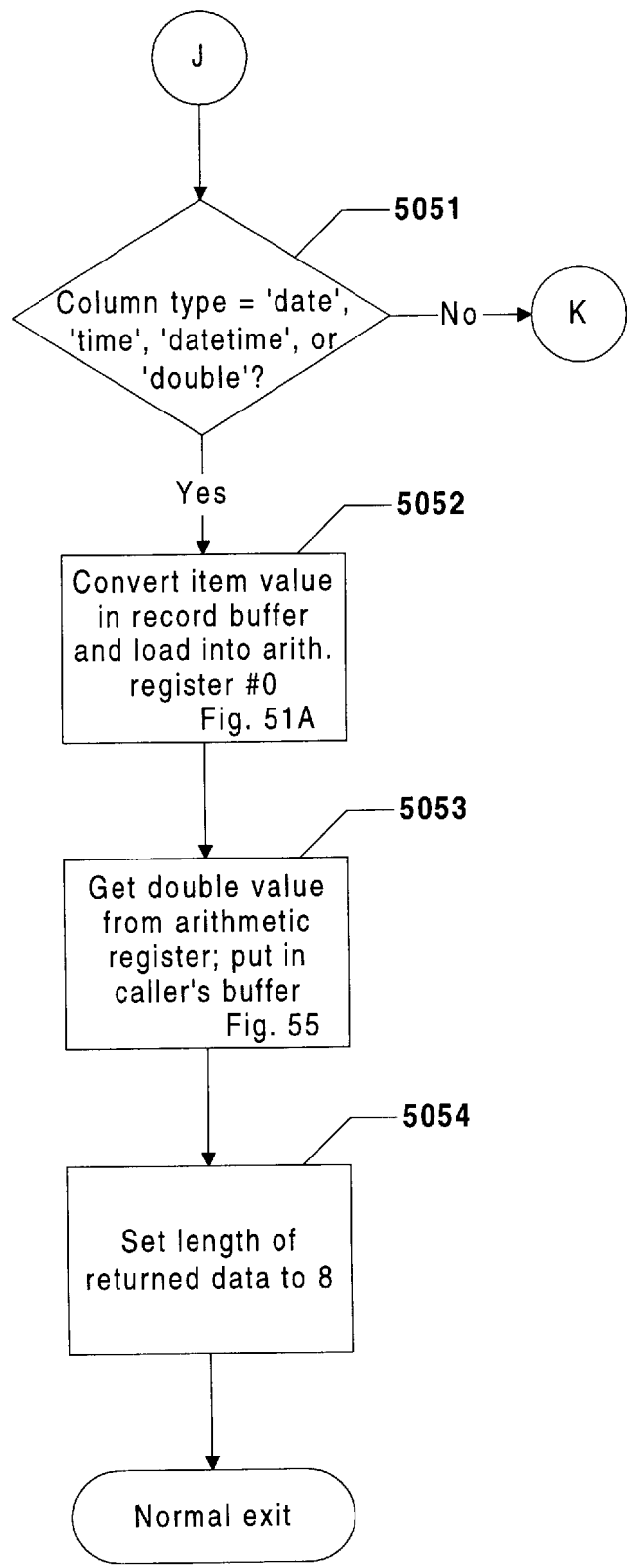
Figure 50A11

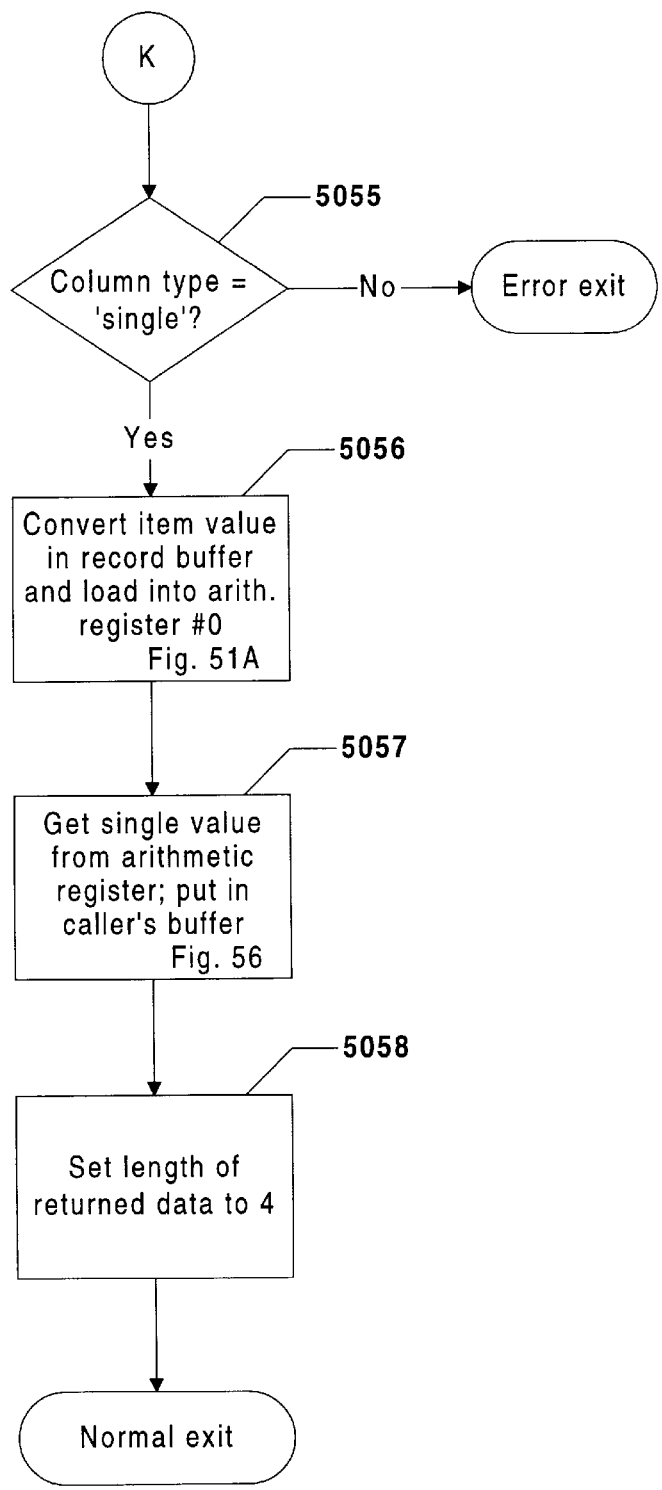
Figure 50A12

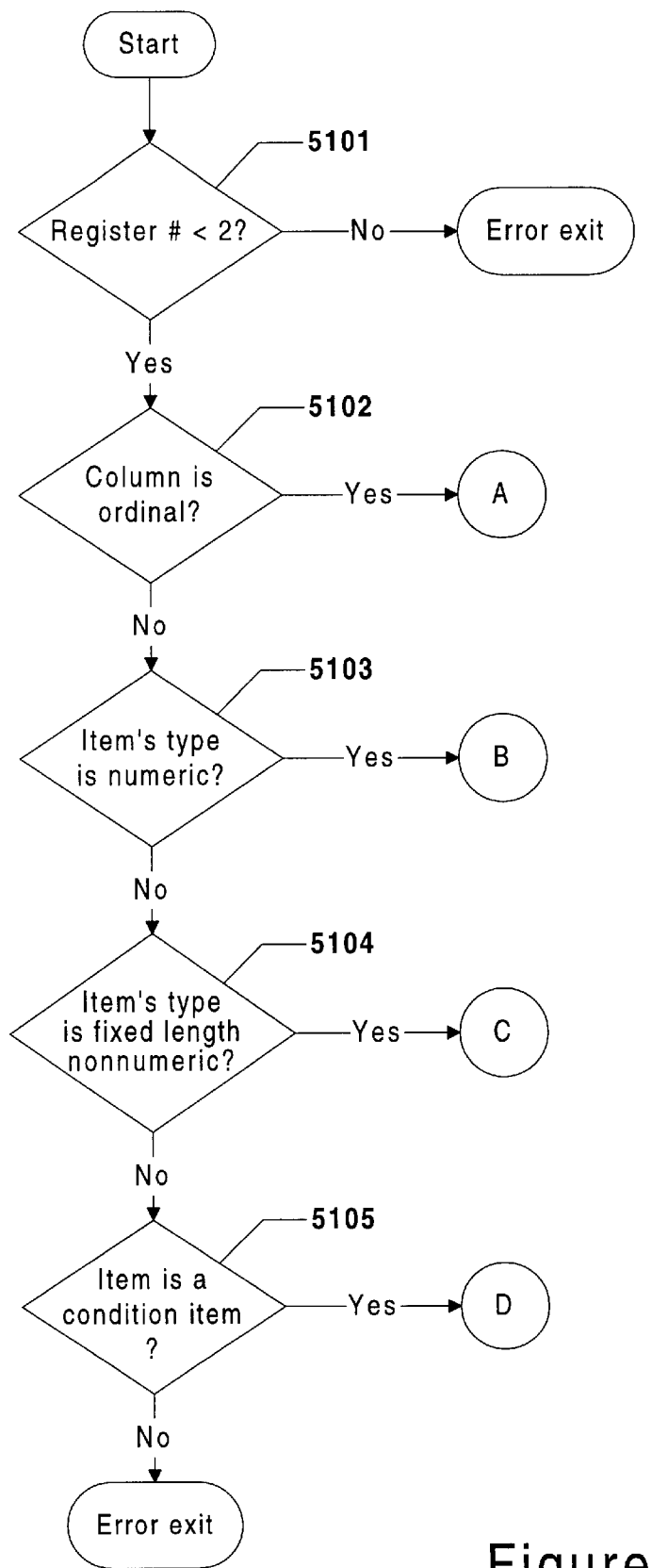
Figure 51A1

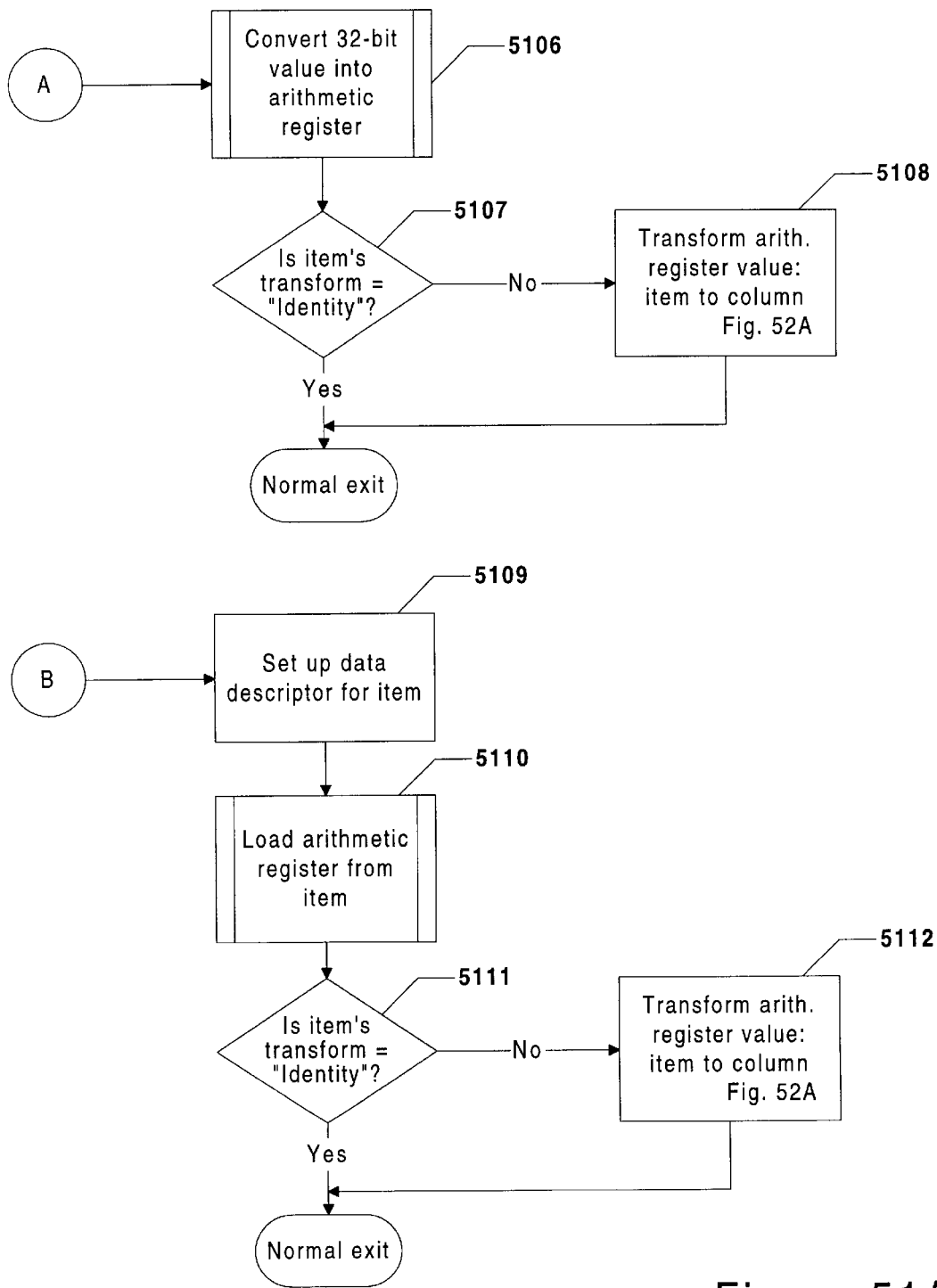
Figure 51A2

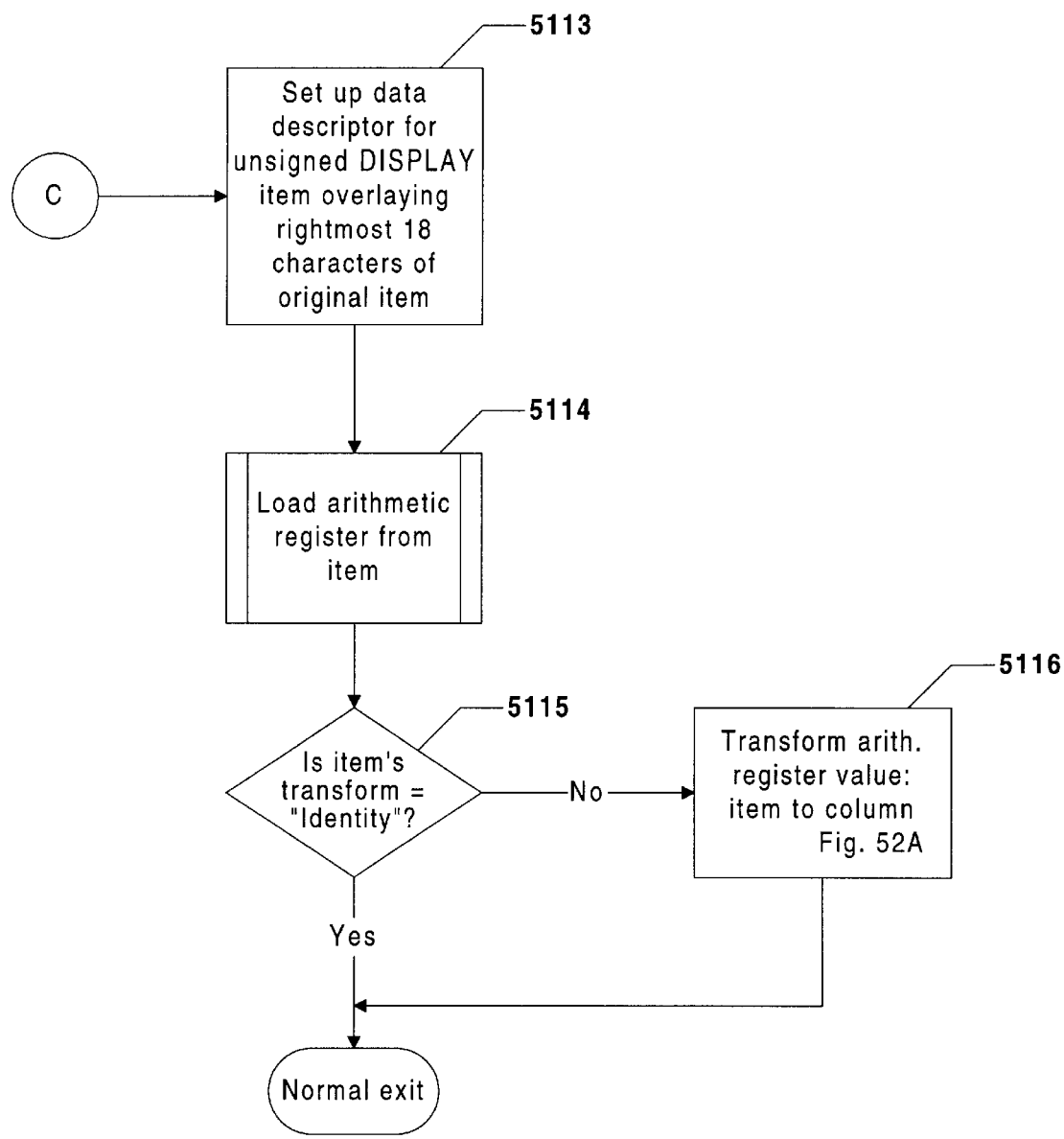
Figure 51A3

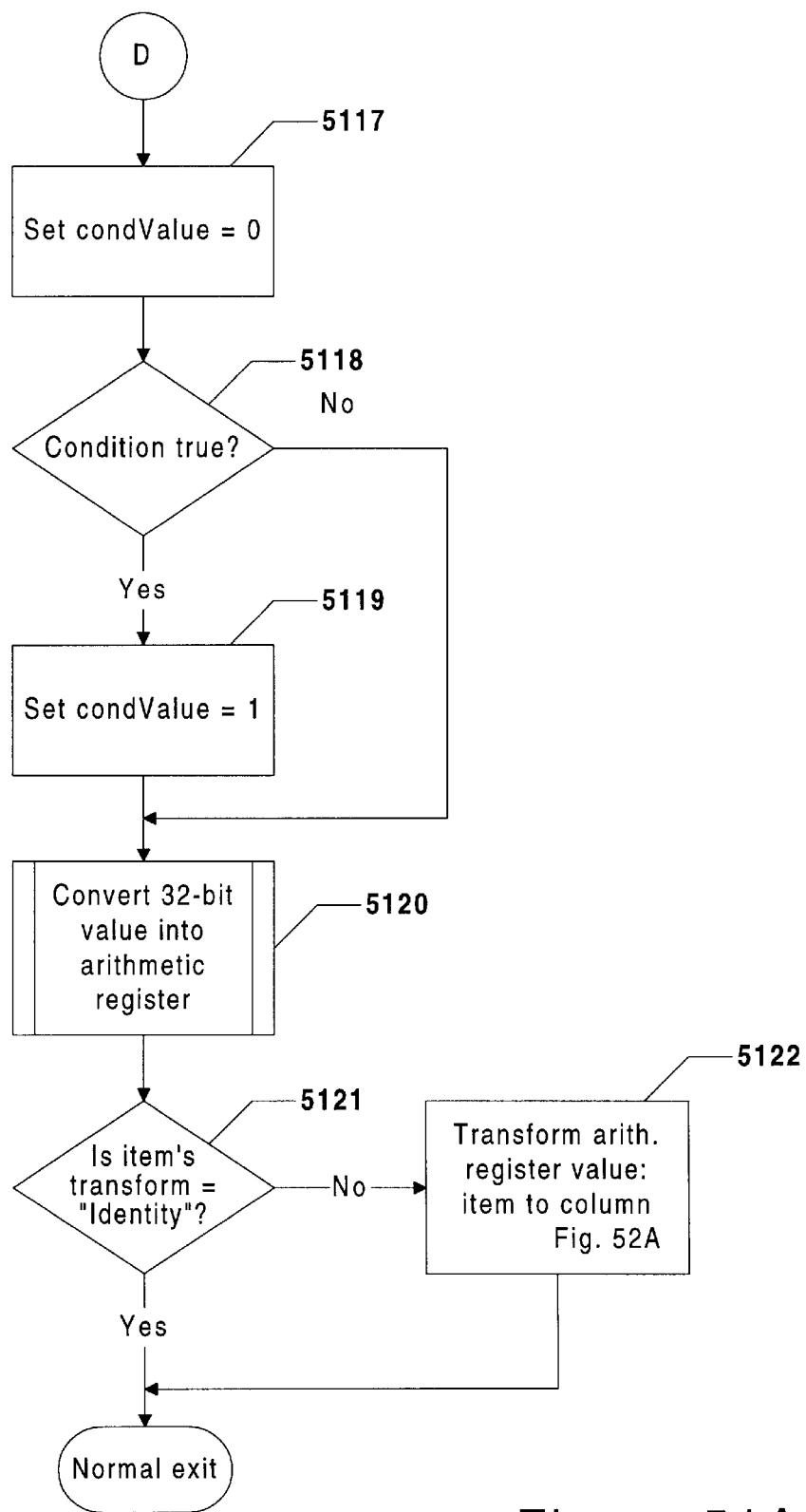
Figure 51A4

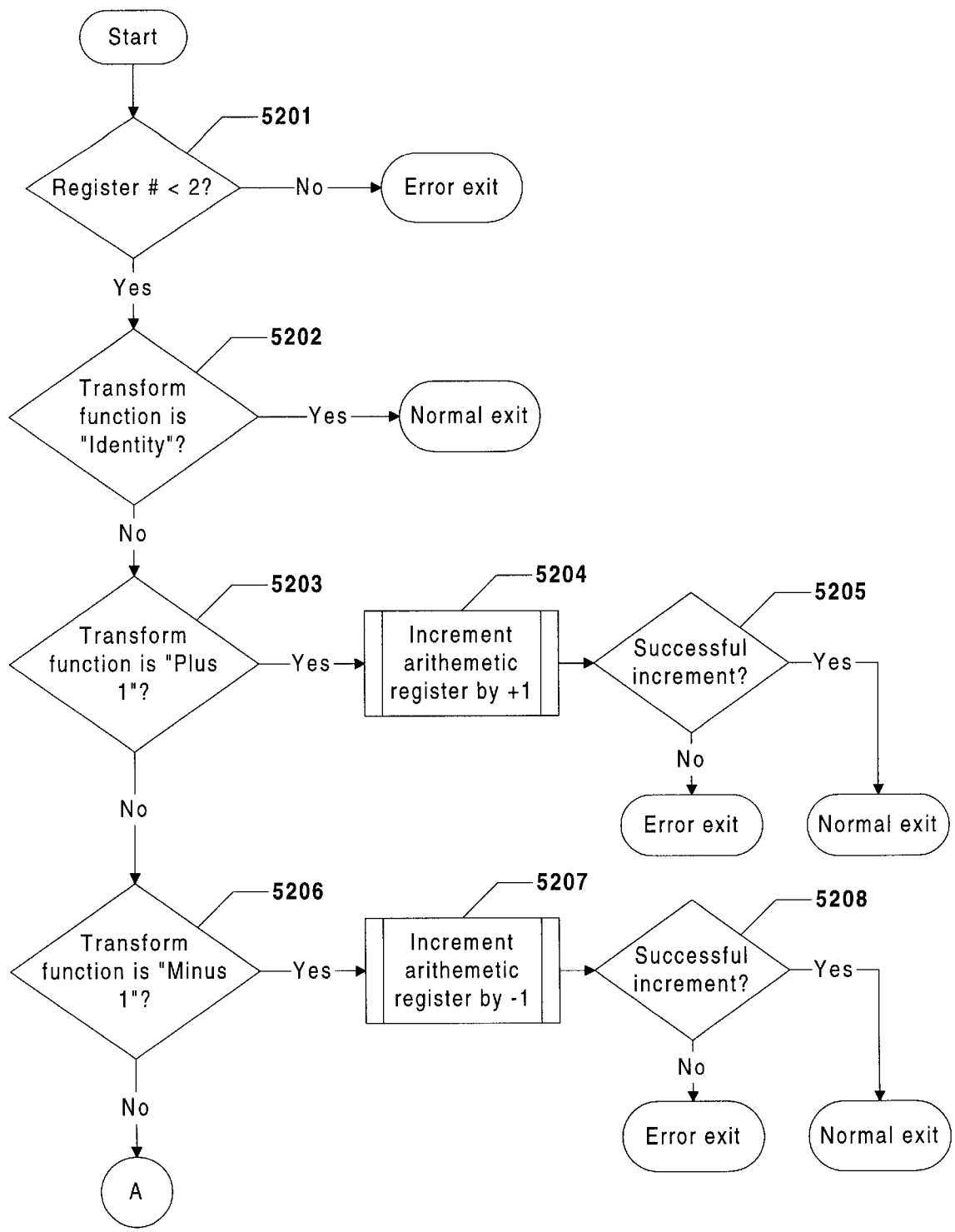
Figure 52A1

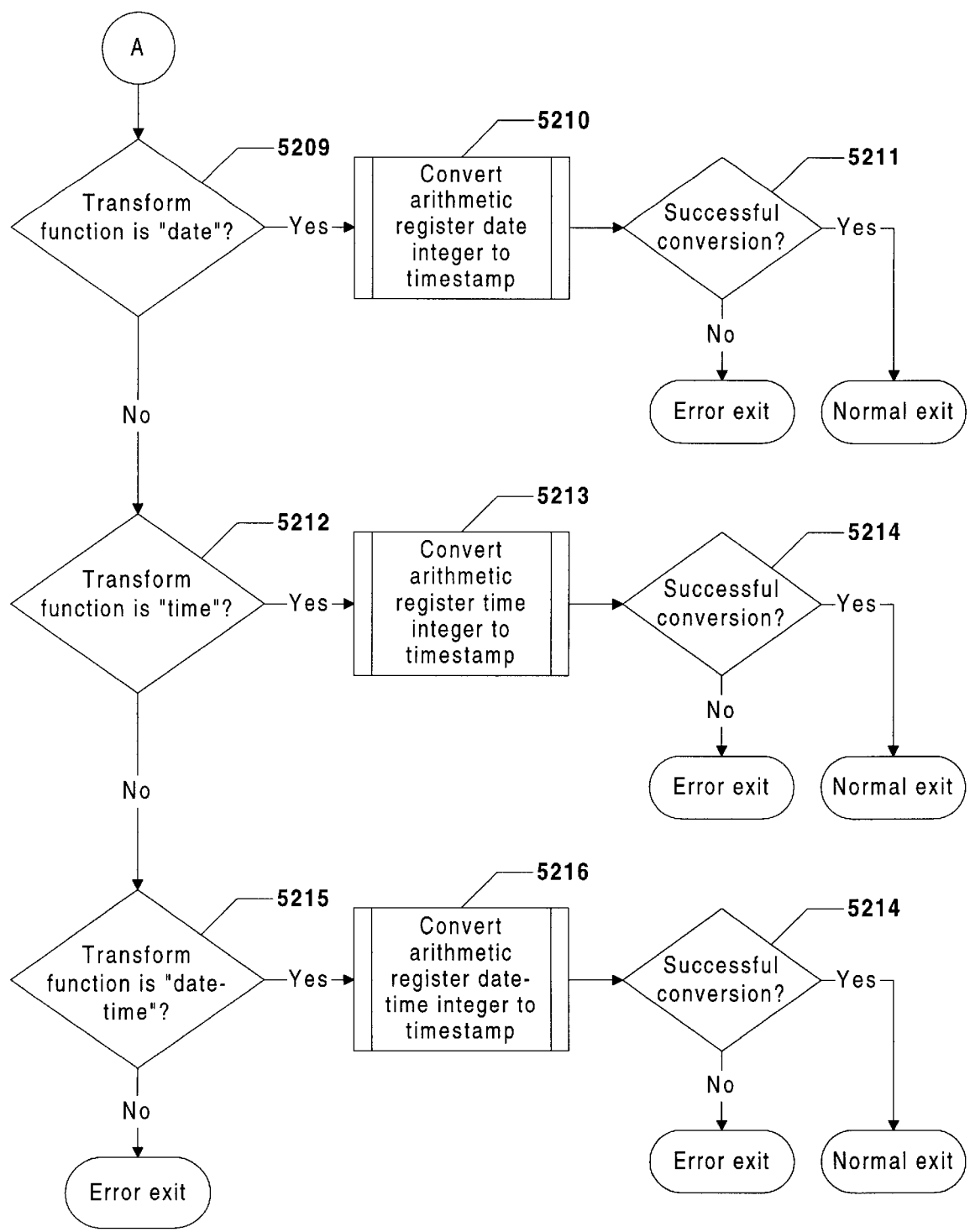
Figure 52A2

COMPUTER-BASED INFORMATION ACCESS METHOD AND APPARATUS TO PERMIT SQL-BASED MANIPULATION OF PROGRAMMING LANGUAGE-SPECIFIC DATA FILES

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to a method and apparatus for storing, accessing and manipulating information used in the automation of business data processing functions. Specifically, the invention addresses the problem of access via client computer-based application components using the SQL relational database query language to non-relational data files produced and maintained by server-based procedural applications written in a third-generation, general purpose programming language.

BACKGROUND OF THE INVENTION

General purpose computer programming languages, commonly known as third-generation languages or "3GLs", have been widely used since the 1960's to store and manage business information. Used primarily and extensively to facilitate the automation of business processes and functions, COBOL and PL/I in particular remain the most common computer programming languages for this purpose. A generally accepted estimate is that over 80 billion source lines of COBOL code alone is presently in production use throughout businesses worldwide.

The problem with COBOL and other 3GLs is that the data produced and used by applications is stored in a form that is quite difficult to access in ways that were not anticipated by the application program developer. This results in the fact that even simple, ad hoc access to the data must be accomplished by modifying or augmenting the application program in the original language (e.g., COBOL). Naturally, this can only be accomplished by skilled computer programmers. It is this problem that led computer scientists to seek alternative ways of managing data, even as early as the late 1960's.

These efforts focused on the notion that the data files maintained by applications actually represented a "database" of business information. If a model could be found that would serve to raise the level of abstraction of this model high enough, it would be practical to access data in the database with much less specific programming skills. Many possible directions were pursued, but the most practical were what were called the network model, the hierarchical model and the relational model. The network and hierarchical data models led to some products designed to implement those database architectures. It is the relational model, however, that is of much greater interest, for it survived the test of time.

Perhaps the greatest attraction of relational database technology was that it was based on a mathematically rigorous theory that a database could be represented by a collection of relations (commonly called "tables") defined in such a way that they could be combined and operated on in certain well-defined ways giving a result that was itself a relation. This property of closure permitted operations within this system to be of arbitrary complexity, yielding an extremely powerful means of manipulating data. Most importantly, at the time of database design there was much less need to anticipate the precise ways that data would be accessed and manipulated by the ultimate user of the information. Commercially viable database systems built on relational principles began to appear on the market in the early 1980's. One of the first commercial relational databases was one called "DB2" produced by IBM. It was based on an IBM research effort begun in the 1970's called "System R" that defined an English-like computer language, called SEQUEL, with which data extraction ("query") and manipulation ("update") operations on a relational database could be expressed. Within the DB2 product, this language was called SQL, which was an acronym that stood for Structured Query Language.

During the early days of DB2 and other Relational Database Management Systems (RDBMS) there were many problems achieving commercially practical results due to the complexity of efficiently processing the SQL operations. Eventually these problems were overcome for many classes of problems, and relational databases came into widespread use. During the early period, many variants of IBM's SQL were implemented by the companies providing RDBMSs. Recognizing the need to provide a standard variant of the language as being within its mission, the American National Standards Institute (ANSI) launched an effort in 1982 to produce a standard relational query language. This effort resulted in ANSI standard X3.135-1986, which was informally called SQL/86. Like most first attempts to standardize a computer language, SQL/86 was a "lowest common denominator" solution. It lacked many of the basic features present in most commercial RDBMSs, and there were many pre-existing systems available, so it was neither widely used as a model for commercial systems nor was it used as a target language by database application developers. Subsequently, to cure many of the deficiencies of SQL/86, ANSI developed a revised version which became known as SQL/89. Both versions of the SQL standard were adopted by the International Standards Organization (ISO) as well.

By 1990, the ANSI and ISO standards notwithstanding, dozens of variations of the SQL language were in common commercial use, and the economic advantage of achieving a broad level of real standardization became obvious. Yet the existing standards bodies (ANSI and ISO) were in the process of producing the third generation of the standard SQL, later to be called SQL/92. This effort reflected a vast expansion of the functions and language defined by previous versions of the standard, and it allowed great flexibility in implementation. Recognizing that very specific guidance was needed if the SQL standards were ever to serve as a point of convergence for the numerous commercial implementations, a group of database vendors formed the SQL Access Group, or SAG, to define target relational database functions, language and features that would enable interoperability of the databases and tools.

The first specification to come out of SAG was a language based on the SQL/89 language known as SAG SQL. Subsequent work by SAG has produced a "call-level interface", or CLI, for this language known as the SAG CLI. This call-level interface defines a standard way for general-purpose programming languages to access the database via the capabilities of dynamically generated SQL. The SAG CLI formed the basis for a specification by Microsoft Corporation, the owner of software products used most commonly for desktop operating environments, DOS and Windows. This specification was called Open DataBase Connectivity, or ODBC. Almost immediately, another group of vendors led by Borland International, defined a similar common interface for desktop connectivity of application tools to enterprise data. Both of the specifications used SQL as the basis for data access. Virtually every major front end client tool vendor pledged support to one or both of these specifications. As of early 1994, most key vendors had released products based on the ODBC specification. The industry's dream of a single connection point to business information appeared to have been realized.

Even today, however, in spite of the widespread acceptance of relational database technology, the majority of information used by existing business applications is stored by and accessed through the use of older procedural computer programs written in 3GLs such as COBOL and PL/I. This means that, without enabling technology, the majority of businesses cannot fully exploit the opportunity presented by universal desktop client connectivity via SQL-based standards, since most of the data was not under the control of a relational database.

SUMMARY OF THE INVENTION

The present invention solves the problem of providing SQL-based client application access to data files created, read and modified by 3GL application programs. It does so by providing a method and apparatus that allows the data files to be described as a set of relational tables, the resulting description to be stored in a system catalog, and the data files to be manipulated by SQL operations as relational tables in exactly the same manner as by 3GL source-based applications. The SQL-based data file manipulation capability provided by the present invention is capable of supporting any of a class of 3GL (such as COBOL) data files and record structures present in existing applications. In the case of COBOL, this includes support for all COBOL file organizations (i.e., sequential, relative and indexed), fixed and variable length records, COBOL file record numbers and keys, multiple COBOL record types in a single file, redefinition of portions of the data record (such redefinitions being possibly nested within other redefinitions), repeating items (both group and elementary) and all of the COBOL elementary data types (e.g., binary, packed decimal, display text, display numeric, edited text and edited numeric). The data are operated on in precisely the same way as the normal COBOL file and arithmetic subsystems would operate on them.

The present invention provides for means to recover 3GL non-relational data schema information from the source code of existing applications, and to store this schema information in a disk-based catalog structure outside of the original source code. Once the 3GL-specific data schema contained in the application source has been extracted and stored in the catalog, the relational database to be based upon the data represented by the 3GL schema is defined and stored in the system catalog such that tables in the relational database can be accessed by a runtime SQL database engine. Furthermore, the present invention permits both the 3GL data schema and the relational database schema to be modified and maintained within a single tool set. Subsequent to any modification of the 3GL schema represented in the catalog by the tool set, the present invention provides the means to "export" the modified schema information in the source form of the original 3GL programming language.

The present invention provides for means, at the time of client application execution, to process SQL requests in order to access the relational database representation of the 3GL application data. This is accomplished by parsing the SQL-form of the query request, generating a set of possible execution plans for manipulating the relational form of the data, selecting an optimal plan based on information provided from the system catalog, and executing the plan by servicing the requests for relational data from the underlying 3GL data files described in the system catalog. In the case of SQL operations that modify the data contained within the relational database, the present invention provides for means to alter the data within the 3GL data files.

In particular, the method of the present invention for processing SQL requests to access a relational database representation of 3GL application data, comprises, parsing the SQL requests, generating a plurality of execution plans for manipulating the relational database representation of the 3GL application data, selecting an execution plan as a function of information provided in a predetermined catalog which relates SQL requests to 3GL application data, and finally, executing the selected execution plan by servicing the SQL request to access the relational database representation of the 3GL application data, as a function of the information in the predetermined catalog.

The method may additionally comprise the creation of the predetermined catalog by selecting source programs from the 3GL application data for which file definitions are to be extracted, identifying specific files within the selected source programs to be processed, extracting appropriate schema from the selected files, and recording the appropriate schema in the catalog. The step of extracting the appropriate schema from the selected files may comprise extracting an identification of the selected file, extracting record descriptors for the selected file, and extracting repeating items from the selected file.

Yet further, the executing step of the invention may comprise, scanning all rows of the predetermined catalog to extract filter predicates, and sorting the rows of the catalog in accordance with the extracted filter predicates to form a query to access the relational database representation of the 3GL application data.

These and other features and advantages of the present invention will become apparent to those of ordinary skill in this art with reference to the following detailed description and appended figures.

REFERENCE TO MICROFICHE APPENDIX

Source code listings of portions of the computer programs that form components of the exemplary embodiment of the present invention are included in a microfiche appendix to this patent document. This appendix includes 3 microfiche with a total number of 191 frames.

BRIEF DESCRIPTION OF THE DRAWINGS

FIGS. 12–13 are flow charts of the computational steps performed by the SQL query engine component of the exemplary embodiment of the present invention described in FIG. 11.

FIGS. 14–56 are flow charts of the computational steps performed by the COBOL relation data manager component of the exemplary embodiment of the present invention described in FIG. 11.

DETAILED DESCRIPTION

In the exemplary embodiment of the present invention, data contained within files maintained by application programs written in the COBOL programming language are made accessible to client applications using the SQL-based application programming interface known as ODBC, or Open DataBase Connectivity, used within the Microsoft Windows operating system. This configuration of SQL and 3GL-specific data is typical of a large class of data access problems to which the present invention is applicable.

Figure 1:
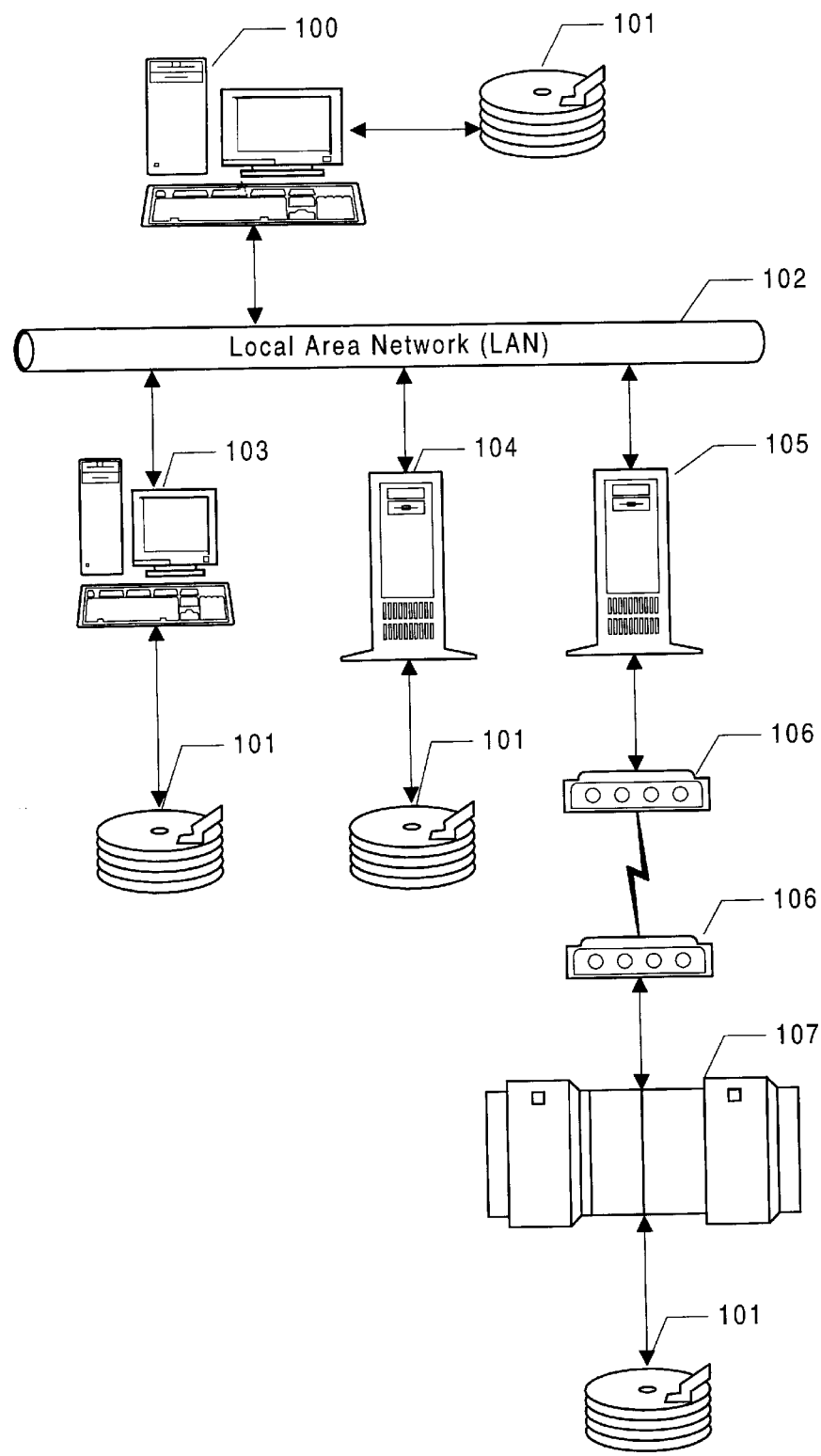
FIG. 1 is a computer-based local area network system embodying the present invention.

Referring to FIG. 1, a block diagram of a computer local area network (LAN) 102 is shown, along with client workstation 100 and 3GL data files 101. Also shown are various server computer systems such as Windows server 103, UNIX server 104 and proprietary mainframe server 107 connected to the LAN 102 via modems 106 and gateway computer system 105. The present invention facilitates the manipulation of the 3GL data files via SQL query and update operations by client application programs in the client workstation. The present invention is implemented by computer program logic in client workstation 100 or servers 103, 104, 105 or 107. This logic, as an embodiment of the present invention, is shown in the block diagram in FIG. 2.

Figure 2:
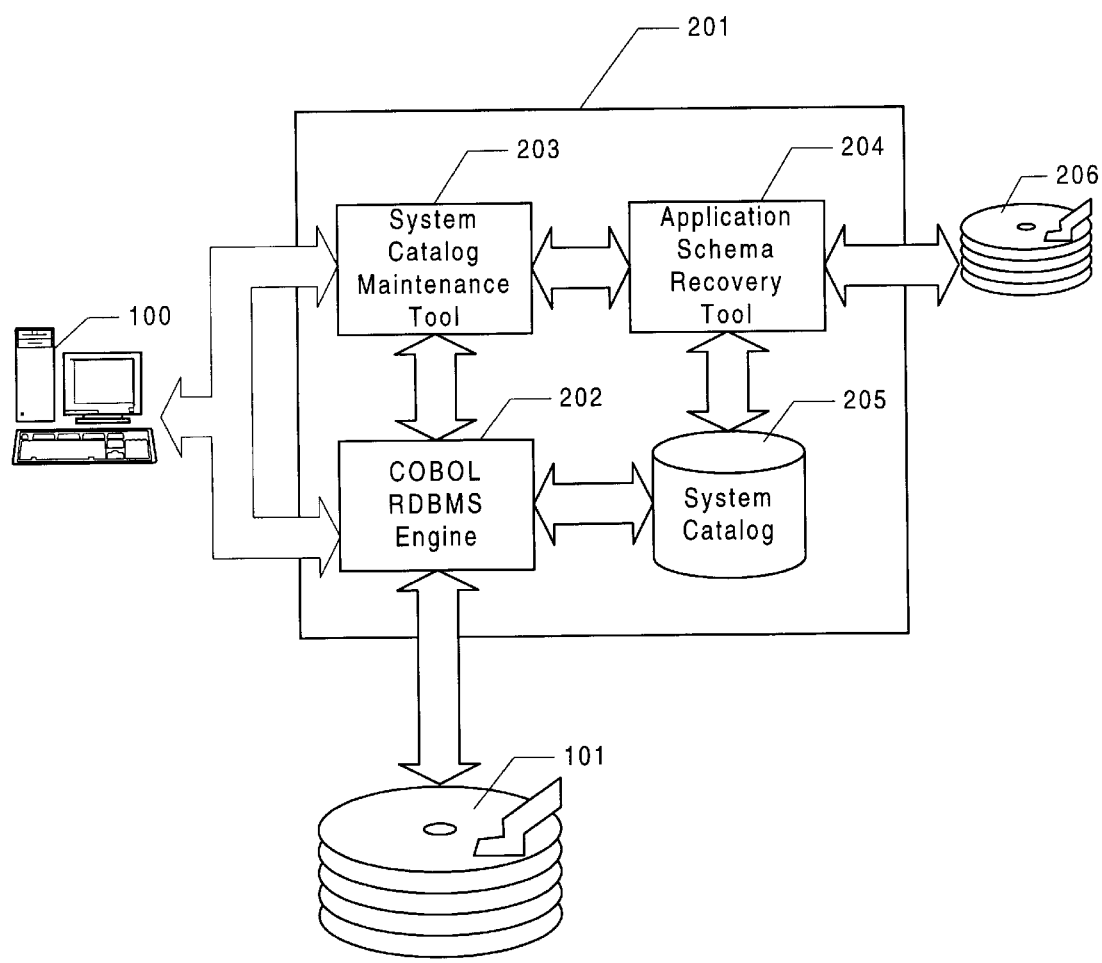
FIG. 2 is a block diagram of the primary components of the present invention.

Referring to FIG. 2, a block diagram illustrating the key components and data flow between the components of the present invention, block 201, and surrounding data processing elements, blocks 100, 101 and 206, is shown. Prior to the runtime SQL manipulation of the COBOL data, the database schema information necessary to enable this process must be recorded in a the system catalog, shown in block 205. The definition and maintenance of this schema information is controlled by an interactive application program, or system catalog maintenance tool, represented by block 203 of FIG. 2. The original COBOL application program source is shown in block 206. Within this source code, the data file definition information is extracted under the control of the system catalog maintenance tool by the schema recovery tool illustrated in block 204. Within the program processes performed in block 204, the source programs from which to extract file definitions are selected, the specific files to be processed are identified and the appropriate schema information recorded in the system catalog, block 205. The relational database schema for the COBOL database management system is then described by the COBOL application developer with the facilities of the system catalog maintenance tool. After the system catalog information for the COBOL database is complete, SQL requests to manipulate the original data shown in block 101 may be processed and the appropriate operations and transformations performed on the data files. This processing of SQL and the resulting operations on the data files are performed within the program logic represented by block 202, the COBOL RDBMS engine, shown in detail in FIG. 11

Figure 3:
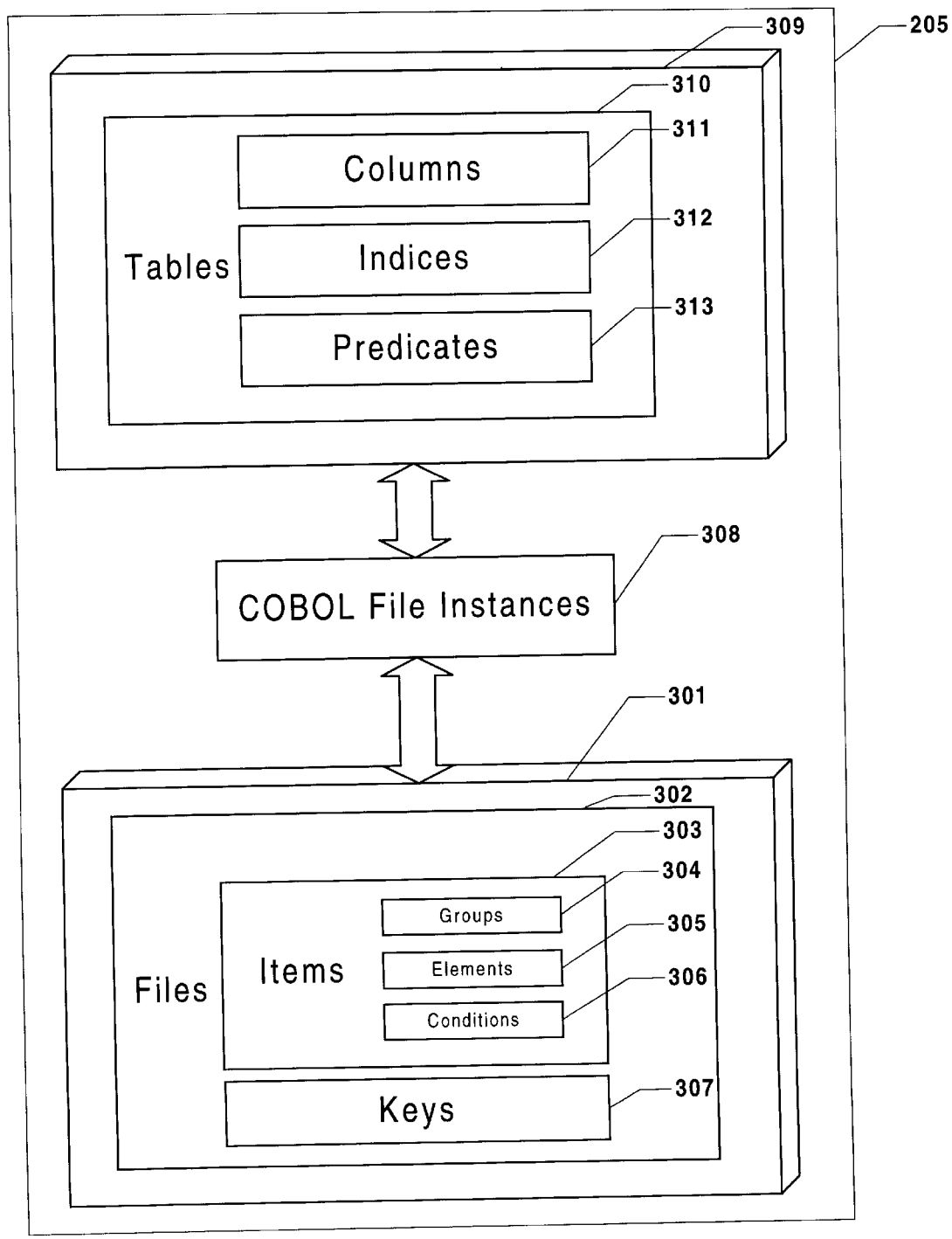
FIG. 3 is block diagram of the system catalog component of the exemplary embodiment of the present invention described in FIG. 2.

Turning now to the expanded block diagram of the system catalog component of the exemplary embodiment of the present invention (block 205 FIG. 2), FIG. 3 shows the general structure and type of information recorded. The system catalog contains all of the COBOL file schema information contained in the application source program, shown in block 301. This includes information found in the COBOL environment division SELECT statement, such as primary and alternate key definitions (block 307) and file name and organization (block 302). Also included in this part of the system catalog is all of the file information found in the COBOL data division file section. The logical file and record definitions (block 302) and the nested definitions of data items within records (block 303) are contained in this part of the system catalog. This includes group (block 304) and elementary level (block 305) data items and any condition items (block 306) defined on the data items. Also contained in the system catalog is information necessary to define the relational database schema representation of the COBOL file set (block 301) defined in block 309. As such, this relational schema includes information to define the tables within the database (block 310). The definition of each table requires information to be included in the system catalog to define the columns comprising each table (block 311), the indices defined on each table (block 312) and information that is important to the proper operation of the present invention, "predicates" (block 313). Each column of each table in the database definition is "bound" to a source of its value defined within the COBOL file definition portion of the system catalog. For most columns, the binding is to a particular data item, but for some it is to an "ordinal" value that represents an occurrence number of a repeating COBOL item. As COBOL data records are read by the COBOL relation manager described later, each record is tested against a set of table "predicates" that make up a filter for the table. This facility permits the COBOL redefinition of data areas to be supported by the present invention. Information regarding these predicates is contained in the system catalog shown.

Figure 4:
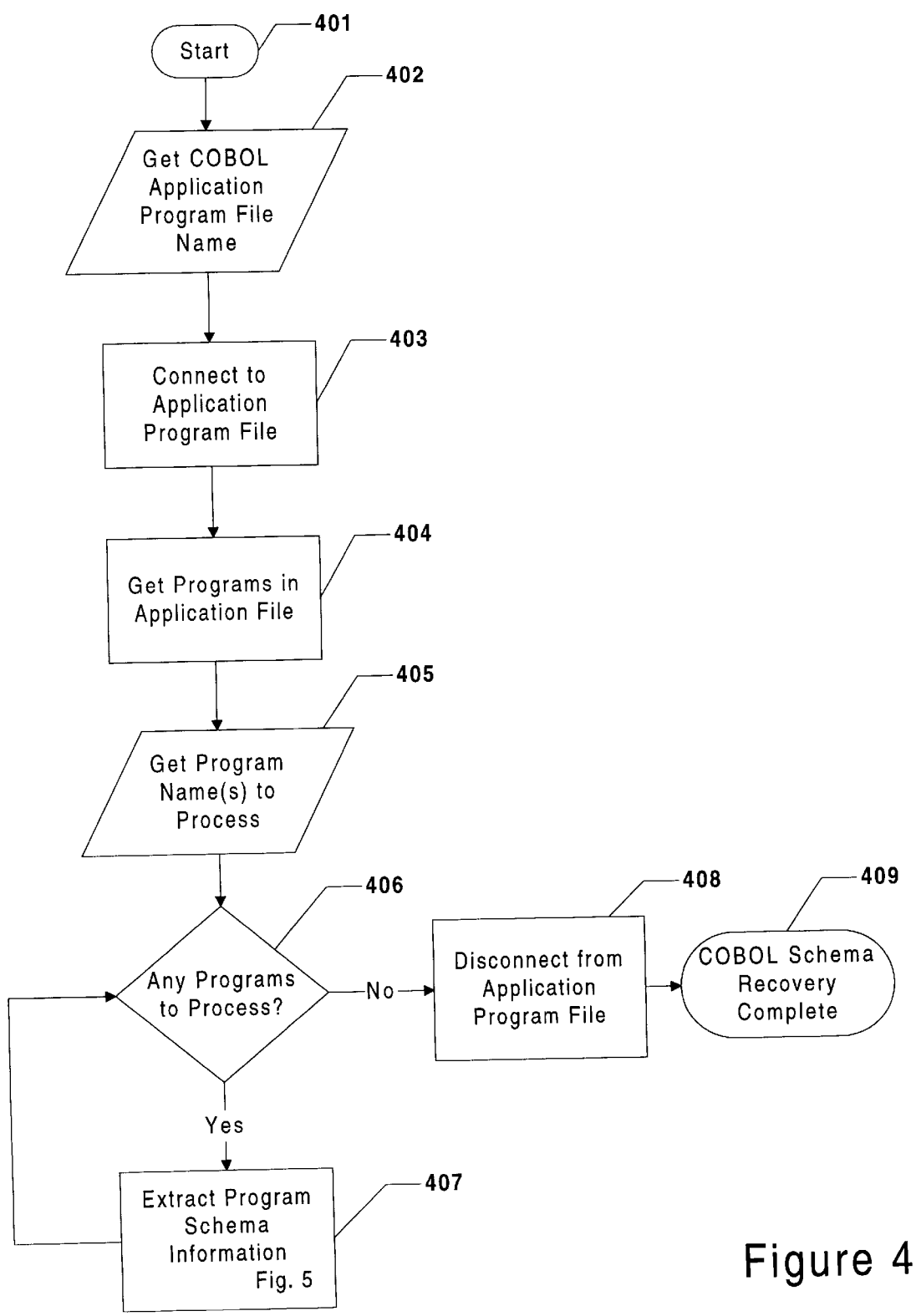
FIGS. 4–6 are flow charts of the computational steps performed by the COBOL schema recovery component of the exemplary embodiment of the present invention described in FIG. 2.
Figure 5:
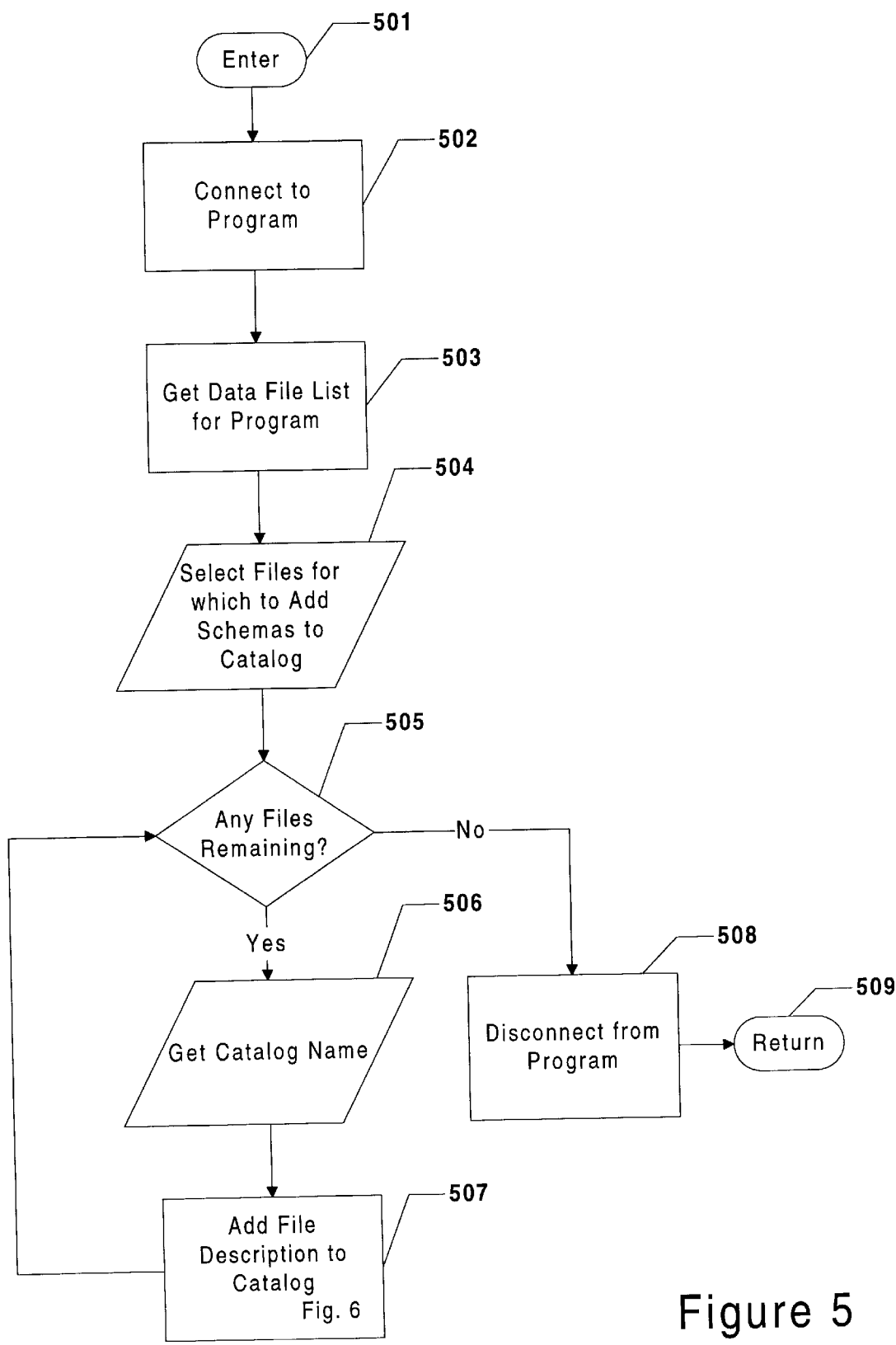
Figure 6:
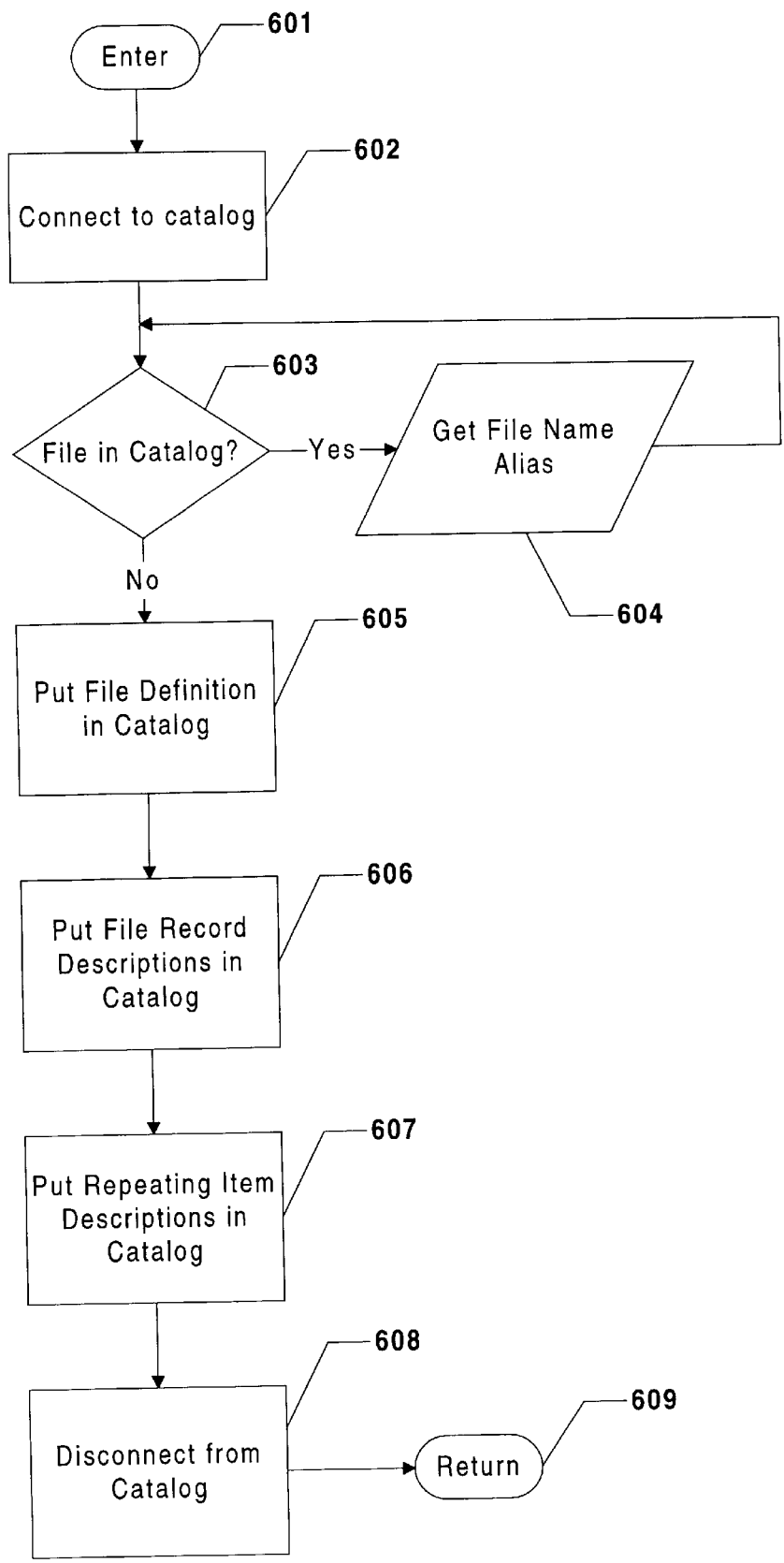

Turning now to the flow charts of the COBOL schema recovery component of the exemplary embodiment of the present invention (block 204 FIG. 2), FIGS. 4–6 show the detailed flow of control. FIG. 4 covers the process of selecting a particular application program from a specified object file for processing. This process begins at the "Start" label block 401 in FIG. 4, under the control of the catalog maintenance tool (block 203 FIG. 2), when the user requests to import a COBOL schema and completes at block 409 when there are no further programs to process. In block 402, the user is requested to supply the name of a COBOL application program object file. This object file must have been produced by the RM/COBOL-85 compiler using the compile command option "Y"; this compile command option places a copy of the symbol table derived from the COBOL source program in the object file. In a desirable refinement of the exemplary embodiment of the invention described herein, it would be possible to specify a COBOL application source file and the compiler program would be automatically started to obtain the symbol table from the source file.

After obtaining an application object file name from the user, a connection is made to the specified object file, as indicated in block 403. The specified file is opened and memory is allocated for bookkeeping structures. If any errors occur, an error code is returned to the catalog maintenance tool (block 203 FIG. 2) and the process is terminated. The object file is scanned in block 404 to find the names of all separately compiled programs in the object file; a single object file may contain multiple separately compiled COBOL application programs, since COBOL source files may contain a sequence of source programs. The names of the programs are placed in the bookkeeping data structures. A pointer to the bookkeeping data structures is returned to the catalog maintenance tool as a handle to the connected object file.

In block 405 the catalog maintenance tool (block 203 FIG. 2) presents the list of programs available in the connected object file to the user. The user selects zero or more program names to be processed. The selected list is then used in the loop that begins with block 406. If there are one or more programs to process, then as indicated in block 407, the next program to process is selected and processing occurs as shown in FIG. 5. Upon return, the processed program is removed from the list and the process loops back to block 406. When the list of programs is empty, the catalog maintenance tool disconnects from the COBOL application program file in block 408, thereby allowing for closing the COBOL object file and the release of data structures allocated for processing programs contained in that object file, thus ending the connection established in block 403. Then the COBOL schema recovery process completes at block 409 by returning control to the catalog maintenance tool. At this point the catalog maintenance allows the user to begin another import, to define relational tables on the COBOL schema as shown in block 303 of FIG. 3, to do assorted other tasks related to the catalog or data described by the catalog, or to terminate the process.

FIG. 5 is the second of three flow charts showing how the COBOL schema is recovered for use in the catalog shown in FIG. 3 block 301. When a particular program has been selected from among the programs available in the connected object file (see FIG. 4), schema recovery processing reaches block 501. The catalog maintenance tool (block 203 FIG. 2) passes the name of the user selected program and the process connects to the specified program. In block 502, the name is compared against the names available in the connected object file until the specified program is found. The catalog maintenance tool has made an error if the name is not found, in which case an error is returned. Otherwise processing continues using the symbol table in the object file for the specified program name. The edit characters (decimal-point, comma, and currency symbol) for the specified program are recorded in the bookkeeping structures for later use, along with the index of the selected program. Until the program is disconnected, all program references implicitly refer to the connected program. In block 503, the catalog maintenance tool requests the list of file descriptions contained in the connected program. The schema recovery program gets the list of COBOL file-names for all the files declared in the connected program and returns this list of names to the catalog maintenance tool. In block 504, the catalog maintenance tool presents the list of COBOL file-names to the user and allows selection of zero or more files to be added to the catalog. The list of selected files is passed to the loop beginning at block 505. For each selected COBOL file-name, control reaches block 506 where the catalog maintenance tool requests the user to specify a catalog file name in which to add the COBOL schema. The file description is then added to the specified catalog as indicated in block 507, the COBOL file-name is removed from the selected list, and control loops back to block 505. When the list is empty, the catalog maintenance tool disconnects from the connected COBOL application program at block 508, terminating the connection established in block 502 and thus providing an opportunity to release any data structures allocated for processing files in that program. Then control is returned to the outer level at block 509 (see FIG. 4, block 407).

FIG. 6 is the third of three flow charts showing how the COBOL schema is recovered for use in the catalog shown in FIG. 3 block 301. When a particular program within an object file has been selected (see FIG. 4) and a particular file within that program has been selected for addition to a particular catalog (see FIG. 5), control reaches block 601. The specified catalog file name is used to connect to the catalog as shown in block 602. The catalog file is opened and validated to be a catalog. If the catalog file does not exist, this is indicated to the catalog maintenance tool (block 203 FIG. 2), which gives the user an opportunity to specify a different catalog file name or to request creation of the catalog file. If the user requests creation of a catalog file, then a new catalog file is created, initialized, and connected as the currently connected catalog. Once a catalog is successfully connected, the specified COBOL file-name is compared against the names of files described in the connected catalog as indicated in block 603. If the COBOL file-name is already in the catalog, this is indicated to the catalog maintenance tool, which provides the user an opportunity to skip the file or specify an alias name for the file to be used in the catalog as shown in block 604. This guarantees that files described in the catalog have unique names for later use. For a selected COBOL file-name (or alias) that is not in the catalog, control reaches block 605. The file definition from the connected program for the specified COBOL file-name is added to the catalog, including descriptions of keys and key parts. If the file definition in the connected object program contains a literal file access name, then a file instance record is also added to the catalog; this file instance record specifies the literal file access name as the path string for a file instance. If the file description requires alphabet definitions, for code-set specification or key collating sequence specification, then these alphabet definitions are also added to the catalog. In block 606, the record descriptions associated with the file are added to the catalog; this includes item definition records for each group, elementary, and condition item associated with the file. In block 607, repeating item descriptions are added to the catalog; this includes descriptions of each item associated with the file that is described with an OCCURS clause, including any ordering key items declared in those OCCURS clauses. This completes adding the file to the catalog. In block 608, the catalog maintenance tool disconnects from the catalog so that the user has the option of changing the catalog for the next file to be added to the catalog. Then control passes to block 609 where the process returns to the outer level (see FIG. 5, block 507).

Turning now to the flow charts of the system catalog maintenance tool component of the exemplary embodiment of the present invention (block 203 FIG. 2), FIGS. 7–10 show the key flow of control in detail.

Figure 7:
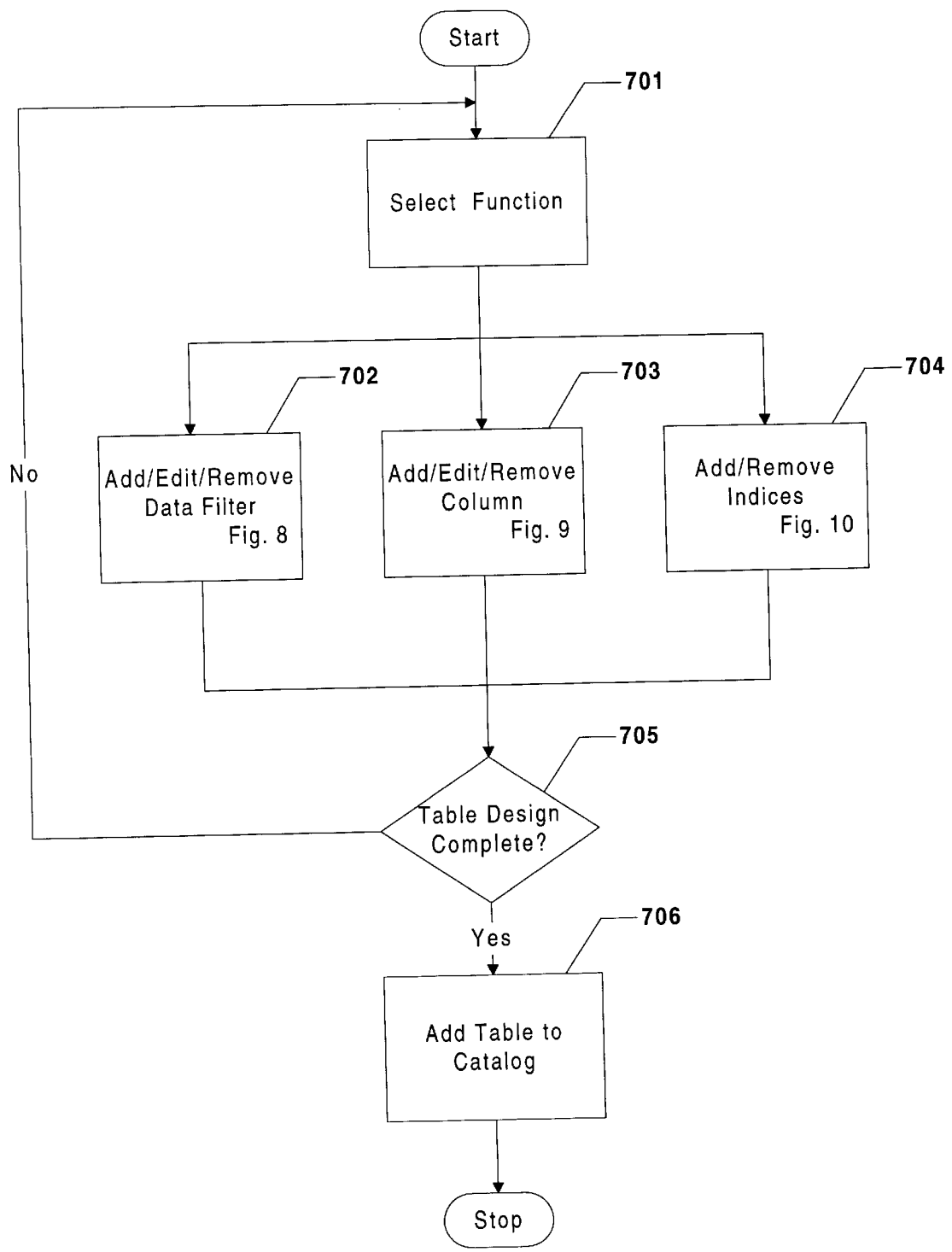
FIGS. 7–10 are flow charts of the computational steps performed by the system catalog maintenance tool component of the exemplary embodiment of the present invention described in FIG. 2.

FIG. 7 details the steps involved in the process of the COBOL developer's defining the tables that comprise a COBOL database to be accessed by the COBOL RDBMS engine component (block 202, FIG. 2) of the present invention. While many methods of interacting with the COBOL developer to accomplish this task are possible, the exemplary embodiment of the present invention uses a graphical user interface driven approach. Since the flow of control of such an interface is determined by the order in which the user decides to perform the steps of the process, FIGS. 7–10 reflect this non-deterministic control flow. In block 701 of FIG. 7, the user selects the next (or first) function he wishes to perform regarding the presently selected table within the presently selected database. The primary choices at this point are to transfer control to block 702 in order to add, edit or remove filter predicates defined for the table (detailed in FIG. 8); transfer control to block 703 in order to add a column defined for the table (detailed in FIG. 9), or to transfer control to block 704 in order to add or remove an index for the table (detailed in FIG. 10). When control returns from the selected function, the decision is made in block 705 as to whether or not the design for the selected table is complete at this time. If not, control returns to block 701. If so, control passes to block 706. Within block 706, the steps are performed to update the disk-based copy of the system catalog (block 205, FIG. 2) if necessary. The procedure then exits normally.

Figure 8:
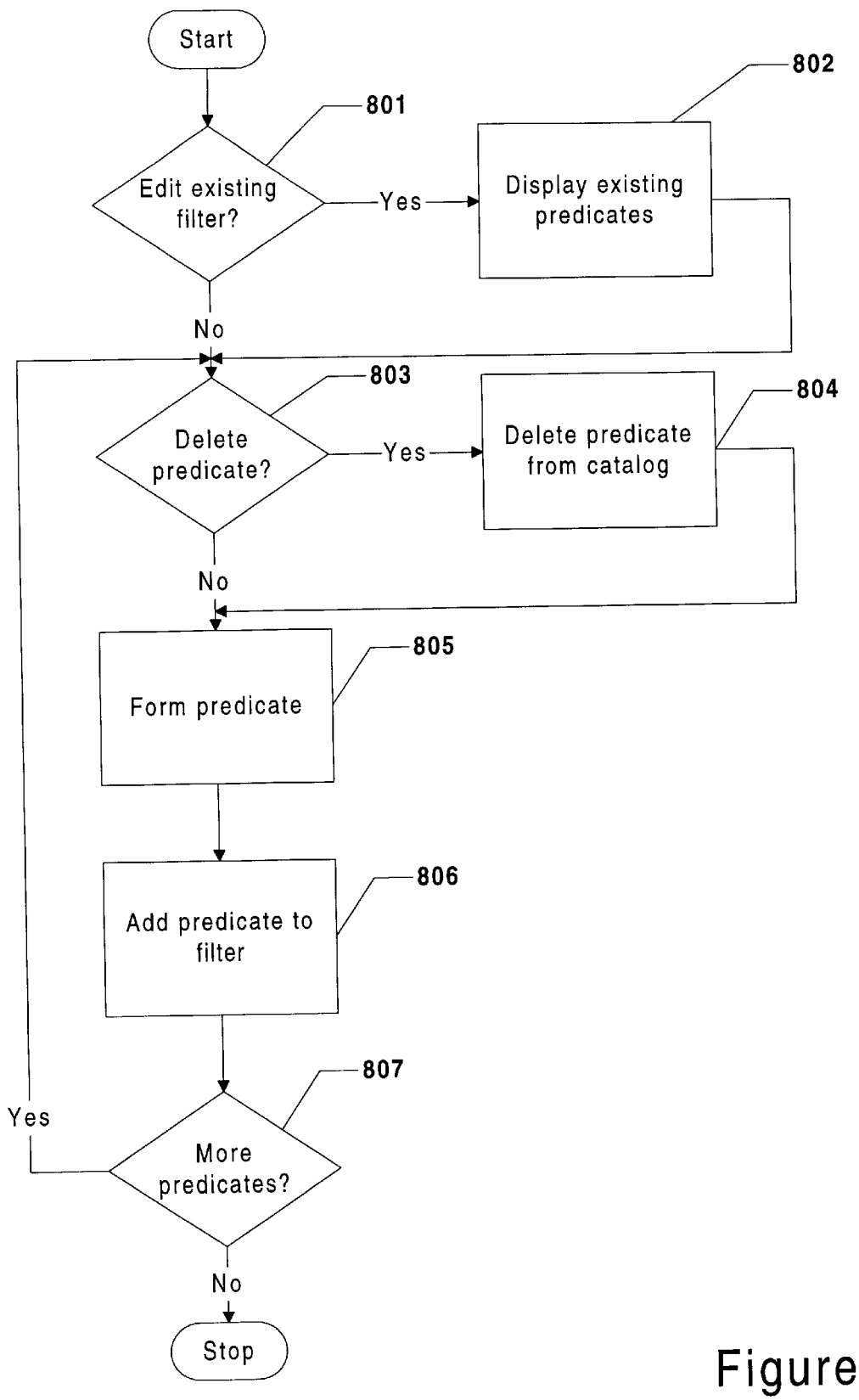

FIG. 8 details the process of modifying the filter condition definition applying to a selected table definition. It begins with the decision block 801 which determines if any predicates exist for the selected table definition. If they do, the existing predicates are formatted and displayed to the user in block 802. In either case, control advances to decision block 803, which determines whether or not the user wishes to delete an existing predicate. If so, control advances to block 804 which deletes all of the information regarding the selected predicate from the disk-based copy of the system catalog. After this, or if the decision was made in block 803 not to delete any predicates, control advances to block 805. In block 805, the user forms the definition of a new predicate condition to add to the filter definition for the selected table. Control then passes to decision block 807, which determines if the user wishes to add or delete any additional predicates for the table. If so, control passes back to block 803. If not, the procedure exits normally.

Figure 9:
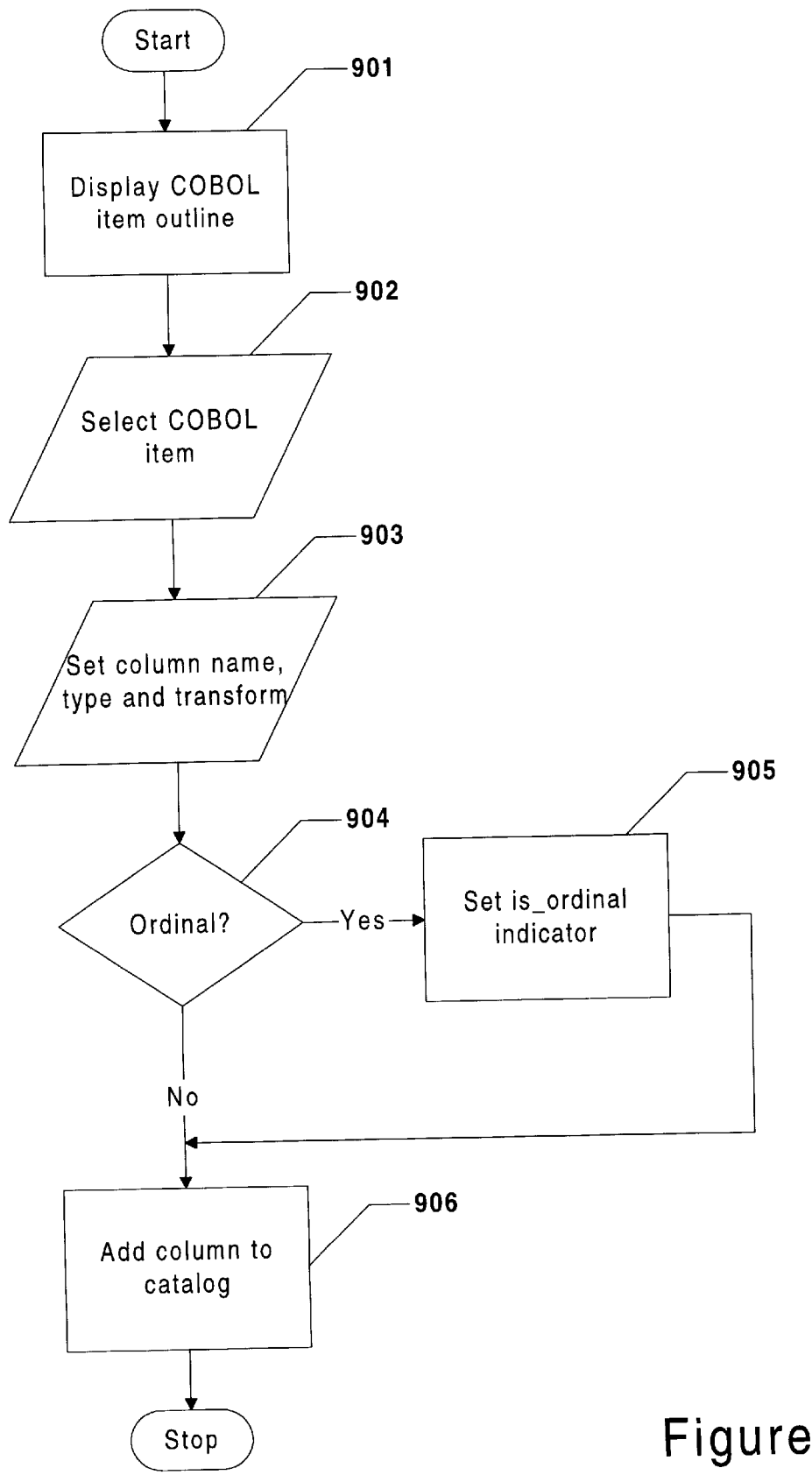

FIG. 9 details the process of adding a column to the selected table definition and binding that column definition to a COBOL file data item for the file from which columns in the selected table derive values. The procedure begins with block 901, which displays the file definition information in the system catalog for the file associated with the selected table. The exemplary embodiment of the present invention uses an outline-style representation of the file description hierarchy. After presenting the file data item choices to the user, control advances to block 902. In block 902, the user selects a single item from within the file. This action allows additional choices as to column name, type and transform function to be presented to the user. Control advances to block 903, where these parameters are chosen by the user. Control then advances to the decision block 904 where it is determined whether or not the selected item is repeating, and, if so, whether or not the column value is to be derived from the data item itself, or an ordinal value representing the occurrence number of the repeating item. If it is to be the ordinal value, control passes to block 905 where this is indicated in the system catalog. In either case, control then advances to block 906 where the column data are added to the system catalog. The procedure then exits normally.

Figure 10:
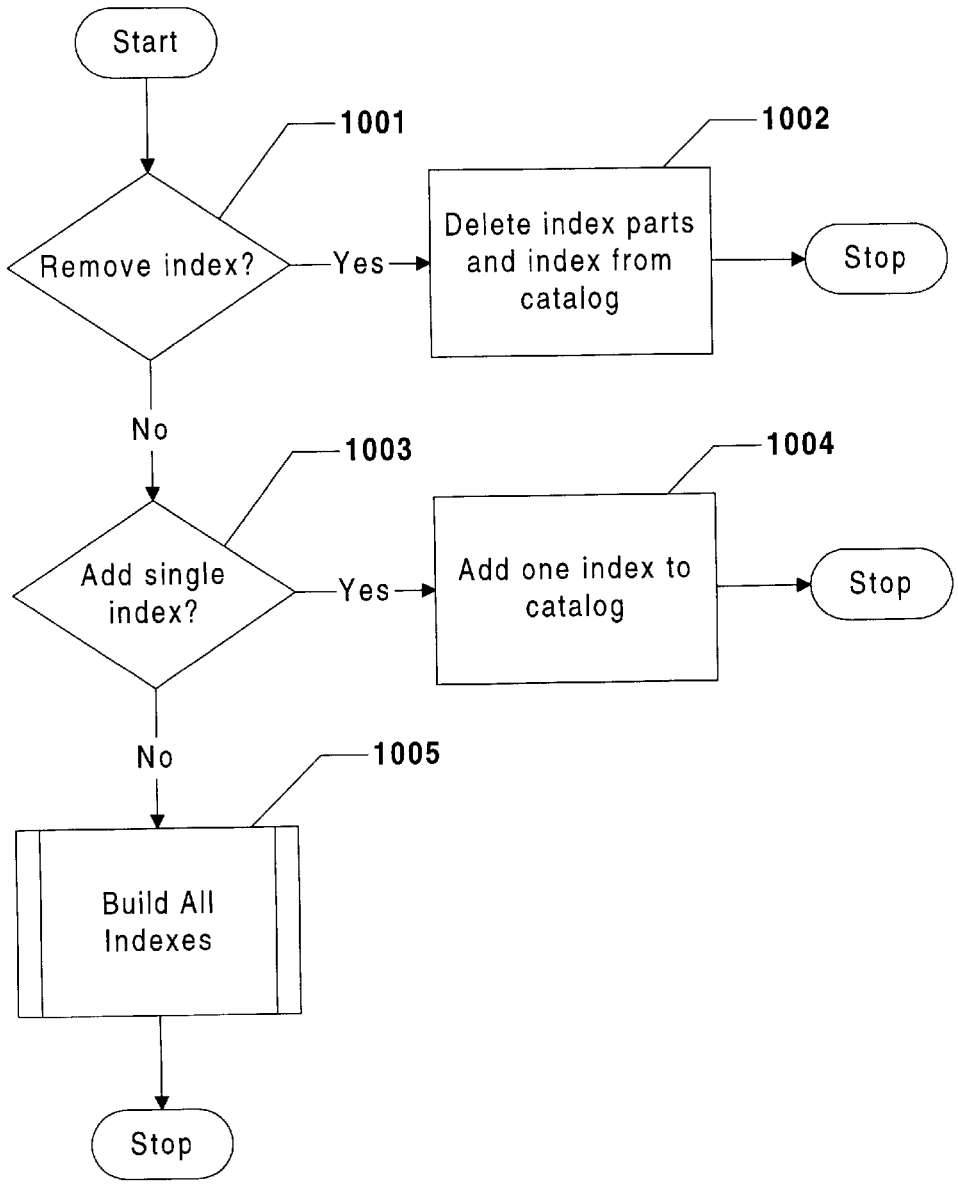

FIG. 10 details the process of adding or removing indices from the selected table definition. Flow begins with the decision block 1001, where it is determined if the user wishes to remove an existing index definition. If so, control passes to block 1002 where all of the index structures for a selected index are deleted from the system catalog. In this case the procedure exits normally. Otherwise, control advances to decision block 1003 where it is determined if the user wishes to add a single index to the table definition. If this is the case, the information is added to the system catalog to indicate the designated index defined on the selected table in block 1004. The procedure then exits normally. If the user requested that all possible indices be defined on the selected table, a list of candidate column sets is built and then checked for validity in block 1005. If valid, the index is defined on the selected table. The procedure then exits normally.

Figure 11:
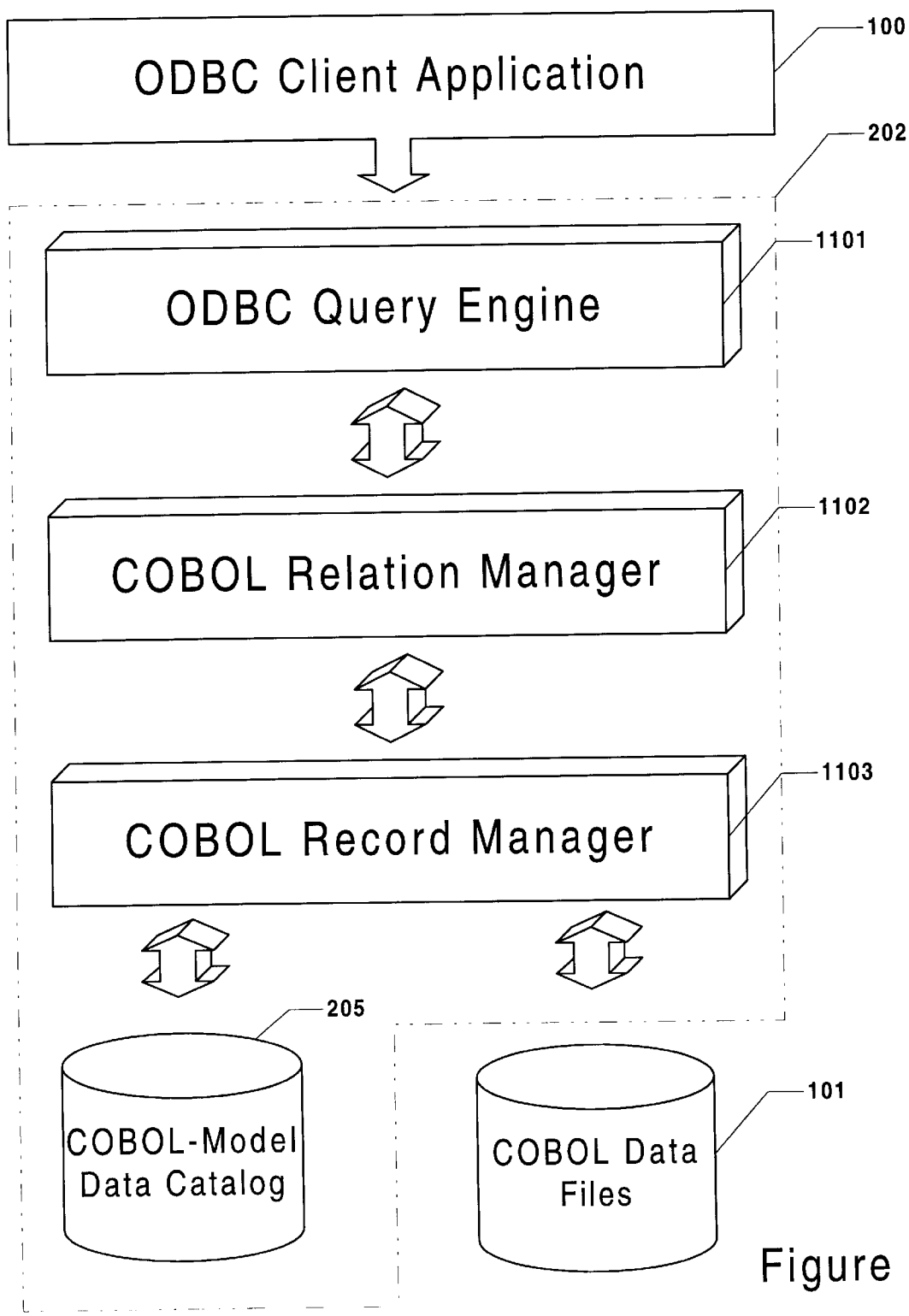
FIG. 11 is a flow chart of the overall data flow of the COBOL RDBMS component of the exemplary embodiment of the present invention described in FIG. 2.

Turning now to the detailed charts of the COBOL RDBMS engine component of the exemplary embodiment of the present invention (block 202 FIG. 2), FIG. 11 shows the high level structure and subassemblies and FIGS. 12–13 illustrate the overall flow of control within this component of the exemplary embodiment of the present invention. As shown in FIG. 11, the client application (block 100, FIGS. 1 and 11) interacts with the COBOL RDBMS engine (block 202, FIGS. 2 and 11) primarily via SQL requests. The initial processing is performed by an ODBC SQL query engine (block 1101) which analyzes the request and determines an optimized, procedural plan of access to perform the query or update operation. This plan is then performed by the engine by requesting that operations on the tables within the COBOL relational database be performed by the COBOL relation manager, block 1102. The relation manager, in turn and with the information held in the memory resident image of the system catalog (block 205, FIGS. 2 and 11) utilizes the COBOL record manager, block 1103, in order to read, write, update and delete physical disk storage records in the COBOL data files (block 101, FIGS. 1 and 11) affected by the plan.

In the case of the exemplary embodiment, the query engine chosen was one produced by PageAhead Software Corporation. Other suitable query engines may be obtained from a variety of other sources. Likewise, the COBOL record manager chosen was the RM/COBOL file manager used by Ryan McFarland Corporation to access COBOL data files as part of its RM/COBOL-85 runtime environment. In other embodiments of the present invention, the record manager for the native COBOL or PL/I compiler/runtime system used to manipulate the data files would be used. The present invention places no unusual burdens on the functionality of either component.

Turning now to the overall flow charts of the COBOL RDBMS engine shown in FIGS. 12–13, FIG. 12A illustrates the initial processing of the SQL request by the ODBC SQL query engine (block 1101, FIG. 11). The ODBC SQL request is accepted as shown in block 1201. Control then advances to block 1202 where the SQL statement is parsed and stored in tree form. Control then advances to block 1203 where the parse tree is converted into a canonical form. Control then passes to block 1204 which chooses the low level functions that will form the building blocks of the execution plan. In block 1205, the query engine generates one or more functionally correct execution plans. Control then advances to block 1206, where the plans are evaluated as to "cost" to perform, and the best (lowest cost) one chosen to control the query execution. Control then passes to block 1207 where the plan is interpreted and the query performed. FIG. 13 describes the plan execution in greater detail. The procedure then exits normally.

Figure 12B:
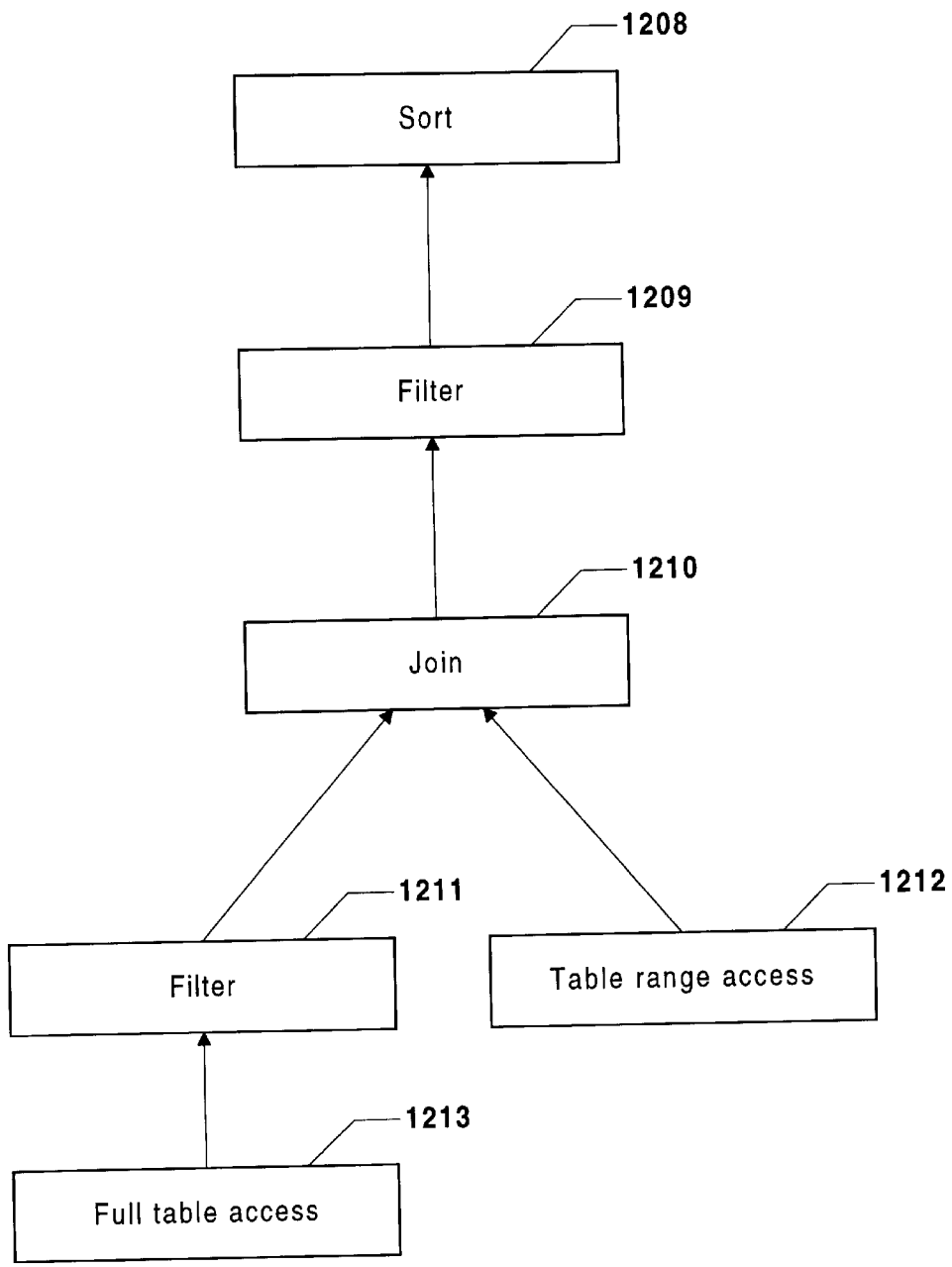

FIG. 12B illustrates the data flow operation of a typical query execution plan. Block 1213 represents the scanning of all the rows of a table, the results of which are passed to a filtering operation in block 1211. Block 1211 screens each row produced by block 1213 with the relevant WHERE clause predicates, and passes the ones selected to block 1210. In parallel with the operations in blocks 1211 and

1213, block 1212 represents a scan of another table that is restricted to rows addressed by a range of index values. The rows selected by this function are also passed to block 1210, which performs a "join" operation on the two sets of rows input. For each pair of rows satisfying the joining condition, a single row is passed to block 1209. In block 1209, another set of predicates are applied, and only the rows passing that filter are passed to block 1208. Block 1208 sorts the rows passed from block 1209 based on a set of sort criteria, and the sorted set forms the result of the query operation. The plan execution has completed at that time.

Figure 14:
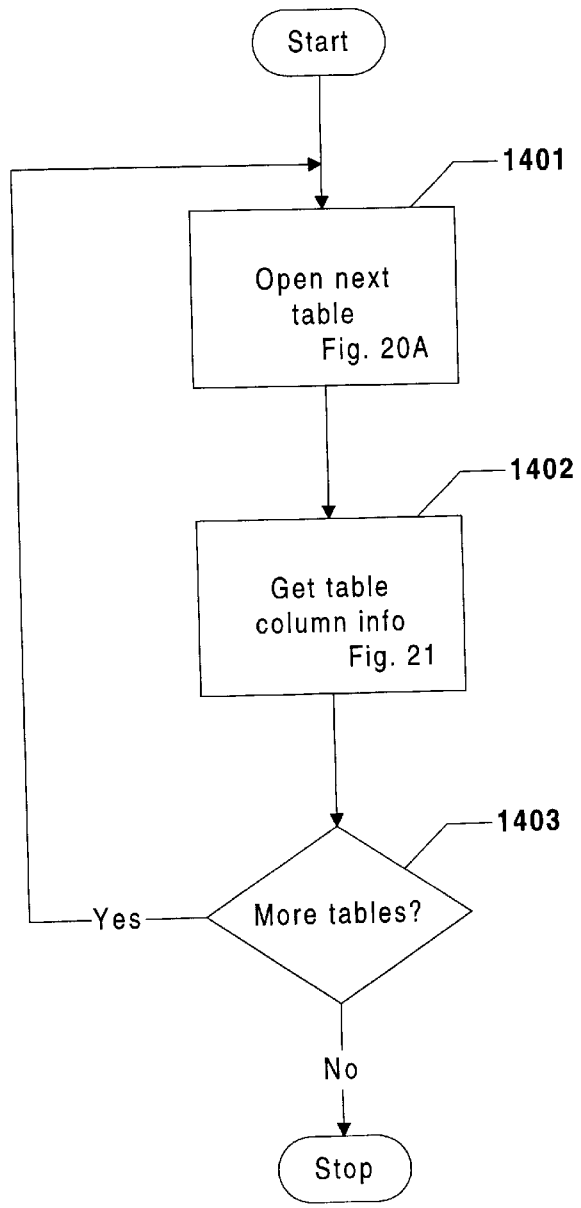
Figure 16:
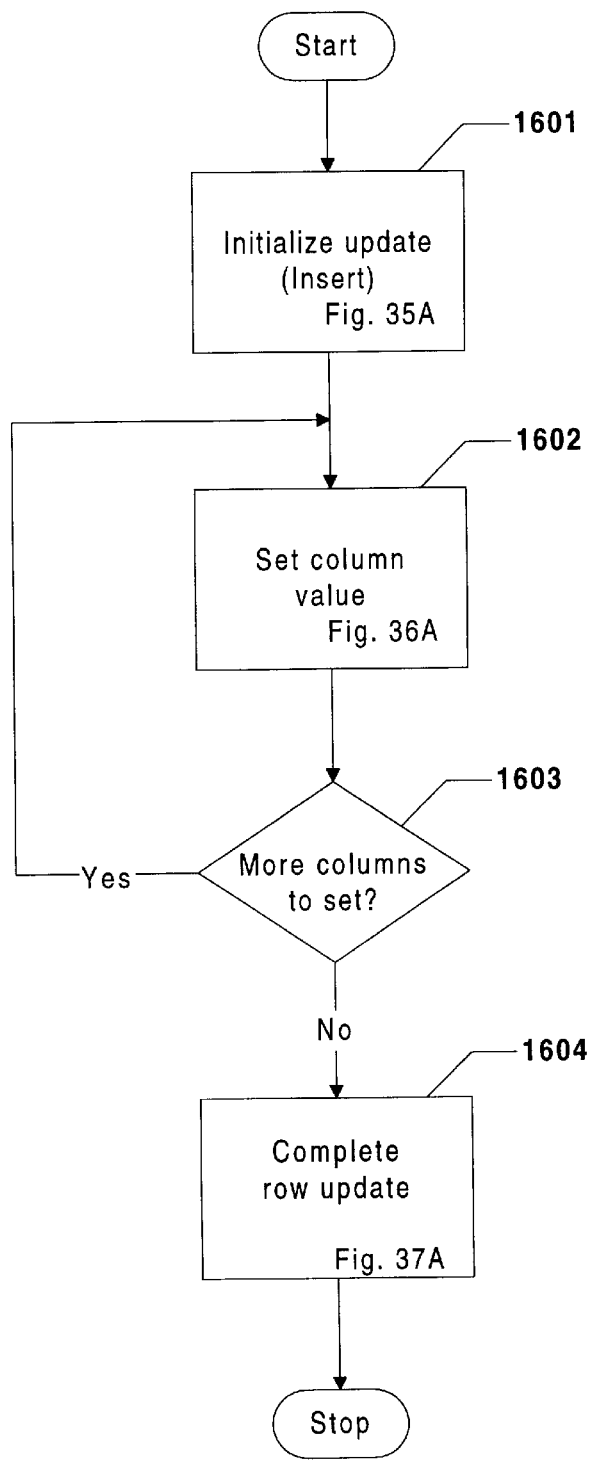

FIG. 13 details the interpretation of the execution plan under the overall control of the query engine. In block 1301, the state of the interpreter is set to begin processing the plan tree. Control then advances to block 1302, where the COBOL relation manager is called to open the tables to be accessed by the query. FIG. 14 details the operation of this step. Control then passes to the decision block 1303, where the SQL operation is tested to determine if it is an "INSERT" function. If so, in block 1304 the formed row is passed to the COBOL relation manager to be inserted into the table. FIG. 16 provides more detail as to this step. The plan interpreter then exits normally. If the function was not "INSERT" in block 1303, control advances to block 1305, where the interpreter obtains a row from the plan and passes control to decision block 1306. If a row was located in block 1305, then control passes to decision block 1307, otherwise the plan interpreter exits normally. In block 1307, if the function is "SELECT", then control advances to block 1308. If not, control passes to decision block 1309. In block 1308, the column values are retrieved from the COBOL relation manager, and control passes back to block 1305. Detail regarding this step is found in FIG. 17. In block 1309, if the function is "UPDATE", control passes to block 1310 where the COBOL relation manager is called to update column values. More detail concerning this step is provided in FIG. 18. Control then passes to block 1305. In 1309, if the function is not "UPDATE" but rather "DELETE", then the COBOL relation manager is called to delete the selected row from the table. Control then passes back to block 1305. Detail regarding this step is provided in FIG. 19.

Turning now to the flow charts of the exemplary embodiment of the COBOL relation manager component (block 1102 FIG. 11) of the COBOL RDBMS engine (block 202 FIGS. 2 and 11) within the present invention, FIGS. 14–56 show the detailed flow of control.

FIG. 14 details the steps performed when the tables are opened for the execution of a query plan (see FIG. 13, block 1302). In block 1401 the next table is opened, a process which is described in detail in FIG. 20. Column information within the table is obtained in block 1402 and described in detail in FIG. 21. Decision block 1403 returns control to block 1401 if there are more files to be opened.

Figure 15:
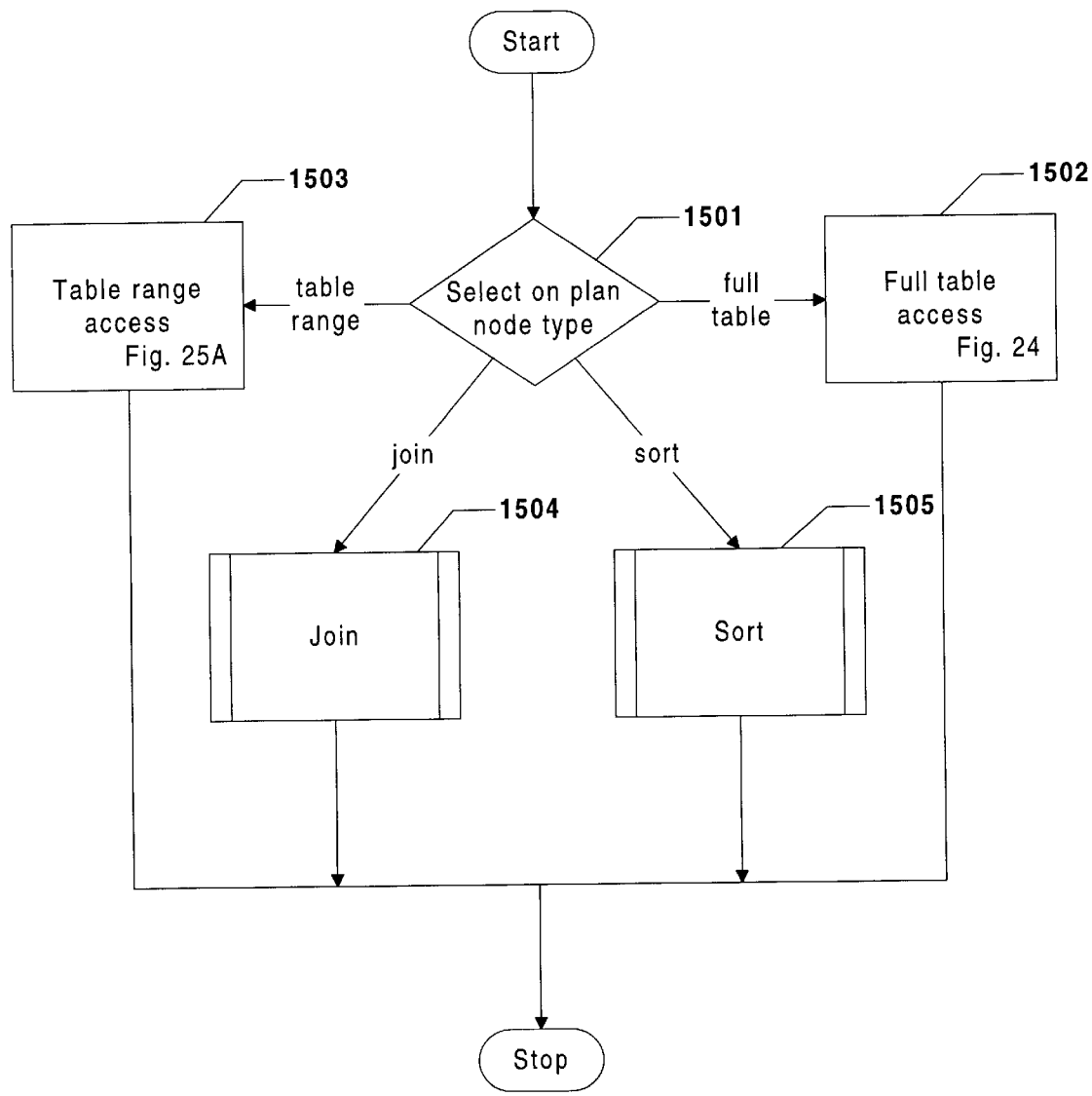

FIG. 15 details the steps performed when a row is obtained from the query plan (see FIG. 13, block 1305). Decision block 1501 points to the various plan node types that can be selected. In block 1502, full table access is selected. This process is described in detail in FIG. 24. In block 1503, table range access is selected. This process is described in detail in FIG. 25. In predefined procedure block 1504, the sets of rows are joined. In predefined procedure block 1505, the set of rows is sorted.

FIG. 16 details the steps performed when a row is inserted in a table (see FIG. 13, block 1304). Block 1601 initializes the update, setting the update mode to indicate an insert operation on the table, a process that is described in detail in FIG. 35A. Block 1602 sets a column value, described in detail in FIG. 36A. Decision block 1603 returns control to block 1602 if there are more columns to set; otherwise, the row update is completed in block 1604 (described in detail in FIG. 37).

Figure 17:
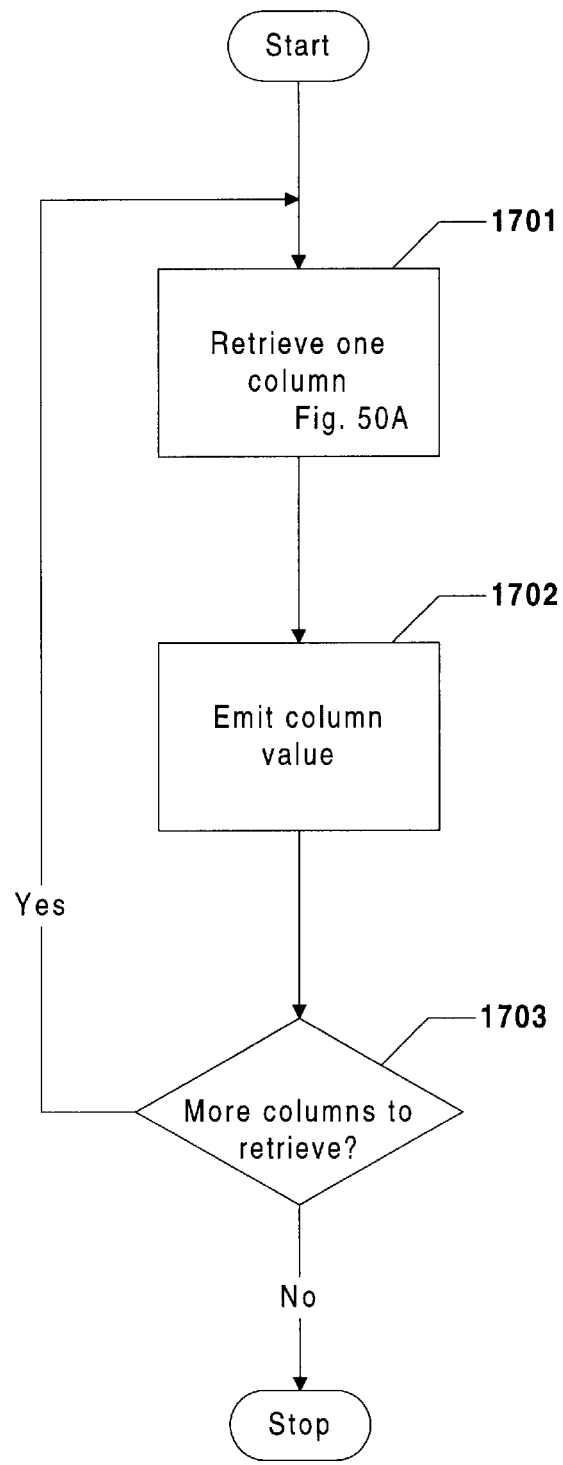

FIG. 17 details the steps performed when column values are retrieved (see FIG. 13, block 1308). In block 1701, one column is retrieved (described in detail in FIG. 50). A column value is emitted in block 1702. Decision block 1703 returns control to block 1701 if there are more columns to retrieve.

Figure 18:
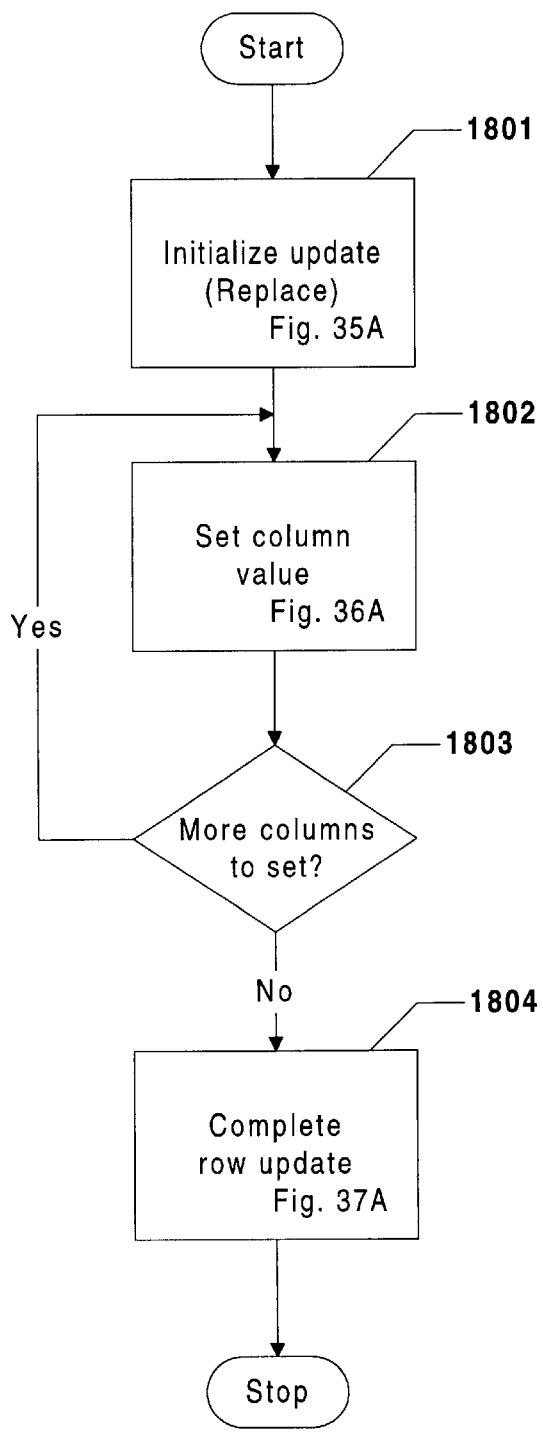

FIG. 18 details the steps performed when a row is updated (see FIG. 13, block 1310). Block 1801 initializes the update, setting the update mode to indicate a replace operation on the table (described in detail in FIG. 35A). Block 1802 sets a column value, described in detail in FIG. 36A. Decision block 1803 returns control to block 1802 if there are more columns to set; otherwise, the row update is completed in block 1804 (described in detail in FIG. 37).

Figure 19:
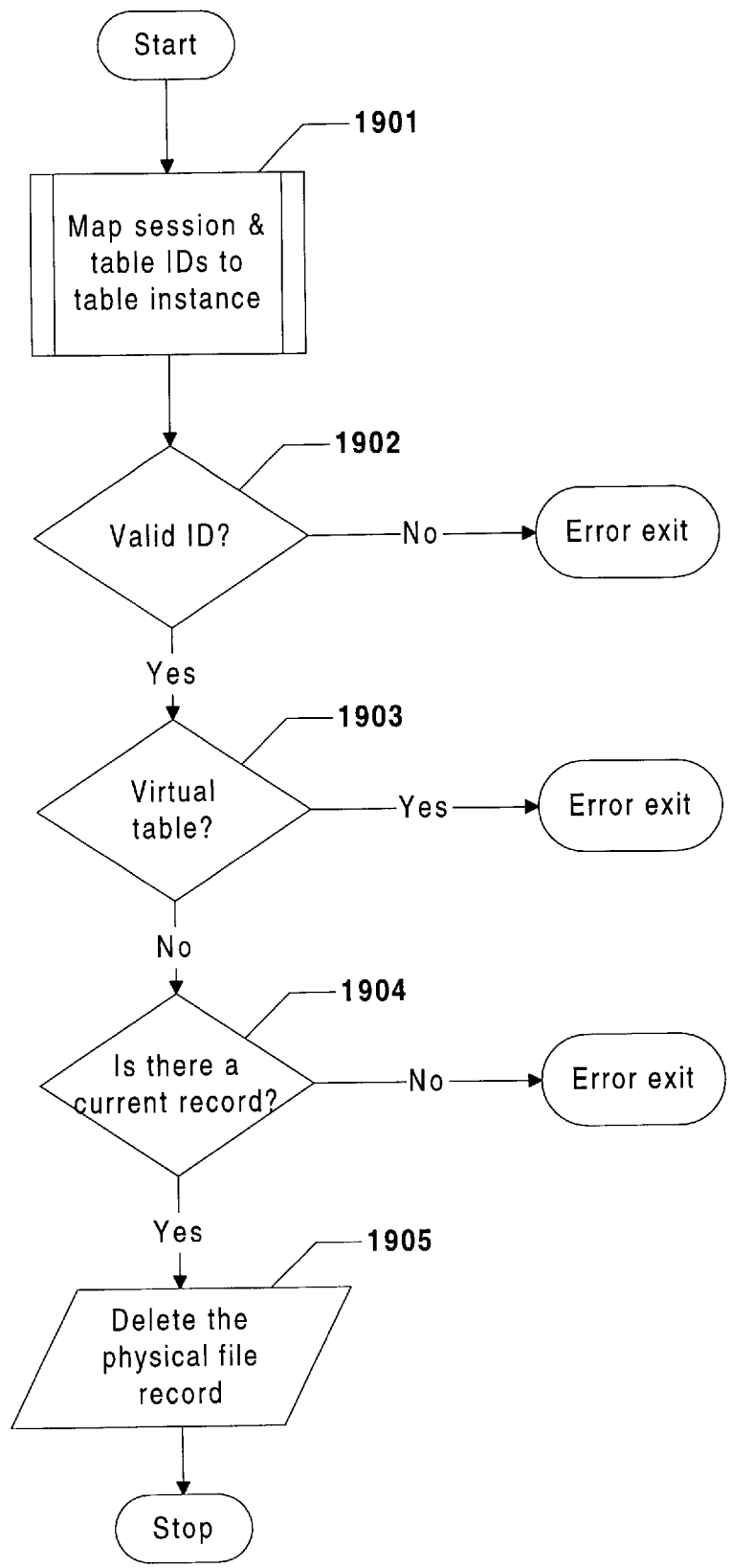

FIG. 19 details the steps performed when a row is deleted (see FIG. 13, block 1311). In predefined procedure block 1901, session and table IDs are mapped to the table instance. If the IDs are valid, decision block 1902 passes control to decision block 1903; otherwise, the procedure exits with an error. Decision block 1903 determines whether the table is a virtual table, in which case the procedure exits with an error. If the table is not a virtual table, decision block 1903 passes control to decision block 1904. If there is a current record, decision block 1904 passes control to I/O block 1905; otherwise, the procedure exits with an error. In I/O block 1905, the physical file record is deleted.

FIG. 20 details the steps performed to open the next table (see FIG. 14, block 1401). In predefined procedure block 2001, session and database IDs are mapped to a database. If the IDs are valid, decision block 2002 passes control to decision block 2003; otherwise, the procedure exits with an error. Block 2003 searches for a table definition with a matching name. If the table is found, decision block 2004 passes control to decision block 2005; otherwise, the procedure exits with an error. Decision block 2005 determines whether the table is a catalog table and if so, whether catalog tables are hidden, in which case the procedure exits with an error. If the table is not a catalog table or if catalog tables are not hidden, control passes to decision block 2006. Decision block 2006 determines whether the table is a virtual table, in which case the procedure exits with an error. If the table is not a virtual table, control passes to decision block 2007. Decision block 2007 determines whether the table is a catalog table.

If decision block 2007 determines that the table is a catalog table, control advances to predefined procedure block 2012, where catalog table column definitions are built, after which control passes to decision block 2013.

If decision block 2007 determines that the table is not a catalog table, then a set of steps is performed in predefined procedure blocks 2008 through 2011 to further define the table, after which control passes to decision block 2013. In predefined procedure block 2008, the file instance is either read or found; in predefined procedure block 2009, predicates are read; in predefined procedure block 2010, table column definitions are read; and in predefined procedure block 2011, table index definitions are read. Control then advances to decision block 2013.

Decision block 2013 determines whether there are any errors. If there are errors, the procedure exits with an error. If decision block 2013 determines that there are no errors control passes to predefined procedure block 2014, where a table instance structure is built. Block 2015 computes the file open mode and sharing mode. Block 2016 opens a file instance (described in detail in FIG. 22). Control then passes to decision block 2017, which determines whether there are any errors.

If decision block 2017 determines that there are errors, control advances to block 2021, where the table instance is closed (described in detail in FIG. 23), and the procedure exits with an error.

If no errors are discovered in decision block 2017, then control passes to predefined procedure block 2018, which allocates a record buffer for the table instance. Decision block 2019 determines whether sufficient memory was available to allocate the record buffer. If not, control advances to block 2021, where the table instance is closed (described in detail in FIG. 23), and the procedure exits with an error. If sufficient memory was available, control passes to block 2020, which returns the table instance's ID to the caller and the procedure exits normally.

Figure 21:
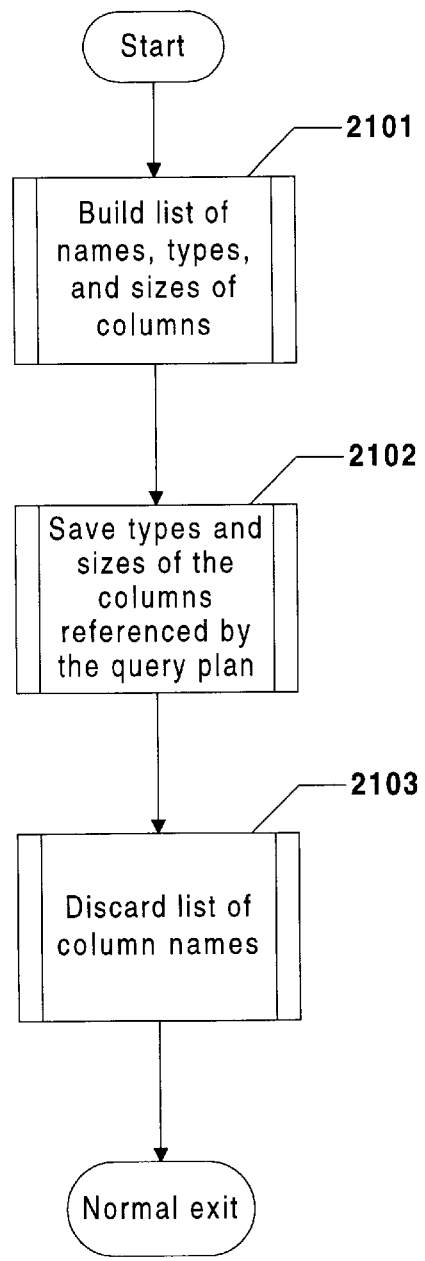

FIG. 21 details the steps performed to get table column information (see FIG. 14, block 1402). Predefined procedure block 2101 builds a list of names, types, and sizes of columns. Predefined procedure block 2102 saves types and sizes of the columns referenced by the query plan. Predefined procedure block 2103 discards the list of column names, and the procedure exits normally.

Figure 22:
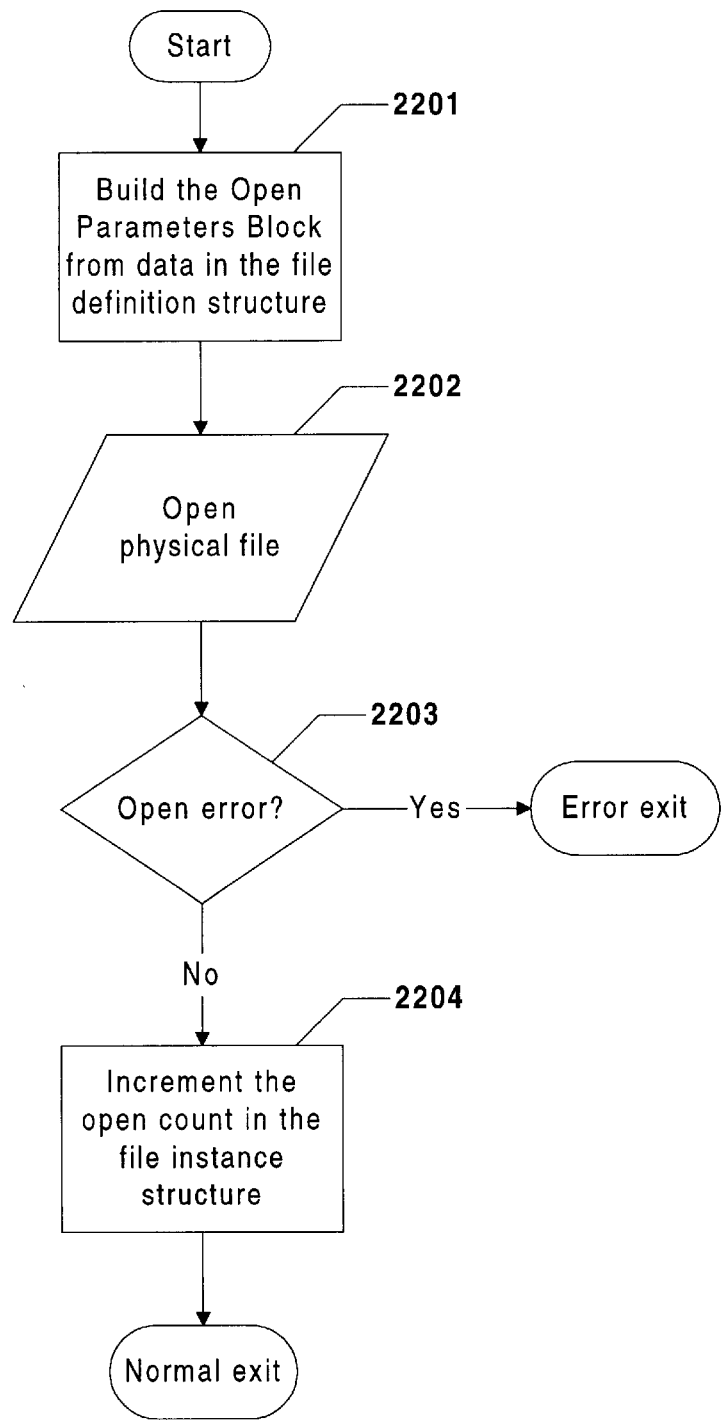

FIG. 22 details the steps performed to open a file instance (see FIG. 20, block 2016). Block 2201 builds the Open Parameters Block from the data in the file definition structure. I/O block 2202 opens the physical file. Decision block 2203 determines whether there was an error during the open. If there was an error during the open, the procedure exits with an error. If there is no open error, control passes to block 2204, which increments the open count in the file instance structure, and the procedure exits normally.

FIG. 23 details the steps performed to close a table instance (see FIG. 20, block 2021). Decision block 2301 determines whether the table ID is valid. If the table ID is not valid, the procedure exits with an error. If the table ID is valid, control passes to block 2302, which clears the pointer to the table instance in the session structure. Predefined procedure block 2303 deallocates record buffers owned by the table instance. Predefined procedure block 2304 deallocates bookmark cells owned by the table instance. Predefined procedure block 2305 deallocates the filter attached to the table instance and passes control to decision block 2306, which determines whether the table is a virtual table.

If decision block 2306 determines that the table is a virtual table, then control passes to block 2307, which delinks the table instance from the table definition. Predefined procedure block 2308 then deallocates the table instance structure and the procedure exits normally.

If decision block 2306 determines that the table is not a virtual table, control advances to decision block 2309, which determines whether the file is open. If the file is not open, control advances to block 2315. If the file is open, control passes to I/O block 2310, which closes the physical file. Block 2311 then decrements the open count in the file instance structure and passes control to decision block 2312. Decision block 2312 determines whether the open count equals zero. If not, control advances to block 2315. If the open count does equal zero, then control passes to block 2313, which delinks the file instance structure from the database structure. Predefined procedure block 2314 then deallocates the file instance structure and passes control to block 2315.

Block 2315 delinks the table instance structure from the table definition structure. Predefined procedure block 2316 deallocates the table instance structure and passes control to decision block 2317. Decision block 2317 determines whether any table instances are still linked to the table definition. If so, the procedure exits normally. If not, control passes to predefined procedure block 2318, which deallocates the column and index definition structures. Predefined procedure block 2319 then deallocates the subscript table owned by the table definition and the procedure exits normally.

Figure 24:
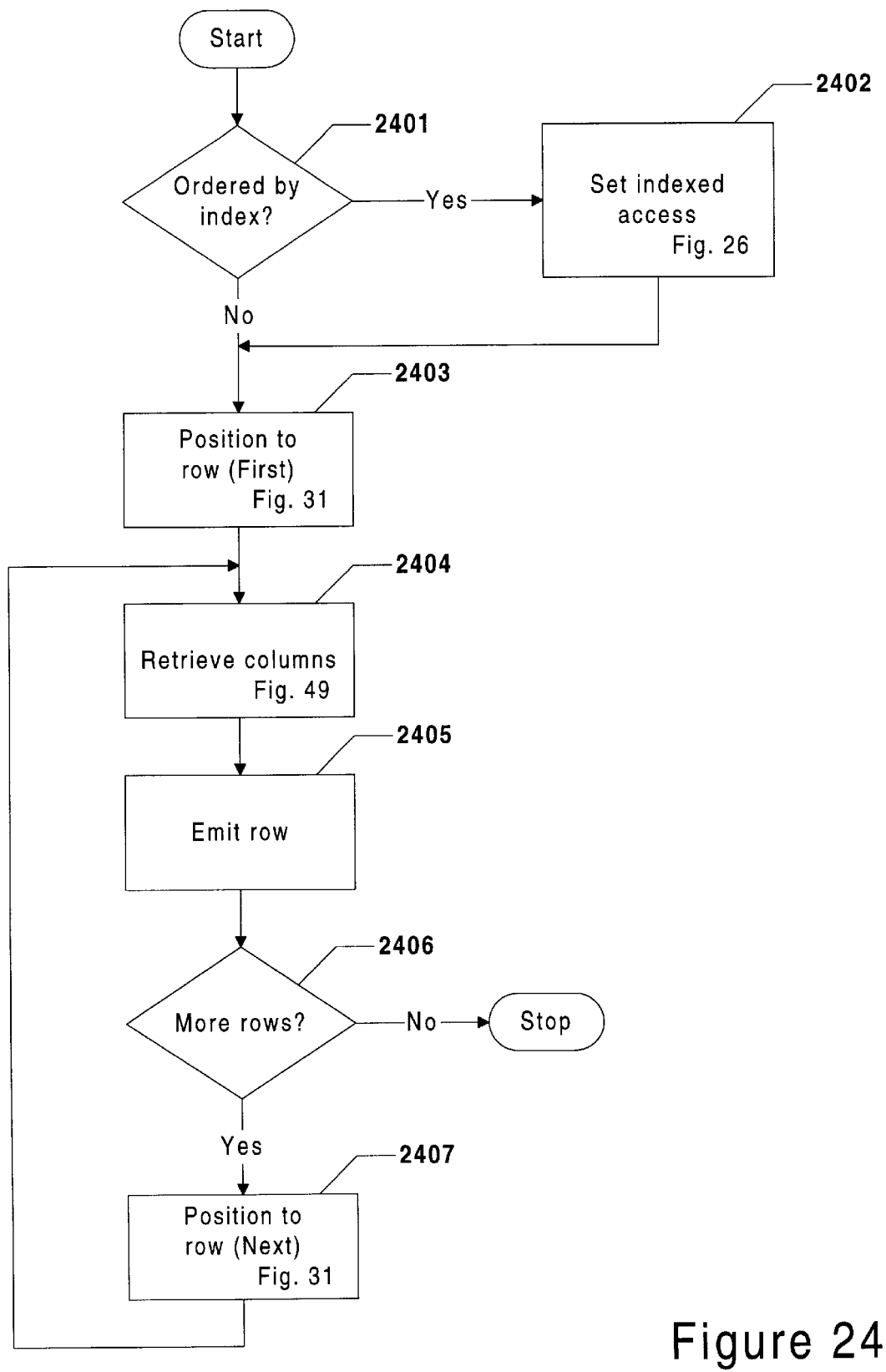

FIG. 24 details the steps performed to select full table access (see FIG. 15, block 1502). Decision block 2401 determines whether access to the table is to be ordered by an index. If so, control passes to block 2402, which sets indexed access (described in detail in FIG. 26), and then passes control to block 2403. If decision block 2401 determines that the table is not ordered by index, control passes to block 2403. Block 2403 moves the table position to the first row (described in detail in FIG. 31). FIG. 2404 then retrieves columns (described in detail in FIG. 49). A row is emitted in block 2405 and control is passed to decision block 2406, which determines whether there are more rows. If no more rows exist, no further action is taken. If more rows exist, control passes to block 2407, which moves to the next row (described in detail in FIG. 31). Control then loops back to block 2404.

FIG. 25 details the steps performed to select table range access (see FIG. 15, block 1503). Decision block 2501 determines whether another range is to be selected. If another range is not selected, no further action is taken. If another range is to be selected, then control passes to block 2502, which gets the lower and upper index values. Block 2503 then sets indexed access (described in detail in FIG. 26). Block 2504 positions the table to a row at the lower value (described in detail in FIG. 28) and passes control to decision block 2505. Decision block 2505 begins a loop that includes blocks 2506 through 2509 and determines whether such a row exists and whether the column value in the row is less than or equal to the upper value. If no row at the lower value exists or if the column value in the row is greater than the upper value, control returns to decision block 2501. If a row at the lower value exists and if the column value in the row is less than or equal to the upper value, control passes to block 2506, which retrieves columns (described in detail in FIG. 49). Block 2507 then emits a row and passes control to decision block 2508. Decision block 2508 determines whether more rows exist. If no more rows exist, control returns to decision block 2501. If more rows exist, control passes to block 2509, which positions to the next row (described in detail in FIG. 31). Control then returns to decision block 2505 and the loop begins again.

Figure 26:
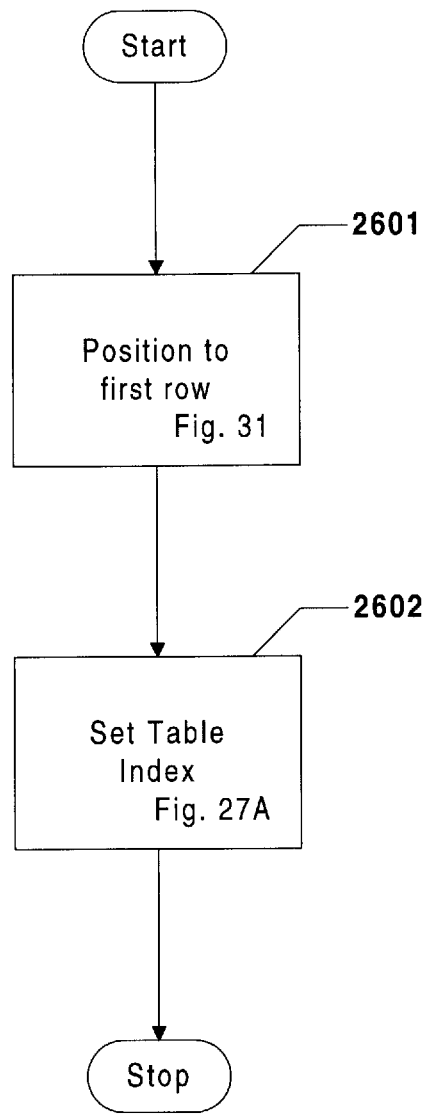

FIG. 26 details the steps performed to set indexed access (see FIG. 24, block 2402; and FIG. 25, block 2503). Block 2601 positions the file to the first row (described in detail in FIG. 31). Block 2602 sets the table index (described in detail in FIG. 27).

FIG. 27 details the steps performed to set the table index (see FIG. 26, block 2602). Predefined procedure block 2701 maps session and table IDs to the table instance and passes control to decision block 2702. Decision block 2702 determines whether the IDs are valid. If the IDs are not valid, the procedure exits with an error. If the IDs are valid, control passes to decision block 2703, which determines whether the table is a virtual table. If the table is a virtual table, the procedure exits with an error. If the table is not a virtual table, control passes to block 2704, which sets the table index pointer to null. Block 2705 resets the order in which subscripts are incremented to the normal order and passes control to decision block 2706. Decision block 2706 determines whether an index name is provided. If no index name is provided, the procedure exits normally. If an index name is provided, control passes to block 2707, which searches for the index. Decision block 2708 determines whether the index name is known. If the index name is unknown, the procedure exits with an error. If the index name is known, control passes to block 2709, which sets the table index pointer to point to the selected index. Block 2710 sets the number of the current key part to zero. Block 2711 then sets the order in which subscripts are incremented from the selected index, and the procedure exits normally.

Figure 28:
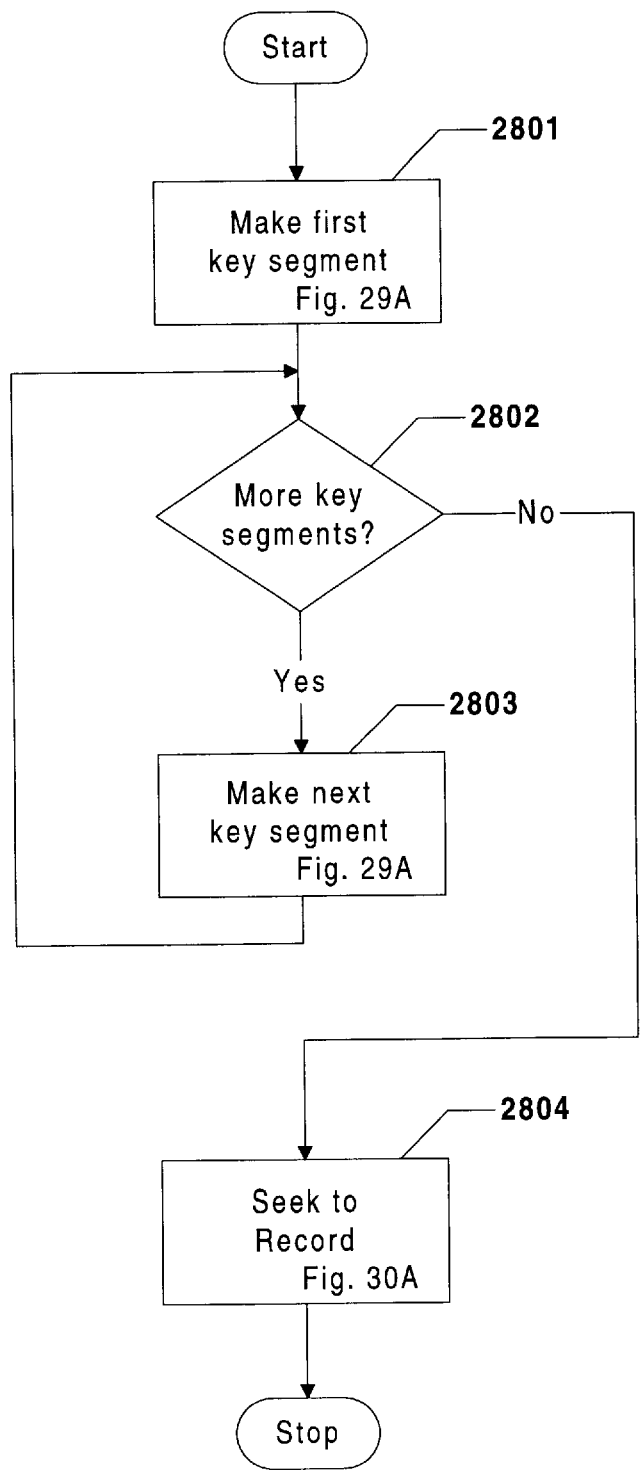

FIG. 28 details the steps performed to position a table to a row containing a lower value (see FIG. 25, block 2504). Block 2801 makes the first key segment (described in detail in FIG. 29A) and passes control to decision block 2802. Decision block 2802 determines whether there are more key segments. If there are more key segments, control passes to block 2803, which makes the next key segment (described in detail in FIG. 29A) and returns control to decision block 2802. If there are no more key segments, control advances to block 2804, which seeks to the record (described in detail in FIG. 30).

FIG. 29A details the steps performed to make a key segment (see FIG. 28, blocks 2801 and 2803). Predefined procedure block 2901 maps session and table IDs to the table instance and passes control to decision block 2902. Decision block 2902 determines whether the IDs are valid. If the IDs are not valid, the procedure exits with an error. If the IDs are valid, control passes to decision block 2903, which determines whether the table is a virtual table. If the table is a virtual table, the procedure exits with an error. If the table is not a virtual table, control passes to decision block 2904, which determines whether the table index pointer is null. If the table index pointer is null, the procedure exits with an error. If the table index pointer is not null, control passes to decision block 2905. Decision block 2905 determines whether this key segment is the first key segment.

If decision block 2905 determines that this is the first key segment, decision block 2905 passes control to block 2906. Block 2906 sets the current key part number to zero and control advances to block 2908. Block 2908 fetches addresses of the column and item structures for the current key part and passes control to decision block 2909. Decision block 2909 determines whether the key part value is too large or too small. If the key part value is not an acceptable size, the procedure exits with an error. If the key part value is an acceptable size, control passes to block 2910, which copies the key part value to the key buffer (described in detail in FIG. 29B). Block 2911 then increments the key part number and the procedure exits normally.

If decision block 2905 determines that it is not the first key segment, control advances to decision block 2907. Decision block 2907 determines whether the current key part number is too large. If the current key part number is too large, the procedure exits with an error. If the current key part number is not too large, control passes to block 2908 and the flow of control continues as previously described from that point.

FIG. 29B details the steps performed to copy the key part value to the key buffer (see FIG. 29A, block 2910). Block 2912 computes the address of the key part in the key buffer and passes control to decision block 2913. Decision block 2913 determines whether the column type equals text.

If decision block 2913 determines that the column type equals text, control passes to decision block 2914. Decision block 2914 determines whether the column is an ordinal column. If the column is an ordinal column, the procedure exits with an error. If the column is not an ordinal column, control passes to block 2915, which copies the key part value to the key buffer. Block 2916 then copies spaces to the key buffer in order to pad the value to the size of the key part and the procedure exits normally.

If decision block 2913 determines that the column type does not equal text, control advances to decision block 2917. Decision block 2917 determines whether the column type equals binary, vartext, or varbinary. If the column type equals binary, vartext, or varbinary, control passes to decision block 2918. Decision block 2918 determines whether the column is an ordinal column. If the column is an ordinal column, the procedure exits with an error. If the column is not an ordinal column, control passes to block 2919, which copies the key part value to the key buffer. Block 2920 then copies binary zeroes to the key buffer in order to pad the value to the size of the key part and the procedure exits normally.

If decision block 2917 determines that the column type does not equal binary, vartext, or varbinary, control advances to decision block 2921. Decision block 2921 determines whether the column type equals bit. If the column type equals bit, control passes to block 2922, which sets binValue to equal the first byte of the key part value ANDed with 0x01. Block 2923 then puts binValue in arithmetic register #0 (described in detail in FIG. 38). Block 2924 then converts arithmetic register #0 and stores it into the key buffer (described in detail in FIG. 43). The procedure then exits normally.

If decision block 2921 determines that the column type does not equal bit, control advances to decision block 2925. Decision block 2925 determines whether the column type equals unsigned byte. If the column type equals unsigned byte, control passes to block 2926, which sets binValue to equal the first byte of the key part value, zero-filled to 32 bits. Block 2927 then puts binValue in arithmetic register #0 (described in detail in FIG. 38). Block 2928 then converts arithmetic register #0 and stores it into the key buffer (described in detail in FIG. 43). The procedure then exits normally.

If decision block 2925 determines that the column type does not equal unsigned byte, control passes to decision block 2929. Decision block 2929 determines whether the column type equals short. If the column type equals short, control passes to block 2930, which sets binValue to equal the first two bytes of the key part value, extended to 32 bits. Block 2931 then puts binValue in arithmetic register #0 (described in detail in FIG. 38). Block 2932 then converts arithmetic register #0 and stores it into the key buffer (described in detail in FIG. 43). The procedure then exits normally.

If decision block 2929 determines that the column type does not equal short, control advances to decision block 2933. Decision block 2933 determines whether the column type equals long. If the column type equals long, control passes to block 2934, which puts the 32-bit key part value in arithmetic register #0 (described in detail in FIG. 38). Block 2935 then converts arithmetic register #0 and stores it into the key buffer (described in detail in FIG. 43). The procedure then exits normally.

If decision block 2933 determines that the column type does not equal long, control passes to decision block 2936.

Decision block 2936 determines whether the column type equals currency. If the column type equals currency, control passes to block 2937, which puts the currency-type key part value in arithmetic register #0 (described in detail in FIG. 39). Block 2938 then converts arithmetic register #0 and stores it into the key buffer (described in detail in FIG. 43). The procedure then exits normally.

If decision block 2936 determines that the column type does not equal currency, control passes to decision block 2939. Decision block 2939 determines whether the column type equals date, time, or datetime. If the column type equals date, time, or datetime, control passes to block 2940, which puts the IEEE double precision key part value in arithmetic register #0 (described in detail in FIG. 40). Block 2941 then converts arithmetic register #0 and stores it into the key buffer (described in detail in FIG. 43). The procedure then exits normally.

If decision block 2939 determines that the column type does not equal date, time, or datetime, control advances to decision block 2942. Decision block 2942 determines whether the column type equals double. If the column type equals double, control passes to block 2943, which puts the IEEE double precision key part value in arithmetic register #0 (described in detail in FIG. 40). Block 2944 then rounds the arithmetic register #0 to the size of the key buffer (described in detail in FIG. 41). Block 2945 then converts arithmetic register #0 and stores it into the key buffer (described in detail in FIG. 43). The procedure then exits normally.

If decision block 2942 determines that the column type does not equal double, control advances to decision block 2946. Decision block 2946 determines whether the column type equals single. If the column type equals single, control passes to block 2947, which puts the IEEE single precision key part value in arithmetic register #0 (described in detail in FIG. 42). Block 2948 then rounds the arithmetic register #0 to the size of the key buffer (described in detail in FIG. 41). Block 2949 then converts arithmetic register #0 and stores it into the key buffer (described in detail in FIG. 43). The procedure then exits normally.

If decision block 2946 determines that the column type does not equal single, the procedure exits with an error.

FIG. 30 details the steps performed to seek to a record (see FIG. 28, block 2804). Predefined procedure block 3001 maps session and table IDs to the table instance and passes control to decision block 3002. Decision block 3002 determines whether the IDs are valid. If the IDs are not valid, the procedure exits with an error. If the IDs are valid, control passes to decision block 3003, which determines whether the table is a virtual table. If the table is a virtual table, the procedure exits with an error. If the table is not a virtual table, control passes to decision block 3004, which determines whether the table index pointer is null. If the table index pointer is null, the procedure exits with an error. If the table index pointer is not null, control passes to decision block 3005. Decision block 3005 determines whether the current key part number is zero. If the current key part number is zero, the procedure exits with an error. If the current key part number is not zero, control passes to decision block 3006. Decision block 3006 determines whether the seek mode is valid. If the seek mode is not valid, the procedure exits with an error. If the seek mode is valid, control passes to block 3007, which computes the number of real (not ordinal) key parts that have been set. Block 3008 then copies the real key parts into the record area. Block 3009 copies the ordinal column key parts into the subscript value table. I/O block 3010 positions the file using the current index and the key value in the record and passes control to decision block 3011. Decision block 3011 determines whether a record was found. If no record was found, the procedure exits with an error. If a record was found, control passes to block 3012, which positions to a row (with parameter value seek) (described in detail in FIG. 32A). Decision block 3013 determines whether the row was found. If no row was found, the procedure exits with an error. If the row was found, control passes to decision block 3014, which determines whether the Seek mode is greater than or equal to. If Seek mode is not greater than or equal to, the procedure exits normally. If Seek mode is greater than or equal to, control passes to decision block 3015. Decision block 3015 determines whether the key value in the key buffer equals the key value in the record buffer. If the key value in the key buffer does not equal the key in the record buffer, the procedure exits with a warning. If the key value in the key buffer does equal the key in the record buffer, the procedure exits normally.

Figure 31:
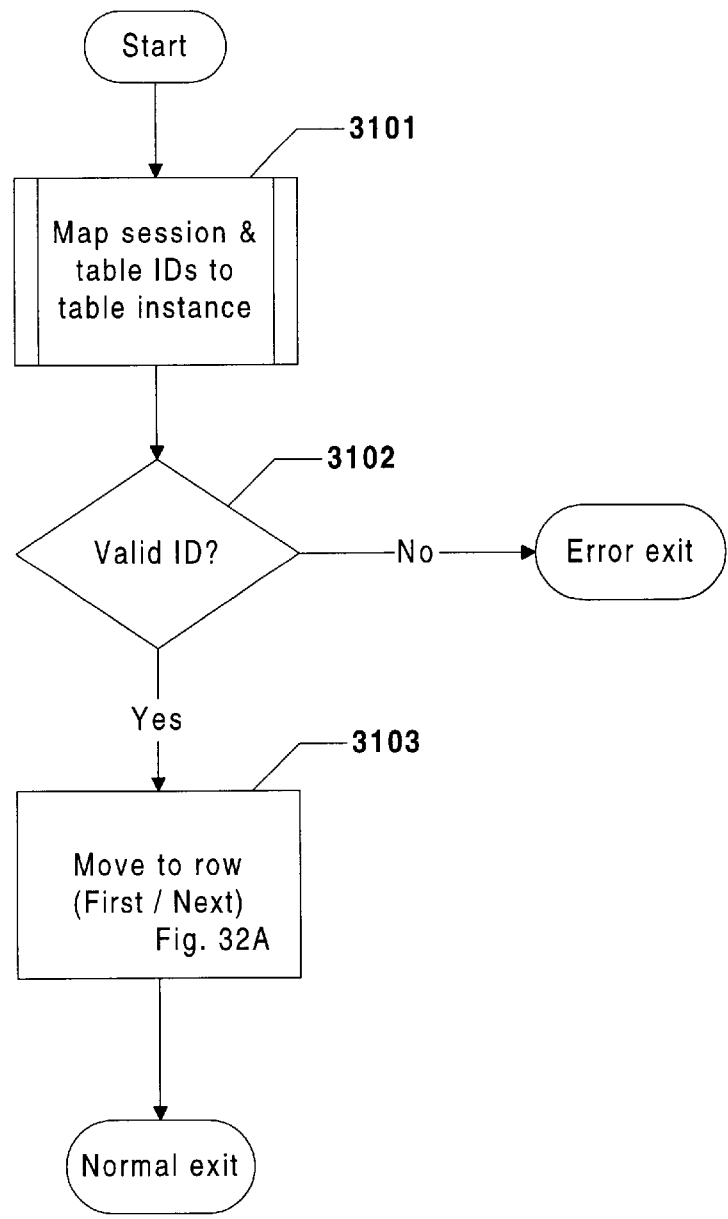

FIG. 31 details the steps performed to position to a row (see FIG. 24, blocks 2403 and 2407; FIG. 25, block 2509; and FIG. 26, block 2601). Predefined procedure block 3101 maps the session and table IDs to the table instance and passes control to decision block 3102. Decision block 3102 determines whether the IDs are valid. If the IDs are not valid, the procedure exits with an error. If the IDs are valid, control passes to block 3103, which moves to a row (with parameter first or next) (described in detail in FIG. 32A). The procedure then exits normally.

Figure 32A:
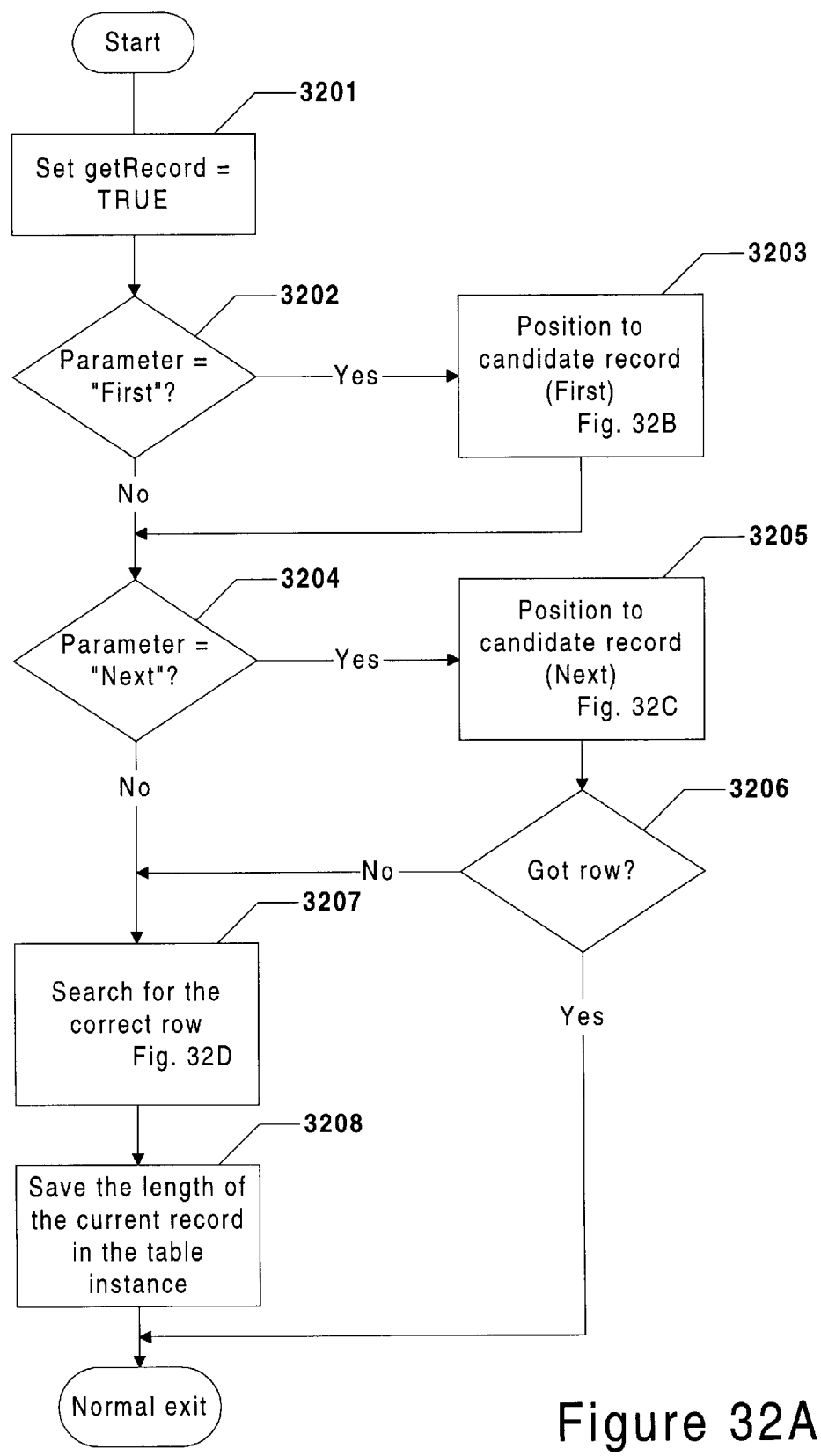

FIG. 32A details the steps performed to position to a row (with parameter equal to first, next, or seek) (see FIG. 30, block 3012; and FIG. 31, block 3103). Block 3201 sets getRecord to true and passes control to decision block 3202. Decision block 3202 determines whether the parameter equals first. If the parameter equals first, control passes to block 3203. Block 3203 positions to the first candidate record (described in detail in FIG. 32B) and passes control to decision block 3204. If decision block 3202 determines that the parameter does not equal first, control passes to decision block 3204. Decision block 3204 determines whether the parameter equals next. If the parameter equals next, control passes to block 3205, which positions to the next candidate record (described in detail in FIG. 32C). Decision block 3206 then determines whether a row was obtained, and if so, the procedure exits normally. If either decision block 3204 determines that the parameter does not equal next, or decision block 3206 determines that no row is was obtained, control passes to block 3207, which searches for the correct row (described in detail in FIG. 32D). Block 3208 then saves the length of the current record in the table instance, and the procedure exits normally.

Figure 32B:
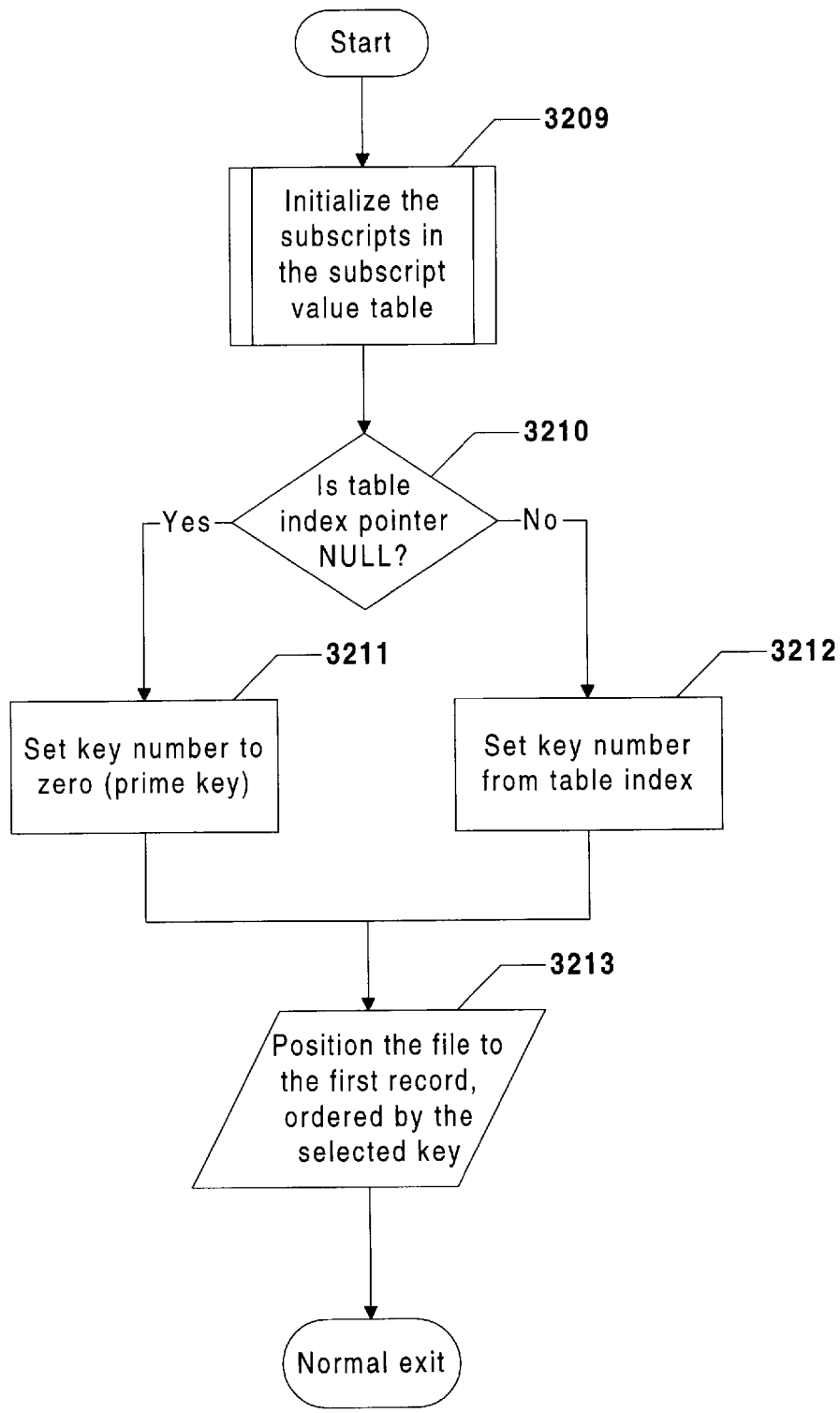

FIG. 32B details the steps performed to position to the first candidate record (see FIG. 32A, block 3203). Predefined procedure block 3209 initializes the subscripts in the subscript value table and passes control to decision block 3210. Decision block 3210 determines whether the table index pointer is null. If the table index pointer is null, control passes to block 3211, which sets the key number to zero (indicating the file's prime key) and passes control to I/O block 3213. If decision block 3210 determines that the table index pointer is not null, control advances to block 3212, which sets the key number from the table index structure and passes control to I/O block 3213. I/O block 3213 positions the file to the first record, ordered by the selected key, and the procedure exits normally.

FIG. 32C details the steps performed to position to the next candidate record (see FIG. 32A, block 3205). Decision block 3214 determine whether the next record is already in the buffer (see FIG. 35B, block 3548 for the setting of this flag). If the next record is already in the buffer, predefined procedure block 3215 initializes the subscripts in the subscript value table and the procedure exits normally. If the next record is not in the buffer, control passes to decision block 3216, which tests a flag to determines whether the subscripts have overflowed (see FIG. 35B, block 3558 for the setting of this flag).

If decision block 3216 determines that the subscripts have overflowed (exceeded the maximum values), control advances to predefined procedure block 3220, which initializes the subscripts in the subscript value table. The procedure then exits normally.

If decision block 3216 determines that the subscripts have not overflowed, control passes to decision block 3217, which determines whether the subscripts have already been incremented (see FIG. 35B, block 3557 for the setting of this flag). If the subscripts have already been incremented, control advances to decision block 3221. If the subscripts have not been incremented, control passes to predefined procedure block 3218, which increments the subscripts in the subscript value table and passes control to decision block 3219. Decision block 3219 determines whether the subscripts overflowed when incremented in block 3218. If the subscripts have overflowed (exceeded the maximum values), control passes to predefined procedure block 3220, which initializes the subscripts in the subscript value table. The procedure then exits normally. If decision block 3219 determines that the subscripts have not overflowed, control advances to decision block 3221.

Decision block 3221 determines whether the count of table predicates is equal to zero. If the count of table predicates does not equal zero, control advances to block 3223, which sets getRecord to false and the procedure exits normally.

If decision block 3221 determines that the count of table predicates is equal to zero, control passes to decision block 3222, which determines whether the filter pointer equals null. If the filter pointer equals null, the procedure exits normally with the row found. If the filter pointer does not equal null, control passes to block 3223, which sets getRecord to false and the procedure exits normally.

FIG. 32D details the steps performed to search for the correct row (see FIG. 32A, block 3207). Decision block 3224 determines whether getRecord equals true. If getRecord equals true, control passes to block 3225, which reads the next record (described in detail in FIG. 32E) and control advances control to decision block 3228. If getRecord does not equal true, control passes to decision block 3228. Decision block 3228 determines whether the count of table predicates equals zero.

If decision block 3228 determines that the count of table predicates equals zero, control advances to decision block 3230, which determines whether the filter pointer equals null. If the filter pointer equals null, the procedure exits normally. If decision block 3230 determines that the filter pointer does not equal null, control passes to decision block 3231. Decision block 3231 determines whether the row passes the filter (described in detail in FIG. 48), and if it does, the procedure exits normally. If the row does not pass the filter, control returns to decision block 3226.

If decision block 3228 determines that the count of table predicates does not equal zero, control passes to decision block 3229. Decision block 3229 determines whether the predicate is true (described in detail in FIG. 33A). If the predicate is true, control passes to decision block 3230, and control proceeds as described previously. If decision block 3229 determines that the predicate is not true, control passes to decision block 3226.

Decision block 3226 determines whether getRecord equals true. If getRecord does not equal true, control returns to decision block 3224. If getRecord equals true, control passes to predefined procedure block 3227, which initializes the subscripts in the subscript value table and returns control to decision block 3224.

FIG. 32E details the steps performed to read the next record (see FIG. 32D, block 3225). Block 3232 sets the record length that is stored in the table instance equal to zero. I/O block 3233 then reads the next physical record and passes control to decision block 3234, which determines whether the I/O encountered an error or reached the end of the file. If either case occurs, the procedure exits with an error. If neither case occurs, control passes to decision block 3235, which determines whether the parameter equals seek. If the parameter does not equal seek, the procedure exits normally.

If decision block 3235 determines that the parameter equals seek, control passes to predefined procedure block 3236, which normalizes the subscripts in the subscript value table. Control then passes to decision block 3237, which determines whether the key value in the key buffer equals the key value in the record buffer. If the key value in the key buffer equals the key value in the record buffer, control passes to decision block 3238, which determines whether the seek mode equals greater than. If the seek mode does not equal greater than, the procedure exits normally. If the seek mode equals greater than, control passes to predefined procedure block 3239, which increments the subscripts in the subscript value table. Control then passes to decision block 3240, which determines whether the subscripts have overflowed. If the subscripts have not overflowed, the procedure exits normally. If the subscripts have overflowed, control passes to predefined procedure block 3241, which initializes the subscripts in the subscript value table and returns control to block 3232.

If decision block 3237 determines the key value in the key buffer does not equal the key value in the record buffer, control advances to decision block 3242. Decision block 3242 determines whether the seek mode equals equal to. If the seek mode equals equal to, control advances to decision block 3246, which determines whether the key permits duplicates. If the key does not permit duplicates, the procedure exits with an error. If the key permits duplicates, control passes to decision block 3247, which determines whether the mismatch in the key values occurred in a subscript (from an ordinal column). If the mismatch in the key values occurred in a subscript, the procedure exits normally. If the mismatch in the key values did not occur in a subscript, the procedure exits with an error.

If decision block 3242 determines that the seek mode does not equal equal to, control passes to decision block 3243, which determines whether the key value in the key buffer is greater than the key value in the record buffer. If the key value in the key buffer is greater than the key value in the record buffer, the procedure exits with an error. If the key value in the key buffer is not greater than the key value in the record buffer, control passes to decision block 3244, which determines whether the subscript values in the key buffer are greater than those contained in the subscript value table. If the subscript values in the key buffer are not greater than those contained in the subscript value table, the procedure exits normally. If the subscript values in the key buffer are greater than those contained in the subscript value table, control passes to predefined procedure block 3245, which initializes the subscripts in the subscript value table and returns control to block 3232.

Figure 33A:
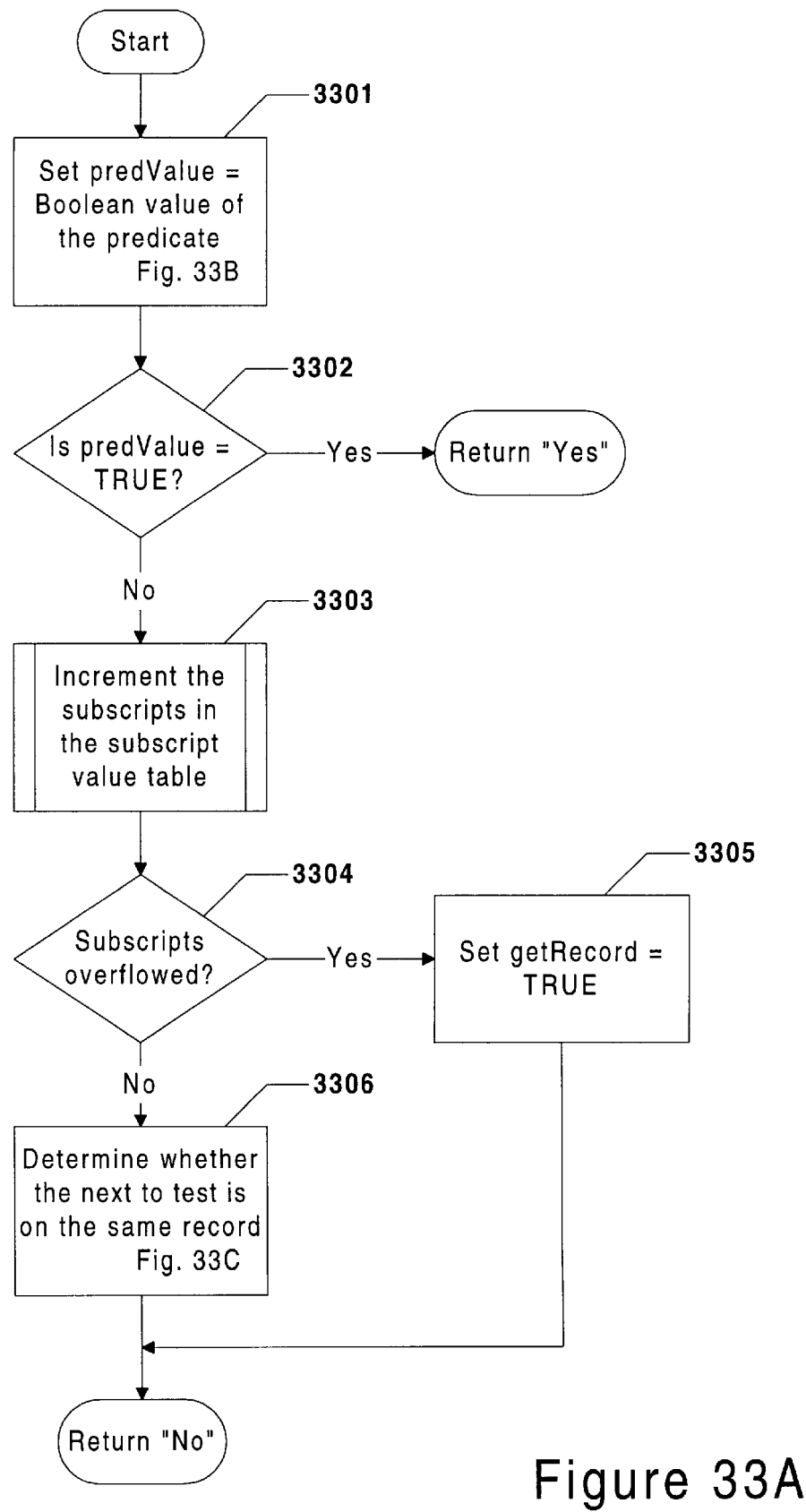

FIG. 33A details the steps required to determine whether a predicate is true (see FIG. 32D, block 3229; and FIG. 35B, block 3553). This includes steps to bypass multiple rows for which the predicate is false. Block 3301 sets predValue equal to the Boolean value of the predicate (described in detail in FIG. 33B) and passes control to decision block 3302. Decision block 3302 determines whether predValue equals true. If predValue equals true, the procedure responds that the predicate is true. If predValue is not equal to true, control passes to predefined procedure block 3303, which increments the subscripts in the subscript value table. Decision block 3304 then determines whether the subscripts have overflowed. If the subscripts have over flowed, control passes to block 3305, which sets getRecord equal to true and the procedure responds that the predicate is not true. If decision block 3304 determines that the subscripts have not overflowed, control advances to block 3306, which determines whether the next row to test is on the same record (described in detail in FIG. 33C). The procedure responds that the predicate is not true.

FIG. 33B describes the steps performed to set predValue equal to the Boolean value of the predicate (see FIG. 33A, block 3301). Block 3307 sets predValue to equal true and passes control to block 3308, which sets the variable i equal to zero. Block 3309 then sets pPredItem to point to the condition item from the $i^{th}$ predicate term and passes control to decision block 3310.

Decision block 3310 determines whether the operation in the $i^{th}$ predicate term is and or or. If decision block 3310 determines that the operation in the $i^{th}$ predicate term is and, control passes to decision block 3311. If decision block 3311 determines that predValue equals true, control advances to block 3313. If decision block 3311 determines that predValue does not equal true, control advances to block 3320. If decision block 3310 determines that the operation in the $i^{th}$ predicate term is or, control passes to decision block 3312. If decision block 3312 determines that predValue equals true and i is greater than zero, control advances to block 3320. If decision block 3312 determines that predValue does not equal true or that i is not greater zero, control advances to block 3313.

Block 3313 sets predValue to false and pRange equal to the address of the first range of values in the condition item pointed at by pPredItem. Decision block 3314 then determines whether the condition item to which pPredItem points is within the range of values to which pRange points (described in detail in FIG. 34). If decision block 3314 determines that the condition item at pPredItem is within the range at pRange, control passes to block 3315, which sets predValue to true and control advances to decision block 3318. If decision block 3314 determines that the condition item at pPredItem is not within the range at pRange, control passes to block 3316, which sets pRange equal to the address of the next range (that is, the successor of pRange). Control then passes to decision block 3317, which determines whether pRange equals null. If decision block 3317 determines that pRange does not equal null, control returns to decision block 3314; otherwise, control passes to decision block 3318.

Decision block 3318 determines whether the complemented flag is set in the $i^{th}$ predicate. If the complemented flag is set in the $i^{th}$ predicate, control passes to block 3319, which sets predValue equal to NOT predValue (logically complements predValue), and passes control to block 3320. If the complemented flag is not set in the $i^{th}$ predicate, control passes to block 3320.

Block 3320 sets variable i equal to i plus one and passes control to decision block 3321. Decision block 3321 determines whether variable i is equal to the number of predicate terms, and if so, the procedure exits normally. If the variable i does not equal the number of predicate terms, control returns to block 3309 and the flow of control proceeds as previously described from that point.

FIG. 33C describes the steps performed to determine whether the next row to test is on the same record (see FIG. 33A, FIG. 3306). Block 3322 sets subDepend equal to false and i equal to the number of predicate terms. Block 3323 then sets i equal to i minus one and passes control to decision block 3324.

Decision block 3324 determines whether i is greater than zero. If decision block 3324 determines that i is not greater than zero, control advances to decision block 3326, which determines whether subDepend equals false. If subDepend equals false, control passes to block 3327, which sets getRecord equal to true and the procedure exits normally. If subDepend is not false, control passes to block 3328, which sets getRecord equal to false and the procedure exits normally.

If decision block 3324 determines that i is greater than zero, control passes to block 3325, which sets pPredItem to point to the condition item from the $i^{th}$ predicate term, and control advances to decision block 3329.

Decision block 3329 determines whether the operation in the $i^{th}$ predicate term is and or or. If decision block 3329 determines that the operation in the $i^{th}$ predicate term is or, control passes to decision block 3330. Decision block 3330 determines whether the condition item at pPredItem is subscripted. If decision block 3330 determines that the condition item at pPredItem is not subscripted, control passes to block 3323. The flow of control continues as previously described from that point. If decision block 3330 determines that the condition item at pPredItem is subscripted, control passes to block 3333. Block 3333 sets subDepend to true and returns control to decision block 3326. The flow of control continues as previously described from that point.

If decision block 3329 determines that the operation in the $i^{th}$ predicate term is and, control passes to decision block 3331. Decision block 3331 determines whether the condition item at pPredItem is subscripted. If decision block 3331 determines that the condition item at pPredItem is not subscripted, control passes to block 3332. Block 3332 sets getRecord to true and returns control to decision block 3326, where the flow of control continues as previously described from that point. If decision block 3331 determines that the condition item at pPredItem is subscripted, control passes to block 3333 and the flow of control continues as previously described from that point.

Figure 34:
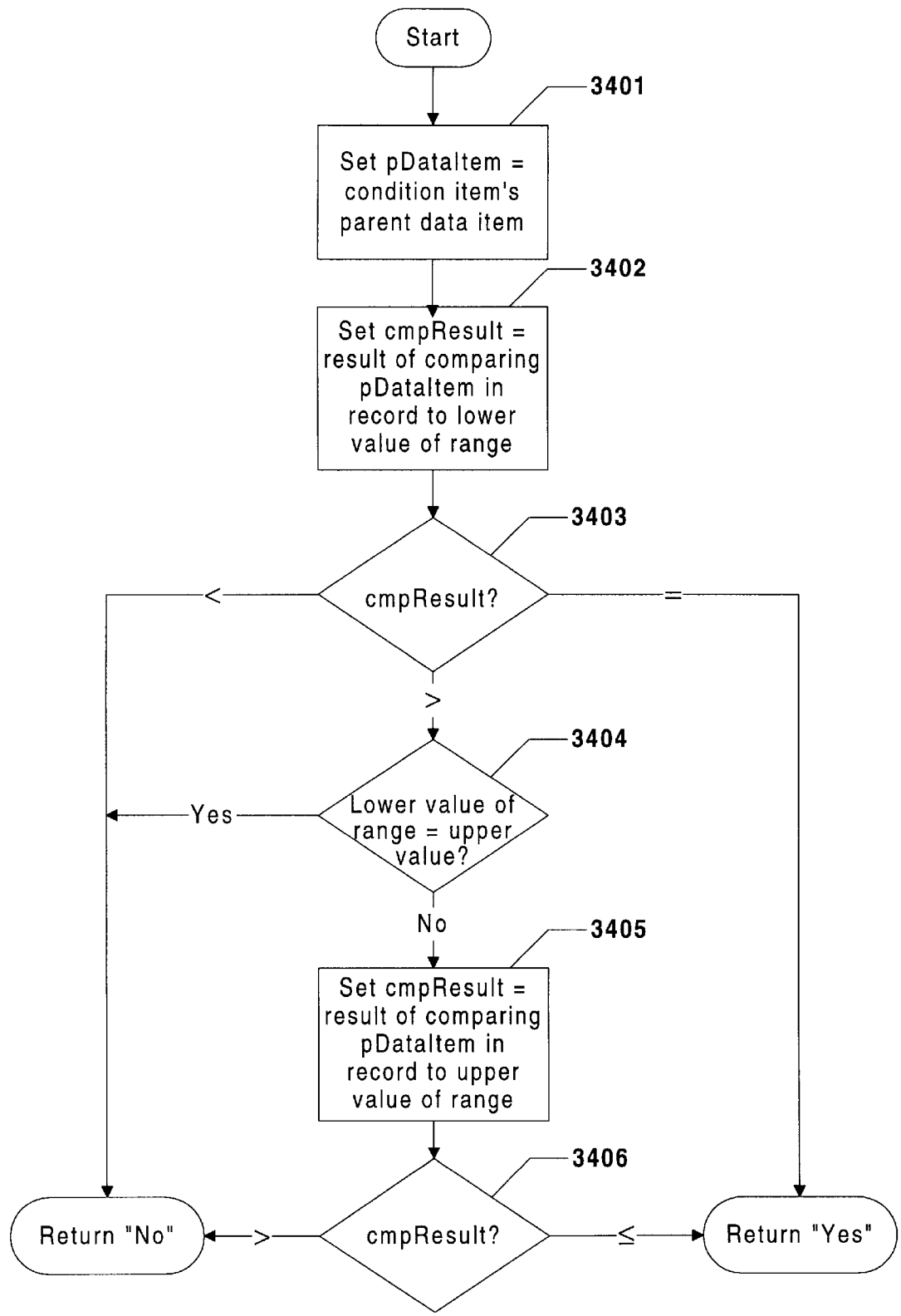

FIG. 34 details the steps performed to determine whether a condition item is within a range of values (see FIG. 33B, block 3314). Block 3401 sets pDataItem equal to the address of the condition item's parent data item. Block 3402 then sets cmpResult equal to the result of comparing the value (in the record buffer) of the data item at pDataItem to the lower value of the range and passes control to decision block 3403.

Decision block 3403 selects the next step depending on whether cmpResult is equal to, less than, or greater than. If decision block 3403 determines that cmpResult is equal to, the procedure responds that the condition item is within the range. If decision block 3403 determines that cmpResult is less than, the procedure responds that the condition item is not within the range.

If decision block 3403 determines that cmpResult is greater than, control passes to decision block 3404. Decision block 3404 determines whether the lower value of the range equals the upper value. If the lower value of the range equals the upper value, the procedure responds that the condition item is not within the range. If the lower value of the range does not equal the upper value, control passes to block 3405, which sets cmpResult equal to the result of comparing the value (in the record buffer) of the data item at pDataItem to the upper value of the range and passes control to decision block 3406. Decision block 3406 determines whether cmpResult is greater than. If decision block 3406 determines that cmpResult is greater than, the procedure responds that the condition item is not within the range. If decision block 3406 determines that cmpResult is less than or equal to, the procedure responds that the condition item is within the range.

FIG. 35A details the steps performed to initialize a table update (an insert or replace; see FIG. 16, block 1601; and FIG. 18, block 1801). Predefined procedure block 3501 maps session and table IDs to the table instance. Decision block 3502 then determines whether the IDs are valid. If the IDs are not valid, the procedure exits with an error. If the IDs are valid, control passes to decision block 3503, which determines whether the table is a virtual table. If the table is a virtual table, the procedure exits with an error. If the table is not a virtual table, control passes to decision block 3504, which determines whether the table is currently open read-only. If the table is currently open read-only, the procedure exits with an error. If the table is not currently open read-only, control passes to decision block 3505, which determines whether an update is already in progress on the table. If an update is already in progress on the table, the procedure exits with an error. If an update is not already in progress on the table, control passes to decision block 3506, which determines whether the parameter indicates an insert operation or a replace operation.

If decision block 3506 determines that the parameter indicates an insert operation, control passes to block 3507, which clears the table's update record buffer. Then predefined procedure block 3508 sets the false value for each condition item for which a false value is defined. Predefined procedure block 3509 sets the default value for each data item which has a default. Control passes to block 3510, which sets the variable firstPred equal to zero and the variable i equal to one, then control passes to decision block 3511.

Decision block 3511 determines whether the variable i is less than the number of terms in the table's predicate. If i is less than the number of terms in the table's predicate, control passes to decision block 3512, which determines whether the operation in the $i^{th}$ predicate term is an and or an or. If decision block 3512 determines that the operation in the $i^{th}$ predicate term is an or, control passes to block 3513, which sets the variable firstPred equal to i plus one, then control passes to block 3514. If decision block 3512 determines that the operation in the $i^{th}$ predicate term is an and, control passes to block 3514. Block 3514 sets the variable i equal to i plus one and returns control to decision block 3511.

If decision block 3511 determines that the variable i is not less than the number of predicate terms, control advances to block 3515. Block 3515 sets the variable i equal to firstPred and passes control to decision block 3516, which determines whether the variable i is less than the number of terms in the table's predicate.

If decision block 3516 determines that the variable i is less than the number of terms in the table's predicate, control passes to decision block 3517, which determines whether the complemented flag is set in the $i^{th}$ predicate. If the complemented flag is not set in the $i^{th}$ predicate, control advances to predefined procedure block 3518, which sets the true value for the condition item in the $i^{th}$ predicate, then control passes to block 3519. If decision block 3517 determines that the complemented flag is set in the $i^{th}$ predicate, control advances to block 3519. Block 3519 sets the variable i equal to i plus one, and returns control to decision block 3516.

If decision block 3516 determines that the variable i is not less than the number of terms in the table's predicate, control advances to block 3520, which interchanges the pointers to the update record buffer and the regular record buffer. Block 3521 then sets the length of this record to the file's minimum record length. Block 3522 sets the update mode to insert to indicate that an insert operation is active on this table, and the procedure exits normally.

If decision block 3506 determines that the parameter indicates a replace operation, control advances to decision block 3523. Decision block 3523 determines whether there is a record currently in the record buffer. If there is no record in the record buffer, the procedure exits with an error. If there is a record is the record buffer, control passes to block 3524, which rereads the current record (described in detail in FIG. 35B). Decision block 3525 then determines whether a record is available, i.e., whether the reread was successful. If no record is available, the procedure exits with an error. If a record is available, control passes to 3526, which copies the record from the regular record buffer to the update record buffer. Block 3527 then sets the update mode to replace to indicate that a replace operation is active on this table, and the procedure exits normally.

FIG. 35B details the steps performed to reread the current record (see FIG. 35A, block 3524). Decision block 3528 determines whether the table index pointer is null. If decision block 3528 determines that the table index pointer is null, control passes to block 3529, which sets the variables currKey and uniqKey to zero, and control then advances to predefined procedure block 3534. If decision block 3528 determines that the table index pointer is not null, control passes to block 3530. Block 3530 sets the variable currKey equal to the key number obtained from the current table index structure (at the table index pointer) and passes control to decision block 3531. Decision block 3531 determines whether the key numbered currKey is unique-valued. If the key numbered currKey is unique-valued, control advances to block 3532, which sets variable uniqKey equal to currKey and passes control to predefined procedure 3534. If the key numbered currKey is not unique-valued, control advances to block 3533, which sets variable uniqKey equal to zero and passes control to predefined procedure 3534.

Predefined procedure block 3534 allocates a temporary cell to hold the values of the keys numbered currKey and uniqKey and passes control to block 3535, which copies the value of the key numbered uniqKey from the regular record buffer to the temporary cell. Block 3536 then copies the value of the key numbered currKey from the regular record buffer to the temporary cell and passes control to decision block 3537. Decision block 3537 determines whether the key numbered currKey is unique-valued.

If decision block 3537 determines that the key numbered currKey is unique-valued, control passes to block 3538, which copies the value of the key numbered uniqKey from the temporary cell to the update record buffer. Then I/O block 3539 performs a random read into the update record buffer using the key numbered uniqKey, and control advances to predefined procedure block 3550.

If decision block 3537 determines that the key numbered currKey is not unique-valued, control advances to I/O block 3540, which reads the previous record into the update record buffer using the current key of reference. Decision block 3541 then determines whether an I/O error other than BOF (beginning of file) has occurred. If an I/O error other than BOF has occurred, control passes to predefined procedure block 3550.

If decision block 3541 determines that no I/O error other than BOF has occurred, control passes to I/O block 3542, which reads the next record into the update record buffer using the current key of reference. Then decision block 3543 determines whether an I/O error has occurred. If an I/O error has occurred, control advances to predefined procedure block 3550. If no I/O error has occurred, control passes to decision block 3544.

Decision block 3544 determines whether the value of the key numbered uniqKey in the temporary cell equals the value in the update record buffer. If the value of the key numbered uniqKey in the temporary cell equals the value in the update record buffer, control advances to predefined procedure block 3550. If decision block 3544 determines that the value of the key numbered uniqKey in the temporary cell does not equal the value in the update record buffer, control passes to I/O block 3545, which reads the next record into the update record buffer using the current key of reference. Decision block 3546 then determines whether an I/O error has occurred. If an I/O error has occurred, control advances to predefined procedure block 3550. If decision block 3546 determines that no I/O error has occurred, control passes to decision block 3547, which determines whether the value of the key numbered currKey in the temporary cell equals the value in the update record buffer. If the value of the key numbered currKey in the temporary cell equals the value in the update record buffer, control returns to decision block 3544.

If the value of the key numbered currKey in the temporary cell does not equal the value in the update record buffer, control passes to block 3548, which sets a flag to indicate that the next record has already been read (see FIG. 32C, block 3214). Block 3549 then sets the error code to indicate the record was not found, and passes control to predefined procedure block 3550.

Predefined procedure block 3550 deallocates the temporary cell holding the key values and passes control to decision block 3551, which determines whether an error occurred. If an error occurred, the procedure exits with an error. If an error did not occur, control passes to decision block 3552, which determines whether the count of terms in the table's predicate equals zero.

If decision block 3552 determines that the count of predicate terms equals zero, control passes to decision block 3554. If the count of predicate terms does not equal zero, control advances to decision block 3553. Decision block 3553 determines whether the predicate is true (described in detail in FIG. 33A). If the predicate is not true, control passes to decision block 3556. If the predicate is true, control advances to decision block 3554, which determines whether the filter pointer equals null. If filter pointer equals null, the procedure exits normally. If the filter pointer does not equal null, control advances to decision block 3555. Decision block 3555 determines whether the row passes the filter (described in detail in FIG. 48). If the row passes the filter, the procedure exits normally. If the row does not pass the filter, control passes to decision block 3556.

Decision block 3556 determines whether the flag getRecord is true (see FIG. 33A, block 3305; FIG. 33C, blocks 3327, 3328 and 3332; and FIG. 48, blocks 4807, 4813, 4828 and 4829 for the setting of this flag). If getRecord is not true, control passes to block 3557. Block 3557 sets a flag to indicate that subscripts have already been incremented (see FIG. 32C, block 3217 for the use of this flag) and the procedure exits with an error. If decision block 3556 determines that the flag getRecord is true, control passes to block 3558. Block 3558 sets a flag to indicate that subscripts have overflowed (see FIG. 32C, block 3216 for the use of this flag) and the procedure exits with an error.

FIG. 36A details the steps required to set a value in a column (see FIG. 16, block 1602; and FIG. 18, block 1802). Predefined procedure block 3601 maps the session and table IDs to the table instance structure. Decision block 3602 then determines whether the IDs are valid. If the IDs are not valid, the procedure exits with an error. If the IDs are valid, control passes to decision block 3603, which determines whether the table is a virtual table. If the table is a virtual table, the procedure exits with an error. If the table is not a virtual table, control passes to decision block 3604, which determines whether the update mode flag is set (see FIG. 35A, blocks 3522 and 3527; and FIG. 37, block 3710, for the setting of this flag). If the update mode flag is not set, the procedure exits with an error. If the update mode flag is set, control passes to block 3605.

Block 3605 then maps a column ID to a column. Decision block 3606 determines whether the column ID is valid. If the column ID is not valid, the procedure exits with an error. If the column ID is valid, control passes to decision block 3607, which determines whether the column is an ordinal column. If the column is an ordinal column, the procedure exits with an error. If the column is not an ordinal column, control passes to decision block 3608, which determines whether the value is too large or too small for the column. If the value is too large or too small, the procedure exits with an error. If the value is not too large or too small, control passes to block 3609, which locates the item within the update record buffer.

Block 3610 then initializes the update record buffer up to the start of the data item (described in detail in FIG. 36B). Block 3611 copies the new column value to the record buffer (described in detail in FIG. 36C). The procedure then exits normally.

FIG. 36B details the steps performed to initialize the update record buffer up to the start of the data item (see FIG. 36A, block 3610; and FIG. 36C, block 3626). Predefined procedure block 3612 sets the variable offset equal to the offset within the record to the data item. Then, predefined procedure block 3613 sets the variable itemLen equal to the size, in bytes, of the data item. Block 3614 sets the variable offToEnd equal to offset plus itemLen and passes control to decision block 3615, which determines whether offToEnd is greater than the maximum record length. If offToEnd is greater than the maximum record length, the procedure exits with an error. If offToEnd is not greater than the maximum record length, control passes to decision block 3616, which determines whether offToEnd is greater than the length of the current record.

If decision block 3616 determines that offToEnd is not greater than the length of the current record, the procedure exits normally. If offToEnd is greater than the length of the current record, control passes to decision block 3617, which determines whether offset is greater than the length of the current record. If offset is not greater than the length of the current record, control advances to block 3620. If offset is greater than the length of the current record, control passes to decision block 3618, which determines whether the update mode is equal to replace (see FIG. 35A, blocks 3522 and 3527; and FIG. 37, block 3710, for the setting of this flag). If update mode is not equal to replace (i.e., the update mode is insert), control advances to block 3620. If update mode is equal to replace, control advances to block 3619, which pads the record in the update record buffer up to offset offset with binary zeroes. Block 3620 then sets the current record's length to offToEnd and the procedure exits normally.

FIG. 36C copies a column value to the update record buffer (see FIG. 36A, block 3611). Decision block 3621 determines whether column type is equal to text, binary, vartext, or varbinary.

If decision block 3621 determines that column type is equal to text, binary, vartext, or varbinary, control passes to 3622, which copies the column value to the item in the record buffer (described in detail in FIG. 36D). Decision block 3623 then determines whether the column is associated with additional items. If there are no additional items, the procedure exits normally. If there are additional items, control passes to block 3624, which sets the variable i equal to zero. Block 3625 then locates the $(i+1)^{st}$ item within the update record buffer and passes control to block 3626, which initializes the update record buffer up to the data item (described in detail in FIG. 36B). Block 3627 then copies the column value to the item in the update record buffer (described in detail in FIG. 36D) and passes control to block 3628, which sets the variable i equal to i plus one. Decision block 3629 then determines whether the variable i is less than the number of additional items. If the variable i is not less than the number of additional items, the procedure exits normally. If the variable i is less than the number of additional items, control returns to block 3625, and the flow of control continues as previously described from that point.

If decision block 3621 determines that column type does not equal text, binary, vartext, or varbinary, control advances to decision block 3630, which determines whether column type equals bit. If column type equals bit, block 3631 sets binValue equal to the first byte of the column value ANDed with hexadecimal 01. Block 3632 then puts binValue in arithmetic register #0 (described in detail in FIG. 38). Block 3633 converts arithmetic register #0 and stores the result into the record buffer (described in detail in FIG. 47A). The procedure then exits normally.

If decision block 3630 determines that column type does not equal bit, control advances to decision block 3634. Decision block 3634 determines whether the column type equals unsigned byte. If the column type equals unsigned byte, control passes to block 3635, which sets binValue to equal the first byte of the column value, zero-filled to 32 bits. Block 3636 then puts binValue in arithmetic register #0 (described in detail in FIG. 38). Block 3637 then converts arithmetic register #0 and stores it into the record buffer (described in detail in FIG. 47A). The procedure then exits normally.

If decision block 3634 determines that the column type does not equal unsigned byte, control advances to decision block 3638. Decision block 3638 determines whether the column type equals short. If the column type equals short, control passes to block 3639, which sets binValue to equal the first two bytes of the column value, extended to 32 bits. Block 3640 then puts binValue in arithmetic register #0 (described in detail in FIG. 38). Block 3641 then converts arithmetic register #0 and stores it into the record buffer (described in detail in FIG. 47A). The procedure then exits normally.

If decision block 3638 determines that the column type does not equal short, control advances to decision block 3642. Decision block 3642 determines whether the column type equals long. If the column type equals long, control passes to block 3643, which puts the 32-bit column value in arithmetic register #0 (described in detail in FIG. 38). Block 3644 then converts arithmetic register #0 and stores it into the record buffer (described in detail in FIG. 47A). The procedure then exits normally.

If decision block 3642 determines that the column type does not equal long, control advances to decision block 3645. Decision block 3645 determines whether the column type equals currency. If the column type equals currency, control passes to block 3646, which puts the currency-type column value in arithmetic register #0 (described in detail in FIG. 39). Block 3647 then converts arithmetic register #0 and stores it into the record buffer (described in detail in FIG. 47A). The procedure then exits normally.

If decision block 3645 determines that the column type does not equal currency, control advances to decision block 3648. Decision block 3648 determines whether the column type equals date, time, or datetime. If the column type equals date, time, or datetime, control passes to block 3649, which puts the IEEE double precision column value in arithmetic register #0 (described in detail in FIG. 40). Block 3650 then converts arithmetic register #0 and stores it into the record buffer (described in detail in FIG. 47A). The procedure then exits normally.

If decision block 3648 determines that the column type does not equal date, time, or datetime, control advances to decision block 3651. Decision block 3651 determines whether the column type equals double. If the column type equals double, control passes to block 3652, which puts the IEEE double precision column value in arithmetic register #0 (described in detail in FIG. 40). Block 3653 then rounds arithmetic register #0 to the size of the data item (described in detail in FIG. 41). Block 3654 then converts arithmetic register #0 and stores it into the record buffer (described in detail in FIG. 47A). The procedure then exits normally.

If decision block 3651 determines that the column type does not equal double, control advances to decision block 3655. Decision block 3655 determines whether the column type equals single. If the column type equals single, control passes to block 3656, which puts the IEEE single precision column value in arithmetic register #0 (described in detail in FIG. 42). Block 3657 then rounds arithmetic register #0 to the size of the data item (described in detail in FIG. 41). Block 3658 then converts arithmetic register #0 and stores it into the record buffer (described in detail in FIG. 47A). The procedure then exits normally.

If decision block 3655 determines that the column type does not equal single, the procedure exits with an error.

FIG. 36D details the steps performed to copy a text, binary, vartext, or varbinary value to a data item in the update record buffer (see FIG. 36C, blocks 3622 and 3627). Predefined procedure block 3659 sets the variable offset equal to the offset within the record to the data item, then control passes to decision block 3660, which determines whether the column type equals text. If the column type equals text, block 3661 copies the value to the data item in the update record buffer. Block 3662 then copies spaces to the end of the value in the update record buffer in order pad the value to the size of the item, and the procedure exits normally.

If decision block 3660 determines that the column type does not equal text, control advances to decision block 3663, which determines whether column type equals binary. If the column type equals binary, block 3664 copies the value to the data item in the update record buffer, and the procedure exits normally.

If decision block 3663 determines that the column type does not equal binary, control advances to decision block 3665. Decision block 3665 determines whether the data item is a variable-length group. If the data item is not a variable-length group, the procedure exits with an error.

If decision block 3665 determines that the data item is a variable-length group, control passes to block 3666, which finds the data item (subordinate to the group) with a variable occurrence count. Block 3667 then sets the variable occ equal to (size of the column value minus the offset within the group to the subordinate item) divided by (the span of the subordinate item). Block 3668 puts occ in arithmetic register #1 (described in detail in FIG. 38). Block 3669 then converts arithmetic register #1 and stores it into the data item which holds the count of occurrences of the subordinate item (described in detail in FIG. 46). Block 3670 then sets the current record's length to the end of the group item and block 3671 copies the value to the group item in the update record buffer. The procedure then exits normally.

FIG. 37 details the steps performed to complete a row update (see FIG. 16, block 1604; and FIG. 18, block 1804). Predefined procedure block 3701 maps the session and table IDs to the table instance. Decision block 3702 then determines whether the IDs are valid. If the IDs are not valid, the procedure exits with an error. If the IDs are valid, control passes to decision block 3703, which determines whether the table is a virtual table. If the table is a virtual table, the procedure exits with an error. If the table is not a virtual table, control passes to decision block 3704, which determines whether the update mode flag is set (see FIG. 35A, blocks 3522 and 3527; and FIG. 37, block 3710, for the setting of this flag). If the update mode flag is not set, the procedure exits with an error. If the update mode flag is set, control passes to decision block 3705.

Decision block 3705 determines whether the update mode flag equals (see FIG. 35A, block 3527, for the setting of replace mode). If the update mode flag equals replace, control passes to I/O block 3706, which rewrites the current record from the update record buffer and passes control to block 3710. If decision block 3705 determines that the update mode flag does not equal replace (i.e., is equal to insert, see FIG. 35A, block 3522, for the setting of insert mode), control advances to predefined procedure block 3707, which verifies that all necessary columns have been set. I/O block 3708 then writes a new record from the update record buffer, and block 3709 resets the record buffer pointer to point to the regular record buffer. Control then passes to block 3710. Block 3710 clears the update mode flag to indicate that no update is in progress on this table, and the procedure exits normally.

Figure 38:
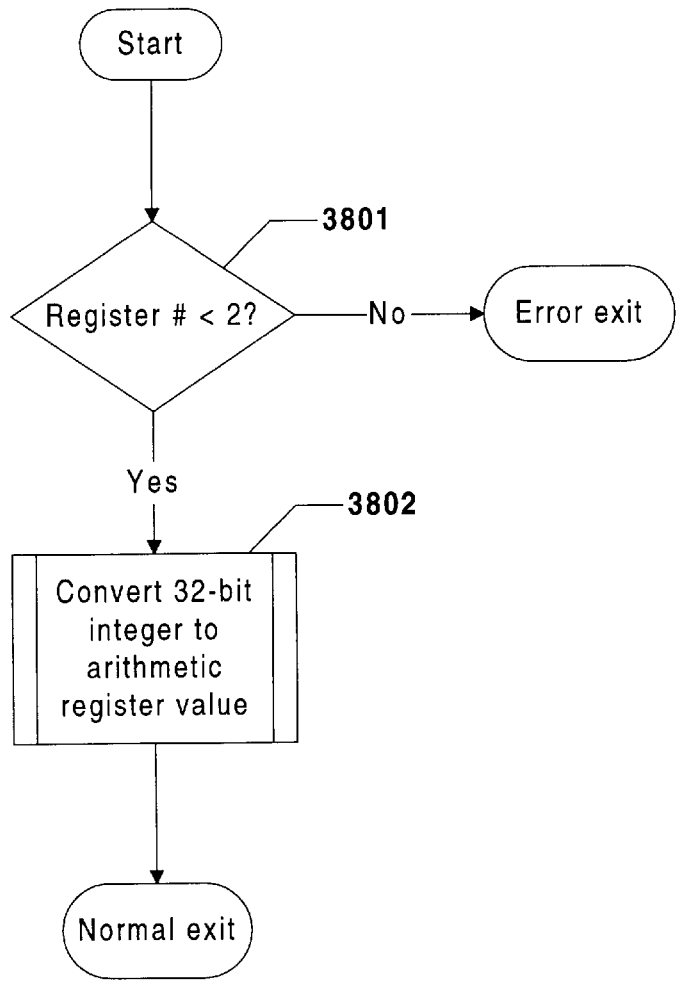

FIG. 38 details the steps performed to put a 32-bit integer value into an arithmetic register (see FIG. 29B, blocks 2923, 2927, 2931, and 2934; and FIG. 36C, blocks 3632, 3636, 3640, and 3643). Decision block 3801 determines whether the register number is less than two. If the register number is not less than two, the procedure exits with an error. If the register number is less than two, predefined procedure block 3802 converts the 32-bit integer to the arithmetic register value and the procedure exits normally.

Figure 39:
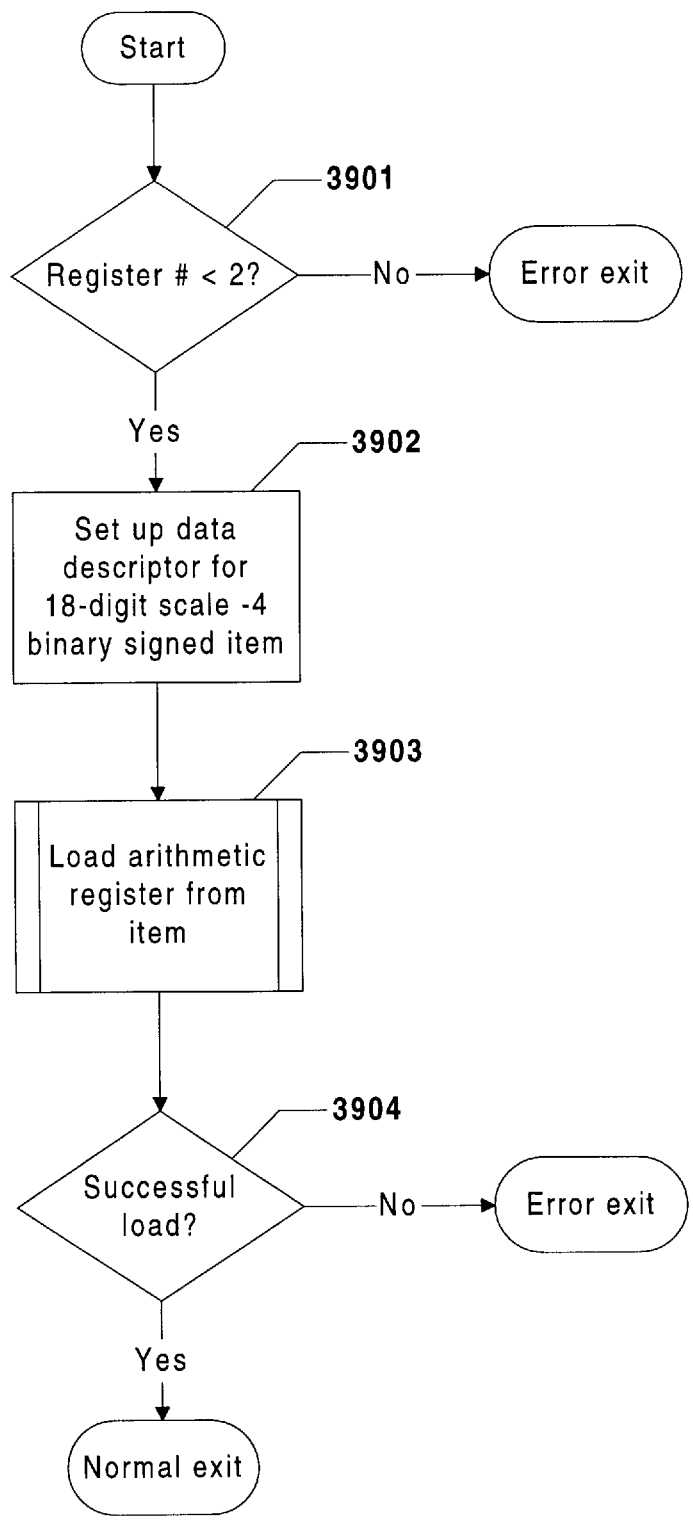

FIG. 39 details the steps performed to put a currency value into an arithmetic register (see FIG. 29B, block 2937; and FIG. 36C, block 3646). Decision block 3901 determines whether the register number is less than two. If the register number is not less than two, the procedure exits with an error. If the register number is less than two, block 3902 sets up a data descriptor for an 18-digit signed binary item with scale −4 (four of the digits follow the decimal point). Predefined procedure block 3903 then loads the arithmetic register from the value. Decision block 3904 determines whether the load was successful. If the load was not successful, the procedure exits with an error. If the load was successful, the procedure exits normally.

Figure 40:
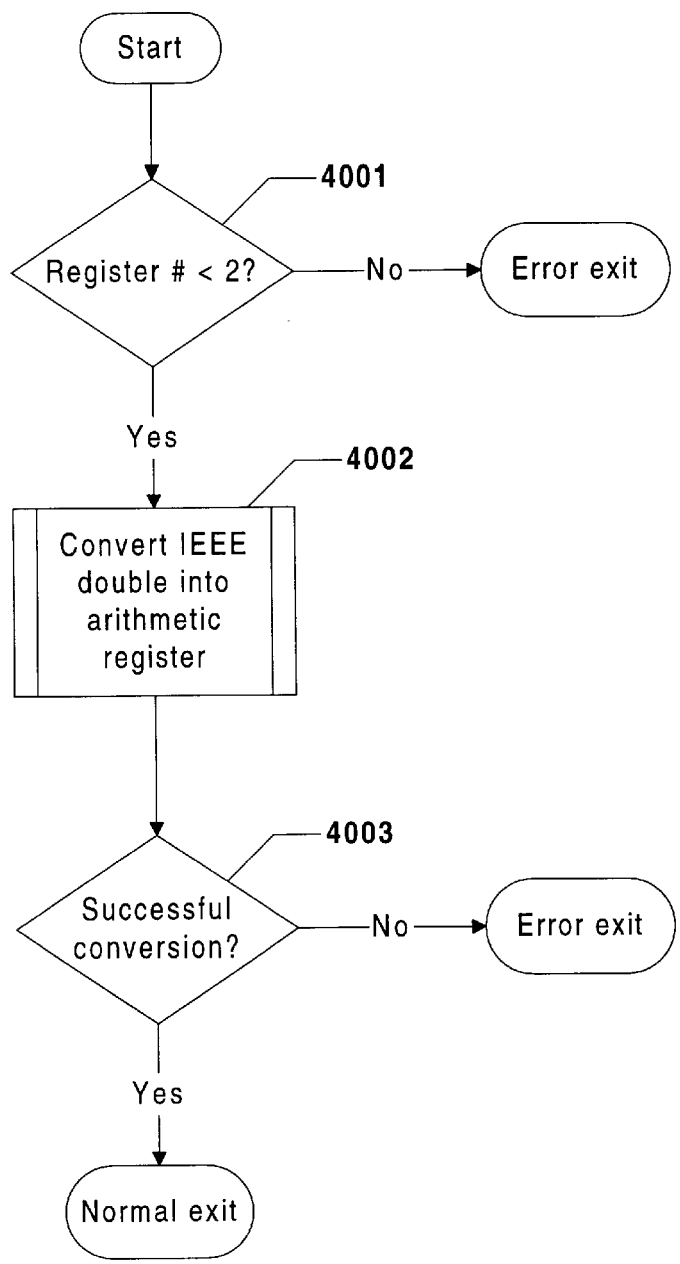

FIG. 40 details the steps performed to put an IEEE double precision value in an arithmetic register (see FIG. 29B, blocks 2940 and 2943; and FIG. 36C, blocks 3649 and 3652). Decision block 4001 determines whether the register number is less than two. If the register number is not less than two, the procedure exits with an error. If the register number is less than two, predefined procedure block 4002 converts the IEEE double precision value and loads it into the arithmetic register. Decision block 4003 determines whether the conversion operation was successful. If the conversion operation was not successful, the procedure exits with an error. If the conversion operation was successful, the procedure exits normally.

Figure 41:
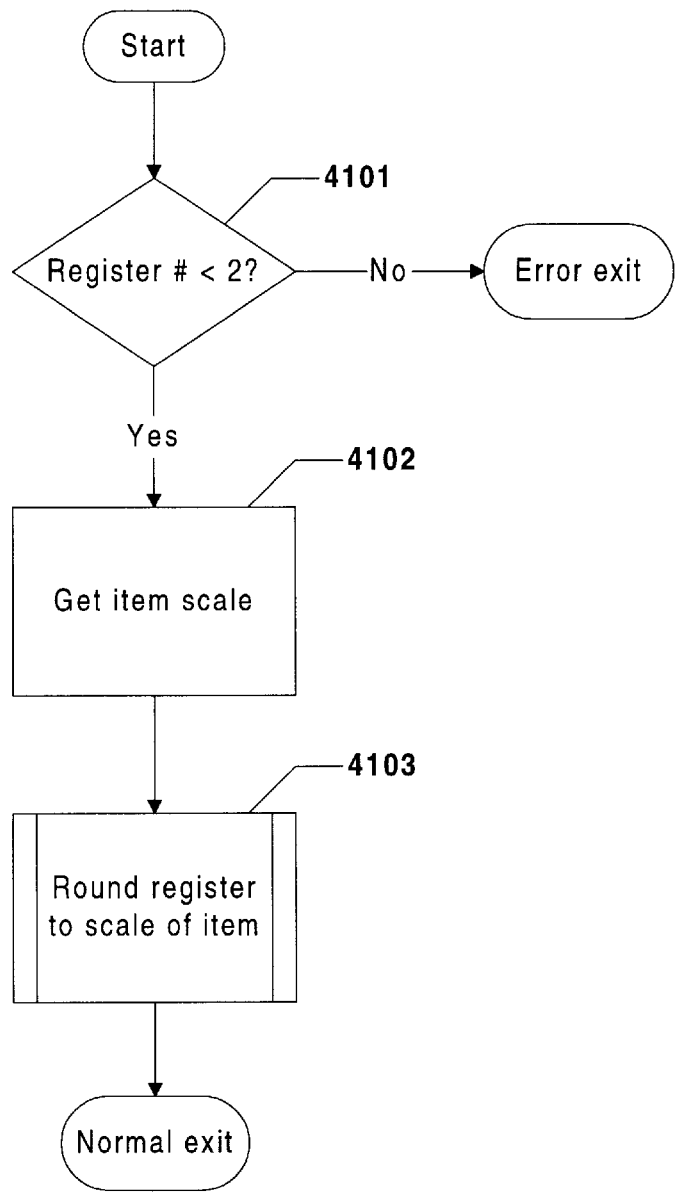

FIG. 41 details the steps performed to round a result to a data item (see FIG. 29B, blocks 2944 and 2948; and FIG. 36C, blocks 3653 and 3657). Decision block 4101 determines whether the register number is less than two. If the register number is not less than two, the procedure exits with an error. If the register number is less than two, block 4102 gets the scale of the data item. Predefined procedure block 4103 rounds the register to the scale of the data item and the procedure exits normally.

Figure 42:
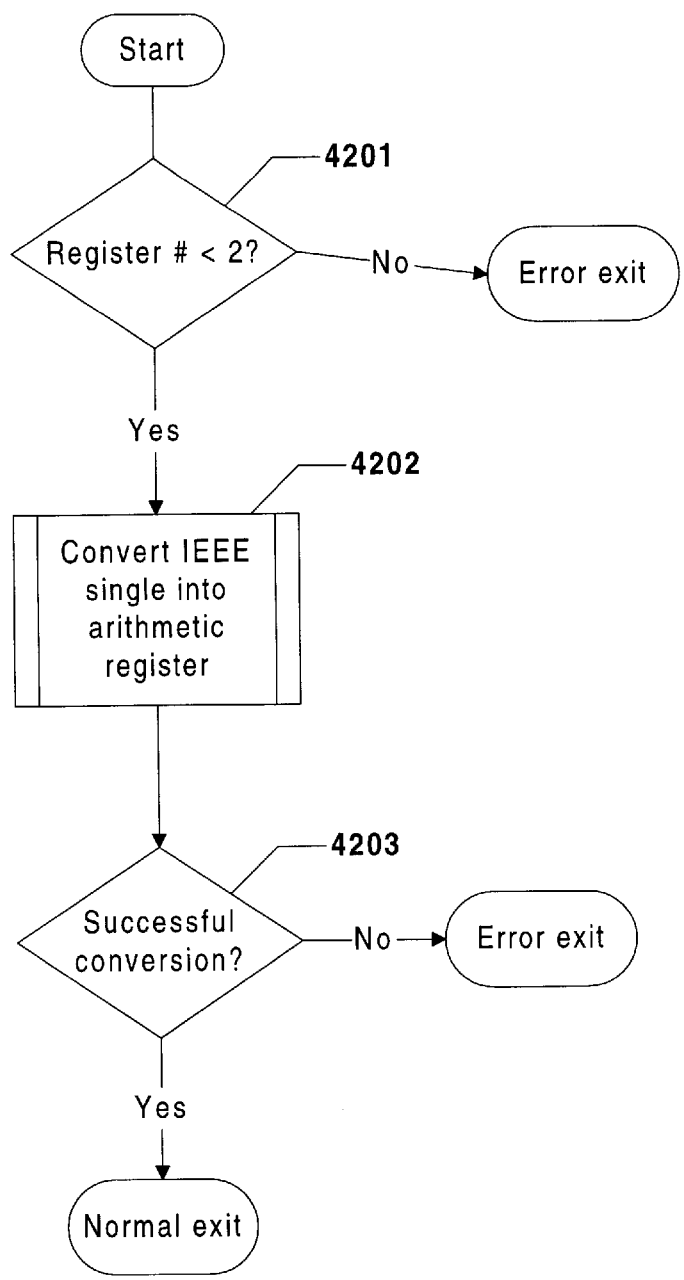

FIG. 42 details the steps performed to put an IEEE single precision value in an arithmetic register (see FIG. 29B, block 2947; and FIG. 36C, block 3656). Decision block 4201 determines whether the register number is less than two. If the register number is not less than two, the procedure exits with an error. If the register number is less than two, predefined procedure block 4202 converts the IEEE single precision value and loads it into the arithmetic register. Decision block 4203 determines whether the conversion operation was successful. If the conversion operation was not successful, the procedure exits with an error. If the conversion operation was successful, the procedure exits normally.

FIG. 43 details the steps performed to convert arithmetic register #0 and store it in the key buffer (see FIG. 29B, blocks 2928, 2932, 2935, 2938, 2941, 2945, and 2949). Block 4301 sets the variable keyLen equal to zero and columnXForm to the item's transform function for the column. Decision block 4302 then determines whether columnXForm equals identity. If columnXForm does not equal identity, control passes to block 4303, which transforms the column value in the arithmetic register into the item value (described in detail in FIG. 44) and passes control to decision block 4304.

If decision block 4302 determines that columnXForm equals identity, control advances to decision block 4304, which determines whether the item's type is a numeric type. If the item is not numeric, control passes to decision block 4305, which determines whether the column is an ordinal column. If the column is not an ordinal column, control passes to decision block 4306, which determines whether the item is a condition item. If the item is not a condition item, the procedure exits with an error. If the item is a condition item, control passes to block 4307, which stores the arithmetic register into the condition item (described in detail in FIG. 47C), and control advances to block 4314.

If decision block 4304 determines that the item's type is a numeric type, control advances to block 4308, which sets up a data descriptor for the item using information from the catalog. Control then advances to predefined procedure block 4310, which stores the arithmetic register into the item and passes control to decision block 4311. Decision block 4311 determines whether the store operation was successful. If the store operation was not successful, the procedure exits with an error. If the store operation was successful, control passes to decision block 4312, which determines whether the column is an ordinal column. If the column is an ordinal column, control passes to block 4313, which sets the variable keyLen equal to four and the procedure exits normally. If decision block 4312 determines that the column is not an ordinal column, control advances to block 4314, which sets keyLen equal to the length of the item, and the procedure exits normally.

If decision block 4305 determines that the column is an ordinal column, control advances to block 4309. Block 4309 sets up a data descriptor for the ordinal column and passes control to predefined procedure block 4310. The flow of control continues as previously described from that point.

FIG. 44 details the steps performed to transform a column value to an item value (see FIG. 43, block 4303; and FIG. 47A, block 4710). Decision block 4401 determines whether the register number is less than two. If the register number is not less than two, the procedure exits with an error. If the register number is less than two, decision block 4402 determines whether the transform function is identity. If the transform function is identity, the procedure exits normally. If the transform function is not identity, decision block 4403 determines whether the transform function is Plus 1.

If decision block 4403 determines that the transform function is Plus 1, control passes to predefined procedure block 4404, which increments the arithmetic register by −1, thus reversing the increment by +1 that occurs when the item value is transformed to the column value (see FIG. 52, block 5204). Decision block 4405 then determines whether the increment operation was successful. If the increment operation was not successful, the procedure exits with an error; if it was successful, the procedure exits normally.

If decision block 4403 determines that the transform function is not Plus 1, control advances to decision block 4406, which determines whether the transform function is Minus 1. If the transform function is Minus 1, control passes to predefined procedure block 4407, which increments the arithmetic register by +1, thus reversing the increment by −1 that occurs when the item value is transformed to the column value (see FIG. 52, block 5207). Decision block 4408 then determines whether the increment operation was successful. If the increment operation was not successful, the procedure exits with an error; if it was successful, the procedure exits normally.

If decision block 4406 determines that the transform function is not Minus 1, control advances to decision block 4409, which determines whether the transform function is date. If the transform function is date, predefined procedure block 4410 converts the arithmetic register timestamp (column datetime value) to a date integer (item date value), thus reversing the conversion to timestamp that occurs when the item value is transformed to the column value (see FIG. 52, block 5210). Decision block 4411 then determines whether the conversion operation was successful. If the conversion operation was not successful, the procedure exits with an error; if it was successful, the procedure exits normally.

If decision block 4409 determines that the transform function is not date, control advances to decision block 4412, which determines whether the transform function is time. If the transform function is time, predefined procedure block 4413 converts the arithmetic register timestamp (column date-time value) to a time integer (item time value), thus reversing the conversion to timestamp that occurs when the item value is transformed to the column value (see FIG. 52, block 5213). Decision block 4414 then determines whether the conversion operation was successful. If the conversion operation was not successful, the procedure exits with an error; if it was successful, the procedure exits normally.

If decision block 4412 determines that the transform function is not time, control advances to decision block 4415, which determines whether the transform function is date-time. If the transform function is not date-time, the procedure exits with an error. If the transform function is date-time, predefined procedure block 4416 converts the arithmetic register timestamp (column date-time value) to a date-time integer (item date-time value), thus reversing the conversion to timestamp that occurs when the item value is transformed to the column value (see FIG. 52, block 5216). Decision block 4417 then determines whether the conversion operation was successful. If the conversion operation was not successful, the procedure exits with an error; if it was successful, the procedure exits normally.

Figure 45:
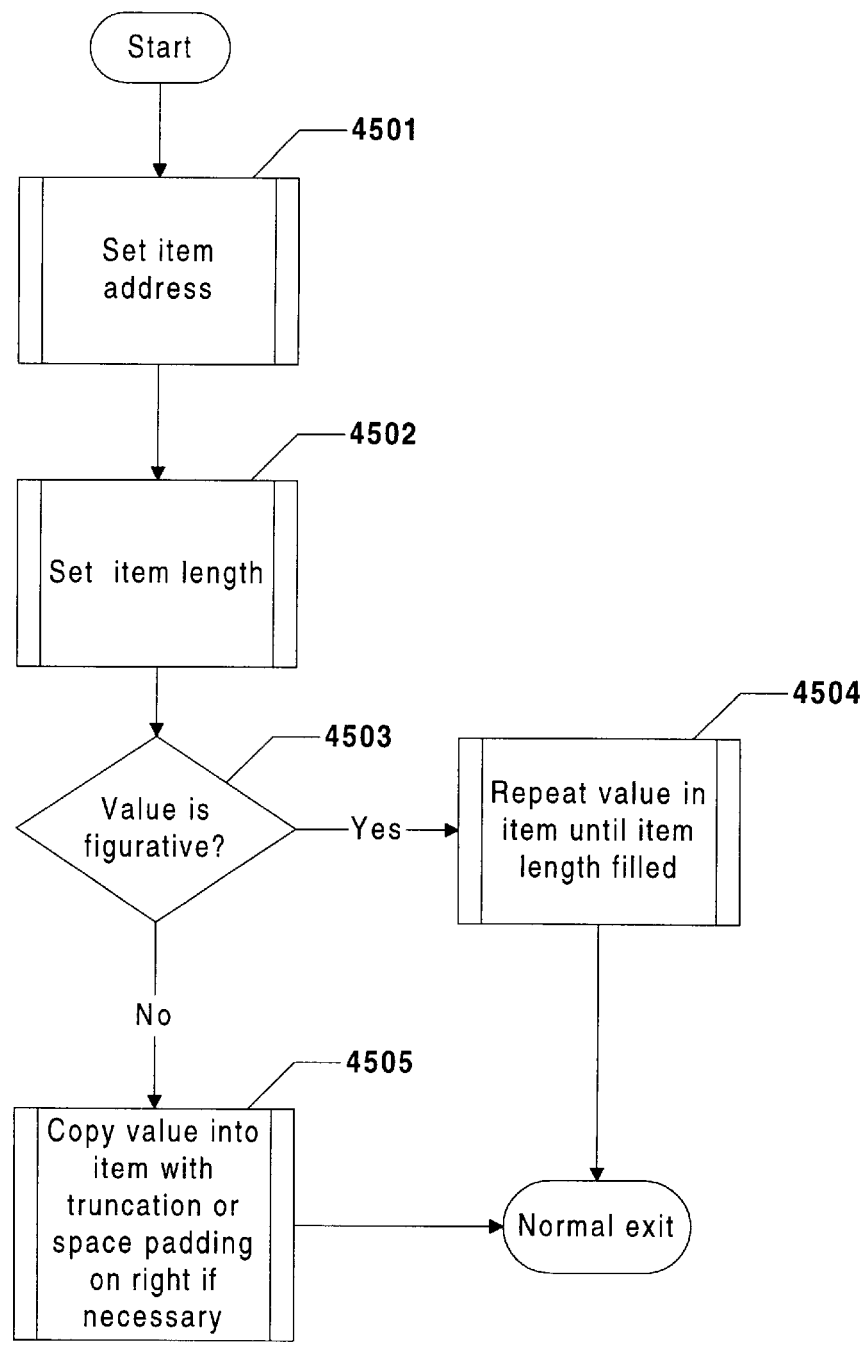
Figure 47B:
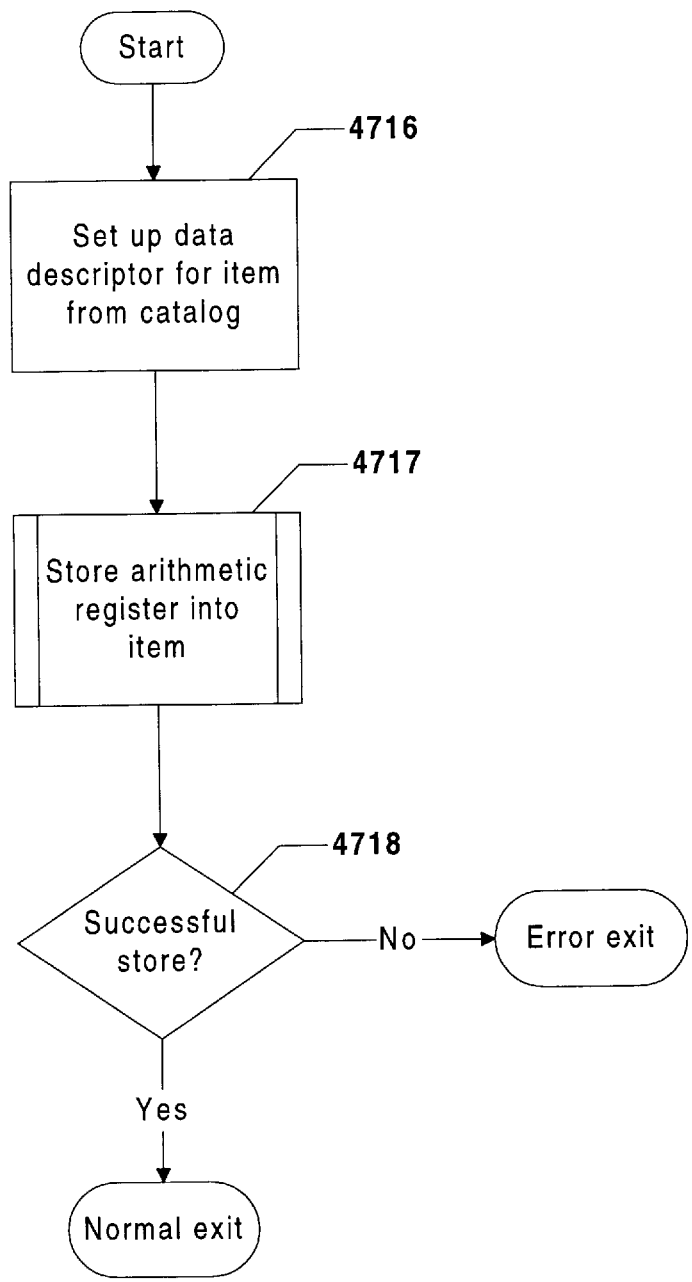
Figure 47C:
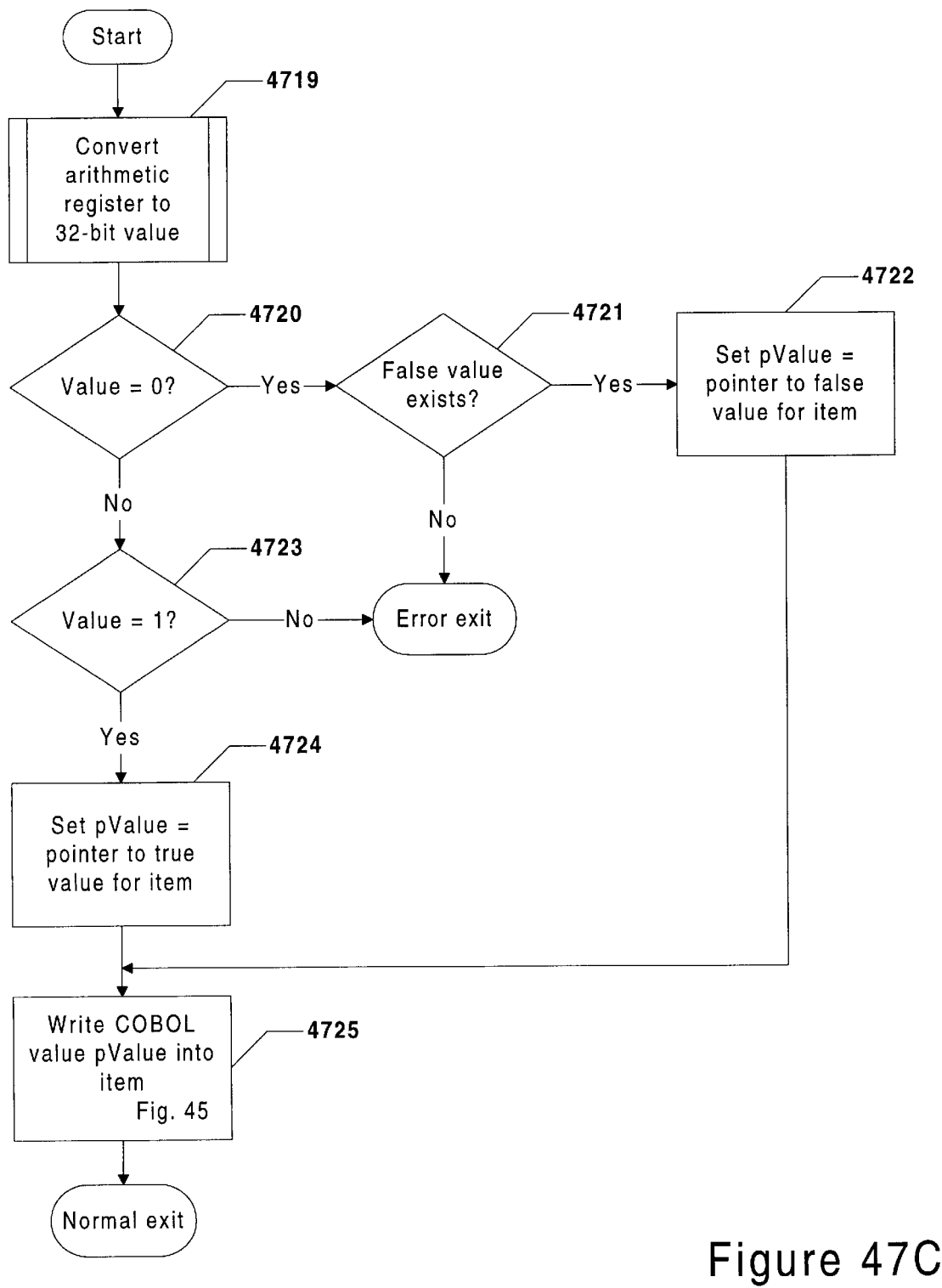

FIG. 45 details the steps performed to write a COBOL value obtained from the catalog into an item (see FIG. 47C, block 4725). Predefined procedure block 4501 sets the item address. Predefined procedure block 4502 sets the item length. Decision block 4503 determines whether the value is a figurative. If the value is a figurative, control passes to predefined procedure block 4504, which repeats the value in the item until the item length is filled. The procedure then exits normally. If the value is not a figurative, control advances to predefined procedure block 4505, which copies the value into the item with truncation or space padding on the right, if necessary. The procedure then exits normally.

Figure 46:
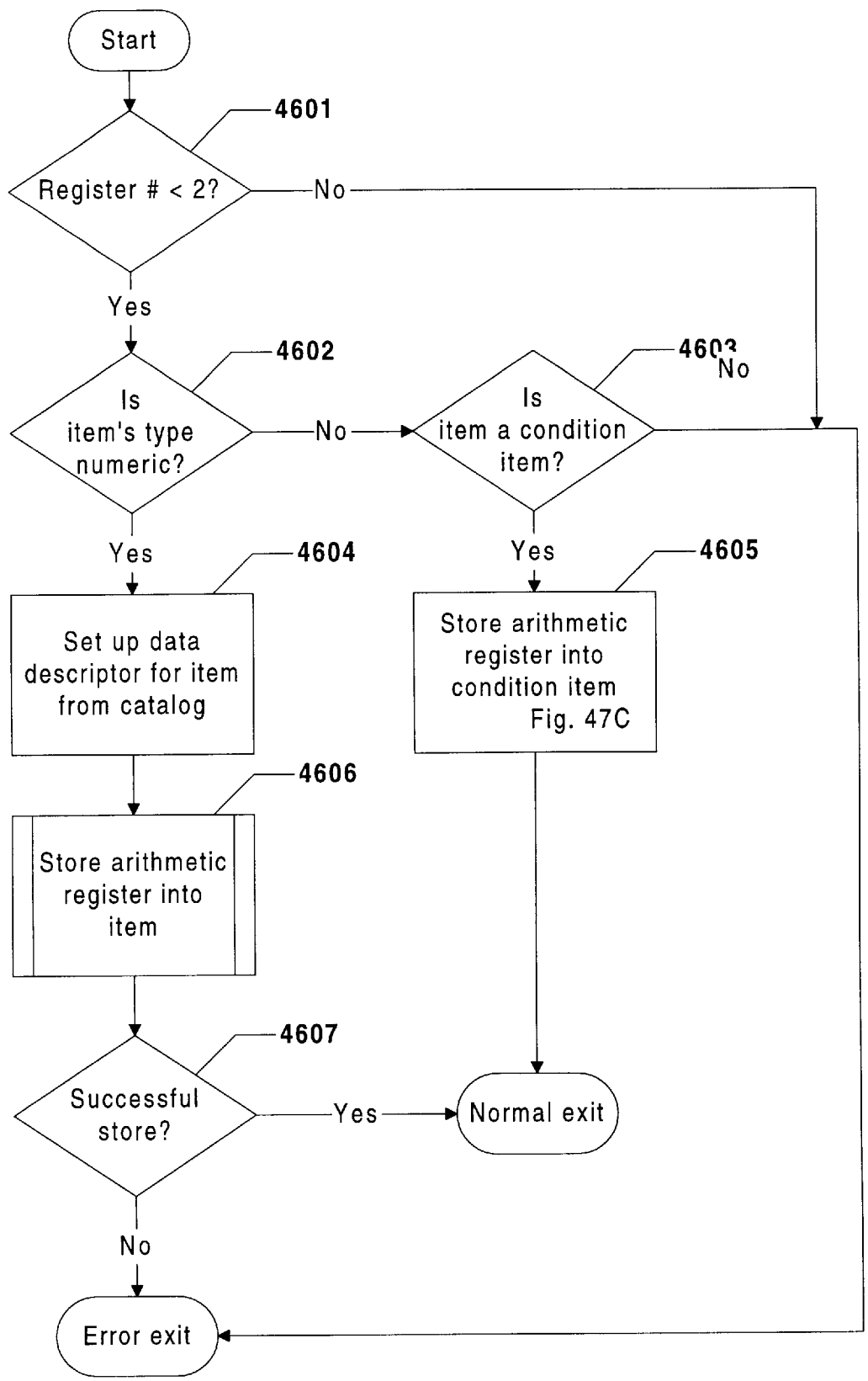

FIG. 46 details the steps performed to convert the arithmetic register item value and store it into the record buffer (see FIG. 36D, block 3669). Decision block 4601 determines whether the register number is less than two. If the register number is not less than two, the procedure exits with an error. If the register number is less than two, control advances to decision block 4602, which determines whether the item's type is a numeric type.

If decision block 4602 determines that the item is not numeric, control passes to decision block 4603, which determines whether the item is a condition item. If the item is not a condition item, the procedure exits with an error. If the item is a condition item, control advances to block 4605, which stores the arithmetic register into the condition item (described in detail in FIG. 47C). The procedure then exits normally.

If decision block 4602 determines that the item's type is a numeric type, control advances to block 4604, which sets up a data descriptor for the item from the catalog. Predefined procedure block 4606 then stores the arithmetic register into the item. Decision block 4607 determines whether the store operation was successful. If the store operation was successful, the procedure exits normally. If the store operation was not successful, the procedure exits with an error.

FIG. 47A details the steps performed to convert the arithmetic register column value and store it into the record buffer (see FIG. 36C, blocks 3633, 3637, 3641, 3644, 3647, 3650, 3654, and 3658). Decision block 4701 determines whether the register number is less than two. If the register number is not less than two, the procedure exits with an error. If the register number is less than two, control advances to block 4702, which sets itemCount equal to the number of items in the item set associated with the column. Control then advances to decision block 4703, which determines if itemCount is greater than one. If decision block 4703 determines that itemCount is not greater than one, control passes to block 4705. If decision block 4703 determines itemCount is greater than one, control advances to predefined procedure block 4704, which saves the arithmetic register value in preparation for storing the column value into multiple items (see block 4708). Block 4705 then sets i equal to one (i will be used to range over the itemCount items in the item set associated with the column) and control advances to decision block 4706.

Decision block 4706 determines whether i is greater itemCount. If i is greater than itemCount, the procedure exits normally. If i is not greater than itemCount, control advances to decision block 4707, which determines whether i is greater than one. If decision block 4707 determines that i is greater than one, control passes to predefined procedure block 4708, which restores the saved arithmetic register value (see block 4704) and passes control to decision block 4709. If decision block 4707 determines that i is not greater than one, control advances to decision block 4709. Decision block 4709 determines whether the $i^{th}$ item's transform function equals identity. If the $i^{th}$ item's transform function does not equal identity, control passes to block 4710, which transforms the column value in the arithmetic register to an item value (described in detail in FIG. 44) and passes control to decision block 4711. If decision block 4709 determines that the $i^{th}$ item's transform function equals identity, control advances to decision block 4711, which determines whether the $i^{th}$ item's type is a numeric type.

If decision block 4711 determines that the $i^{th}$ item is numeric, control passes to block 4712, which stores the arithmetic register into the numeric item (described in detail in FIG. 47B). Control then advances to block 4715, which sets i equal to i plus one and control returns to block 4706. The flow of control then continues as previously described from that point.

If decision block 4711 determines that the $i^{th}$ item's type is not a numeric type, control advances to decision block 4713, which determines whether the $i^{th}$ item is a condition item. If the $i^{th}$ item is not a condition item, the procedure exits with an error. If the $i^{th}$ item is a condition item, control passes to block 4714, which stores the arithmetic register into the condition item (described in detail in FIG. 47C). Control then passes to block 4715, and the flow of control continues as previously described from that point.

FIG. 47B details the steps performed to store an arithmetic register into a numeric item (see FIG. 47A, block 4712). Block 4716 sets up the data descriptor for the item from the catalog. Predefined procedure block 4717 then stores the arithmetic register into the item. Decision block 4718 determines whether the store operation was successful. If the store operation was not successful, the procedure exits with an error. If the store operation was successful, the procedure exits normally.

FIG. 47C details the steps performed to store an arithmetic register into a condition item (see FIG. 43, block 4307;. FIG. 46, block 4605; and FIG. 47A, block 4714). Predefined procedure block 4719 converts the arithmetic register to a 32-bit value. Decision block 4720 then determines whether value equals zero.

If decision block 4720 determines that value equals zero, control passes to decision block 4721, which determines whether a false value exists in the catalog for the data item. If no false value exists, the procedure exits with an error. If a false value exists, block 4722 sets pValue to point to the false value for the item. Control then advances to block 4725, which writes the COBOL value indicated by pValue into the item (described in detail in FIG. 45) and the procedure exits normally.

If decision block 4720 determines that value does not equal zero, control advances to decision block 4723, which determines whether value equals one. If value equals one, block 4724 sets pValue equal to the true value for the item. Block 4725 then writes the COBOL value indicated by pValue into the item (described in detail in FIG. 45) and the procedure exits normally. If decision block 4723 determines that value is not equal to one, the procedure exits with an error.

FIG. 48 details the steps performed to determine whether a row passes a filter (see FIG. 32D, block 3231; and FIG. 35B, block 3555). Block 4801 fetches the filter information from the table instance. Decision block 4802 then determines whether the column is an ordinal column or a subscripted item.

If decision block 4802 determines that the column is not an ordinal column or a subscripted item, control passes to block 4803, which sets newRecord equal to true. Control then passes to decision block 4805. If decision block 4802 determines that the column is an ordinal column or a subscripted item, control advances to block 4804, which sets newRecord equal to false. Control then passes to decision block 4805. Decision block 4805 determines whether the filter data is null or the data item is null.

If decision block 4805 determines that the filter data is null or the data item is null, control passes to decision block 4806, which determines whether the filter operation equals is null. If the filter operation equals is null, control passes to block 4807, which sets getRecord equal to false. The procedure then responds that the row passes the filter. If decision block 4806 determines that the filter operation does not equal is null, control advances to decision block 4825.

If decision block 4805 determines that neither the filter data nor the data item is null, control advances to decision block 4808. Decision block 4808 determines whether the filter operation equals is null. If the filter operation equals is null, control advances to decision block 4825. If the filter operation does not equal is null, control advances to decision block 4809, which determines whether the column type is a text type. If the column type is not a text type, control passes to decision block 4825. If the column type is a text type, control advances to decision block 4810, which determines whether the filter data type is SQL_C_CHAR. If the filter data type is SQL_C_CHAR, control passes to block 4812. If the filter data type is not SQL_C_CHAR, control advances to block 4811, which converts the filter data to character form. Block 4812 then sets relation equal to the result of comparing the filter data to the column in the record. Block 4813 sets getRecord equal to false and passes control to decision block 4814, which determines whether the filter operation equals less than.

If decision block 4814 determines that the filter operation equals less than, control passes to decision block 4815, which determines whether relation equals less than. If relation equals less than, the procedure responds that the row passes the filter. If relation does not equal less than, control advances to decision block 4825.

If decision block 4814 determines that the filter operation does not equal less than, control advances to decision block 4816, which determines whether the filter operation equals less than or equal to. If the filter operation equals less than or equal to, control passes to decision block 4817, which determines whether relation equals less than or relation equals equal to. If relation equals less than or relation equals equal to, the procedure responds that the row passes the filter. If relation does not equal less than nor does relation equal equal to, control advances to decision block 4825.

If decision block 4816 determines that the filter operation does not equal less than or equal to, control advances to decision block 4818, which determines whether the filter operation equals equal to. If the filter operation equals equal to, control passes to decision block 4819, which determines whether relation equals equal to. If relation equals equal to, the procedure responds that the row passes the filter. If relation does not equal equal to, control advances to decision block 4825.

If decision block 4818 determines that the filter operation does not equal equal to, control advances to decision block 4820, which determines whether the filter operation equals greater than or equal to. If the filter operation equals greater than or equal to, control passes to decision block 4821, which determines whether relation equals greater than or relation equals equal to. If relation equals greater than or relation equals equal to, the procedure responds that the row passes the filter. If relation does not equal greater than nor does relation equal equal to, control advances to decision block 4825.

If decision block 4820 determines that the filter operation does not equal greater than or equal to, control advances to decision block 4822, which determines whether the filter operation equals greater than. If the filter operation equals greater than, control passes to decision block 4823, which determines whether relation equals greater than. If relation equals greater than, the procedure responds that the row passes the filter. If relation does not equal greater than, control advances to decision block 4825.

Decision block 4825 determines whether newRecord equals true. If newRecord does not equal true, control passes to predefined procedure block 4826, which increments the subscripts in the subscript value table. Decision block 4827 then determines whether the subscripts have overflowed. If the subscripts have not overflowed, block 4828 sets getRecord equal to false and the procedure responds that the row does not pass the filter. If the subscripts have overflowed, block 4829 sets getRecord equal to true and the procedure responds that the row does not pass the filter. If decision block 4825 determines that newRecord equals true, control advances to block 4829, which sets getRecord equal to true, and the procedure responds that the row does not pass the filter.

Figure 49:
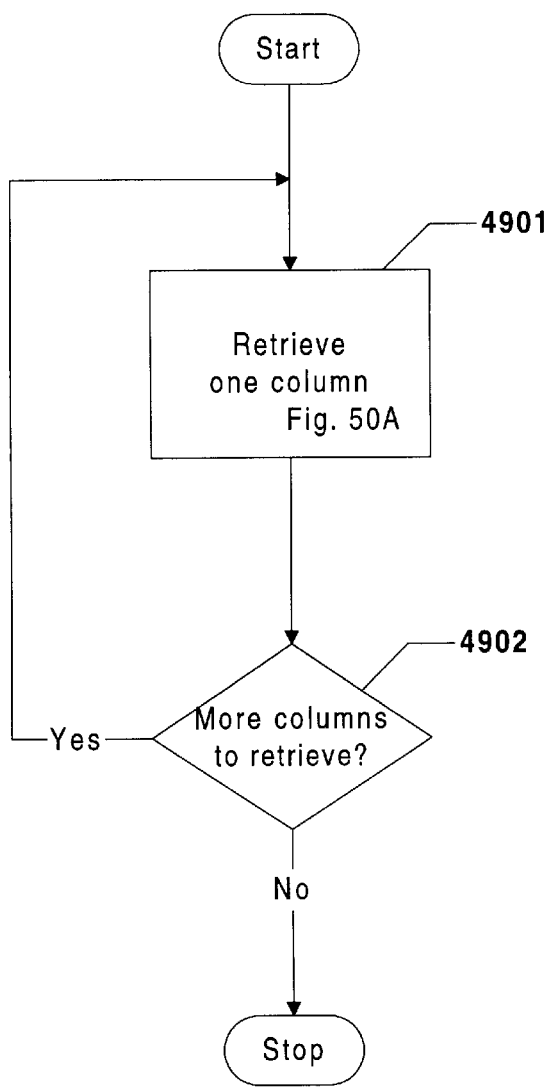

FIG. 49 details the steps performed to retrieve columns (see FIG. 24, block 2404; and FIG. 25, block 2506). Block 4901 retrieves one column (described in detail in FIG. 50).

Decision block 4902 then determines whether there are more columns to retrieve. If there are no more columns to retrieve, the procedure exits normally. If there are more columns to retrieve, control returns to block 4901.

FIG. 50 details the steps required to retrieve one column (see FIG. 17, block 1701; and FIG. 49, block 4901). Predefined procedure block 5001 maps session and table IDs to the table instance. Decision block 5002 then determines whether the IDs are valid. If the IDs are not valid, the procedure exits with an error. If the IDs are valid, control advances to decision block 5003, which maps a column ID to a column. Decision block 5004 then determines whether the column ID is valid. If the column ID is not valid, the procedure exits with an error. If the column ID is valid, control passes to decision block 5005, which determines whether a current record has been established. If no current record has been established, the procedure exits with an error. If a current record has been established, control passes to block 5006, which locates the item within the record buffer. Decision block 5007 then determines whether the column type equals text.

If decision block 5007 determines that the column type equals text, control passes to block 5008, which sets fillByte equal to space character. Control then advances to decision block 5011, which determines whether the column is an ordinal column. If the column is an ordinal column, the procedure exits with an error. If the column is not an ordinal column, predefined procedure block 5012 sets colLen equal to the width of the column. Decision block 5013 then determines whether colLen equals zero. If colLen equals zero, the procedure exits with an error. If colLen does not equal zero, control passes to decision block 5014, which determines whether the column type equals text or binary.

If decision block 5014 determines that the column type does not equal text or binary, control passes to block 5015, which sets fillLen equal to colLen and control advances to block 5017. If decision block 5014 determines that the column type equals text or binary, control advances to predefined procedure block 5016, which sets fillLen equal to the maximum width of the column and control passes to block 5017. Block 5017 sets the length of the returned data to the value of fillLen and passes control to decision block 5018, which determines whether fillLen is greater than the size of the caller's buffer. If fillLen is greater than the size of the caller's buffer, control passes to block 5019. Block 5019 sets fillLen equal to the size of the caller's buffer and passes control to decision block 5020. If decision block 5018 determines that fillLen is not greater than the size of the caller's buffer, control advances to decision block 5020. Decision block 5020 determines whether fillLen is less than colLen. If fillLen is less than colLen, control passes to block 5021, which sets colLen equal to fillLen and passes control to block 5022. If decision block 5020 determines that fillLen is not less than colLen, control advances to block 5022. Block 5022 sets fillLen equal to fillLen minus colLen. Block 5023 then copies colLen bytes from the item in the record buffer to the caller's buffer and passes control to block 5024. Block 5024 copies fillLen copies of fillByte to the caller's buffer and the procedure exits normally.

If decision block 5007 determines that the column type does not equal text, control advances to decision block 5009, which determines whether the column type equals binary, vartext, or varbinary. If the column type equals binary, vartext, or varbinary, control passes to block 5010, which sets fillByte equal to binary zero. Control then passes to block 5011, and the flow of control continues as previously described from that point.

If decision block 5009 determines that the column type does not equal binary, vartext, or varbinary, control advances to decision block 5025, which determines whether the column type equals bit. If column type equals bit, control passes to decision block 5026, which determines whether the column is an ordinal column. If the column is an ordinal column, the procedure exits with an error. If the column is not an ordinal column, control passes to block 5027, which converts the item value in the record buffer and loads it into arithmetic register number zero (described in detail in FIG. 51). Block 5028 then gets a 32-bit value from the arithmetic register and puts it in binValue (described in detail in FIG. 53). Decision block 5029 then determines whether binValue equals zero or one. If binValue does not equal zero or one, the procedure exits with an error. If binValue equals zero or one, control passes to block 5030, which stores the low-order eight bits of binValue in the caller's buffer. Block 5031 then sets the length of the returned data to one and the procedure exits normally.

If decision block 5025 determines that the column type does not equal bit, control advances to block 5032, which determines whether the column type equals unsigned byte. If the column type equals unsigned byte, block 5033 converts the item value in the record buffer and loads it into arithmetic register #0 (described in detail in FIG. 51). Block 5034 then gets a 32-bit value from the arithmetic register and puts it in binValue (described in detail in FIG. 53). Block 5035 stores the low-order eight-bits of binValue in the caller's buffer. Block 5036 sets the length of the returned data to one and the procedure exits normally.

If decision block 5032 determines that the column type does not equal unsigned byte, control advances to decision block 5037, which determines whether the column type equals short. If the column type equals short, block 5038 converts the item value in the record buffer and loads it into arithmetic register #0 (described in detail in FIG. 51). Block 5039 then gets a 32-bit value from the arithmetic register and puts it in binValue (described in detail in FIG. 53). Block 5040 stores the low-order 16-bits of binValue in the caller's buffer. Block 5041 sets the length of the returned data to two and the procedure exits normally.

If decision block 5037 determines that the column type does not equal short, control advances to decision block 5042, which determines whether the column type equals long. If the column type equals long, block 5043 converts the item value in the record buffer and loads it into arithmetic register #0 (described in detail in FIG. 51). Block 5044 then gets a 32-bit value from the arithmetic register and puts it in binValue (described in detail in FIG. 53). Block 5045 stores binValue in the caller's buffer. Block 5046 sets the length of the returned data to four and the procedure exits normally.

If decision block 5042 determines that the column type does not equal long, control advances to decision block 5047, which determines whether the column type equals currency. If the column type equals currency, block 5048 converts the item value in the record buffer and loads it into arithmetic register #0 (described in detail in FIG. 51). Block 5049 then gets a currency value from the arithmetic register and puts it in the caller's buffer (described in detail in FIG. 54). Block 5050 sets the length of the returned data to eight and the procedure exits normally.

If decision block 5047 determines that the column type does not equal currency, control advances to decision block 5051, which determines whether the column type equals date, time, datetime, or double. If the column type equals date, time, datetime, or double, block 5051 converts the item value in the record buffer and loads it into arithmetic register #0 (described in detail in FIG. 51). Block 5053 then gets an IEEE double precision value from the arithmetic register and puts it in the caller's buffer (described in detail in FIG. 55). Block 5054 sets the length of the returned data to eight and the procedure exits normally.

If decision block 5051 determines that the column type does not equal date, time, datetime, or double, control advances to decision block 5055, which determines whether column type equals single. If column type equals single, block 5056 converts the item value in the record buffer and loads it into arithmetic register #0 (described in detail in FIG. 51). Block 5057 then gets an IEEE single precision value from the arithmetic register and puts it in the caller's buffer (described in detail in FIG. 56). Block 5058 sets the length of the returned data to four and the procedure exits normally.

FIG. 51 details the steps performed to convert an item value to an arithmetic register (see FIG. 50, blocks 5027, 5033, 5038, 5043, 5048, 5052, and 5056). Block 5101 determines whether the register number is less than two. If the register number is not less than two, the procedure exits with an error. If the register number is less than two, decision block 5102 determines whether the column is an ordinal column.

If decision block 5102 determines that the column is an ordinal column, control advances to predefined procedure block 5106, which converts a 32-bit value into the arithmetic register. Decision block 5107 then determines whether the item's transform function equals identity. If the item's transform function equals identity, the procedure exits normally. If the item's transform function does not equal identity, control passes to block 5108, which transforms the arithmetic register value from an item value to a column value (described in detail in FIG. 52). The procedure then exits normally.

If decision block 5102 determines that the column is not an ordinal column, control advances to decision block 5103, which determines whether the item's type is a numeric type. If the item is a numeric item, control passes to block 5109, which sets up a data descriptor for the item. Predefined procedure block 5110 then loads the arithmetic register from the item. Decision block 5111 determines whether the item's transform function equals identity. If the item's transform function equals identity, the procedure exits normally. If the item's transform function does not equal identity, block 5112 transforms the arithmetic register value from an item value to a column value (described in detail in FIG. 52). The procedure then exits normally.

If decision block 5103 determines that the item's type is not a numeric type, control advances to decision block 5104, which determines whether the item's type is a fixed length nonnumeric type. If the item's type is a fixed length nonnumeric type, control advances to block 5113, which sets up a data descriptor for the unsigned DISPLAY item, overlaying the rightmost 18 characters of the original item. Predefined procedure block 5114 then loads the arithmetic register from the item. Decision block 5115 determines whether the item's transform function equals identity. If the item's transform function equals identity, the procedure exits normally. If the item's transform function does not equal identity, block 5116 transforms the arithmetic register value from an item value to a column value (described in detail in FIG. 52). The procedure then exits normally.

If decision block 5104 determines that the item's type is not a fixed length nonnumeric type, control passes to decision block 5105, which determines whether the item is a condition item. If the item is not a condition item, the procedure exits with an error. If the item is a condition item, control advances to block 5117, which sets condValue equal to zero. Decision block 5118 then determines whether the condition specified by the condition item is true. If the condition is not true, control advances to predefined procedure block 5120. If the condition is true, control passes to block 5119, which sets condValue equal to one, and passes control to predefined procedure block 5120. Predefined procedure block 5120 then converts the 32-bit value into the arithmetic register and passes control to decision block 5121. Decision block 5121 determines whether the item's transform function equals identity. If the item's transform function equals identity, the procedure exits normally. If the item's transform function does not equal identity, block 5122 transforms the arithmetic register value from item to column (described in detail in FIG. 52). The procedure then exits normally.

FIG. 52 details the steps performed to transform an item value to a column value (see FIG. 51, blocks 5108, 5112, 5116, and 5122). Decision block 5201 determines whether the register number is less than two. If the register number is not less than two, the procedure exits with an error. If the register number is less than two, decision block 5202 determines whether the transform function is identity. If the transform function is identity, the procedure exits normally. If the transform function is not identity, decision block 5203 determines whether the transform function is Plus 1.

If decision block 5203 determines that the transform function is Plus 1, control passes to predefined procedure block 5204, which increments the arithmetic register by +1. Decision block 5205 then determines whether the increment operation was successful. If the increment operation was not successful, the procedure exits with an error; if it was successful, the procedure exits normally.

If decision block 5203 determines that the transform function is not Plus 1, control advances to decision block 5206, which determines whether the transform function is Minus 1. If the transform function is Minus 1, control passes to predefined procedure block 5207, which increments the arithmetic register by −1. Decision block 5208 then determines whether the increment operation was successful. If the increment operation was not successful, the procedure exits with an error; if it was successful, the procedure exits normally.

If decision block 5206 determines that the transform function is not Minus 1, control advances to decision block 5209, which determines whether the transform function is date. If the transform function is date, predefined procedure block 5210 converts the arithmetic register date integer (item date value) to timestamp (column date-time value with zero for time portion). Decision block 5211 then determines whether the conversion operation was successful. If the conversion operation was not successful, the procedure exits with an error; if it was successful, the procedure exits normally.

If decision block 5209 determines that the transform function is not date, control advances to decision block 5212, which determines whether the transform function is time. If the transform function is time, predefined procedure block 5213 converts the arithmetic register time integer (item time value) to timestamp (column date-time value with zero for date portion). Decision block 5214 then determines whether the conversion operation was successful. If the conversion operation was not successful, the procedure exits with an error; if it was successful, the procedure exits normally.

If decision block 5212 determines that the transform function is not time, control advances to decision block 5215, which determines whether the transform function is date-time. If the transform function is not date-time, the procedure exits with an error. If the transform function is date-time, predefined procedure block 5216 converts the arithmetic register date-time integer (item time value) to timestamp (column date-time value). Decision block 5217 then determines whether the conversion operation was successful. If the conversion operation was not successful, the procedure exits with an error; if it was successful, the procedure exits normally.

Figure 53:
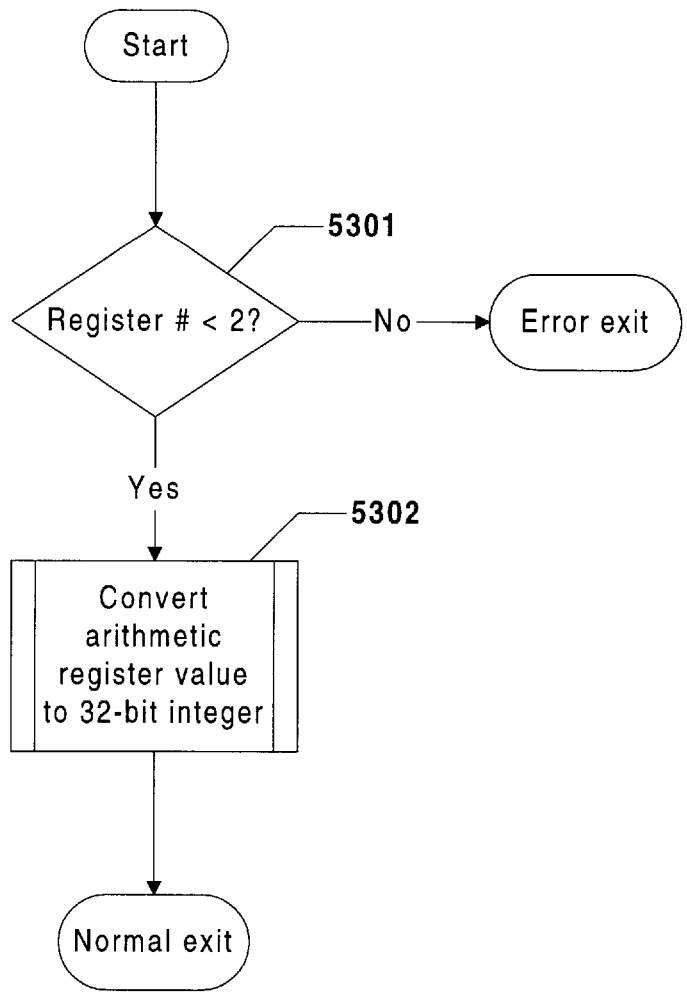

FIG. 53 details the steps performed to get a value from the arithmetic register (see FIG. 50, block 5028, 5034, 5039, and 5044). Decision block 5301 determines whether the register number is less than two. If the register number is not less than two, the procedure exits with an error. If the register number is less than two, predefined procedure block 5302 converts the arithmetic register value to the 32-bit integer. The program then exits normally.

Figure 54:
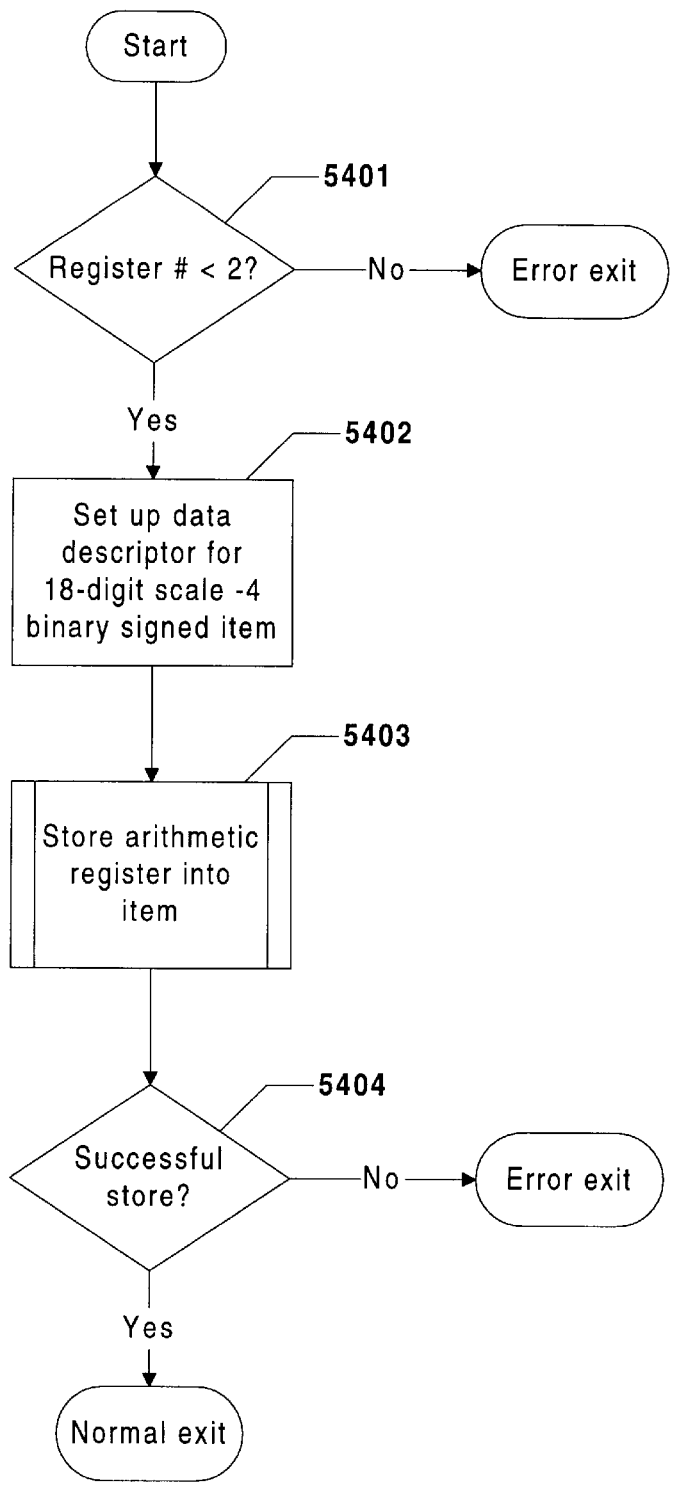

FIG. 54 details the steps performed to get a currency value from the arithmetic register (see FIG. 50, block 5049). Decision block 5401 determines whether the register number is less than two. If the register number is not less than two, the procedure exits with an error. If the register number is less than two, block 5402 sets up a data descriptor for an 18-digit signed binary item with scale −4 (four of the digits follow the decimal point). Predefined procedure block 5403 then stores the arithmetic register into the item. Decision block 5404 determines whether the store operation was successful. If the store operation was not successful, the procedure exits with an error; if it was successful, the procedure exits normally.

Figure 55:
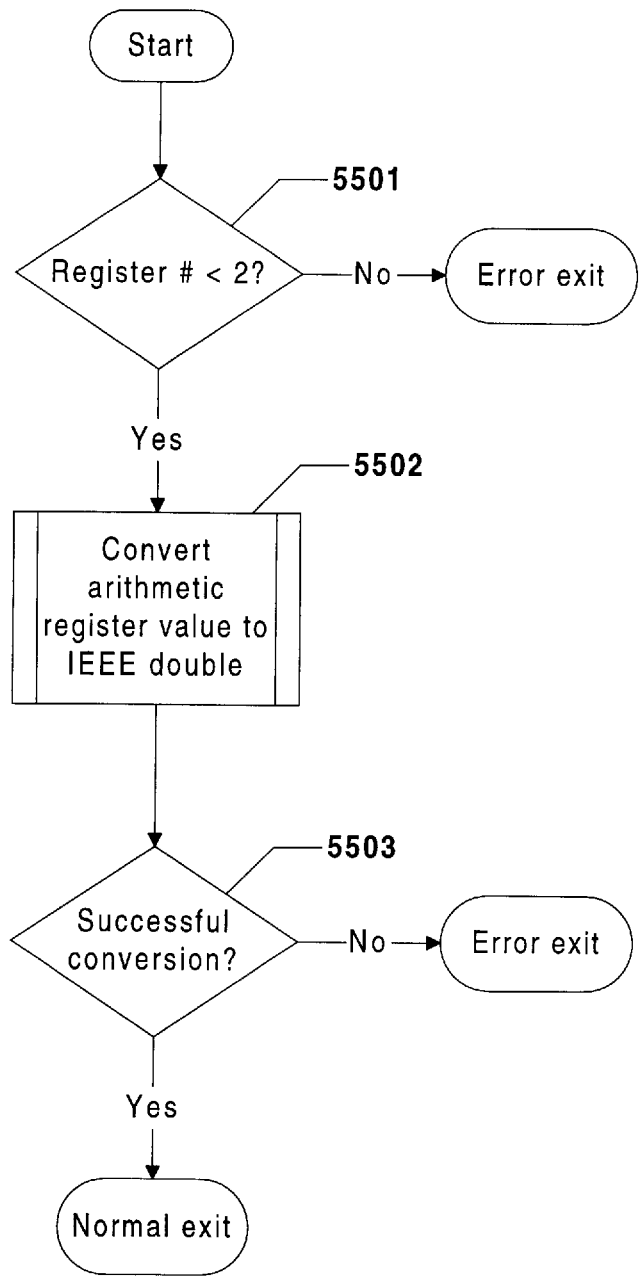

FIG. 55 details the steps performed to get an IEEE double precision value from an arithmetic register. Decision block 5501 determines whether the register number is less than two. If the register number is not less than two, the procedure exits with an error. If the register number is less than two, predefined procedure block 5502 converts the arithmetic register value to the IEEE double precision value. Decision block 5503 determines whether the conversion operation was successful. If the conversion operation was not successful, the procedure exits with an error; if it was successful, the procedure exits normally.

Figure 56:
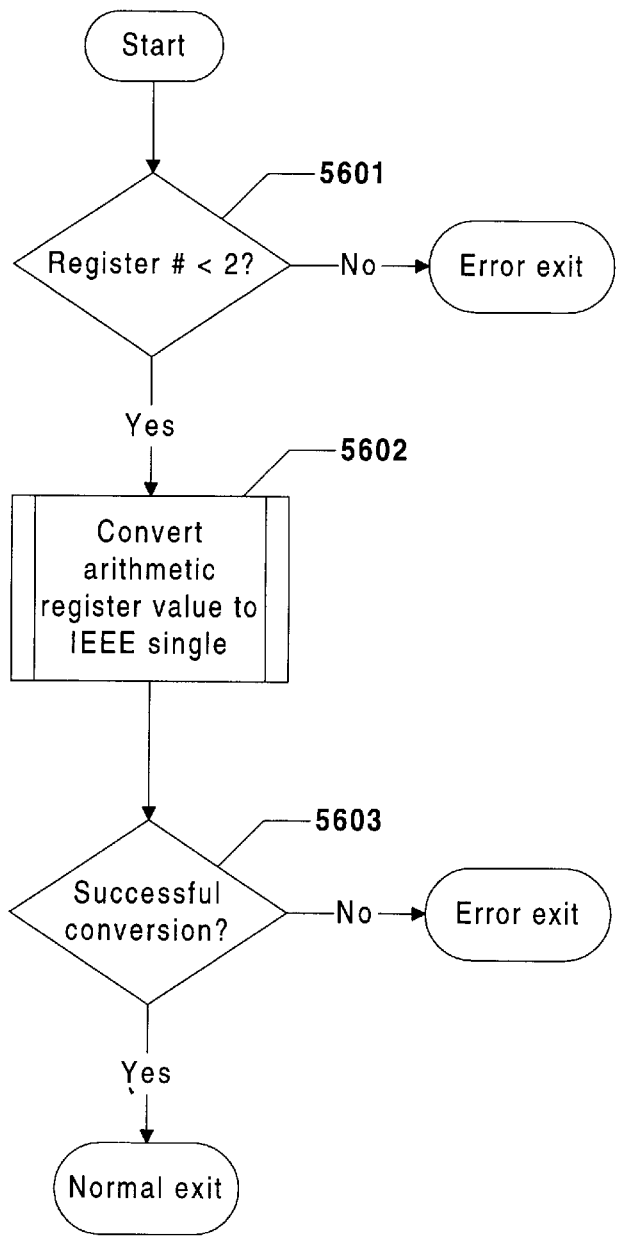

FIG. 56 details the steps performed to get an IEEE single precision value from an arithmetic register. Decision block 5601 determines whether the register number is less than two. If the register number is not less than two, the procedure exits with an error. If the register number is less than two, predefined procedure block 5602 converts the arithmetic register value to the IEEE single precision value. Decision block 5603 determines whether the conversion operation was successful. If the conversion operation was not successful, the procedure exits with an error; if it was successful, the procedure exits normally.

What is claimed is:

1. A method of operating a computer system to process SQL requests to access 3GL application data stored in said computer system, by using a relational database representation of said 3GL application data, comprising:

generating an execution plan as a function of a SQL request and as a function of information provided in a predetermined catalog stored in said computer system, said predetermined catalog defining a relational database representation of underlying 3GL application data stored in said computer system; and processing said SQL request within said computer system to access said 3GL application data, by executing said execution plan as a function of said information in said predetermined catalog and as a function of said underlying 3GL application data.

2. A method of operating a computer system to process SQL requests to access 3GL application data stored in said computer system, by using a relational database representation of said 3GL application data, comprising:

establishing a predetermined catalog by,
generating 3GL file schema from selected 3GL source programs that utilize said underlying 3GL application data;
specifying relational database schema as a function of said generated 3GL file schema; and
storing said 3GL file schema and said relational database schema in said catalog;
generating an execution plan as a function of a SQL request and as a function of information provided in said predetermined catalog stored in said computer system; and
processing said SQL request within said computer system to access said 3GL application data, by executing said execution plan as a function of said information in said predetermined catalog and as a function of said underlying 3GL application data.

3. The method of claim 2, said step of specifying said relational database schema, comprising:
creating table definitions, creating column definitions, creating table predicate definitions, and creating table index definitions, all as a function of said 3GL file schema.

4. The method of claim 2, said step of generating 3GL file schema, comprising:
selecting 3GL source programs that utilize said 3GL application data from which file definitions are to be extracted;
identifying specific file definitions within said selected 3GL source programs to be processed; and
extracting appropriate 3GL file schema from said identified file definitions.

5. The method of claim 4, said extracting step comprising:
extracting file characteristics from said identified file definitions, said file characteristics including, file name, record length, key descriptions and file organization; and
extracting record structures from said identified file definitions, said record structures including data item offsets, data item lengths, and data item types.

6. The method of claim 3, said column definitions including ordinal column definitions.

7. A method of operating a computer system to process SQL requests to access 3GL application data stored in said computer system, by using a relational database representation of said 3GL application data, comprising:
generating an execution plan as a function of a SQL request and as a function of information provided in a predetermined catalog stored in said computer system, said predetermined catalog defining a relational database representation of underlying 3GL application data stored in said computer system, and said predetermined catalog stored in said computer system including 3GL file schema generated from selected 3GL source programs that utilize said 3GL application data, and including relational database schema specified as a function of said generated 3GL file schema; and processing said SQL request within said computer system to access said 3GL application data, by executing said execution plan as a function of said information in said predetermined catalog and as a function of said underlying 3GL application data, said processing step comprising,
opening a table specified by said SQL request, including,
retrieving relational database schema from said predetermined catalog as a function of a table name in said SQL request,
retrieving 3GL file schema from said predetermined catalog as a function of said retrieved relational database schema, and
opening a 3GL application data file as a function of said retrieved 3GL file schema;
performing at least one action on said opened 3GL application data file, in accordance with an operation included in said SQL request; and
closing said table as a function of said retrieved relational database schema and said retrieved 3GL file schema.

8. The method of claim 7, said 3GL file schema including record structures of said opened 3GL application data file, and said relational database schema including column definitions of said relational database representation of said 3GL application data, said performing step comprising:
retrieving at least one data item from said opened 3GL application data file as a function of said record structures and said column definitions.

9. The method of claim 8, said at least one data item comprising a number, said retrieving step comprising:
transforming said number into date or time information represented by said number.

10. The method of claim 7, said 3GL file schema including record structures of said opened 3GL application data file and said relational database schema including column definitions of said relational database representation of said 3GL application data, said performing step comprising:
storing at least one data item in said opened 3GL application data file as a function of said record structures and said column definitions.

11. The method of claim 10, said at least one data item comprising a number, said storing step comprising:
transforming date or time information into said number representing said date or time information.

12. The method of claim 7, said 3GL file schema including key descriptions of said opened 3GL application data file, said performing step comprising:
locating records within said opened 3GL application data file, required by said operation included in said SQL request, as a function of said key descriptions; and
performing said at least one action on said located records.

13. The method of claim 7, said 3GL file schema including key descriptions of said opened 3GL application data file, said performing step comprising:
ordering records within said opened 3GL application data file, required by said operation included in said SQL request, as a function of said key descriptions; and
performing said at least one action on said ordered records.

14. The method of claim 7, said relational database schema including table definitions and table predicate definitions, said performing step comprising:
eliminating records within said opened 3GL application data file in accordance with said table predicate definitions, to create a subset of records in said opened 3GL application data file, said subset of records corresponding to said table definitions; and performing said at least one action on said subset of records.

15. The method of claim 7, said relational database representation of said 3GL application data including tables, each table having at least one row, and said 3GL file schema including record structures of said 3GL application data that define at least one repeating data item, said performing step comprising, for each table:

creating said at least one row for each occurrence of said at least one repeating data item in accordance with said record structure and in accordance with said relational database schema.

16. The method of claim 15, said at least one row having an ordinal column including an occurrence number of said at least one row.

17. A computer system for processing SQL requests to access 3GL application data stored in said computer system, comprising:

storage means for storing 3GL application data and for storing a predetermined catalog defining a relational database representation of said 3GL application data;

data input means for receiving a SQL request from a system user;

means for generating an execution plan as a function of said SQL request and as a function of information provided in said predetermined catalog; and means for processing said SQL request to access said 3GL application data by execution said executing plan as a function of said information in said predetermined catalog and as a function of said 3GL application data.

18. A computer system for processing SQL requests to access 3GL application data stored in said computer system, comprising:

means for storing 3GL source code programs that utilize said 3GL application data;

means for generating a predetermined catalog defining a relational database representation of said 3GL application data, comprising:

means for generating 3GL file schema from selected ones of said 3GL source programs;

means for generating relational database schema as a function of said generated 3GL file schema; and means for storing said 3GL file schema and said relational database schema as said predetermined catalog;

storage means for storing 3GL application data;

data input means for receiving a SQL request from a system user;

means for generating an execution plan as a function of said SQL request and as a function of information provided in said predetermined catalog; and means for processing said SQL request to access said 3GL application data by executing said execution plan as a function of said information in said predetermined catalog and as a function of said 3GL application data.

19. A computer system for processing SQL requests to access 3GL application data stored in said computer system, comprising:

storage means for storing 3GL application data and for storing a predetermined catalog defining a relational database representation of said 3GL application data, said predetermined catalog including 3GL file schema generated from selected 3GL source programs that utilize said 3GL application data, and including relational database schema generated as a function of said generated 3GL file schema;

data input means for receiving a SQL request from a system user;

means for generating an execution plan as a function of said SQL request and as a function of information provided in said predetermined catalog; and means for processing said SQL request to access said 3GL application data by executing said execution plan as a function of said information in said predetermined catalog and as a function of said 3GL application data, said means for processing, including, means for opening a table specified by said SQL request, including, means for retrieving relational database schema from said predetermined catalog as a function of a table name in said SQL request, means for retrieving 3GL file schema from said predetermined catalog as a function of said retrieved relational database schema, and means for opening a 3GL application data file as a function of said retrieved 3GL file schema;

means for manipulating said opened 3GL application file, in accordance with an operation included in said SQL request; and means for closing said table as a function of said retrieved relational database and said retrieved 3GL file schema.

20. The computer system of claim 19, said relational database schema including table definitions and table predicate definitions, said means for manipulating further comprising:

filter means for eliminating records within said open 3GL application data file as a function of said table predicate definitions, and for creating a subset of records in said opened 3GL application data file, said subset of records corresponding to said table definitions in said predetermined catalog; and means for manipulating said subset of records as a function of said operation included in said SQL request.

21. A program storage device, readable by a computer and physically embodying a computer program which, when loaded into said computer, will cause said computer to perform the method of claim 1.

22. A program storage device, readable by a computer and physically embodying a computer program which, when loaded into said computer, will cause said computer to perform the method of claim 2.

23. A program storage device, readable by a computer and physically embodying a computer program which, when loaded into said computer, will cause said computer to perform the method of claim 7.

* * * * *

UNITED STATES PATENT AND TRADEMARK OFFICE
CERTIFICATE OF CORRECTION

PATENT NO.   :   5,826,076

DATED        :   October 20, 1998

INVENTOR(S)  :   Bradley et al.

It is certified that error appears in the above-identified patent and that said Letters Patent is hereby corrected as shown below:

Title page, in the Abstract, line 2, change "programs" to --data--.
In claim 17, column 43, line 32, change "execution said executing" to --executing said execution--.

Signed and Sealed this

Ninth Day of February, 1999

Attest:

Attesting Officer

*Acting Commissioner of Patents and Trademarks*